US011899817B2

(12) United States Patent
Padmanabhan

(10) Patent No.: US 11,899,817 B2
(45) Date of Patent: Feb. 13, 2024

(54) SYSTEMS, METHODS, AND APPARATUSES FOR STORING PII INFORMATION VIA A METADATA DRIVEN BLOCKCHAIN USING DISTRIBUTED AND DECENTRALIZED STORAGE FOR SENSITIVE USER INFORMATION

(71) Applicant: Salesforce, Inc., San Francsico, CA (US)

(72) Inventor: Prithvi Krishnan Padmanabhan, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 521 days.

(21) Appl. No.: 17/163,547

(22) Filed: Jan. 31, 2021

(65) Prior Publication Data

US 2021/0182423 A1 Jun. 17, 2021

Related U.S. Application Data

(63) Continuation-in-part of application No. 16/399,920, filed on Apr. 30, 2019, which is a continuation-in-part (Continued)

(51) Int. Cl.
*G06F 17/00* (2019.01)
*G06F 21/62* (2013.01)

(Continued)

(52) U.S. Cl.
CPC .... *G06F 21/6245* (2013.01); *G06F 16/24573* (2019.01); *G06F 16/278* (2019.01); *G06F 21/602* (2013.01); *G06F 2221/2141* (2013.01)

(58) Field of Classification Search
CPC .... G06F 21/6245; G06F 21/602; G06F 21/64; G06F 16/24573; G06F 16/278;

(Continued)

(56) References Cited

U.S. PATENT DOCUMENTS 5,634,053 A 5/1997 Noble et al.
6,333,929 B1 12/2001 Drottar et al.

(Continued)

FOREIGN PATENT DOCUMENTS

CN 108021986 A 5/2018
CN 109173261 A 1/2019

(Continued)

OTHER PUBLICATIONS

Zyskind, G., et al, "Decentralizing Privacy: Using Blockchain to Protect Personal Data," 2015 IEEE Security and Privacy Workshops (May 1, 2015), 5 pages.

(Continued)

*Primary Examiner* — Greta L Robinson
(74) *Attorney, Agent, or Firm* — Polygon IP, LLP

(57) ABSTRACT

Systems, methods, and apparatuses for storing PII information via a metadata driven blockchain using distributed and decentralized storage for sensitive user information, operable within a cloud based computing environment. For example, there is a system configured with a memory to store instructions; a set of one or more processors; a non-transitory machine-readable storage medium that provides instructions that, when executed by the set of one or more processors, the instructions stored in the memory are configurable to cause the system to perform operations including: operating a blockchain interface to a blockchain on behalf of a plurality of tenants of the host organization; operating a database interface to a distributed database, separate from the blockchain, on behalf of the plurality of tenants of the host organization; displaying a Graphical User Interface (GUI Interface) to a user device communicably interfaced with the system over a network, in which the GUI interface is to prompt for a metadata entity definition at the user device when displayed by the user device, in which the (Continued)

metadata entity definition defines access control permissions for a blockchain entity including specifying at least (i) a data classification attribute indicating sensitive user information and (ii) a consent required attribute indicating consent is required to access the sensitive user information and (iii) a consent requirements attribute indicating a party from whom the consent must be acquired; transacting the metadata entity definition onto the blockchain; creating a new entity object defined by the metadata entity definition within the distributed database system to store the sensitive user information and writing the sensitive user information to the distributed database to be persistently stored. Other related embodiments are disclosed.

22 Claims, 61 Drawing Sheets

Related U.S. Application Data of application No. 16/264,645, filed on Jan. 31, 2019, application No. 17/163,547, filed on Jan. 31, 2021 is a continuation-in-part of application No. 16/777,073, filed on Jan. 30, 2020, now Pat. No. 11,783,024.

(60) Provisional application No. 62/839,525, filed on Apr. 26, 2019.

(51) Int. Cl.

| | |
|---|---|
| ***G06F 16/27*** | (2019.01) |
| ***G06F 21/60*** | (2013.01) |
| ***G06F 16/2457*** | (2019.01) |

(58) Field of Classification Search

CPC ................. G06F 16/27; G06F 16/9024; G06F 2221/2141; H04L 9/085; H04L 9/0891; H04L 9/3239; H04L 9/3271; H04L 9/50; H04L 2209/56; H04L 63/101; H04L 63/102; G06Q 20/401

See application file for complete search history.

(56) References Cited

U.S. PATENT DOCUMENTS

| | | | |
|---|---|---|---|
| 7,587,348 | B2 | 9/2009 | Liao et al. |
| 7,730,478 | B2 | 6/2010 | Weissman |
| 8,095,463 | B1 | 1/2012 | Hartmaier |
| 9,027,094 | B1 | 5/2015 | Balazs et al. |
| 9,390,154 | B1 | 7/2016 | Baird, III |
| 9,529,923 | B1 | 12/2016 | Baird, III |
| 9,569,700 | B1 | 2/2017 | Santos et al. |
| 9,646,029 | B1 | 5/2017 | Baird, III |
| 9,690,822 | B2 | 6/2017 | Roy-Faderman |
| 9,875,510 | B1 | 1/2018 | Kasper |
| 9,978,067 | B1 | 5/2018 | Sadaghiani et al. |
| 9,998,286 | B1 | 6/2018 | Ramathal |
| 10,042,636 | B1 | 8/2018 | Srivastava et al. |
| 10,102,265 | B1 | 10/2018 | Madisetti |
| 10,210,527 | B2 | 2/2019 | Radocchia |
| 10,311,230 | B2 | 6/2019 | Jagadeesan et al. |
| 10,373,129 | B1 | 8/2019 | James et al. |
| 10,425,399 | B2 | 9/2019 | Kravitz et al. |
| 10,482,466 | B1 | 11/2019 | Walters et al. |
| 10,491,375 | B2 | 11/2019 | Maggu |
| 10,505,726 | B1 | 12/2019 | Andon et al. |
| 10,521,196 | B1 | 12/2019 | Wang et al. |
| 10,521,780 | B1 | 12/2019 | Hopkins, III et al. |
| 10,528,551 | B2 | 1/2020 | Li |
| 10,541,821 | B2 | 1/2020 | Toll et al. |
| 10,628,578 | B2 | 4/2020 | Eksten |
| 10,637,644 | B1 | 4/2020 | Walters |
| 10,701,054 | B2 | 6/2020 | Padmanabhan et al. |
| 10,728,283 | B1 | 7/2020 | Dobrek et al. |
| 10,762,079 | B2 | 9/2020 | Shi |
| 10,762,506 | B1 | 9/2020 | Cash et al. |
| 10,831,935 | B2 | 11/2020 | Kiron |
| 10,885,567 | B2 | 1/2021 | Bhattacherjee et al. |
| 10,929,866 | B1 | 2/2021 | Qi et al. |
| 11,038,771 | B2 | 6/2021 | Padmanabhan |
| 11,068,389 | B2 | 7/2021 | Gao |
| 11,184,394 | B1 | 11/2021 | Dobrek et al. |
| 11,244,313 | B2 | 2/2022 | Padmanabhan et al. |
| 11,431,693 | B2 | 8/2022 | Padmanabhan |
| 11,431,696 | B2 | 8/2022 | Padmanabhan |
| 2005/0102159 | A1 | 5/2005 | Mondshine |
| 2006/0118611 | A1 | 6/2006 | Michelsen et al. |
| 2006/0259361 | A1 | 11/2006 | Barhydt et al. |
| 2008/0066165 | A1 | 3/2008 | Rosenoer |
| 2009/0037949 | A1 | 2/2009 | Birch |
| 2009/0119299 | A1 | 5/2009 | Rhodes |
| 2011/0265069 | A1 | 10/2011 | Fee |
| 2011/0276892 | A1 | 11/2011 | Jensen-Horne |
| 2011/0289140 | A1 | 11/2011 | Pletter et al. |
| 2013/0041934 | A1 | 2/2013 | Annamalaisami et al. |
| 2013/0151515 | A1 | 6/2013 | Davis |
| 2013/0226682 | A1 | 8/2013 | Grossman |
| 2013/0346173 | A1 | 12/2013 | Chandoor |
| 2014/0039990 | A1 | 2/2014 | Georgi |
| 2014/0278894 | A1 | 9/2014 | Toumayan et al. |
| 2014/0279857 | A1 | 9/2014 | Bharadwaj |
| 2015/0026061 | A1 | 1/2015 | Siegel et al. |
| 2016/0012465 | A1 | 1/2016 | Sharp |
| 2016/0027229 | A1 | 1/2016 | Spanos et al. |
| 2016/0042383 | A1 | 2/2016 | Joshi et al. |
| 2016/0092872 | A1 | 3/2016 | Prakash et al. |
| 2016/0148251 | A1 | 5/2016 | Thomas et al. |
| 2016/0337400 | A1 | 11/2016 | Gupta |
| 2016/0350860 | A1 | 12/2016 | Dintenfass et al. |
| 2016/0358267 | A1 | 12/2016 | Arjomand et al. |
| 2016/0364743 | A1 | 12/2016 | St. Lawrence et al. |
| 2017/0005804 | A1 | 1/2017 | Zinder |
| 2017/0046698 | A1 | 2/2017 | Haldenby et al. |
| 2017/0085545 | A1* | 3/2017 | Lohe ................... G06Q 20/065 |
| 2017/0103167 | A1 | 4/2017 | Shah |
| 2017/0103472 | A1 | 4/2017 | Shah |
| 2017/0132625 | A1 | 5/2017 | Kennedy |
| 2017/0132630 | A1 | 5/2017 | Castinado et al. |
| 2017/0140145 | A1 | 5/2017 | Shah |
| 2017/0161833 | A1 | 6/2017 | Porth |
| 2017/0200157 | A1 | 7/2017 | Bergeon et al. |
| 2017/0206603 | A1 | 7/2017 | Al-Masoud |
| 2017/0236094 | A1 | 8/2017 | Shah |
| 2017/0236215 | A1 | 8/2017 | Eisen et al. |
| 2017/0289111 | A1 | 10/2017 | Voell et al. |
| 2017/0295021 | A1 | 10/2017 | Gutiérrez et al. |
| 2017/0295023 | A1 | 10/2017 | Madhavan et al. |
| 2017/0300627 | A1 | 10/2017 | Giordano et al. |
| 2017/0300872 | A1 | 10/2017 | Brown et al. |
| 2017/0300876 | A1 | 10/2017 | Musiala, Jr. et al. |
| 2017/0323392 | A1 | 11/2017 | Kasper |
| 2017/0337534 | A1 | 11/2017 | Goeringer et al. |
| 2017/0344988 | A1 | 11/2017 | Cusden et al. |
| 2017/0353309 | A1 | 12/2017 | Gray |
| 2017/0364450 | A1 | 12/2017 | Struttmann |
| 2017/0364549 | A1 | 12/2017 | Abalos |
| 2017/0364698 | A1 | 12/2017 | Goldfarb |
| 2017/0364699 | A1 | 12/2017 | Goldfarb |
| 2017/0364700 | A1 | 12/2017 | Goldfarb |
| 2017/0364701 | A1 | 12/2017 | Struttmann |
| 2017/0366353 | A1 | 12/2017 | Struttmann |
| 2017/0372300 | A1 | 12/2017 | Dunlevy et al. |
| 2018/0005186 | A1 | 1/2018 | Hunn |
| 2018/0006831 | A1 | 1/2018 | Toll et al. |
| 2018/0019879 | A1 | 1/2018 | Kravitz et al. |
| 2018/0026505 | A1 | 1/2018 | Galmiche et al. |
| 2018/0039667 | A1 | 2/2018 | Pierce |
| 2018/0041345 | A1 | 2/2018 | Maim |
| 2018/0060496 | A1 | 3/2018 | Bulleit |
| 2018/0082256 | A1 | 3/2018 | Tummuru et al. |
| 2018/0088928 | A1 | 3/2018 | Smith et al. |
| 2018/0117446 | A1 | 5/2018 | Tran |

(56) References Cited

U.S. PATENT DOCUMENTS

2018/0117447 A1 5/2018 Tran
2018/0123779 A1 5/2018 Zhang
2018/0139186 A1 5/2018 Castagna
2018/0144042 A1 5/2018 Sheng et al.
2018/0158162 A1 6/2018 Ramasamy
2018/0165416 A1 6/2018 Saxena et al.
2018/0181768 A1 6/2018 Leporini
2018/0189100 A1 7/2018 Nemoto et al.
2018/0191503 A1 7/2018 Alwar et al.
2018/0204111 A1 7/2018 Zadeh
2018/0204213 A1 7/2018 Zappier et al.
2018/0205552 A1 7/2018 Struttmann
2018/0218176 A1 8/2018 Voorhees et al.
2018/0225611 A1 8/2018 Daniel et al.
2018/0232644 A1 8/2018 Acharya et al.
2018/0232659 A1 8/2018 Ranatunga et al.
2018/0239897 A1 8/2018 Ventura
2018/0241573 A1 8/2018 Ramathal
2018/0247191 A1 8/2018 Katz et al.
2018/0253661 A1 9/2018 Strauss
2018/0260125 A1 9/2018 Botes
2018/0260212 A1 9/2018 Wisnovsky
2018/0262505 A1 9/2018 Ligatti
2018/0268401 A1 9/2018 Ortiz et al.
2018/0268483 A1 9/2018 Jayaram
2018/0268506 A1 9/2018 Wodetzki et al.
2018/0276553 A1 9/2018 Redkar et al.
2018/0276626 A1 9/2018 Laiben
2018/0285412 A1 10/2018 Zhuang
2018/0285839 A1 10/2018 Yang
2018/0285996 A1 10/2018 Ma
2018/0300382 A1 10/2018 Madisetti
2018/0307857 A1 10/2018 Beecham
2018/0307990 A1 10/2018 Chawla et al.
2018/0311930 A1 11/2018 Sakamoto
2018/0315143 A1 11/2018 Rang
2018/0322485 A1 11/2018 Jayaram
2018/0323963 A1 11/2018 Stollman
2018/0336286 A1 11/2018 Shah
2018/0343238 A1 11/2018 Tola
2018/0365686 A1 12/2018 Kondo
2018/0367528 A1 12/2018 Schwarz et al.
2018/0372502 A1 12/2018 Rønnow
2018/0373776 A1 12/2018 Madisetti
2018/0374173 A1 12/2018 Chen
2019/0012249 A1 1/2019 Mercuri et al.
2019/0012595 A1 1/2019 Beser et al.
2019/0019090 A1 1/2019 Chacko et al.
2019/0028276 A1 1/2019 Pierce et al.
2019/0034404 A1 1/2019 Anderson et al.
2019/0035018 A1 1/2019 Nolan et al.
2019/0042619 A1 2/2019 Baird, III
2019/0050855 A1 2/2019 Martino et al.
2019/0052454 A1 2/2019 Wright et al.
2019/0058581 A1 2/2019 Wood
2019/0058709 A1* 2/2019 Kempf .................... G06F 21/64
2019/0073152 A1* 3/2019 Nagle ..................... G06F 3/067
2019/0081796 A1 3/2019 Chow et al.
2019/0086988 A1 3/2019 He et al.
2019/0087598 A1 3/2019 Adkins et al.
2019/0087892 A1 3/2019 Pinski et al.
2019/0102409 A1 4/2019 Shi et al.
2019/0102423 A1 4/2019 Little et al.
2019/0108543 A1 4/2019 Chan et al.
2019/0109702 A1 4/2019 Maggu et al.
2019/0109713 A1 4/2019 Clark et al.
2019/0122186 A1 4/2019 Kano et al.
2019/0123892 A1 4/2019 Basu
2019/0132350 A1 5/2019 Smith
2019/0147532 A1 5/2019 Singh et al.
2019/0149325 A1 5/2019 Garagiola et al.
2019/0149334 A1 5/2019 Velden
2019/0149600 A1 5/2019 Duan
2019/0158270 A1 5/2019 Berti
2019/0164156 A1 5/2019 Lindemann
2019/0164220 A1 5/2019 Raj et al.
2019/0171739 A1 6/2019 Cochrane
2019/0172282 A1 6/2019 Patel
2019/0182047 A1 6/2019 Andreina et al.
2019/0188706 A1 6/2019 McCurtis
2019/0206536 A1 7/2019 Hausman
2019/0215149 A1 7/2019 Ramasamy et al.
2019/0228006 A1 7/2019 Tormasov et al.
2019/0236559 A1 8/2019 Padmanabhan
2019/0236562 A1 8/2019 Padmanabhan
2019/0236598 A1 8/2019 Padmanabhan
2019/0236606 A1 8/2019 Padmanabhan et al.
2019/0238316 A1 8/2019 Padmanabhan
2019/0238525 A1 8/2019 Padmanabhan et al.
2019/0266601 A1 8/2019 Allen
2019/0268147 A1 8/2019 Baird, III
2019/0287026 A1 9/2019 Calmon et al.
2019/0287116 A1 9/2019 Karantzis
2019/0295114 A1 9/2019 Pavletic et al.
2019/0303121 A1 10/2019 Padmanabhan
2019/0303445 A1 10/2019 Padmanabhan
2019/0303579 A1 10/2019 Reddy et al.
2019/0306235 A1 10/2019 Veale et al.
2019/0334716 A1 10/2019 Kocsis et al.
2019/0361917 A1 11/2019 Tran
2019/0370634 A1 12/2019 Moreno et al.
2019/0370866 A1 12/2019 Lawbaugh et al.
2019/0377806 A1 12/2019 Padmanabhan et al.
2019/0385160 A1 12/2019 Safak et al.
2019/0386834 A1 12/2019 Furukawa
2020/0019616 A1 1/2020 Sukhija
2020/0019923 A1 1/2020 Santhar et al.
2020/0027005 A1 1/2020 Harrison et al.
2020/0027090 A1 1/2020 Braundmeier
2020/0034448 A1 1/2020 Sato
2020/0034453 A1 1/2020 Sato
2020/0034469 A1 1/2020 Sato
2020/0042939 A1 2/2020 Padmanabhan
2020/0050613 A1 2/2020 Gauvreau, Jr.
2020/0057860 A1 2/2020 Patil et al.
2020/0074477 A1 3/2020 Lamba et al.
2020/0074515 A1 3/2020 Ghatage et al.
2020/0076574 A1 3/2020 Austin et al.
2020/0089672 A1 3/2020 Velisetti et al.
2020/0089895 A1 3/2020 Gollogly
2020/0104636 A1 4/2020 Halevi et al.
2020/0110812 A1 4/2020 Kamijoh
2020/0112440 A1 4/2020 Nakamura
2020/0118011 A1 4/2020 Kaiser et al.
2020/0119906 A1 4/2020 Das
2020/0133955 A1 4/2020 Padmanabhan et al.
2020/0134613 A1 4/2020 Jiang
2020/0134656 A1 4/2020 Padmanabhan
2020/0143267 A1 5/2020 Gidney
2020/0143372 A1 5/2020 Liu
2020/0167512 A1 5/2020 Chitra
2020/0169546 A1 5/2020 Padmanabhan
2020/0186338 A1 6/2020 Andon et al.
2020/0186523 A1 6/2020 Kursun
2020/0234386 A1 7/2020 Blackman et al.
2020/0250174 A1 8/2020 Padmanabhan et al.
2020/0250176 A1 8/2020 Padmanabhan
2020/0250177 A1 8/2020 Padmanabhan
2020/0250295 A1 8/2020 Padmanabhan
2020/0250661 A1 8/2020 Padmanabhan et al.
2020/0250683 A1 8/2020 Padmanabhan et al.
2020/0250747 A1 8/2020 Padmanabhan
2020/0252205 A1 8/2020 Padmanabhan
2020/0252404 A1 8/2020 Padmanabhan
2020/0252406 A1 8/2020 Padmanabhan et al.
2020/0336475 A1 10/2020 Padmanabhan et al.
2020/0344132 A1 10/2020 Padmanabhan
2020/0357084 A1 11/2020 Hunn et al.
2021/0004774 A1 1/2021 Ramgopal
2021/0081404 A1 3/2021 Kempf
2021/0152535 A1 5/2021 Padmanabhan et al.
2021/0152536 A1 5/2021 Padmanabhan et al.
2021/0166231 A1 6/2021 Han
2021/0174609 A1 6/2021 Bryant

(56) References Cited

U.S. PATENT DOCUMENTS

| | | | |
|---|---|---|---|
| 2021/0182423 | A1 | 6/2021 | Padmanabhan |
| 2021/0226774 | A1 | 7/2021 | Padmanabhan |
| 2021/0243193 | A1 | 8/2021 | Padmanabhan |
| 2022/0006705 | A1 | 1/2022 | Padmanabhan |

FOREIGN PATENT DOCUMENTS

| | | | |
|---|---|---|---|
| CN | 2019800219289 | | 9/2020 |
| EP | 197071681 | | 8/2020 |
| JP | 2020541893 | | 7/2020 |
| WO | 2016161073 | A1 | 10/2016 |
| WO | 2018007827 | A1 | 1/2018 |
| WO | 2018007828 | A2 | 1/2018 |
| WO | 2018194707 | A1 | 10/2018 |
| WO | 2018230581 | A1 | 12/2018 |
| WO | 2019152750 | A1 | 8/2019 |
| WO | 2020056597 | A1 | 3/2020 |
| WO | 2020160109 | A1 | 8/2020 |

OTHER PUBLICATIONS

U.S. Appl. No. 16/778,628, filed Jan. 31, 2020, Prithvi Krishnan Padmanabhan, Entire Document.
U.S. Appl. No. 17/153,872, filed Jan. 20, 2021, Prithvi Krishnan Padmanabhan, Entire Document.
U.S. Appl. No. 17/163,547, filed Jan. 31, 2021, Prithvi Krishnan Padmanabhan, Entire Document.
U.S. Appl. No. 17/348,286, filed Jun. 15, 2021, Prithvi Krishnan Padmanabhan, Entire Document.
U.S. Appl. No. 62/839,462, filed Apr. 26, 2019, Prithvi Krishnan Padmanabhan, Entire Document.
U.S. Appl. No. 62/839,521, filed Apr. 26, 2019, Prithvi Krishnan Padmanabhan, Entire Document.
U.S. Appl. No. 62/839,523, filed Apr. 26, 2019, Prithvi Krishnan Padmanabhan, Entire Document.
U.S. Appl. No. 62/839,525, filed Apr. 26, 2019, Prithvi Krishnan Padmanabhan, Entire Document.
U.S. Appl. No. 62/839,529, filed Apr. 26, 2019, Prithvi Krishnan Padmanabhan, Entire Document.
U.S. Appl. No. 62/839,561, filed Apr. 26, 2019, Prithvi Krishnan Padmanabhan, Entire Document.
U.S. Appl. No. 62/840,074, filed Apr. 29, 2019, Prithvi Krishnan Padmanabhan, Entire Document.
U.S. Appl. No. 62/963,311, filed Jan. 20, 2020, Prithvi Krishnan Padmanabhan, Entire Document.
U.S. Appl. No. 63/339,929, filed Dec. 25, 2001, Drottar et al., Entire Document.
"BigchainDB 2.0 The Blockchain Database," Berlin Germany dated May 2018, 14 pages.
"Deloitte IoT Powered by Blockchain", dated May 2017, 20 pages.
"How Creating Digital Twins In Blockchain Will Protect Brands?", dated Nov. 15, 2018, 4 pages.
"How Smart Certificates of Authenticity Improve Asset Management", Jan. 17, 2019, 4 pages.
Azaria, A., et al "MedRec: Using Blockchain for Medical Data Access and Permission Management," 2016 2nd Int'l Conference on Open and Big Data, IEEE, (Aug. 22, 2016), pp. 25-30.
Bendor-Samuel, P. (2017) Blockchain-enabled "smart-contracts" solve problems in administering IT ecosystem services, CIO, 3 pages.
Final Office Action for U.S. Appl. No. 15/885,803, dated Jul. 20, 2020, 29 pages.
Final Office Action for U.S. Appl. No. 15/885,811, dated Aug. 5, 2020, 45 pages.
Final Office Action for U.S. Appl. No. 15/932,092 dated Jun. 22, 2020, 42 pages.
Final Office Action for U.S. Appl. No. 15/932,099 dated Jun. 1, 2020, 26 pages.
Final Office Action for U.S. Appl. No. 15/932,099 dated Jun. 1, 2020, 27 pages.
Final Office Action for U.S. Appl. No. 16/177,305 dated Feb. 2, 2021, 47 pages.
Final Office Action for U.S. Appl. No. 16/264,657 dated May 17, 2021, 36 pages.
Genestier, P., et al, "Blockchain for Consent Management in the eHealth Environment: A Nugget for Privacy and Security Challenges," Journal of the Int'l Society for Telemedicine and eHealth, (Jan. 1, 2017), 4 pages.
International Search Report and Written Opinion for Application No. PCT/US2019/036103, dated Aug. 1, 2019, 12 pages.
International Search Report and Written Opinion for Application No. PCT/US2020/01561B dated May 11, 2020, 13 pages.
International Search Report and Written Opinion for International Patent Application No. PCT/US2019/016199, dated Apr. 2, 2019, 12 pages.
McConaghy et al., "BigchainDB: A Scalable Blockchain Database (DRAFT)" dated Jun. 8, 2016, 64 Pages.
Non-final Office Action for U.S. Appl. No. 16/177,305 dated Jul. 23, 2020, 52 pages.
Normans Media Ltd., Smart Contracts: Blockchain-based contracts that don't require lawyers. 2016, 4 pages.
Notice of Allowance for U.S. Appl. No. 15/940,646, dated Oct. 31, 2019, 8 pages.
Notice of Allowance for U.S. Appl. No. 16/264,653 dated Jun. 7, 2021, 21 pages.
Notice of allowance for U.S. Appl. No. 16/264,653 dated Nov. 23, 2020, 16 pages.
Notice of Allowance for U.S. Appl. No. 16/683,945, dated Feb. 10, 2021, 14 pages.
Office Action for U.S. Appl. No. 15/885,803 dated Jan. 8, 2020, 47 pages.
Office Action for U.S. Appl. No. 15/885,803, dated Apr. 14, 2021, 31 pages.
Office Action for U.S. Appl. No. 15/885,811 dated Jan. 17, 2020, 40 pages.
Office Action for U.S. Appl. No. 15/932,092 dated Jan. 22, 2020, 36 pages.
Office Action for U.S. Appl. No. 15/932,092 dated Mar. 17, 2021, 23 pages.
Office Action for U.S. Appl. No. 15/932,099, dated Oct. 3, 2019, 26 pages.
Office Action for U.S. Appl. No. 15/932,100, dated Nov. 8, 2019, 9 pages.
Office Action for U.S. Appl. No. 15/940,646, dated Apr. 29, 2019, 7 pages.
Office Action for U.S. Appl. No. 16/177,300 dated Jun. 16, 2021, 80 pages.
Office Action for U.S. Appl. No. 16/177,305 dated Jul. 23, 2020, 41 pages.
Office Action for U.S. Appl. No. 16/264,657, dated Sep. 18, 2020, 33 pages.
Office Action for U.S. Appl. No. 16/683,945 dated Sep. 14, 2020, 26 Pages.
Office Action for U.S. Appl. No. 16/683,945, dated Sep. 14, 2020, 18 pages.
Office Action for EP Application No. 19707168.1 dated Sep. 24, 2020, 3 pages.
Ojha, "Chaincode for Go Developers, Part 1: Writing Blockchain Chaincode in Go for Hyperledger Fabric v0.6," 2017, 15 pages.
Peterson, K., et al, "A Blockchain-Based Approach to Health Information Exchange Networks," (Aug. 8, 2016), Retrieved from the Internet: URL: http://kddlab.zjgsu.edu.cn:7200/research/blockchain/huyiyang-reference/A%20Blockchain-Based%20Approach%20to%20Health%20Information%20Exchange.pdf, Retrieved on Mar. 21, 2019), 10 pages.
Salesforce, "Force.com Apex Code Developer's Guide," version 34.0, 2015, 1000 pages.
Sandgaard, J., et al, "MedChain White Paper V1.1," (Oct. 1, 2017), Retrieved from the Internet: URL:https://www.medchain.global/doc/Medchain%20Whitepaper%20v1.1.pdf, Retrieved on Mar. 21, 2019, 54 pages.

(56) References Cited

OTHER PUBLICATIONS

Shukla, A., et al., "Smart Contracts for Multiagent Plan Execution in Untrusted Cyber-physical Systems," 2018 IEEE 25th International Conference on High Performance Computing Workshops (HiPCW), 10 pages.
Using Sawtooth with Docker: Configuring the List of Transaction Families, Apr. 6, 2018, 13 pages.
Wikipedia, "Federate database system," Jun. 8, 2016, https://en.wikipedia.org/w/index.php/?title=Federated%20database%20system&oldid=808166410, 6 pages.
Wikipedia, "Solidity," Feb. 2, 2017, https://web.archive.org/web/2017020202304/https://en.wikipeida.org/wiki/Solidity (Year: 2017), 3 pages.
Final Office Action for U.S. Appl. No. 15/885,803 dated Nov. 17, 2021, 28 pages.
Final Office Action for U.S. Appl. No. 15/885,811, dated Feb. 3, 2022, 38 pages.
Final Office Action for U.S. Appl. No. 15/932,092 dated Sep. 27, 2021, 25 pages.
Final Office Action for U.S. Appl. No. 15/932,099 dated Nov. 1, 2021, 35 pages.
Mandal, S., "A Framework for Modular Norm Extraction, Modeling, and Reasoning," [Doctoral dissertation, University of Nebraska], 2017, 151 pages, ProQuest Dissertations Publishing.
Non-final Office Action for U.S. Appl. No. 16/399,920, dated Feb. 17, 2022, 66 pages.
Non-final Office Action for U.S. Appl. No. 16/777,409 dated Oct. 4, 2021, 42 pages.
Non-final Office Action for U.S. Appl. No. 16/917,506, dated Oct. 4, 2021, 44 pages.
Norta, A. et al., "Self-Aware Agent Supported Contract Management on Blockchains for Legal Accountability," 2017, 37 pages.
Notice of Allowance for U.S. Appl. No. 16/177,300, dated Oct. 6, 2021, 14 pages.
Notice of Allowance for U.S. Appl. No. 16/264,653 dated Sep. 29, 2021, 17 pages.
Notice of Allowance for U.S. Appl. No. 16/683,932 dated Dec. 3, 2021, 9 pages.
Office Action for U.S. Appl. No. 15/885,811 dated Aug. 4, 2021, 26 pages.
Office Action for U.S. Appl. No. 16/177,305 dated Sep. 16, 2021, 42 pages.
Office Action for U.S. Appl. No. 16/264,645 dated Oct. 27, 2021, 46 pages.
Office Action for U.S. Appl. No. 16/399,913, dated Dec. 24, 2021, 51 pages.
Abdellatif et al. Formal verification of smart contracts based on users and blockchain behavior models. Conference Paper ¦ Feb. 2018. DOI: 10.1109/NTMS.2018.8328737. Retrieved via Research Gate on [Sep. 13, 2022]. (Year: 2018).
Alessi etal., "Make users own their data: a decentralized personal data store prototype based on Ethereum and IPFS;" 2018 3rd International Conference on Smart and Sustainable Technologies (SpliTech) (Year: 2018).
Cai et al., "BCSolid: A Blockchain-Based Decentralized Data Storage and Authentication Scheme for Solid;" Springer Nature Singapore Pte Ltd. 2020, Z. Zheng etal. (Eds.): BlockSys 2019, CCIS 1156, pp. 676-689, 2020. (Year: 2020).
Duan et al. Formal Modeling and Verification of Blockchain System. ICCMS 2018, Jan. 8-10, 2018, Sydney, Australia ©2018 Association for Computing Machinery. ACM ISBN 978-1-4503-6339-6/18/01. https://doi.org/10.1145/3177457.3177485. (Year: 2018 ).
Hu, Y.C. et si, "Analyzing smart contract interactions and contract level state consensus," Concurrency and Compulation: Practice and Experience 32, 202G, 17 pages.
Jackson, "Understanding the Implication of Blockchain Technology on the Audit Profession;" 2018, Honors Undergraduate Theses; 421; https://stars.library.ucf.edu/honorstheses/421 (Year: 2018).
Kalra. S. et al, "Zeus: Analyzing Safety of Smart Contracts," In Ndss Feb. 18, 2018, pp. 1-12.
Mao et al. Visual and User-Defined Smart Contract Designing System Based on Automatic Coding. © 2019 IEEE Access. vol. 7, 2019. DOI: 10.1109/ACCESS.2019.2920776. 13 pages (Year: 2019).
Notice of Allowance dated Jun. 30, 2023 for U.S. Appl. No. 16/399,920 (pp. 1-14).
Notice of Allowance dated Jul. 3, 2023 for U.S. Appl. No. 16/399,913 (pp. 1-18).
Notice of Allowance for U.S. Appl. No. 15/932,100 dated Feb. 20, 2020, 5 pages.
Office Action (Final Rejection) dated May 15, 2023 for U.S. Appl. No. 16/777,141 (pp. 1-35).
Office Action (Non-Final Rejection) dated May 25, 2023 for U.S. Appl. No. 16/399,913 (pp. 1-23).
Office Action (Non-Final Rejection) dated Jun. 8, 2023 for U.S. Appl. No. 16/399,920 (pp. 1-38).
Office Action (Non-Final Rejection) dated Aug. 15, 2023 for U.S. Appl. No. 16/264,645 (pp. 1-13).
Office Action (Notice of Allowance and Fees Due (PTOL-85)) dated May 26, 2023 for U.S. Appl. No. 16/777,073 (pp. 1-11).
Office Action (Notice of Allowance and Fees Due (PTOL-85)) dated Jun. 23, 2023 for U.S. Appl. No. 16/777,141 (pp. 1-12).
Office Action (Notice of Allowance and Fees Due (PTOL-85)) dated Jun. 30, 2023 for U.S. Appl. No. 16/399,920 (pp. 1-13).
Office Action (Notice of Allowance and Fees Due (PTOL-85)) dated Jul. 3, 2023 for U.S. Appl. No. 16/399,913 (pp. 1-17).
Office Action (Notice of Allowance and Fees Due (PTOL-85)) dated Aug. 21, 2023 for U.S. Appl. No. 16/776,236 (pp. 1-8).
Salah, K. et al, "Blockchain for AI: Review and Open Research Challenges," IEEE, vol. 7, 2019, 23 pages.

* cited by examiner

102

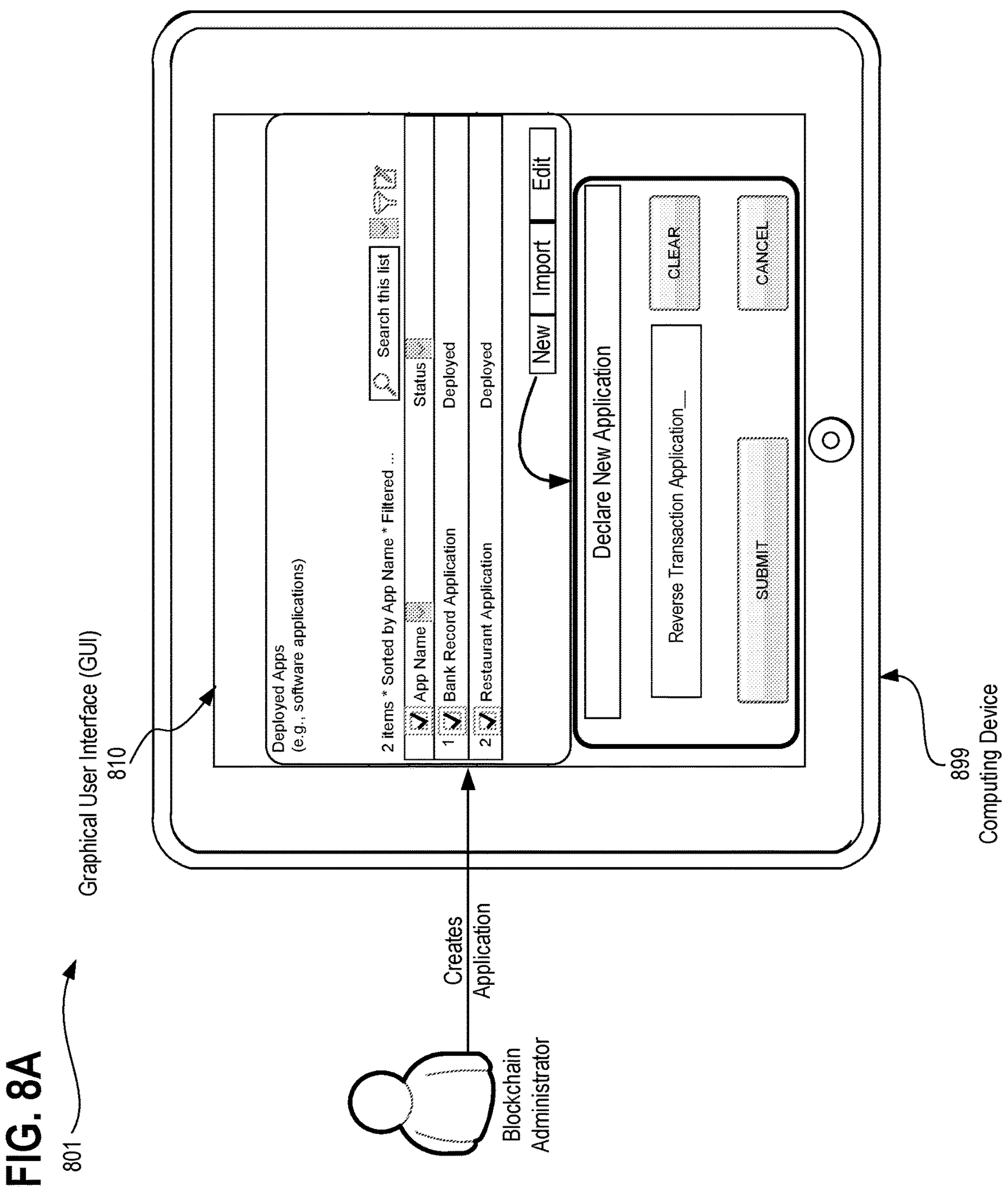
FIG. 8A
801
Graphical User Interface (GUI)
810
Deployed Apps
(e.g., software applications)
2 items * Sorted by App Name * Filtered ...
Search this list
App Name
Status
1 Bank Record Application
Deployed
2 Restaurant Application
Deployed
New
Import
Edit
Declare New Application
Reverse Transaction Application__
CLEAR
CANCEL
SUBMIT
Creates Application
Blockchain Administrator
899
Computing Device

805

1000

1101

SYSTEMS, METHODS, AND APPARATUSES FOR STORING PII INFORMATION VIA A METADATA DRIVEN BLOCKCHAIN USING DISTRIBUTED AND DECENTRALIZED STORAGE FOR SENSITIVE USER INFORMATION

CLAIM OF PRIORITY

This United States Continuation In Part (CIP) patent application is related to, and claims priority to, the non-provisional U.S. Utility patent application entitled "SYSTEMS, METHODS, AND APPARATUSES FOR PROTECTING CONSUMER DATA PRIVACY USING SOLID, BLOCKCHAIN AND IPFS INTEGRATION," filed Jan. 30, 2020, having an application Ser. No. 16/777,073, and is further related to, and claims priority to, the non-provisional U.S. Utility patent application entitled "SYSTEMS, METHODS, AND APPARATUSES FOR IMPLEMENTING A DECLARATIVE AND METADATA DRIVEN BLOCKCHAIN PLATFORM USING DISTRIBUTED LEDGER TECHNOLOGY (DLT)," filed Apr. 30, 2019, having an application Ser. No. 16/399,920, and is further related to, and claims priority to, the non-provisional U.S. Utility patent application entitled "SYSTEMS, METHODS, AND APPARATUSES FOR IMPLEMENTING EFFICIENT STORAGE AND VALIDATION OF DATA AND METADATA WITHIN A BLOCKCHAIN USING DISTRIBUTED LEDGER TECHNOLOGY (DLT)," filed Jan. 31, 2019, having an application Ser. No. 16/264,645, and is further related to, and claims priority the PROVISIONAL U.S. Patent Application entitled "Systems, Methods, and Apparatuses for Protecting Consumer Data Privacy Using Solid, Blockchain and IPFS Integrated With A Marketing Cloud Platform," filed Apr. 26, 2019, having an application No. of 62/839,525, the entire contents of each being incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology and blockchain platforms. More particularly, disclosed embodiments relate to systems, methods, and apparatuses for storing PII information via a metadata driven blockchain using distributed and decentralized storage for sensitive user information, operable within a cloud based computing environment.

BACKGROUND

The subject matter discussed in the background section is not to be considered prior art merely because of its mention in the background section. Similarly, a problem mentioned in the background section or associated with the subject matter of the background section shall not be considered to have been previously recognized in the prior art. The subject matter in the background section merely represents different approaches, which in and of themselves, may also correspond to claimed embodiments.

A blockchain is a continuously expanding list of records/blocks that are linked and secured using cryptography. In particular, every block in a blockchain may include a cryptographic hash of the immediately preceding block, a timestamp for the current block, and transaction data (e.g., the addition/modification of information associated with a peer in a blockchain network). Further, the blockchain may be shared and managed through a peer-to-peer network via a system of verifying/validating new blocks to be added to the chain such that a block in a blockchain cannot be altered without alteration of all subsequent blocks, which requires network consensus. This architecture allows for security of information stored within blocks through the use of cryptography; sharing/distribution of information through the use of peer-to-peer networks; trust through the use of consensus of block addition; and immutability of information stored within blocks through the use of cryptography, chaining/linking of blocks, and peer distribution (e.g., each peer in the blockchain network may maintain a ledger of all verified/validated transactions in the network). Blockchains can be utilized to store many different types of data including financial data. Such financial data can be stored in a blockchain that functions as a distributed ledger.

A distributed ledger in blockchain is shared by all of the participants in that blockchain. Distributed Ledger Technology (DLT) helps to address and overcome many of these the types of shortcomings of conventional financial systems, however, the technology may nevertheless be expanded to introduce even further benefits to those utilizing such DLT and related blockchain platforms.

Presently available DLT platforms and blockchains utilizing such DLT technologies store data in a fixed, immutable, and static manner. Thus, once data is written into the blockchain, it is fixed there, wholly absent of context, metadata, or any other information which describes the stored data, describes the shape of the data, or describes the type of the data. Consequently, it may prove extremely difficult to transform data retrieved from the blockchain back into a format which is acceptable for the business objectives due to the lack of context of other metadata describing that stored data.

Further still, presently available DLT and blockchains utilizing such DLT technologies require any record on the blockchain which is updated or modified to be re-written to the blockchain in its entirety, resulting in an explosion of total volume of stored data on the blockchain, which is likely unsustainable and at the least resource intensive. Other conceived approaches write only the modified portion of a record to the blockchain, which results in inefficient data retrieval as the complete record is now split amongst multiple blocks on the blockchain and thus necessitates any retrieval of a modified record to search for, inspect, and retrieve data from multiple blocks on the blockchain.

Further still, presently available DLT and blockchains store the data in the blockchain such that it is accessible to any node in the network. The data in the blockchain is never removed. Due to these characteristics, operating DLT platforms and blockchain implementations are often a poor fit for use in applications where it is necessary for data to be permanently deleted or where it is desired to restrict access privileges to the data stored in the blockchain.

Many of these problems may be fixed if asset ownership were to be recorded on a single shared ledger. However, a combination of practical and technological constraints have made such ledgers difficult to adopt. Such a shared ledger tends to require trust in a single party. That party needs to have the computational capacity and bandwidth to process every transaction in real time. Additionally, to address the disadvantages discussed above, the ledger needs to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and the platform provides only limited support for custom programs that determine asset movement, sometimes called smart contracts, without any mechanism by which to customize the underlying functions or the associated smart contracts.

Distributed Ledger Technology (DLT) helps to address and overcome many of these types of shortcomings of conventional financial systems, however, the technology may nevertheless be expanded to introduce even further benefits to those utilizing such DLT and related blockchain platforms.

The present state of the art may therefore benefit from the systems, methods, and apparatuses for storing PII information via a metadata driven blockchain using distributed and decentralized storage for sensitive user information, operable within a cloud based computing environment, as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 8A depicts another exemplary architecture in accordance with described embodiments;

DETAILED DESCRIPTION

Figure 1A:
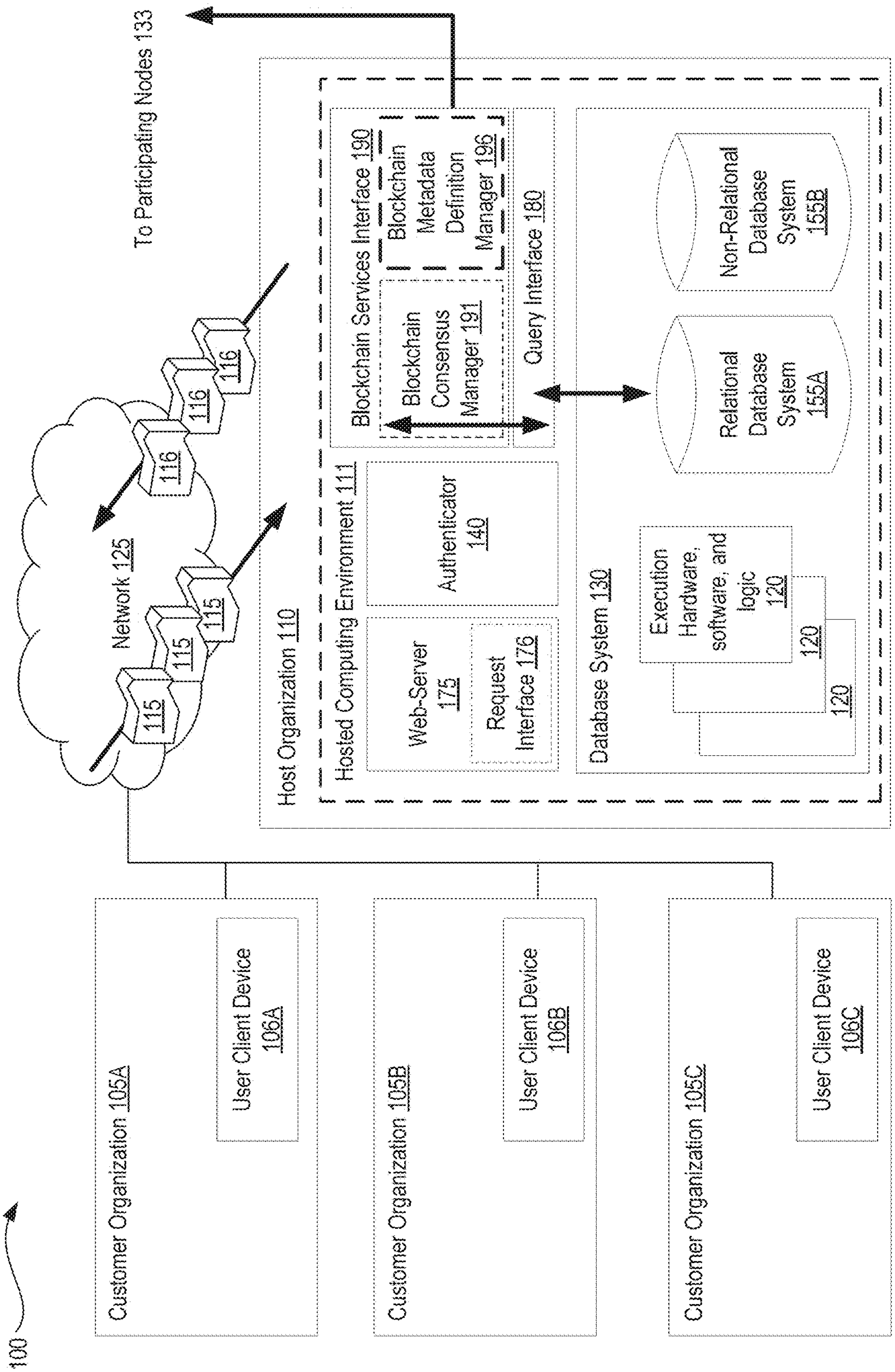
FIG. 1A depicts an exemplary architecture in accordance with described embodiments.

Described herein are systems, methods, and apparatuses for storing PII information via a metadata driven blockchain using distributed and decentralized storage for sensitive user information, operable within a cloud based computing environment.

For instance, according to a particular embodiment, there is a system having at least: a memory to store instructions; a set of one or more processors; a non-transitory machine-readable storage medium that provides instructions that, when executed by the set of one or more processors, the instructions stored in the memory are configurable to cause the system to perform operations including: operating a blockchain interface to a blockchain on behalf of a plurality of tenants of the host organization; operating a database interface to a distributed database, separate from the blockchain, on behalf of the plurality of tenants of the host organization; displaying a Graphical User Interface (GUI Interface) to a user device communicably interfaced with the system over a network, in which the GUI interface is to prompt for a metadata entity definition at the user device when displayed by the user device, in which the metadata entity definition defines access control permissions for a blockchain entity including specifying at least (i) a data classification attribute indicating sensitive user information and (ii) a consent required attribute indicating consent is required to access the sensitive user information and (iii) a consent requirements attribute indicating a party from whom the consent must be acquired; transacting the metadata entity definition onto the blockchain; creating a new entity object defined by the metadata entity definition within the distributed database system to store the sensitive user information and writing the sensitive user information to the distributed database to be persistently stored.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments.

In one embodiment, a hosted computing environment 111 is communicably interfaced with a plurality of user client devices 106A-C (e.g., such as mobile devices, smartphones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface 180. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

Further depicted is the host organization 110 receiving input and other requests 115 from customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155A and 155B or the query interface 180, pursuant to which results 116 are then returned to an originator or requestor, such as a user of one of a user client device 106A-C at a customer organization 105A-C.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 155 on behalf of the query interface 180 and for providing a web-based interface or other graphical displays to an end-user user client device 106A-C or machine originating such data requests 115.

Certain requests 115 received at the host organization may be directed toward a blockchain for which the blockchain services interface 240 of the host organization 110 operates as an intermediary.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155A and 155B for processing search queries, or into the other available data stores of the host organization's computing environment 111. In one embodiment, the query interface 180 implements an Application Programming Interface (API) through which queries may be executed against the databases 155A and 155B or the other data stores.

Additionally, the query interface 180 provides interoperability with the blockchain services interface 240, thus permitting the host organization 110 to conduct transactions with either the database system 130 via the query interface 180 or to transact blockchain transactions onto a connected blockchain for which the host organization 110 is a participating node or is in communication with the participating nodes 133, or the host organization 110 may conduct transactions involving both data persisted by the database system 130 (accessible via the query interface 180) and involving data persisted by a connected blockchain (e.g., accessible from a participating node 133 or from a connected blockchain directly, where the host organization operates a participating node on such a blockchain).

In certain embodiments, the Application Programming Interface (API) of the query interface 180 provides an API model through which programmers, developers, and administrators may interact with the blockchain services interface 240 or the database system 130, or both, as the needs and particular requirements of the API caller dictate.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 240 having included therein both a blockchain consensus manager 241 which facilitates consensus management for private and public blockchains upon which tenants, customer organizations, or the host organization 110 operates as a participating node on a supported blockchain. Additionally depicted is the blockchain metadata definition manager 246, which enables the blockchain services interface 240 to define and create metadata which is then pushed to and transacted onto a blockchain which is interfaced via the blockchain services interface 240.

For instance, via the blockchain metadata definition manager 246, it is possible to for any customer organization 105A-C of the host organization to define and create metadata which is then recorded or transacted onto the blockchain for use by that customer organization 105A-C and for use by other participating nodes on the blockchain, regardless of whether or not those participating nodes 133 are also customer organizations 105A-C with the host organization 110.

For example, once metadata is defined and created via the blockchain metadata definition manager 246 and pushed onto the blockchain, any participating node 133 with access to the blockchain where that metadata definition resides can then create data records and store information onto the blockchain which adopts the defined metadata definition and thus complies with the newly created metadata definition. In such a way, all participating nodes can utilize information which is stored in compliance with the newly created metadata definition, as there is a standardized and customized manner for storing such data.

In one embodiment, the blockchain consensus manager 241 and blockchain metadata definition manager 246 work in conjunction to implement consensus on read functions as described further herein below with reference to FIGS. 10-12. A consensus on read is a specific type of consensus for controlling read access to data stored on the blockchain. Data is stored in an encrypted format where the encryption key is distributed as a shared secret with other nodes in the blockchain platform. The nodes 133 of the network perform a consensus on read operation when a request to access the data is made. The consensus on read process examines the credentials or any configured criteria that is determined to be required, which is provided in the access request. Each node that approves of the read access responds with its portion of the shared secret that enables the requesting node to generate the key from the shared secrets to decrypt the data on the blockchain and access the data. A threshold number of secrets must be returned to enable access to the encrypted data. The threshold number can be configured and/or determined by the shared secret algorithm utilized with the consensus on read process (e.g., Shamir's secret sharing algorithm).

In further embodiments, a permissions manager 181 operates to enforce access controls and privileges as defined in metadata for data stored in the blockchain. The permissions manager 181 can enforce restrictions on accessing records, objects, fields, or similar levels of granularity on access control including read and write access controls. The permissions manager 181 enforces management of the blockchain data based on metadata defining access privileges.

The access privileges utilize a unique user identifier (UUID) or similar entity identifier. The metadata can define a list of entities with permission to read or write data in the blockchain. The metadata can also define a set of owners that control the consensus on read process that is utilized to manage the access to access controlled information. In some embodiments, the permissions manager 181 implement a right to forget process (e.g., in compliance with European Union general data protection regulation (GDPR)) or similar process to 'erase' data from the blockchain. The operations of the permissions manager 181 and the consensus on read process of the blockchain consensus manager 241 including the right to forget and access privileges are further discussed and described herein with relation to FIGS. 10-12.

As shown here, the blockchain services interface 240 communicatively interfaces the host organization 110 with other participating nodes 133 (e.g., via the network 125) so as to enable the host organization 110 to participate in available blockchain protocols by acting as a blockchain protocol compliant node, which in turn, permits the host organization 110 to access information within such a blockchain as well as enabling the host organization 110 to provide blockchain services to other participating nodes 133 for any number of blockchain protocols supported by, and offered to customers and subscribers by the host organization 110. In certain embodiments, the host organization 110 both provides the blockchain protocol upon which the host organization then also operates as participating node. In other embodiments, the host organization merely operates as a participating node so as to enable the host organization 110 to interact with the blockchain protocol(s) provided by others.

According to certain embodiments, the blockchain metadata definition manager 246 additionally permits non-subscribers (e.g., entities which are not customer organizations

105A-C) of the host organization to nevertheless utilize the blockchain metadata definition manager 246 and graphical user interfaces (GUIs) associated with the blockchain metadata definition manager 246 via an exposed API interface for such non-subscribing customers which may then create and define metadata definitions which are then pushed onto the blockchain via the host organization's blockchain services interface 240.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 240, is merely one of many nodes for an available blockchain protocol or operates as blockchain protocol manager and provider, while other participating nodes 133 communicating with the host organization 110 via blockchain services interface 240 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example, proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. The concept of permissioned verifiers is separate and distinct from the permissioned access control processes described herein. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 240 of the host organization 110, both private and public mechanisms are described herein and utilized as needed for different implementations supported by the host organization 110.

An advantage to an open, permissionless, or public, blockchain network is that guarding against bad actors is not required and no access control is generally needed, although as discussed herein, the embodiments provide for a blockchain access control for particular cases that are applicable to permissioned or public blockchains. This means that applications may be added to the network without the approval or trust of others, using the blockchain as a transport layer. Conversely, permissioned (e.g., private) blockchains use an access control layer to govern who has access to the network. The embodiments further provide access controls for entities within or external to a private or public blockchain. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 1B:
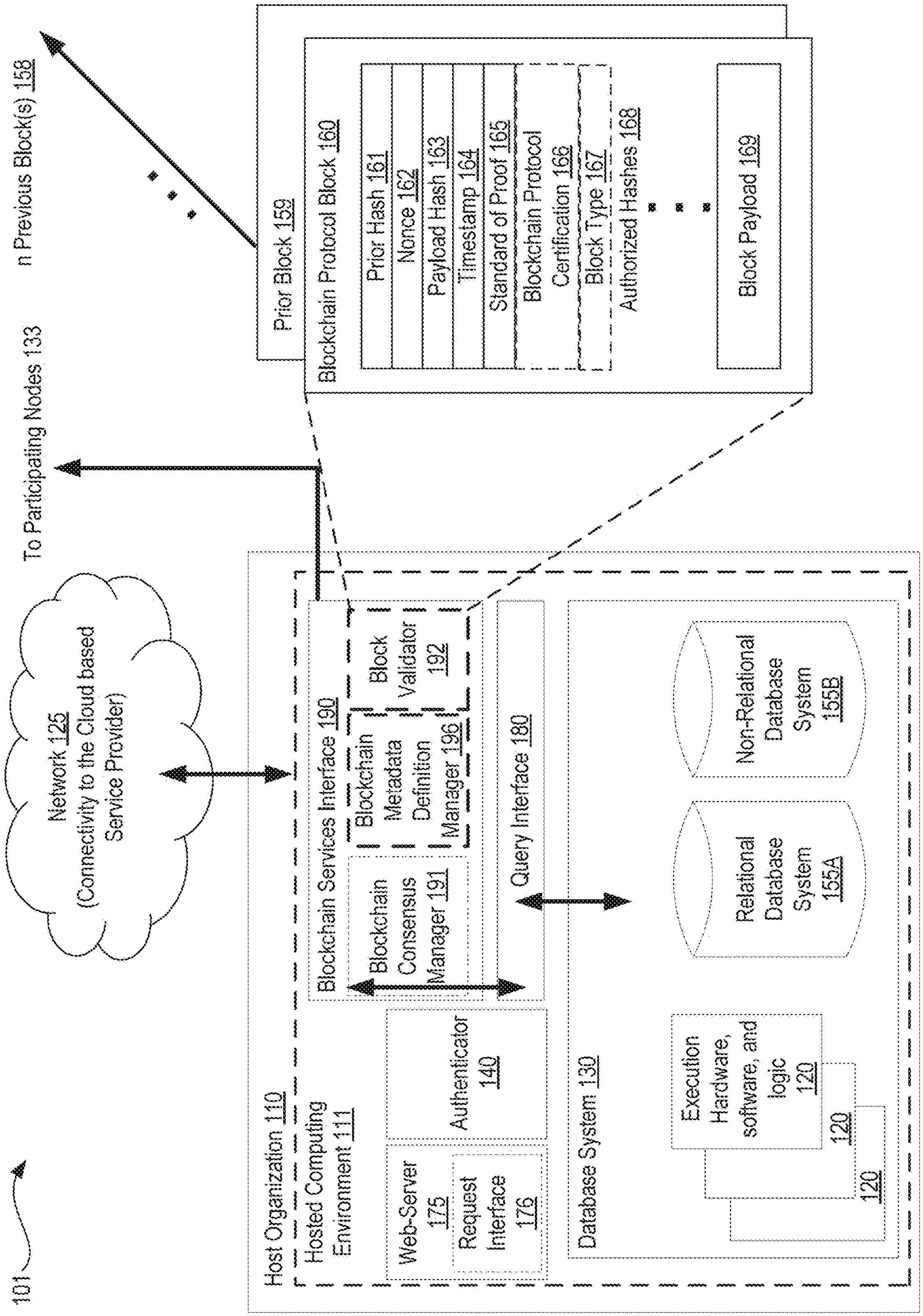
FIG. 1B depicts another exemplary architecture, with additional detail of a blockchain protocol block operating in conjunction with a block validator, in accordance with described embodiments.

FIG. 1B depicts another exemplary architecture 101, with additional detail of a blockchain protocol block 160 operating in conjunction with a block validator 242, in accordance with described embodiments. The blockchain consensus manager 241 implements consensus on read and the permissions manager 181 supports access control and similar operations as further described herein below in relation to FIGS. 10-12.

In particular, a blockchain protocol block 160 is depicted here to be validated by the block validator 242 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 240.

In accordance with a particular embodiment, the blockchain protocol block 160 depicted here defines a particular structure for how the fundamental blocks of any given blockchain protocol supported by the host organization 110 are organized.

According to certain embodiments, blockchain metadata definition manager 246 as shown here may utilize a specific blockchain implementation which is provided by the host organization 110 and thus, for which the applicable blockchain protocol is defined by the host organization 110. Alternatively, the blockchain metadata definition manager 246 may utilize any publicly accessible blockchain for which the host organization operates as a participating node so as to establish access or the blockchain metadata definition manager 246 may utilize a private blockchain, including those which are not provided by the host organization 110, so long as the host organization is able to authenticate with such a private blockchain and access the blockchain by operating as a participating node on the private blockchain.

As will be described in greater detail below, the blockchain metadata definition manager 246 implements a specialized metadata definition and creation scheme which may include the use of GUIs and other user-friendly interfaces which are provided by the host organization either via an API or via an interface of the host organization, such as the web-server 175 via which users and customer organizations may interact with the host organization and more particularly, with the services and applications provided by the host organization, including use of GUIs provided by the blockchain metadata definition manager 246 which is made accessible to tenants of the host organization via the cloud computing platform and in certain embodiments made available to non-tenants and non-subscribers of the host organization 110, either of which may then utilize the GUIs and functionality provided by the blockchain metadata definition manager 246.

It may be necessary in accordance with certain embodiments that a customized blockchain protocol implementation be provided by the host organization to support use of the specialized metadata definition and creation scheme as implemented by the blockchain metadata definition manager 246. However, in other embodiments where the metadata is permissibly defined and stored onto a blockchain by the host organization 110, any blockchain utilized to store such data will be unaffected because such blockchains are agnostic as to what types of metadata is defined or created and transacted onto the blockchain by the host organization. Stated differently, while the host organization 110 facilitates the definition and creation of such metadata and transacts that information onto a blockchain, it is immaterial to the blockchain as to what applications elect to utilize such data, whereas the host organization facilitates a platform in which applications may elect to only utilize data which is in compliance with the defined and created metadata, thus permitting transferability of such data, as well as many other benefits. For instance, other non-compliant applications may store data in a non-compliant format, but the applications which comply with the formatting requirements and utilize the metadata defined and stored on the blockchain will simply have the benefit of data interoperability. This will be true regardless of whether the applications are utilizing a blockchain established by the host organization or whether the applications are utilizing some public or private blockchain not established by the host organization, but for which the applications have the ability to access such a blockchain via the host organizations' blockchain services interface 240 in the manner described above.

With respect to the blockchain protocol 160 (regardless of whether it is an existing and already available blockchain protocol or a custom implemented blockchain protocol), the prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 242 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 163 provides a hash of the data stored within the block payload 169 portion of the blockchain protocol block 160 and need not meet any specific standard of proof 165. However, the payload hash is included as part of the input when the hash is calculated for the purpose of storing it as the prior hash 161 for the next or subsequent block. Timestamp 164 indicates what time the blockchain protocol block 160 was created within a certain range of error. According to certain blockchain protocol implementations provided via the blockchain services interface 240, the distributed network of users (e.g., blockchain protocol nodes) checks the timestamp 164 against their own known time and will reject any block having a timestamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 240, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized to store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standard of proofs 165 may utilized pursuant to the particular blockchain protocol chosen, such as proof of work, hash value requirements, proof of stake, a key, or some other indicator such as a consensus, or proof of consensus. Where consensus-based techniques are utilized, the blockchain consensus manager 241 provides consensus management on behalf of the host organization 110, however, the host organization 110 may be operating only as one of many nodes for a given blockchain protocol which is accessed by the host organization 110 via the blockchain services interface 240 or alternatively, the host organization 110 may define and provide a particular blockchain protocol as a cloud based service to customers and subscribers (and potentially to non-authenticated public node participants), via the blockchain services interface 240. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

Figure 1C:
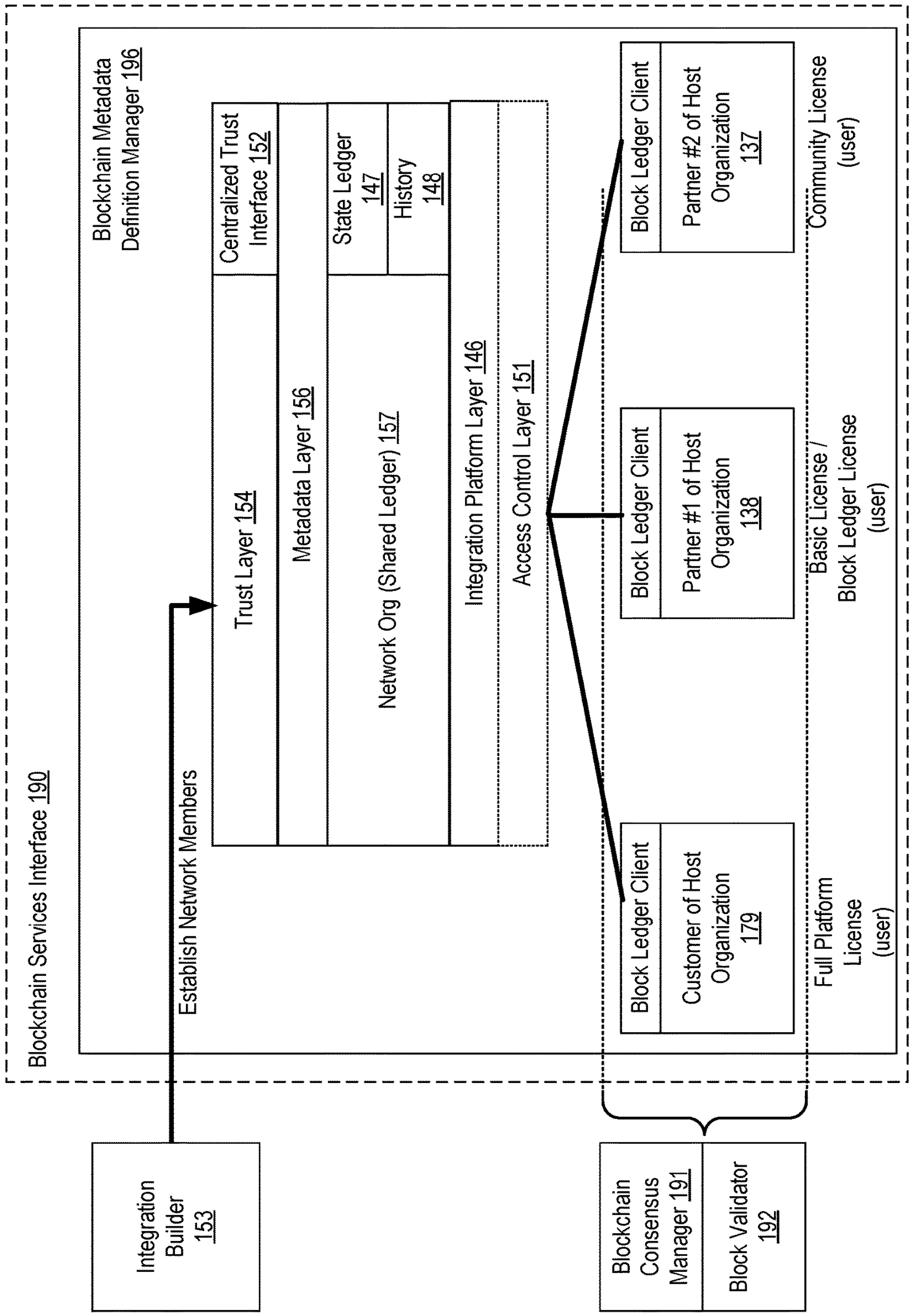
FIG. 1C depicts another exemplary architecture, with additional detail of the blockchain metadata definition manager set forth in greater detail, in accordance with described embodiments.

FIG. 1C depicts another exemplary architecture 102, with additional detail of the blockchain metadata definition manager 246 set forth in greater detail, in accordance with described embodiments.

As can be seen here, there is a blockchain services interface 240 which includes the blockchain metadata definition manager 246. Also depicted as interacting with the various elements of the blockchain metadata definition manager 246 are the integration builder 153 which is capable of establishing network members to participate with the metadata definition and creation scheme, as well as the blockchain consensus manager 241 and the block validator 242.

Internal to the blockchain metadata definition manager 246 there are various further elements, including a trust layer 154 and a centralized trust interface 152 capable of interacting with both tenants and customer organizations of the host organization as well as non-subscribers to the services of the host organization. There is further depicted a metadata layer 156 having knowledge of all presently defined metadata definitions created and pushed to the accessible blockchains, followed by a network organization 157 layer or a shared ledger, which serves as an interface to the variously accessible blockchains. The state ledger 147 maintains the status of the accessible blockchains and any connection or non-connection states while the history 148 block maintains a transaction history and logging for the platform. The integration platform layer 146 provides an interface to other components within the host organization 110 to interface with the components of the blockchain metadata definition manager 246 while the access control layer 151 is described in greater detail below, but provides certain access rights and restrictions for private and permissioned blockchains that are not fully open to public access.

Lastly, there is depicted various block ledger clients, including the customer of the host organization 179 which enjoys a full platform license as a subscribing customer of the host organization, while the next block ledger client at block 166 having the partner #1 of the host organization 138 enjoys only a basic license and a block ledger license with limited user capabilities provided by the host organization, followed by the last block ledger client at block 167 having the partner #2 of the host organization 137 which is limited to strictly a community license which is available to all parties without subscription to any subscription required user services provided by the host organization.

From a high level, the depicted architecture provides similar services to public blockchain, except that, according to this particular embodiment, the shared ledger 157 operates a blockchain internal to the host organization and defines the blockchain protocol of the hosted network org or a so called "shared ledger 157" as shown here. The depicted shared ledger 157 therefore permits customers and non-customers to interact with orgs and clients and non-subscribing clients, but not necessarily third party instances since this particular embodiment operates the shared ledger 157 internal to the host organization. In such a way, the functionality provided by public and private blockchains may still be realized and utilized, yet, because the shared ledger 157 is wholly internal to the host organization 110, its possible to operate the shared ledger, utilizing Distributed Ledger Technology (DLT) which is modified to rely upon the host organization's 110 trust layer 154 as a centralized trust authority (and providing validation of trust via the centralized trust interface 152) rather than having to rely upon the more customary use of a blockchain consensus manager 241 as is typical with other related embodiments as is described in relation to other blockchain modification embodiments described later.

Regardless of the trust authority (e.g., be it the host organization 110 or distributed nodes reaching consensus as managed by the blockchain consensus manager 241), all data is transparent and cryptographically verifiable and data and users are not owned by a single party, notwithstanding being hosted internal to the host organization, and the history 148 and state ledger 147 provide for an enhanced audit trail. The integration builder 153 permits the execution of smart contracts run on shared data as well as run against data which is owned by the network org 157 itself, such as metadata definitions which are accessible to all members but which nevertheless remain owned by the host organization.

In this particular embodiment, as alluded to above, because trust is established by the host organization itself, via the trust layer 154, there is no need for consensus, although consensus may optionally be utilized depending on the implementation.

According to particular embodiments, there is a multi-tenant ledger platform that works at the network level providing and provides an equivalent amount of transparency and provenance that is available through Blockchain, yet is entirely within the control of the host organization 110, and thus provides for certain benefits, such as the establishment of centralized trust by the host organization 110.

In a manner of speaking, such an architecture represents a compromise between a centralized and decentralized database, and notably, deviates from the fundamentals of prior known blockchain technologies which utilize Distributed Ledger Technology (DLT) and thus operate strictly as a distributed database. Nevertheless, as is depicted here, the host organization 110 operates as a central party, by and through the blockchain services interface 240, which provides the trust on behalf of all tenants, as opposed to blockchain where trust is delivered by the network, and specifically by the nodes distributed throughout the network reaching consensus.

Data and information which is persisted via the shared ledger 157 of the host organization is wholly owned and by the network and specifically by the established network members, yet the infrastructure is owned by the central party, in this case, the host organization 110 owns, controls, and manages the computing infrastructure and resources upon which the shared ledger 157 operates. Thus, if any established network member trusts host organization as the central party, then the system and architecture will operate to the satisfaction of that particular established network member. Notably, however, the established network members must place their trust into a third party, in this case the host organization 110. If doing so is not possible, or not permissible based on the various data security requirements, regulations, or other concerns, then the Distributed Ledger Technology (DLT) which requires consensus by the distributed nodes, as managed by the blockchain consensus manger 241 is more appropriate for those parties. Stated differently, if a given participating node is not able to accept the host organization as the centralized trust authority, then such a node should rely upon network consensus rather than the simplified and streamlined centralized trust option.

According to a particular embodiment, a tenant-focused network org or a tenant focused shared ledger 157 is provided, again internal to the host organization 110 (and specifically the blockchain services interface 240 of the host organization) in which all users are controlled by each respective customer organization rather than being controlled by a centralized customer. Stated differently, there may be tenant-specific customer control, such that any user for a given instance of the shared ledger 157 is controlled by the tenant or customer org having authority over that instance of the shared ledger 157. In such a way, there can be multiple instances of the shared ledger 157, each having its user-set controlled by a specific customer org, without having to negotiate or rely upon any other customer org, tenant, or any other entity to approve or deny user inclusion. This includes the tenant's customer org being able to determine for itself which users are permitted in their instance of the shared ledger 157 without having to go through the host organization, despite the instance of the shared ledger 157 being internally hosted by the host organization. This is because the host organization 110 effectively delegates full control over user inclusion for each respective instance of the shared ledger 157 to the customer org for which that particular shared ledger 157 operates.

According to certain embodiments, the shared ledger 157 embodies a Merkle Directed Acyclic Graph (DAG) or a "Merkle-DAG" which is a data structure similar to a native Merkle tree, except that a Merkle DAG structure does not need to be balanced and its non-leaf nodes are allowed to contain data. In such a way, a Merkle-DAG is similar to native Merkle trees in that they both are embody a tree of hashes. While a Merkle tree connects transactions by sequence, the Merkle-DAG is differentiated insomuch that it connects transactions by hashes. Therefore, in a Merkle-DAG structure, addresses are represented by a Merkle hash. The resulting spider web of Merkle hashes links data addresses together by a Merkle graph. The directed acyclic graph (DAG) portion of the Merkle-DAG may therefore be utilized to model information, such as modeling what specific address stores specific data.

According to another embodiment, the data is encrypted and cryptographically verifiable within each instance of the shared ledger 157. For instance, utilizing an extension of the blockchain services interface 240 platform, any tenant having an instance of the shared ledger 157 may cryptographically verify any stored encrypted data within their instance of the shared ledger 157.

As noted above, for many customers, it is much preferred to lease or subscribe to cloud-based computing infrastructure and software rather than having to own, operate, maintain, and configure such computing infrastructure themselves. Where certain customers and partners require only transparency of their data and the ledger (e.g., and do not necessarily require consensus amongst distributed nodes), such a solution represents a substantial improvement over competing alternatives. While blockchain technology presents many advantages, many of which are described in greater detail elsewhere by this paper, the reality is that certain customers simply are not concerned with decentralization of the data and the ledger, and thus, may realize significant benefits from utilizing a shared ledger 157 instance which is entirely operated within the host organization 110 with a centralized trust interface 152, thus negating the need to participate in other consensus regimes common to distributed blockchain ledgers.

In accordance with one embodiment, the shared ledger 157 provides an audit trail which is immutable by any party, including by the host organization 110, and thus, provides greater security, transparency, and assurance than a standard audit trail offered by competing solutions. Added value is thus brought to the tenants and customer organizations when utilizing the shared ledger 157 when compared with a standard centralized system.

Further still, because the shared ledger 157 is multi-tenant aware (e.g., each tenant or customer organization may utilize it's own instance of the shared ledger 157, thus being "multi-tenant aware") and metadata driven, with the further functionality of executable smart contracts via triggers, there are multiple advantages for the host organization's tenant subscribers, above and beyond the non-blockchain platform benefits offered by the host organization.

Consider the example of a large retailer wishing test or pilot management of their supply chain, going to market utilizing the blockchain services provided by the host organization to manage their supply chain of products ranging from clothing to fresh produce. Such a pilot may begin with cotton as raw materials for clothing and leafy greens to be sold in stores as packaged produce. Ultimately, the large retailer may evolve to a full blockchain solution, but initially, many customers may prefer to utilize a wholly controlled, single point of trust, and hosted solution such as the shared ledger 157 provided by the host organization. Reasons for initially beginning with the hosted shared ledger solution may simply be to enable a single login or a single authentication portal via their current host organization which already provides them with cloud-based services, which will then enable the large retailer to experiment with the Distributed Ledger Technology (DLT) while permitting the large retailer to view their validated ledger information from the single sign-on portal.

Such a structure would thus allow the large retailer, by way of example, to place their trust into the immutability of the data due to the data being stored within the immutable shared ledger 157, albeit within the host organization 110. This is possible because even the host organization cannot alter the shared ledger 157 audit trail. This is in contrast to the use of prior cloud based platforms which provides a standardized audit trail, yet because the audit trail is not immutable by all parties, it could theoretically be manipulated by malicious actors, albeit such a scenario is highly unlikely. Nevertheless, the shared ledger 157 utilizing modified DLT technologies is by design immutable by all parties, in terms of its audit trail, and thus, a higher level of trust may be appropriately placed into the centralized trust authority, such as the host organization, given that even the host organization lacks the capability to alter the historical records stored within the shared ledger 157. For instance, even if an "update" were written onto the blockchain, the updated record will remain within the blockchain and remain visible, accessible, and permanently stored by the blockchain. Not even the host organization can alter the audit trail for such a record persisted by the blockchain.

The same logic may apply to companies wishing to utilize such a ledger internally within one company and its subsidiaries as doing so will permit greater integration and data sharing amongst the company and its subsidiaries, while benefiting from the immutability of the shared ledger, above and beyond that which may be provided by competing solutions, such as locally and remotely operated databases, or a strictly on-demand cloud based solution.

Consider for example, a mortgage division wishing to share sales lead information with their commercial banking division or a healthcare company having multiple divisions across the country, which are not well integrated amongst the various divisions, resulting in duplicative operational centers, such as a claims processing group in northern California and another claims processing group in Southern California, which currently lack full integration, yet may nevertheless migrate to the hosted shared ledger 157 solution to realize greater integration, trusted audit trails through the immutability of the records written into the platform, and in turn, improved ease of use and transparency of data utilized by the various divisions of the large healthcare provider.

Therefore, according to a particular embodiment, there are operations by a system of a host organization that include operating an interface to a shared ledger on behalf of a plurality of authorized network participants for the shared ledger, in which the shared ledger persists data via a plurality of distributed shared ledger nodes; generating a network org within the shared ledger to store the data on behalf of a founder org as a first one of the plurality of authorized network participants; receiving input from the founder org defining a plurality of partner orgs as additional authorized network participants for the network org, in which all of the authorized network participants have read access to the data stored by the network org via the shared ledger without replicating the data; receiving input from the founder org defining permissions for each of the partner orgs to interact with the network org within the shared ledger; writing metadata to the shared ledger defining at least the authorized network participants for the network org and the permissions defined for each of the partner orgs; receiving requests from the authorized network participants to interact with the network org; and transacting with the shared ledger in fulfillment of the requests.

According to the operations of another embodiment, the shared ledger includes a declarative, metadata driven, cryptographically verifiable multi-network (multi-tenant) shared ledger operating on a relational database system internal to the host organization; in which the method further includes: assigning a unique network ID to each of the partner orgs and to the founder org; and partitioning a table of the relational database system having the data of the network org stored thereupon by network ID.

According to the operations of another embodiment, the relational database system immutably stores an audit log recording all insertions, deletions, and updates affecting the data stored within the network org via the plurality of shared ledger nodes.

According to the operations of another embodiment, transacting with the shared ledger in fulfillment of the requests includes at least: (i) retrieving the metadata for the network org from the shared ledger; (ii) validating each request originates from one of the authorized network participants for the network org; (iii) validating each request specifies an interaction by the founder org or an interaction by one of the partner orgs in compliance with the permissions defined by the retrieved metadata for the network org; and (iv) transacting with the network org via the shared ledger in fulfillment of the request pursuant to successful validation.

According to the operations of another embodiment, the permissions defined by the metadata for each of the partner orgs include one or more of: write access to the metadata at the request of one of the partner orgs, the write access to the metadata granted by the founder org; and write access to the data stored by the network org at the request of one of the partner orgs, the write access to the data granted by the founder org.

According to the operations of another embodiment, the permissions defined by the metadata for each of the partner orgs include permission to create new users associated with one of the partner orgs.

According to the operations of another embodiment, the permissions defined by the metadata for each of the partner orgs include permission to add new partner orgs as authorized network participants for the network org.

According to the operations of another embodiment, the permissions defined by the metadata further include one or more of: permission for the founder org granted by the founder org to modify the metadata; permission for the founder org granted by the founder org to modify the data stored by the network org; permission for the founder org granted by the founder org to remove one of the partner orgs from the network org and eliminating the removed partner org as one of the authorized network participants for the network org; permission for the founder org granted by the founder org to add a new partner orgs as an authorized network participant for the network org; permission for the founder org granted by the founder org to declare new business logic common across all of the authorized network participants for the network org; and permission for the founder org granted by the founder org to declare new business rules common across all of the authorized network participants for the network org.

According to the operations of another embodiment, the data stored by the network org within the shared ledger includes one or more of: application data records common across all of the authorized network participants for the network org; business data records common across all of the authorized network participants for the network org; declared business logic common across all of the authorized network participants for the network org; and declared business rules common across all of the authorized network participants for the network org.

According to another embodiment such operations may further include: receiving a request from one of the authorized network participants to store localized data via the shared ledger; storing the localized data via the shared ledger; and in which the stored localized data is accessible to only to the authorized network participant having originated the request to store the localized data and in which the stored localized data is not exposed to the other authorized network participants.

According to the operations of another embodiment, the stored localized data includes at least one of: a modification to the data stored by the network org accessible only to the authorized network participant having originated the request to store the localized data; a modification to application data records common across all of the authorized network participants for the network org, in which the modification is accessible only to the authorized network participant having originated the request to store the localized data; a modification to business data records common across all of the authorized network participants for the network org, in which the modification is accessible only to the authorized network participant having originated the request to store the localized data; a modification declared business logic common across all of the authorized network participants for the network org, in which the modification is accessible only to the authorized network participant having originated the request to store the localized data; and a modification declared business rules common across all of the authorized network participants for the network org, in which the modification is accessible only to the authorized network participant having originated the request to store the localized data.

According to the operations of another embodiment, the stored localized data includes a new user account for the authorized network participant having originated the request to store the localized data and defined user permissions for the new user account; and in which each authorized network participant has distinct user controls without affecting the data stored by the network org within the shared ledger.

According to the operations of another embodiment, the authorized network participant having originated the request to store the localized data is a customer organization having a plurality of users within the host organization; in which the stored localized data includes a new user account for the authorized network participant having originated the request to store the localized data; and in which the new user account is distinct from any user account associated with the plurality of user accounts for the customer organization.

According to the operations of another embodiment, the authorized network participant having originated the request to store the localized data is a customer organization having tenancy within the host organization; in which the stored localized data includes a customer organization specific workflow to execute against CRM data for the customer organization based on changes affecting the data stored by the network org.

According to the operations of another embodiment, all changes affecting the data and metadata stored by the network org are cryptographically verifiable providing a full audit log including at least what data was changed, when the data was changed, and who made the changes to the data.

According to the operations of another embodiment, each of the authorized network participants are tenants of the host organization.

According to the operations of another embodiment, the founder org is a first one of a plurality of tenants of the host organization having requested generation of the network org; and in which each of the partner orgs are tenants of the host organization different than the founder org and having been added as authorized network participants for the shared ledger by the founder org.

According to the operations of another embodiment, the system of the host organization embodies hardware, software, and logic elements to implement cloud based functionality providing on-demand services, on-demand database services, and cloud computing services to subscribing customer organizations; and in which the founder org and each of the partner orgs are selected from amongst the subscriber customer organizations; and in which the cloud based functionality is accessible to the subscribing customer organizations over a public Internet.

According to the operations of another embodiment, the network org is represented by the host organization as one of a plurality of customer organizations of the host organization.

According to the operations of another embodiment, the shared ledger includes a relational database system internal to the host organization; in which a copy of the data stored by the network org is accessible from each of a plurality of data centers of the host organization via one or more of the plurality of shared ledger nodes; and in which the method further includes: determining a first one of the plurality of shared ledger nodes is inaccessible based on an outage at one of the plurality of datacenters of the host organization or pursuant to a non-response from the first one of the plurality of shared ledger nodes; and transacting with the network org stored by the shared ledger from a second one of the plurality of shared ledger nodes subsequent to the determination.

According to the operations of another embodiment, the shared ledger implements a Distributed Ledger Technology (DLT) data store internal to the host organization; in which a copy of the data stored by the network org is accessible from each of the plurality of shared ledger nodes distributed across a plurality of geographically dispersed data centers of the host organization; and in which the DLT data store immutably stores all data within assets added to the DLT data store.

According to the operations of another embodiment, data deletion transactions at the network org are represented by new assets specifying the data deleted from the network org without removing any data from the DLT data store; in which data update transactions at the network org are represented by new assets specifying a current version of the data updated at the network org without removing any data from the DLT data store; and in which all prior versions of the data transacted to the network org are immutably persisted by the DLT data store and available via an audit log for the DLT data store including any data specified as having been deleted and all prior versions of the data transacted to the network org having been affected by one or more updates.

According to the operations of another embodiment, the host organization operates as a centralized trust authority to validate any transaction against the DLT data store on behalf of the authorized network participants for the network org.

According to the operations of another embodiment, the DLT data store is implemented via a hardware and software infrastructure operating wholly under the host organization's exclusive control.

According to the operations of another embodiment, operating the interface to the shared ledger includes operating a blockchain services interface to a blockchain on behalf of the authorized network participants for the shared ledger; in which each of the authorized network participants operate as a participating node on the blockchain and transact with the blockchain via the blockchain services interface operated by the host organization.

According to the operations of another embodiment, a copy of the data stored by the network org is accessible from any of the authorized network participants operating as participating nodes on the blockchain and further accessible from any other participating node on the blockchain; in which the blockchain immutably stores all record added to the blockchain; and in which the data stored by the network org affected by deletions and updates remain accessible from the blockchain as a non-current version of the data via an audit log for the blockchain.

According to the operations of another embodiment, the host organization operates a participating node on the blockchain; and in which the blockchain operates external from the host organization and operates outside of the host organization's exclusive control.

According to the operations of another embodiment, the network org includes one of a plurality of distinct network orgs operating via the shared ledger; or alternatively in which the network org operates on a unique shared ledger instance of the host organization and in which different network orgs operate on other shared ledger instances within the host organization separate from the unique shared ledger instance upon which the network org operates.

According to the operations of another embodiment, the data stored by the network org is associated with a first declared application and a second declared application, both the first and the second declared applications being utilized by the founder org and the plurality of partner orgs; and in which the permissions defined by the metadata specify different access permissions to the data stored by the network org based on whether each of the partner organizations is accessing the data utilizing the first declared application or the second declared application.

According to the operations of another embodiment, the metadata written to the shared ledger further defines a plurality of entity types and a plurality of field definitions for each of the plurality of entity types; and in which the method further includes: generating a virtual table within a database system of the host organization; structuring the virtual table at the database system of the host organization based on the metadata written to the shared ledger, in which the entity types from the metadata written to the shared ledger are represented as tables within the virtual table and further in which the one or more new field definitions for each of the plurality of entity types are represented as columns within the tables at the virtual table.

According to the operations of another embodiment, the virtual table includes a materialized view hosted at the database system of the host organization structured based on the metadata declared for the new application; in which the materialized view hosted at the database system of the host organization does not store any data associated with the new application; and in which SQL queries requesting read-only access are processed against the materialized view by translating the read-only SQL queries into a shared ledger transaction to retrieve the requested data from the shared ledger.

According to the operations of another embodiment, the metadata written to the shared ledger further defines a plurality of entity types and a plurality of field definitions for each of the plurality of entity types; and in which the method further includes: retrieving the metadata from the shared ledger, including the plurality of entity types, the one or more new field definitions for each of the plurality of entity types, and any field types applied to the one or more field definitions; generating a materialized view of the data stored via the shared ledger within a virtual table at the host organization by structuring the virtual table based on the defined metadata; in which the materialized view represents the structure of the data associated stored by the shared ledger without storing the data within the materialized view at the host organization.

According to another embodiment such operations may further include: receiving, at the host organization, an SQL statement from a user device, in which the SQL statement is directed toward the materialized view requesting an SQL update or an SQL insert for the data persisted to the blockchain and associated with the new application; processing the SQL statement against the materialized view by translating the SQL statement requesting the SQL update or the SQL insert into a corresponding shared ledger transaction to update or add the data associated with the new application at the shared ledger; and issuing an acknowledgement to the user device confirming successful processing of the SQL statement against the materialized view pursuant to the corresponding shared ledger transaction being accepted by the shared ledger and successfully updating or adding the data associated with the new application at the shared ledger.

According to another embodiment such operations may further include: receiving an SQL statement directed toward the materialized view at the host organization; in which the SQL statement specifies one or more of (i) a SELECT from SQL statement, (ii) an INSERT into SQL statement, and (iii) an UPDATE set SQL statement; and in which the SQL statement received is processed by translating the SQL statement into a corresponding shared ledger transaction and executing the corresponding shared ledger transaction against the shared ledger in fulfillment of the SQL statement directed toward the materialized view at the host organization.

According to a particular embodiment, there is non-transitory computer-readable storage media having instructions stored thereupon that, when executed by a processor of a system having at least a processor and a memory therein, the instructions cause the system to perform operations including: operating an interface to a shared ledger on behalf of a plurality of authorized network participants for the shared ledger, in which the shared ledger persists data via a plurality of distributed shared ledger nodes; generating a network org within the shared ledger to store the data on behalf of a founder org as a first one of the plurality of authorized network participants; receiving input from the founder org defining a plurality of partner orgs as additional authorized network participants for the network org, in which all of the authorized network participants have read access to the data stored by the network org via the shared ledger without replicating the data; receiving input from the founder org defining permissions for each of the partner orgs to interact with the network org within the shared ledger; writing metadata to the shared ledger defining at least the authorized network participants for the network org and the permissions defined for each of the partner orgs; receiving requests from the authorized network participants to interact with the network org; and transacting with the shared ledger in fulfillment of the requests.

According to another embodiment, there is a system to execute at a host organization, in which the system includes: a memory to store instructions; a processor to execute instructions; in which the processor is to execute a shared ledger interface to a shared ledger on behalf of a plurality of authorized network participants for the shared ledger, in which the shared ledger persists data via a plurality of distributed shared ledger nodes; in which the processor is to generate a network org within the shared ledger to store the data on behalf of a founder org as a first one of the plurality of authorized network participants; a receive interface to receive input from the founder org defining a plurality of partner orgs as additional authorized network participants for the network org, in which all of the authorized network participants have read access to the data stored by the network org via the shared ledger without replicating the data; the receive interface to further receive input from the founder org defining permissions for each of the partner orgs to interact with the network org within the shared ledger; in which the shared ledger interface is to metadata to the shared ledger defining at least the authorized network participants for the network org and the permissions defined for each of the partner orgs; the receive interface to further receive requests from the authorized network participants to interact with the network org; and in which the shared ledger interface further is to transact with the shared ledger in fulfillment of the requests.

Notably, the shared ledger provides similar decentralization capabilities as blockchain, although as noted, the shared ledger may run on a shared ledger instance internal to the host organization, may run on a public blockchain external to the host organization, may run on a private blockchain external to the host organization or a private blockchain implemented by the host organization, or the shared ledger may run on a distributed relational database system.

One problem with conventional solutions is that anytime two or more organizations agree to share data, ultimately at least one of the organizations must go back to the founder organization of the data repository for help to change access permissions, or to make any changes to the structure of the shared data. Worse yet, there are situations where a founder organization of the data repository must go to another third party for assistance, for example, to delegate certain administrative rights.

The shared ledger enables a founder organization to specify what other entities may operate as partner organizations and further permits the founder organization to delegate enhanced administrative privileges to themselves and to other partner organizations. For instance, partner organizations may be enabled to create users or to modify metadata defining the structure of the network org data persisted or saved by the shared ledger. Moreover, the shared ledger implements a declarative, metadata driven, cryptographically verifiable multi-network (multi-tenant) shared ledger in accordance with certain embodiments which permits the sharing of data amongst the founder org and partner orgs without having to replicate any data whatsoever in fulfillment of the sharing capabilities or to benefit from the distributed nature of the shared ledger's distributed nodes.

Consider for example a loyalty rewards program implemented by a credit card company such as American Express. It may be the case that Amex wishes to share data with multiple different partner organizations so that information may be gathered within a centralized location to the benefit of Amex as the founder organization and the partner organizations. With prior solutions, each of the partner organizations would continually need to go back to Amex for help anytime the partner organizations needed to add users to the system for data access, or make any changes whatsoever to data stored by the system, and so forth.

However, with the use of the shared ledger, a founder org such as Amex may delegate certain rights to the partner orgs. For example, Amex may permit the partner orgs to create their own user accounts or modify business logic shared by the founder org and the partner org or create localized data (e.g., such as a CRM flow to execute for one of the partner orgs) specific to only one of the partner orgs without affecting the common pool of data in the shared ledger shared by all the partner orgs and the founder org, or to perform certain data modification operations, such as permitting certain applications for the partner org to have write access to the shared data, and so forth.

According to a particular embodiment, the host organization implements, manages, maintains, and controls the entirety of the computing infrastructure for the shared ledger, yet permits the founder org to delegate or assign certain rights to themselves (e.g., the founder org may assign privileges to the founder org) or to the partner orgs, such as write access to stored data or write and update access to the stored metadata defining the structure of the stored data on behalf of the partner orgs and the founder org for a given network org.

According to a particular embodiment, each of the founder orgs and the partner orgs are an existing customer organization or tenant of the host organization and are thus enabled, through participation with the shared ledger as an authorized network participant, to define their own access controls for themselves and for their users, without having to solicit administrative support from the host organization.

Moreover, because the shared ledger provides all the information in a cryptographic manner, a type of an audit trail or fully transparent audit log is created, permitting the founder org and possibly the partner orgs to see who changed what data and when, thus allowing a full traceback as to the who, what, where, when, and why changes to the data records were made, as may be required by law, accounting principles, or contractual obligations.

Notably, with the shared ledger there is only one single repository for the data of the host org, and data is not replicated for each of the partner nodes (although certain distributed technologies do provide a single data repository which is distributed amongst a plurality of nodes). Notably, however, there are no synchronization mechanisms provided because the data is always persisted via the shared ledger and is not copied elsewhere and referenced as is the case with many prior solutions to the problem of data sharing.

According to certain embodiments, some or all of the partners may create their own business rules and business logic which is then written to the common pool of data stored by the network org within a shared ledger. In other embodiments, partners may write their own partner org specific rules and business logic which is persisted via the shared ledger, but not placed within the common pool of data for the network org and therefore is not exposed to the other partner orgs or to the founder org. This may occur when a partner org creates a CRM data flow to execute based on modifications to the data stored by the network org within the shared ledger, in which case, the common pool of data is referenced by the partner org's CRM data flow, but the CRM data flow itself is only useful for that particular partner org. Notably, however, common business rules and logic for all authorized network participants is not only feasible, but very likely to occur on any given network org having data shared by multiple distinct entities.

Further still, despite the data being persisted within a shared ledger, it is provided in accordance with certain embodiments that a data-less virtual table is created within the host organization as a "materialized view" in which founder or and the partner org may issue and process SQL based queries against the materialized view as if it were a traditional relational database table, notwithstanding the fact that certain embodiments of the shared ledger may be persisted to a non-relational data store, such as a DLT based data store within the host organization or a blockchain (private or public), while in other situations, the shared ledger may be permissibly persisted to a relational database, so long as it is cryptographically verifiable.

With such embodiments, a materialized view may be provided for every one of the authorized network participants (e.g., founders and partners) which then permits SQL transactions to be processed against the materialized view from the perspective of such participants, with the host organization then providing the necessary translation from the received SQL statements to the necessary shared ledger transaction commands, be a blockchain, DLT data store, or even another relational database store.

According to certain embodiments, the shared ledger is multi-tenant aware and multi-network aware, with every authorized network participant being assigned a unique network ID and further in which all data stored within a network org via the shared ledger is then partitioned by network ID and/or referenceable via the network ID, thus permitting data specific to only one or more specified authorized network participants to be referenced.

According to another embodiment, the same common pool of data for a network org may be subjected to different access permissions based on the declared app being utilized to access such data. For example, where Amex is a founder org and Chevron is a partner org, it may be that a first application for inventory management used by the network org allows Chevron only read access to the common pool of data, and yet, the same partner org, Chevron, when utilizing a different app to access the same common pool of data, such as a customer rewards points app, permits Chevron to have write access to some of the data stored by the network org, thus permitting different permissions based on the declared app and not just based on the particular partner org.

Figure 1D:
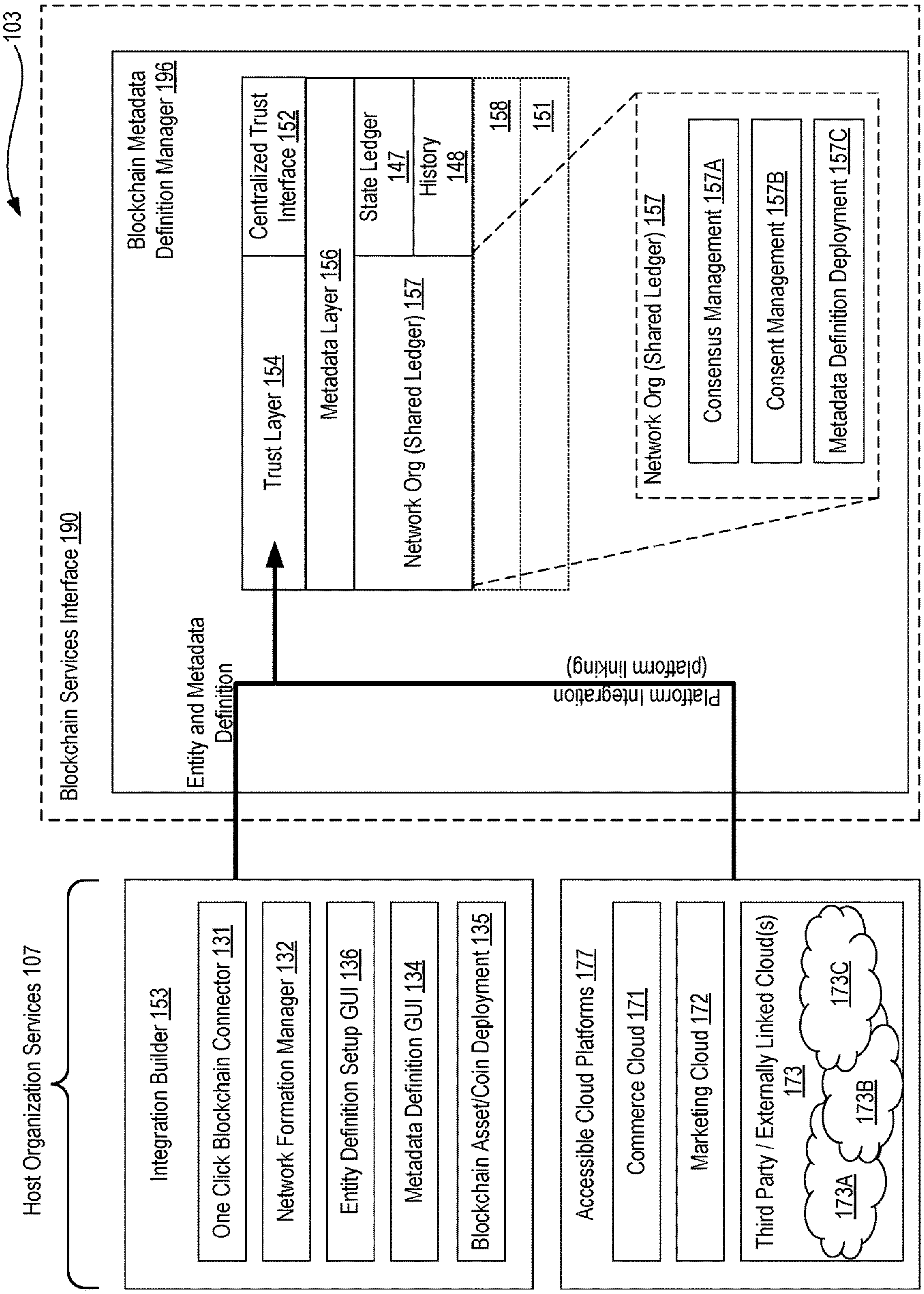
FIG. 1D depicts another exemplary architecture, which depicts the integration of host organization services with the blockchain services interface in greater detail, in accordance with described embodiments.

FIG. 1D depicts another exemplary architecture 103, which depicts the integration of host organization services with the blockchain services interface 240 in greater detail, in accordance with described embodiments.

In particular, there is now depicted both an integration builder 153 and accessible cloud platforms 177, each of which are interfaced into the blockchain metadata definition manager 246 of the blockchain services interface. The Integration builder 153 provides a variety of functionality which collectively permits for entity and metadata definition into a shared ledger 157 which is hosted internal to the host organization or which permits the entity and metadata definition into a blockchain which is made accessible through the host organization, even when such a blockchain is a public blockchain which is not under the ultimate control of the host organization.

Specifically depicted at the integration builder 153 is a one click blockchain connector 131 permitting users to click and drag components to link their application with an available blockchain internal to the host organization or accessible via the host organization, thus specifying a linkage between an application and a blockchain, without the user necessarily having to write code to establish the link.

Further provided by the integration builder 153 is a network formation manager 132 which permits users to define what entities (e.g., applications, etc.), partners, tenants, users, customer organizations, etc., will have access to the information written into the blockchain via their application.

The entity definition setup GUI 136 permits users to define, without writing code, an application or entity to which specified metadata will apply. For instance, this may be a new entity specified at the entity definition setup GUI 136 or this may be existing application, which are to be made compatible with the metadata definitions specified and established via the metadata definition GUI 134.

Lastly, the blockchain asset or coin deployment 135 module of the integration builder 153 permits a user to deploy their specified entities, with defined metadata and any associated applications, partners, customer orgs, tenants, users, etc., as specified via the network formation manager 132 onto the connected blockchain for use by applications or anyone having connectivity and where appropriate, relevant access rights. Once the entity and metadata defined via the GUIs are deployed onto the blockchain, they may be utilized by any application or entity having access and relevant access rights to the blockchain in question. Stated differently, the blockchain asset or coin deployment 135 component serves to "publish" or "go live" with the defined entities and metadata.

Further depicted are the accessible cloud platforms 177, via which information stored outside of the linked blockchain, yet accessible via the host organization, may be linked through a defined entity.

Therefore, if a user creates a new application and defines metadata for that application and then deploys the defined entity and metadata onto the blockchain chosen, it is then further permissible to retrieve, reference, and read and write data stored on variously accessible cloud platforms 177 accessible via the host organization, despite such data not persisted within the chosen blockchain in question for that particular application. Stated differently, such an application which generally utilizes and references data persisted on the blockchain and which expressly relies upon the defined metadata written to the blockchain for that given application nevertheless will have the option to access data stored within the host organization when lined via a "defined entity," this permitting the application developer to leverage additional data within the host organization, such as CRM data, etc., without having to copy that data on to the blockchain which would be generally inefficient and undesirable under such circumstances.

For example, an application on the shared ledger 157 or another blockchain accessible via the host organization may retrieve data from the commerce cloud 171 provided by the host organization, or retrieve data from the marketing cloud 172 provided by the host organization or may reference information from third party and externally linked clouds 173, such as the externally linked clouds depicted here as 173A, 173B, and 173C, which may in reality correspond to, for example, an Amazon AWS cloud service interface, or a Microsoft Azure cloud service interface, or an Oracle cloud service interface, etc. So long as such third party clouds are externally linked via the host organization services 107, then those third party clouds are referenceable by entities and applications which persist their data within a blockchain accessible via the host organization or hosted internal to the host organization.

Further depicted is a more detailed breakout of the network org shared ledger 157, which as noted previously, may provide to customer orgs wishing to avoid full deployment to a public blockchain, certain Distributed Ledger Technology (DLT) functional aspects, yet provide internally hosted ledger capabilities (within the host organization) which implements a centralized trust authority via the trust layer 154, rather than requiring consensus by the participating nodes of the blockchain or shared ledger. Optionally, the shared ledger 157 may permit the customer org to reference consensus management protocols 157A for testing or validation purposes, in which the customer organization may simply provide their own consensus for any transaction, as they are permitted to do within an internally hosted shared ledger 157 for which the customer organization has its own instance, and thus, possesses ultimate authority. This is similar in function to relying upon the centralized trust interface 152, yet permits the customer organization to utilize DLT based consensus management as would be observed on a public blockchain, while retaining control over consensus management decisions. Later, if the customer org transitions their application to a public blockchain, then their migration path will be simplified as there will already be integration with consensus management components. Such a customer organization simply needs to define or reference an alternative consensus management scheme which is applicable for the public blockchain to which their application and data is being migrated.

The consent management 157B module permits the customer org utilizing the shared ledger 157 to define which entities, users, partners, customer orgs, etc. have authority to reference, read, write, update, or delete transactions associated with a defined application as well as permit those same entities, users, partners, customer orgs, etc., to grant authority for their data to be referenced. The metadata definition deployment 157C module permits defined metadata to be written to the blockchain in question or written into the shared ledger 157 as an asset or as a coin, subsequent to which, entities, applications, and any code interacting with information for which metadata has been defined must be in compliance with the defined metadata, and may be forced into compliance via smart contract execution which performs metadata compliance validation. For example, a transaction having non-compliant data, as defined via the metadata for the application which is written onto the blockchain, when evaluated by a triggered and executing smart contract, will simply be rejected and thus not be permitted to attain consensus at the blockchain as a valid transaction or in the even the host organization is the centralized trust authority for such a transaction, then the host organization will simply withhold authorization for the transaction due to its use of non-compliant formatted data, thus effectively rejecting the transaction.

Figure 1E:
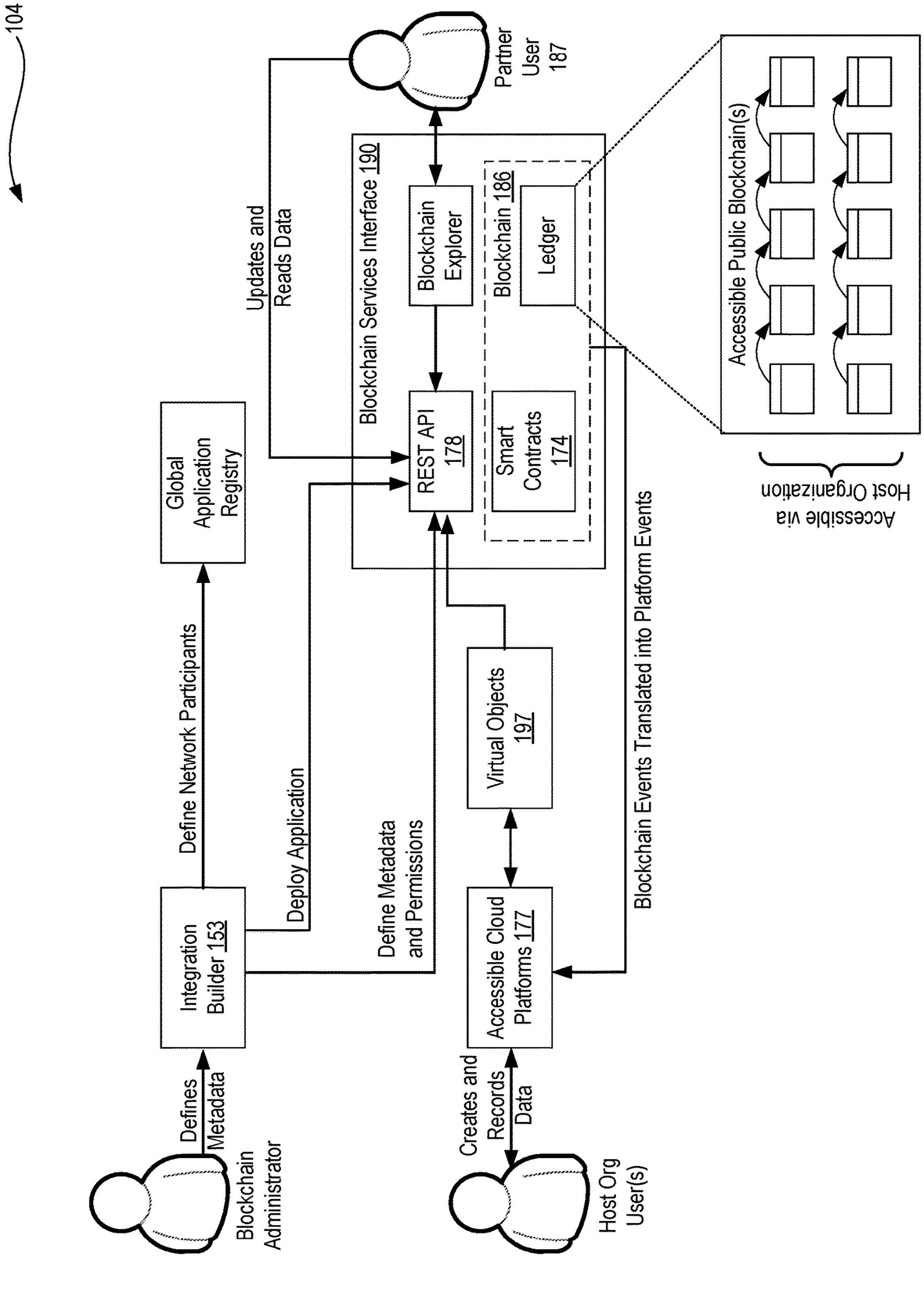
FIG. 1E depicts an exemplary data flow utilizing the blockchain services interface, in accordance with described embodiments.

FIG. 1E depicts an exemplary data flow 104 utilizing the blockchain services interface 240, in accordance with described embodiments.

In particular, as shown here, there is a partner user which interacts with the blockchain services interface 240 and specifically with the blockchain explorer through which accessible blockchains may be discovered and referenced. The partner user may then update and read data, where permissions are appropriate, from the blockchain via the REST API as depicted at element 178. The blockchain persists the information for a defined entity application in compliance with the metadata definitions described previously.

The REST API 178 or the "Representational State Transfer" API is a software architectural style that defines a set of constraints used for creating and utilizing Web services. Web services that conform to the REST architectural style, termed RESTful Web services (RWS), provide interoperability between computer systems on the public Internet. RESTful Web services allow the requesting systems to access and manipulate textual representations of Web resources by using a uniform and predefined set of stateless operations, while other supported Web services, such as SOAP Web services, expose their own arbitrary sets of operations.

Such Web services may include any application entity that may be identified, named, addressed, or handled, in any way permitted by the application, via the public Internet, with so called RESTful Web service permitting requests to be made to a resource's URI which will then in turn elicit a responsive payload formatted in HTML, XML, JSON, or some other selected format. Utilizing a stateless protocol and standard operations, RESTful systems aim for fast performance, reliability, and the ability to grow, by re-using components that can be managed and updated without affecting the system as a whole, even while it is running, thus permitting fuller interoperability between the depicted blockchain and the connected elements, such as the partner user 187, the host org users, and the integration builder 153.

As shown here, there are blockchain events which are translated into platform events and transmitted to the accessible cloud platforms 177.

Host organization users may interact with such accessible cloud platforms 177 to create and record data, and where appropriate, data and events may be pushed back into the blockchain 186 through configured virtual objects 247 which communicate with the REST API to write information into the blockchain or to reference information in the blockchain or to update state information for managed events within the blockchain.

Additionally depicted here is a blockchain administrator which, for example, may utilize the previously described GUIs to define metadata at the integration builder 153, thus permitting the blockchain administrator to define network participants which are recorded in the global application register, or to deploy an application which is then referenced by the REST API at the blockchain services interface, as well as to define metadata and permissions for the entity application deployed, thus ensuring that information for that deployed application, when written into the blockchain, is in fact in compliance with the defined metadata for such information associated with the application. Such compliance may be enforced by the smart contracts 174 depicted here within the blockchain 186 at the blockchain services interface 240.

As noted previously, the blockchain 186 may be an internally hosted blockchain, such as a shared ledger 157 which is hosted internally and wholly controlled by the host organization, or the blockchain 186 may be any public blockchain accessible via the host organization.

Figure 2A:
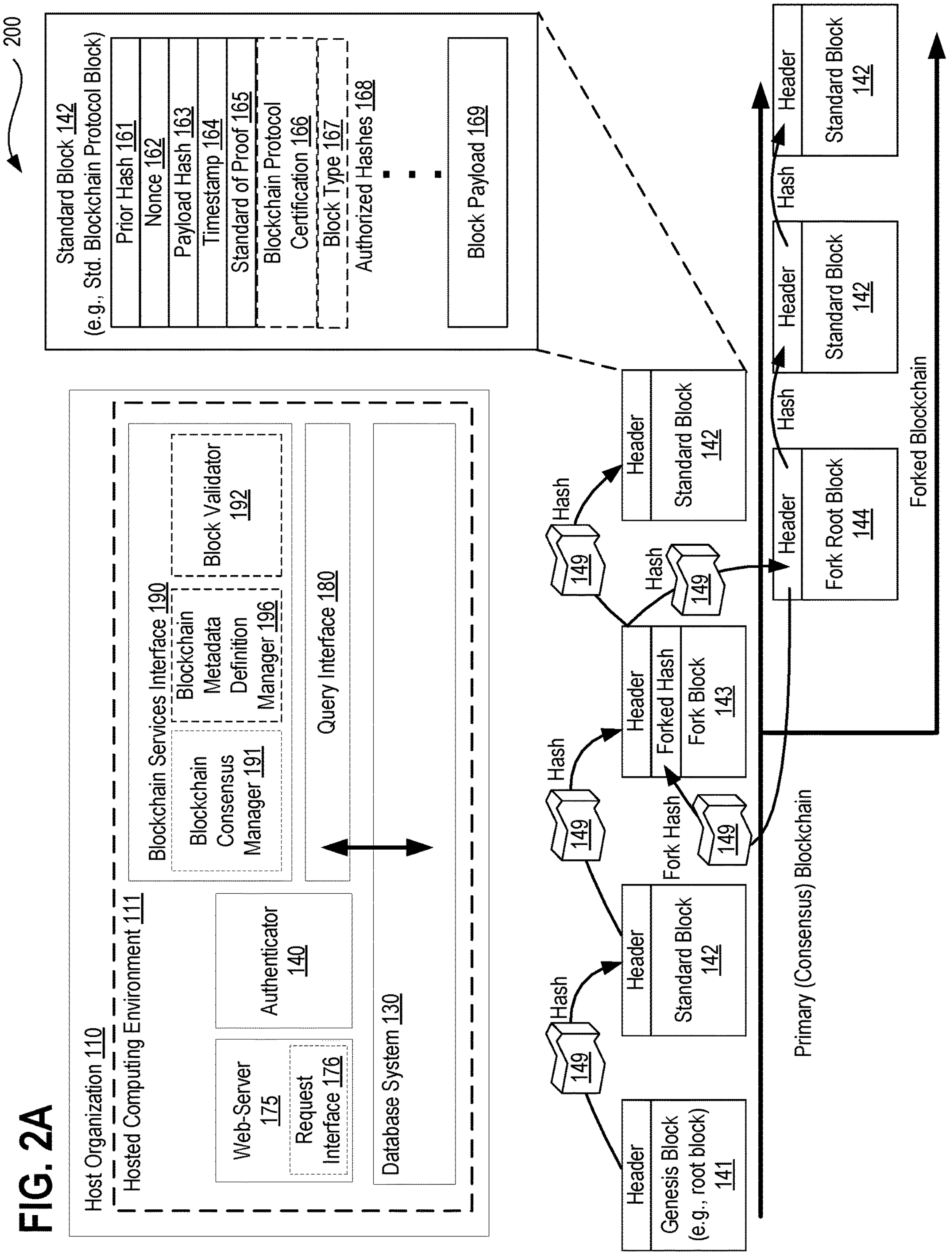
FIG. 2A depicts another exemplary architecture, with additional detail of a blockchain and a forked blockchain, in accordance with described embodiments.

FIG. 2A depicts another exemplary architecture 200, with additional detail of a blockchain and a forked blockchain, in accordance with described embodiments. In this example architecture, the blockchain consensus manager 241 and the permissions manager 181 operate to support consensus on read and access control processes as further described in relation to FIGS. 10-12.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary blockchain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 242 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing and potentially valid primary blockchains. Once consensus is reached (typically after one or two cycles of new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

For instance, a forked blockchain may be utilized to support declarative smart actions as enabled by the host organization where a forked blockchain of a public or private blockchain is customized via a new blockchain protocol certification 166 to support both the declarative establishment of smart actions and their required information capture provisions as defined by an administrator as well as the ability to map the data captured with a transaction utilizing such a declared smart action back to the cloud platform entity as provided by the host organization.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which declared smart actions for assets, tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

Consider for instance the host organization's use of a previously existing blockchain for the implementation of the services provided by the blockchain metadata definition manager 246. It may be advantageous to utilize an existing blockchain, but then creating a specialized sidechain or a forked blockchain specifically for the services provided by blockchain metadata definition manager 246 yet remain in compliance with the blockchain protocol certification 166 required by the primary (consensus) blockchain.

In other instances, a modified Distributed Ledger Technology such as the shared ledger 157 at FIG. 1C may be utilized which is a hosted ledger fully under the control of the host organization, and as such, it may not be necessary to side-chain from a primary chain. Still other examples may include the host organization providing and defining the blockchain protocol for a public blockchain, in which case the host organization may define the blockchain protocol utilized in such a way that the extended capabilities of the blockchain metadata definition manager 246 (see e.g., FIG. 1A) are native to the protocol, thus requiring no side-chaining or conversely, the host organization may define and operate a public blockchain which has a limited sub-set of functionality available to the public and then extend the capabilities of the blockchain metadata definition manager 246 by side-chaining off of the public blockchain to provide the enhanced functionality.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C #, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

Figure 2B:
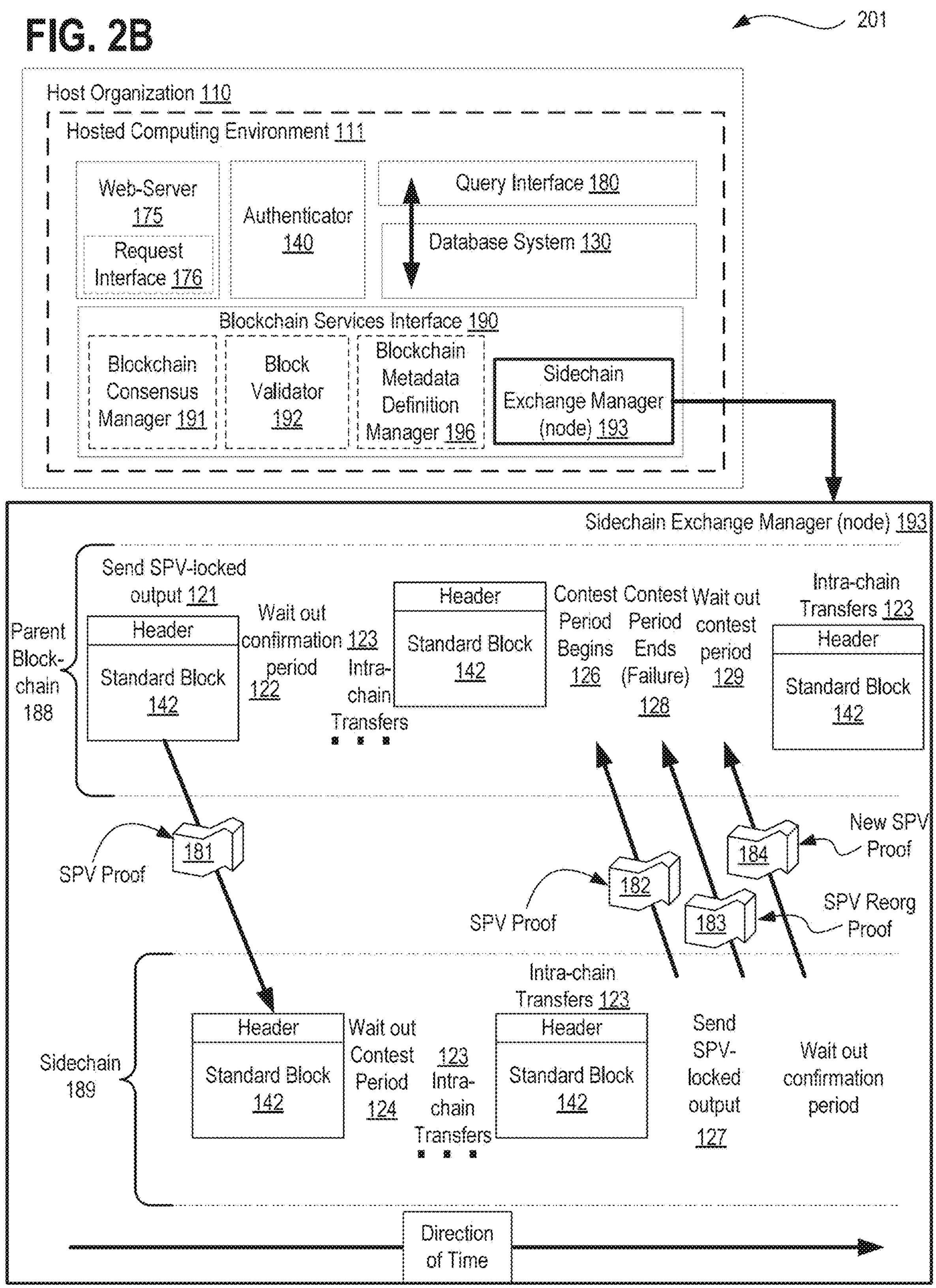
FIG. 2B depicts another exemplary architecture with additional detail for sidechains, in accordance with described embodiments.

FIG. 2B depicts another exemplary architecture 201 with additional detail for sidechains, in accordance with described embodiments. In this example architecture, the blockchain consensus manager 241 and the permissions manager 181 operate to support consensus on read and access control processes as further described in relation to FIGS. 10-12.

More particularly, there is depicted here a mechanism by which to perform a symmetric two-way pegged transfer from a parent blockchain 188 (e.g., e.g., a primary chain) to a sidechain 189, which may be a different blockchain protocol supported by and provided by the host organization 110 or the sidechain may be a foreign blockchain, public or private, for which the sidechain exchange manager 243 of the host organization 110 participates as a node, so as to permit access and transactional capabilities with the sidechain.

Regardless, it is in accordance with described embodiments that inter-chain transfers between the parent blockchain 188 and the sidechain 189 may permissibly performed in compliance with the rules and conditions of each respective blockchain. Notably, as described here, the perspective of each blockchain is interchangeable insomuch that the sidechain 189 depicted here may consider itself as a primary or parent blockchain and consider the depicted parent blockchain 188 as the child blockchain or a sidechain. Regardless, each blockchain operates independently, yet has a defined exchange mechanism by which to exchange assets, coins, tokens, value, or other payload information between them which have been created by a transaction utilizing a declared smart action.

As shown here, the sidechain exchange manager 243 of the host organization may send a parent chain asset as an output of the parent blockchain 188 at operation 121.

A Simplified Payment Verification (SPV) proof 181 associated with the parent blockchain 188 asset is generated as the output and communicated to the sidechain 189. The SPV proof may include a threshold level of work, and the generating may take place over a predetermined period of time, which may also be referred to as a wait out confirmation period 122. The confirmation period of a transfer between chains may be a duration for which a coin, token, or other exchanged value is locked on the parent blockchain 188 before it may be successfully transferred to the sidechain 189. This confirmation period may allow for sufficient work to be created such that a denial of service attack in the next waiting period becomes more computationally difficult.

Consider for instance an exemplary confirmation period which may be on the order of 1-2 days. The confirmation period may be implemented, in such an example, as a per-sidechain security parameter, which trades off cross-chain transfer speeds in exchange for greater security. Other confirmation periods which are much shorter may be utilized where sufficiently difficult proof of work conditions are effectuated so as to ensure adequate security so as to protect the integrity of both blockchains and negate the potential for fraudulent transactions.

The output created on the parent blockchain 188 may specify via rules and configuration parameters (e.g., stored within the blockchain protocol certification portion of each block of the parent blockchain 188) a requirement that any spending, transfer, or consumption of an asset received by the output in the future are burdened with additional conditions, in addition to the rules governing transfer within the parent chain. For example, any release of assets received by the output may require additional conditions for verifying a proof from the destination chain, such as validating that the rules for the destination chain proof show that the destination chain has released the asset and show to where the asset has been released. After creating the output on the parent blockchain 188, the user waits out the confirmation period, meanwhile, intra-chain transfers 123 continue to occur. Subsequent to waiting out the confirmation period, a transaction is then created on the sidechain 189 referencing the output from the parent blockchain 188.

The sidechain, using a sidechain validator service, such as the block validator 242 of the host organization, is then provided with an SPV proof that shows the parent chain asset was created and encumbered by sufficient work within the parent chain A sidechain validator service (e.g., block validator 242 if performed by the host organization's available services) will then validate that the SPV proof associated with the parent blockchain 188 asset meets the required threshold level of work indicated by the SPV proof at operation 154 and a sidechain 189 asset corresponding to the parent blockchain 188 asset is then generated.

The generated sidechain 189 asset also may be held for a predetermined contest period at operation 124 during which time the transfer will be invalidated if a reorganization proof 183 associated with the parent blockchain 188 asset is detected in the parent blockchain.

The wait out contest period at operation 124 may be a duration during which a newly-transferred token, coin, value, or payload data may not be spent, accessed, or consumed on the sidechain 189. The predetermined contest period is implemented to prevent any possibility for double-spending in the parent blockchain 188 by transferring previously-locked coins, tokens, value, or payload data during a reorganization. If at any point during this delay, a new SPV proof 184 (known as a "reorganization proof") is published containing a chain with more aggregate work which does not include the block in which the lock output was created, the conversion is retroactively invalidated. If no reorganization proof is detected, the sidechain asset may be released. All participating nodes on the sidechain have an incentive to produce reorganization proofs if possible, as the consequence of a bad proof being admitted degrades the value of all sidechain tokens, coins, value, or trust in the authenticity of payload data stored by the sidechain 189.

Similar to the above, an exemplary contest period at operation 126 may also be on the order of 1-2 days. To avoid these delays, users may instead employ use atomic swaps for fungible transfers, so long as a liquid market is available. Where the exchanged asset is a unique or less common token, value, or payload data, atomic swaps will not be feasible and a sidechain transfer must instead occur, despite the necessity of a potentially lengthy 1-2 day waiting period.

Upon eventual release of the sidechain asset, the side chain asset corresponding to the parent chain asset may then be transferred or consumed within the sidechain one or more times the intra-chain transfers 123 of the sidechain 189. While locked on the parent blockchain 188, the asset is freely transferable within the sidechain and without requiring any further interaction with the parent blockchain 188, thus permitting the sidechain 189 to again operate wholly independently. Notwithstanding the above, the sidechain asset retains its identity as a parent chain token, coin, value, or payload data and may therefore, if the need arises, be transferred back to the originating parent blockchain 188 from which the sidechain asset originated. In certain embodiments, transfers are relegated to only a single hop, such that an asset cannot be transferred to a sidechain 189 and then transferred again to another sidechain, where it is necessary to prevent obfuscation of the source. Such restrictions are dependent upon the particular blockchain protocol chosen and the define exchange agreement (e.g., pegging conditions) established between a parent blockchain 188 and a sidechain 189.

Where it becomes necessary to redeem a sidechain asset in the parent blockchain 188, the sidechain asset may be sent to an output of the sidechain as depicted at operation 157. An SPV proof 182 associated with the sidechain asset is thus generated and communicated to the parent blockchain 188 pursuant to the side chain 189 sending SPV-lockout output 127. A parent chain validator service, such as the block validator 242 of the host organization 110, may validate the SPV proof 182 associated with the sidechain asset. The validated SPV proof 182 associated with the sidechain 189 asset may include, for example, validation that the SPV proof 182 associated with the sidechain asset meets the threshold level of work indicated by the SPV proof 182 associated with the sidechain asset.

As before, the parent chain asset associated with the sidechain asset may be held for a second predetermined contest period at step 126, during which a release of the parent chain asset is denied at operation 128, showing where the contest period ends (failure), if a reorganization proof 183 associated with the sidechain asset is detected in the sidechain. The parent chain asset may be released if no reorganization proof 183 associated with the sidechain asset is detected.

If validation failure occurs with respect to the second SPV proof 184, after the reorganization proof 183 is received, then a second SPV proof 184 associated with the sidechain asset may be received and validated by the parent blockchain 188 during a third predetermined contest period at operation 129. The parent blockchain 188 asset may be released if no reorganization proof associated with the sidechain asset is detected during the third predetermined contest period, after which the parent chain asset is free to be transferred within the parent chain via the depicted intra-chain transfers 123 shown at the rightmost side of the parent blockchain 188 flow.

Because pegged sidechains may carry assets from many different blockchains, it may be problematic to make assumptions about the security of the other foreign blockchains. It is therefore required in accordance with certain embodiments that different assets are not interchangeable (except by an explicit trade) within the sidechain. Otherwise, a malicious user may potentially execute a fraudulent transaction by creating a worthless chain with a worthless asset, and then proceed to move the worthless asset from their worthless chain into the parent blockchain 188 or into a sidechain 189 with which the parent blockchain 188 interacts and conducts exchanges. This presumes that the worthless chain secures a pegged exchange agreement with the sidechain. However, because the rules, configuration options, and security scheme of the sidechain 189 is not controlled by the parent blockchain 188 (assuming the sidechain is a foreign sidechain and not another blockchain protocol provided by the host organization 110), it simply cannot be known with certainty that the sidechain 189 being interacted with does not contain such vulnerabilities. To negate this potential security vulnerability, the sidechain 189 may be required, as per the pegged exchange agreement, to treat assets from separate parent blockchains as wholly as separate asset types, as denoted by the block type portion of a blockchain protocol block as depicted at FIG. 1B, element 167.

With a symmetric two-way pegged sidechain transfer, both the parent blockchain 188 and sidechains 189 may perform SPV validation services of data on each other, especially where the parent blockchain 188 is provided by the host organization and where the sidechain is a foreign sidechain for which the host organization is merely a participating node via the sidechain exchange manager node 243. Because the parent blockchain 188 clients (e.g., participating nodes) do not observe every sidechain, users import proofs of work from the sidechain into the parent chain in order to prove possession. In a symmetric two-way peg, the reverse is also true. For example, to use Bitcoin as a parent blockchain 188, an extension script to recognize and validate such SPV proofs may be utilized. To facilitate such transactions, the SPV proofs are sufficiently small in size so as to fit within a Bitcoin transaction payload. However, such a change may alternatively be implemented as a forking transaction, as described previously, without affecting transactions not involved in pegged sidechain transactions. Stated differently, using symmetric two-way pegged sidechains as described above, no further restrictions are necessarily placed upon any transaction deemed valid within Bitcoin.

Through the use of such pegged sidechains transactions, independent blockchains are made to be flexible enough to support many assets, including assets that did not exist when the chain was first created. Each of these assets may be labeled with the blockchain from which it was transferred so as to ensure that transfers may be unwound (e.g., transferred back) correctly.

According to certain embodiments, the duration of the contest period is made as a function of the relative hashpower of the parent chain and the sidechain, such that the receiving sidechain (or the parent blockchain with an incoming transfer) may only unlock tokens, coins, value, or data payloads, given an SPV proof of one day's worth of its own proof-of-work, which may, for example, correspond to several days of the sending blockchain's proof-of-work. Security parameters of the particular sidechain's blockchain protocol implementation may thus be tuned to each particular sidechain's implementation.

According to described embodiments, the blockchain validator 242 may require, utilize, or apply various types of consensus management to the blocks requiring validation.

When a block containing a particular asset or transaction is to be added to the blockchain, the transaction type database is queried using the type of the particular asset or transaction that is to be added to the blockchain to determine the corresponding consensus protocol type that is to be used to commit the particular asset or transaction, or block containing the particular asset or transaction, to the blockchain. For example, in the database, a transaction type of "loan" may be associated with a consensus protocol type of "proof of stake" (PoS), an asset type of "document" may be associated with a consensus protocol type of "Byzantine Fault Tolerant" (BFT), an asset or transaction type of "currency" may be associated with a consensus protocol type of "proof of work" (PoW), and a default transaction type to be used in the case of an otherwise unenumerated transaction type in the database may be associated with a default consensus protocol type, say, PoS.

Another transaction type may correspond to an asset type having metadata stored therein, possibly typed as "metadata," while a closely related transaction type stores a "related entity" as metadata within the blockchain having a transaction type of either "metadata" if it shares the same type as normal metadata or having a transaction type of "related entity" if separate. Still further, a "stored record" transaction type may be utilized to store a record having multiple distinct data elements embedded therein, typically which will be defined by metadata specified by an application developer.

For instance, when a block or transaction within a block having a particular transaction type corresponding to transactions utilizing a declared smart action is to be added to the blockchain, the consensus protocol type to be used to commit the block or transaction therein to the blockchain is PoS, when a block or transaction therein with a particular asset having the type "document" is to be added to the blockchain, the consensus protocol type to be used to commit the block or transaction therein to the blockchain is BFT, and when a block or transaction therein with a particular transaction having a transaction type that is not specified in the database is to be added to the blockchain, then the default consensus protocol type of PoS is to be used to commit the block or transaction therein to the blockchain.

This selected consensus protocol type may be communicated to the nodes in the consortium for use in for validating the request to add the new block or transaction therein to the blockchain. According to certain embodiments, the host organization 110 receives validation of the request to add the new block or transaction therein to the blockchain when the nodes in the consortium reach consensus according to the selected consensus protocol to add the block or transaction therein to the blockchain and communicate such to the host.

Any relevant factors may be used in determining which nodes participate in the consensus protocol, including, for example, the selected consensus protocol itself, a particular node's computing resources, the stake a particular node has in the consortium or the selected consensus protocol, relevant (domain) knowledge a particular node has, whether that knowledge is inside (on-chain) or outside (off-chain) with regard to the blockchain or consortium, a particular node's previous or historical performance, whether in terms of speed or accuracy, or lack thereof, in participating in the selected consensus protocol, the block number of the new block being added to the blockchain, the number of transactions in the new block, the size of the block, and the fiduciary or nonfiduciary nature of the assets or transactions in the block being added to the blockchain.

According to a particular embodiment, the host organization 110 receives from each of one or more of the nodes in a peer-to-peer network a weighted vote to validate or to add a new block or transaction therein to the blockchain, in response to the request, or in response to a request for a vote issued by the blockchain platform host. These nodes learn of the request either through a blockchain protocol packet broadcast by the node generating the request, or by communication with other nodes in the consortium or the blockchain platform host providing notice of the request in conjunction or combination with the request for a vote transmitted by the blockchain platform host. The host organization then responsively validates, or receives validation of, the request to add the new block or transaction therein to the blockchain when a sum of the received weighted votes exceeds a threshold.

According to another embodiment, a consortium of nodes participate in a private, or permissioned, blockchain within which each node is assigned a weight that its vote will be given, for example, based on domain (general) knowledge about the transactions, or types of transactions, the nodes may add to a new block in the blockchain. Certain nodes may be given a zero weight within such a permissioned blockchain, whereas other nodes may be given such a significant weight that their vote is near controlling or even controlling when combined with a limited number of other highly weighted nodes, depending upon the particular implementation.

Before a node adds a transaction to a new block of the blockchain, or before the new block including the transaction may be added to the blockchain, other nodes in the consortium vote on adding the transaction to the new block for the blockchain and/or adding the new block to the blockchain. When a majority of nodes agree the transaction and/or new block is valid and may thus be accepted as a valid block on the primary blockchain, the transaction and/or new block is added and accepted to that primary blockchain, sometimes called the main chain or the consensus chain. For instance, while an invalid block may be added to the blockchain, such an invalid block in effect creates a side chain which fails to attain consensus, and thus, is never accepted as an added valid block within the main or primary blockchain. Nodes are weighted such that a "majority" may be obtained or denied based on the votes of one or more of the nodes participating in the private blockchain, that is, a majority may be obtained from less than all of the nodes participating in the blockchain.

According to this embodiment, the parties in the consortium agree upon the weight, w, to assign each node in the consortium, for example, based on a party's domain knowledge, and/or other criteria, including, for example, a party's participation in another blockchain or sidechain. The total weight, W, of the nodes in the consortium is equal to the sum of the individual node weights, $w_1+w_2+ \ldots w_n$, where n is the number of nodes in the consortium. The weight, w, of any one member, or the ratio of w/W may or may not exceed a certain threshold, in one embodiment. Each node's weight is attributed to the respective node's vote. If the sum of the weights for the nodes that voted exceed a certain threshold, the transaction/new block is validated and added to the blockchain. In particular, the transaction/new block is added if the total weight, W, attributed to the votes meets or exceeds a threshold (e.g., a plurality, majority, supermajority, in terms of percentage of w/W, or absolute value for w, whatever is agreed upon by the consortium) to reach consensus for the blockchain. In this embodiment, the nodes in the blockchain do not need to come to unanimous agreement about adding the transaction and/or new block to the blockchain, and indeed, after the threshold is met, a node need not begin, or continue, to participate in the voting process.

In one embodiment, at least a minimum number of nodes, k, vote on adding a transaction to the new block in the blockchain, or adding the new block that includes the transaction to the blockchain, to mitigate the risk of fraud or double-spending, or to prevent one node with a large weight, w, or a small group of nodes with a collectively large weight, from controlling the outcome of the vote. In one embodiment, the number of nodes that participate in voting, k, or the ratio of k/n must meet a minimum threshold.

Figure 3A:
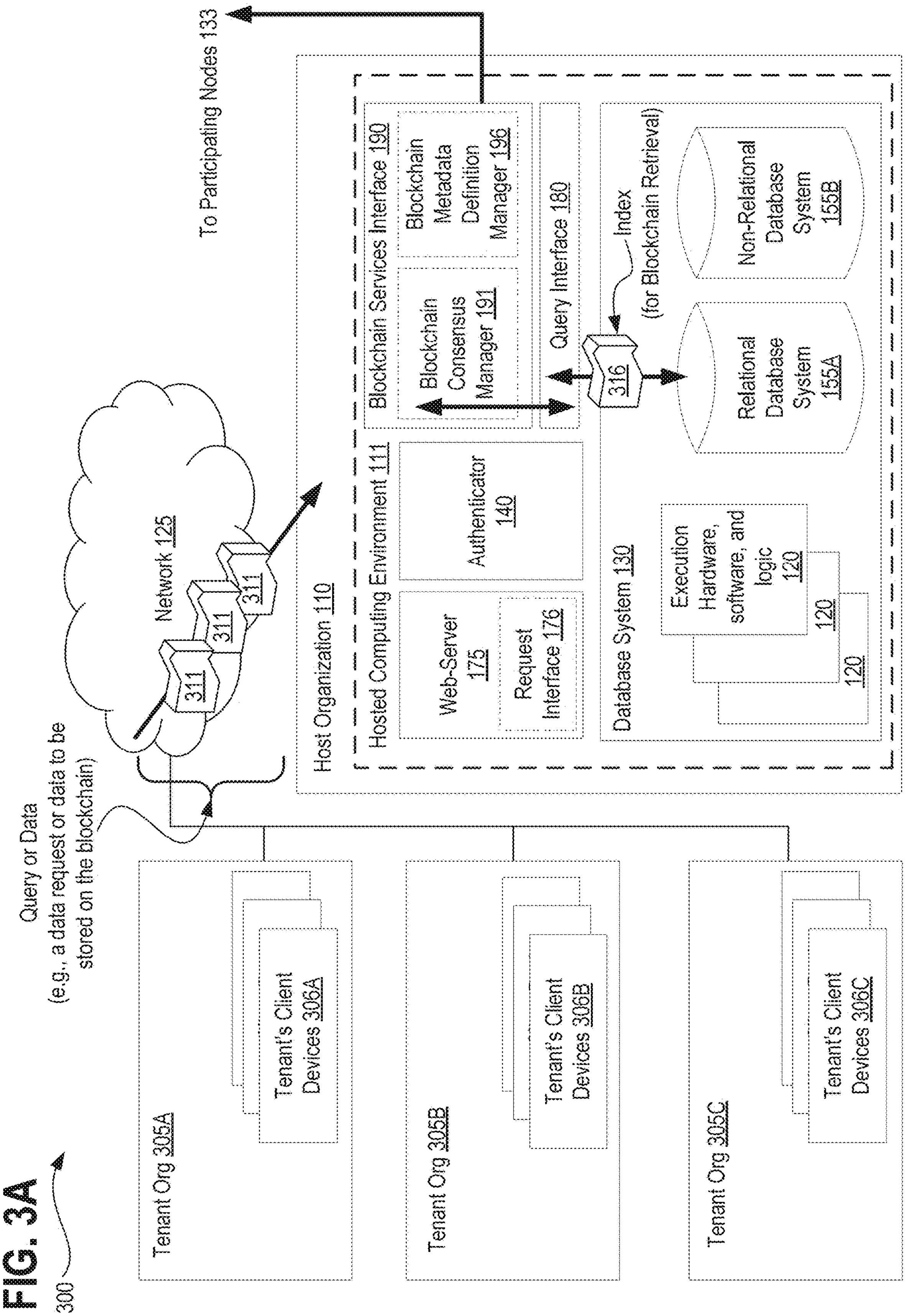
FIG. 3A depicts an exemplary architecture in accordance with described embodiments.

FIG. 3A depicts an exemplary architecture 300 in accordance with described embodiments. In this example architecture, the blockchain consensus manager 241 and the permissions manager 181 operate to support consensus on read and access control processes as further described in relation to FIGS. 10-12.

As depicted here, there is again the host organization 110 which includes the hosted computing environment 111 having a processor and memory (e.g., within the execution hardware, software, and logic 120 of the database system 130) which serve to operate the blockchain services interface 240 including the blockchain consensus manager 241 and blockchain metadata definition manager 246. There is additionally depicted an index 316 which provides addressing capabilities for data, metadata, and records which are written to, or transacted onto the blockchain.

Additionally depicted are the multiple tenant orgs 305A, 305B, and 305C (also referred to sometimes as customer orgs) each of which have tenant client devices 306A, 306B, and 306C via which the tenants and the tenants' users may interact with the host organization 110 and its services. For example, the tenant orgs may submit queries or data 311 to the host organization to request data retrieval from the blockchain or to store data to the blockchain, either of which may utilize the depicted index 316.

According to certain embodiments, the index 316 implements a Merkle Tree Index or a Merkle Directed Acyclic Graph (DAG) or a "Merkle-DAG" tree index. In cryptography and computer science, a hash tree or Merkle tree is a tree in which every leaf node is labeled with the hash of a data block, and every non-leaf node is labeled with the cryptographic hash of the labels of its child nodes. Such trees allow for efficient and secure verification of the contents of large data structures and thus provide significant efficiencies for data retrieval from large data structures. According to such an embodiment, implementing the index 316 via a Merkle tree or the Merkle-DAG tree recursively defines the index as a binary tree of hash lists where the parent node is the hash of its children, and the leaf nodes are hashes of the original data blocks. The Merkle-DAG tree permits for unbalanced trees and permits data in the leaf (terminal) nodes.

Implementing the index 316 via a Merkle tree provides a means to prove the integrity and validity of data stored within the index, requires relatively little memory or disk space as the proofs are computationally easy and fast, and additionally, the proofs and management for the Merkle tree index requires only very small or tiny amounts of information to be transmitted across networks, thus being more operationally efficient in terms of network resource consumption. While many blockchains heavily rely upon the use of Merkle trees for the purposes of block verification, the index 316 implemented utilizing a Merkle tree, is unrelated to the block verification functions of the blockchain and is used here as a robust and efficient means by which to store the index 316 information.

Figure 3B:
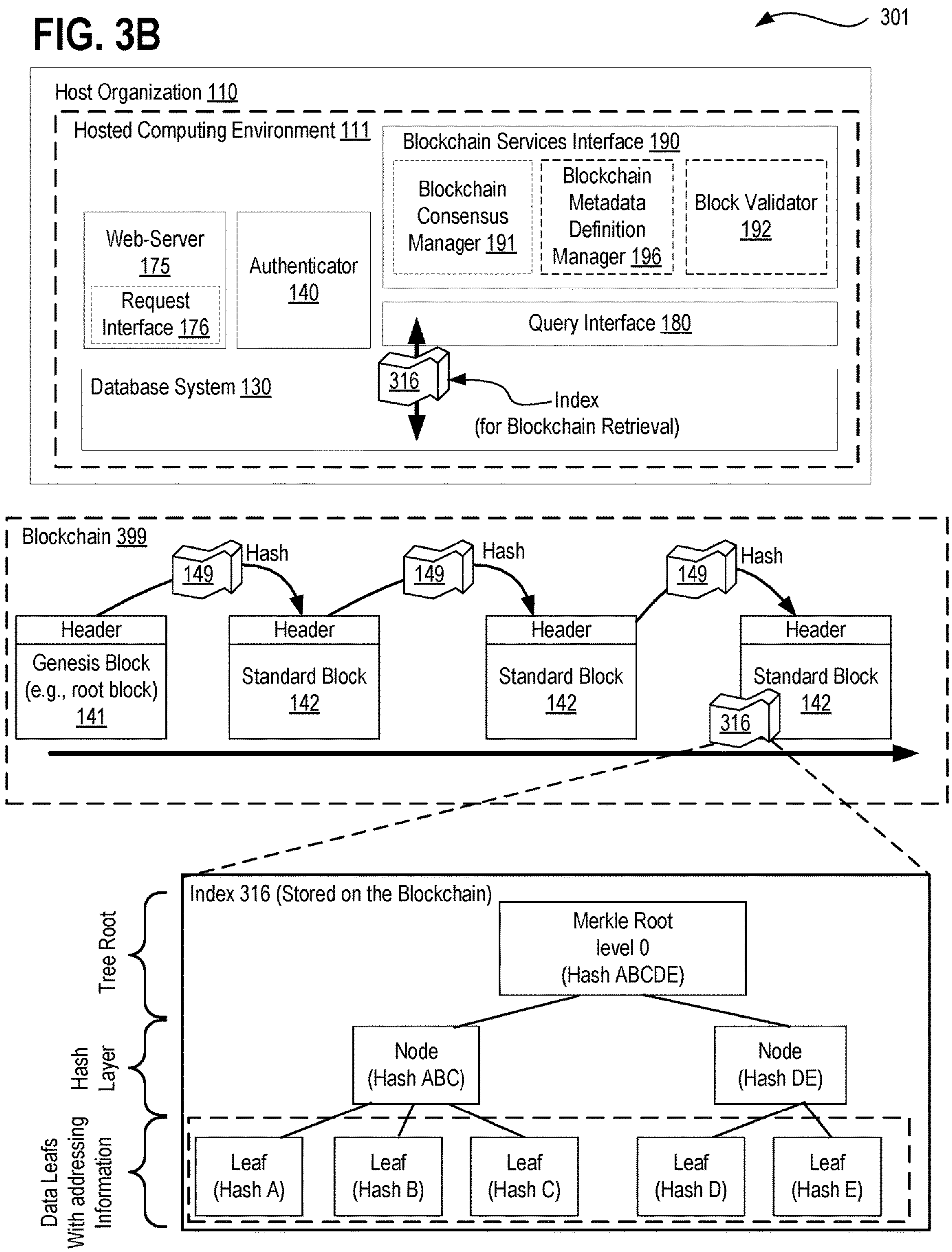
FIG. 3B depicts another exemplary architecture in accordance with described embodiments.

FIG. 3B depicts another exemplary architecture 301 in accordance with described embodiments. In this example architecture, the blockchain consensus manager 241 and the permissions manager 181 operate to support consensus on read and access control processes as further described in relation to FIGS. 10-12.

There is again the host organization 110 which includes the hosted computing environment 111 having a processors and memory (e.g., within the execution hardware, software, and logic 120 of the database system 130) which serve to operate the blockchain services interface 240 including the blockchain consensus manager 241 and blockchain metadata definition manager 246. There is additionally depicted an index 316 which provides addressing capabilities for data, metadata, and records which are written to, or transacted onto the blockchain 399.

As shown, the index 316 is stored within the database system 130 of the host organization, however, the Merkle tree index 316 may alternatively be written to and stored on the blockchain itself, thus enabling participating nodes with the blockchain which lack access to the query interface 180 of the host organization to nevertheless be able to retrieve the Merkle tree index 316 (when stored on the blockchain) and then use an address retrieved from the Merkle tree index 316 to directly reference an addressable block on the blockchain to retrieve the desired record, data, or metadata, without having to traverse the entire blockchain or search the blockchain for the needed record.

As depicted, there is another index 316 depicted as being shown within the last standard block 142 of the blockchain 399. Only one index 316 is required, but the index 316 may permissibly be stored in either location.

The Merkle tree index 316 depicted in greater detail at the bottom shows a level 0 Merkle root having a hash of ABCDE, followed by a hash layer with two hash nodes, a first with hash ABC and a second with a hash DE, followed by the data blocks within the data leafs identified by hash A, B, C, D, and E, each containing the addressing information for the addressable blocks on the blockchain.

Storing data and metadata on the blockchain 399 via the blockchain metadata definition manager 246 in conjunction with the use of a Merkle tree index 316 is much more efficient than previously known data storage schemes as it is not necessary to search through multiple blocks 141 and 142 of the blockchain to retrieve a data record. Rather, the index 316 is first searched to retrieve an address for the desired block, which is very fast and efficient, and then using the retrieved address from the index 316, the record is retrieved directly from the addressable block on the blockchain 399.

As data is stored within a blockchain using conventional techniques, the amount of data in the blockchain explodes in terms of total volume of stored data creating scalability problems and resulting in problematic inefficiencies. The total volume of data stored to a blockchain tends to explode or grow unsustainably over time because every time a stored record is updated or modified, it is necessary to re-write the entirety of the modified record back to the blockchain which then becomes the most recent and up-to-date record, however, all prior versions and copies are retained within the blockchain, thus resulting in significant duplicative data entries being stored. The benefit to such an approach is that an entire record may be retrieved from a single block on the blockchain, without having to refer back to prior blocks on the blockchain for the same record. But, such a storage scheme is highly inefficient in terms of storage.

Alternatively, only a modification to a record stored within the blockchain may be stored, in accordance with conventional approaches, thus resulting in the modified data being written into a new block on the blockchain, with the non-modifiable data being retrievable from a prior block of the blockchain. This approach reduces the total amount of data stored by the blockchain. Unfortunately, any data retrieval of a modified record requires the inspecting and retrieval from multiple blocks on the blockchain, thus mitigating the data redundancy and unsustainable growth problem, but trading that problem for an undesirable data retrieval inefficiency problem.

However, through practice of the described techniques, data management for records and information stored within the blockchain 399 is greatly improved, resulting in faster retrieval times and reduced data storage needs. Moreover, metadata may additionally be stored within the blockchain to provide additional information and context regarding stored records, with each of the data records and the metadata describing such data records being more easily retrievable through the use of the index 316. Such metadata permits a business or other entity to transform the data record retrieved from the blockchain back into a useable format much easier than with conventional approaches which lose such context and metadata for any record written to the blockchain.

For example, because both the metadata describing the stored records and also the data for the stored record are transacted onto the blockchain, any application interfacing with the blockchain may retrieve the data for such records in the appropriate format by retrieving the metadata definition for that data and then retrieving the data record itself. If multiple data retrievals are conducted, it is only necessary to retrieve the metadata definition once, until such time that it changes. Furthermore, through the use of the index 316, it is possible to interact with the blockchain in a much more computationally efficient manner, thus providing improved retrieval times even for data which is exclusively available from the blockchain 399.

Figure 3C:
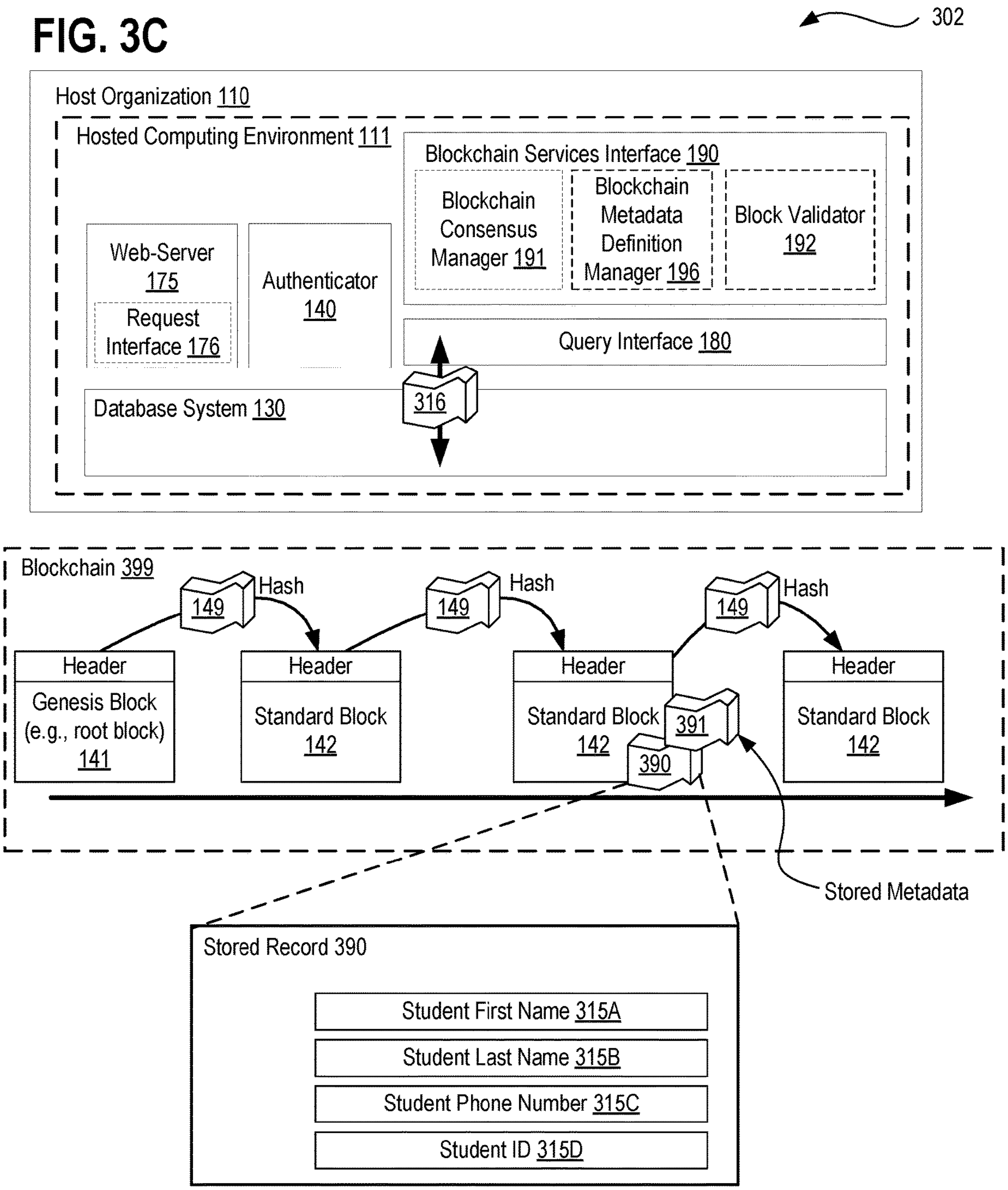
FIG. 3C depicts another exemplary architecture in accordance with described embodiments.

FIG. 3C depicts another exemplary architecture 302 in accordance with described embodiments. In this example architecture, the blockchain consensus manager 241 and the permissions manager 181 operate to support consensus on read and access control processes as further described in relation to FIGS. 10-12

There is again the host organization 110 which includes the hosted computing environment 111 having a processors and memory (e.g., within the execution hardware, software, and logic 120 of the database system 130) which serve to operate the blockchain services interface 240 including the blockchain consensus manager 241 and the blockchain metadata definition manager 246 which utilizes an index 316 by which to identify an addressable block of the blockchain 399 via which a desired record is stored. There is additionally depicted an exemplary stored record 390 at the second to last block of the blockchain 399.

Here the stored record 390 stores student information including a student first name 315A, a student last name 315B, a student phone number 315C, and a student ID 315D.

Once the stored record 390 is transacted onto the blockchain, for instance, by adding an asset to the blockchain within which the stored record 390 is embodied, student data is persistently stored by the blockchain and accessible to participating nodes with access to the blockchain 399, however, when such data is retrieved, the stored record does not in of itself describe how to use such data, any particular format for such data, or how to validate such data. Therefore, it is further permissible to store metadata within the blockchain which may then be used to define the format, validation means, and permissible uses for such data. However, storage of the metadata only exacerbates the problem of searching for and retrieving data from the blockchain as there is now a stored record 390 and also stored metadata 391 which is associated with that record. An organizational methodology is therefore provided via the indexing scheme as implemented by the blockchain metadata definition manager 246 in conjunction with use of the index 316 which provides for more efficient storage, retrieval, and validation of data stored on the blockchain.

According to one embodiment, the stored record 390 is therefore converted to a more efficient format for storage within the blockchain. Consider the stored record 390 for which student information is stored. Initially, the stored record 390 may include only student first name 315A and student last name 315B, and is then stored. Subsequently, the student record is updated to include student phone number 315C, and thus, either the stored record 390 is updated and re-written to the blockchain in its entirety thus creating a second copy, albeit updated, of the stored record 390 or alternatively, only the new portion, the student phone number 315C is written to the blockchain with a reference back to the prior record, in which case total storage volume is reduced, but retrieval of the entire record requires searching for and finding multiple blocks on the blockchain from which to reconstruct the entire stored record 390. Worse yet, if the student ID 315D is subsequently assigned, then the stored record 390 needs to be updated again, thus writing yet another entire stored record 390 to the blockchain resulting in now three different versions and copies on the blockchain, or as before, writing only the new portion of the stored record to the blockchain 399, in which case the stored record 390 is fragmented across at least three blocks of the blockchain.

This fragmentation is problematic because if the application is searching for student information, it may result that a first block contains the student's first name and last name, a second block contains a change to the student's last name due to an update, a third block contains only the student's phone number, and so forth. Consequently, it is necessary to traverse multiple blocks of the blockchain to locate and retrieve up all the fragmented pieces so as to reconstruct the entire stored record 390 in its most up-to-date version before such a record may be utilized for whatever purpose the application requires such data.

Nevertheless, through the use of the index (refer to element 316 of FIG. 3B), it is possible to store the data in a more efficient manner by writing only the updates to the different blocks of the blockchain, and yet, permit retrieval of those pieces from the blockchain by referencing the index 316 without requiring the application to traverse all blocks of the blockchain searching for such pieces of the data records. Instead, it is only necessary to reference the blocks identified via the index to retrieve the pieces of the record. According to another embodiment, the metadata written onto the blockchain specifies a fragmentation threshold (e.g., such as maximum fragmentation of 2 blocks or 3 blocks, etc.) and when a single data record is fragmented across a greater number of blockchain blocks than is specified by the fragmentation threshold in the metadata, the application retrieving, updating, or referencing the data will reset the fragmentation threshold for that data record by retrieving the entirety of the record in its latest and most up-to-date version and then re-write the entirety of the record back onto a single block of the blockchain, thus deprecating all prior blocks having pieces of the record on the blockchain. Typically such a function will be performed by an application performing an update to an existing record, although it is permissible for an application to perform such a function concurrent with a search a search or retrieval operation, so as to ensure optimal performance of the index and maximum compliance with a specified fragmentation threshold.

Figure 3D:
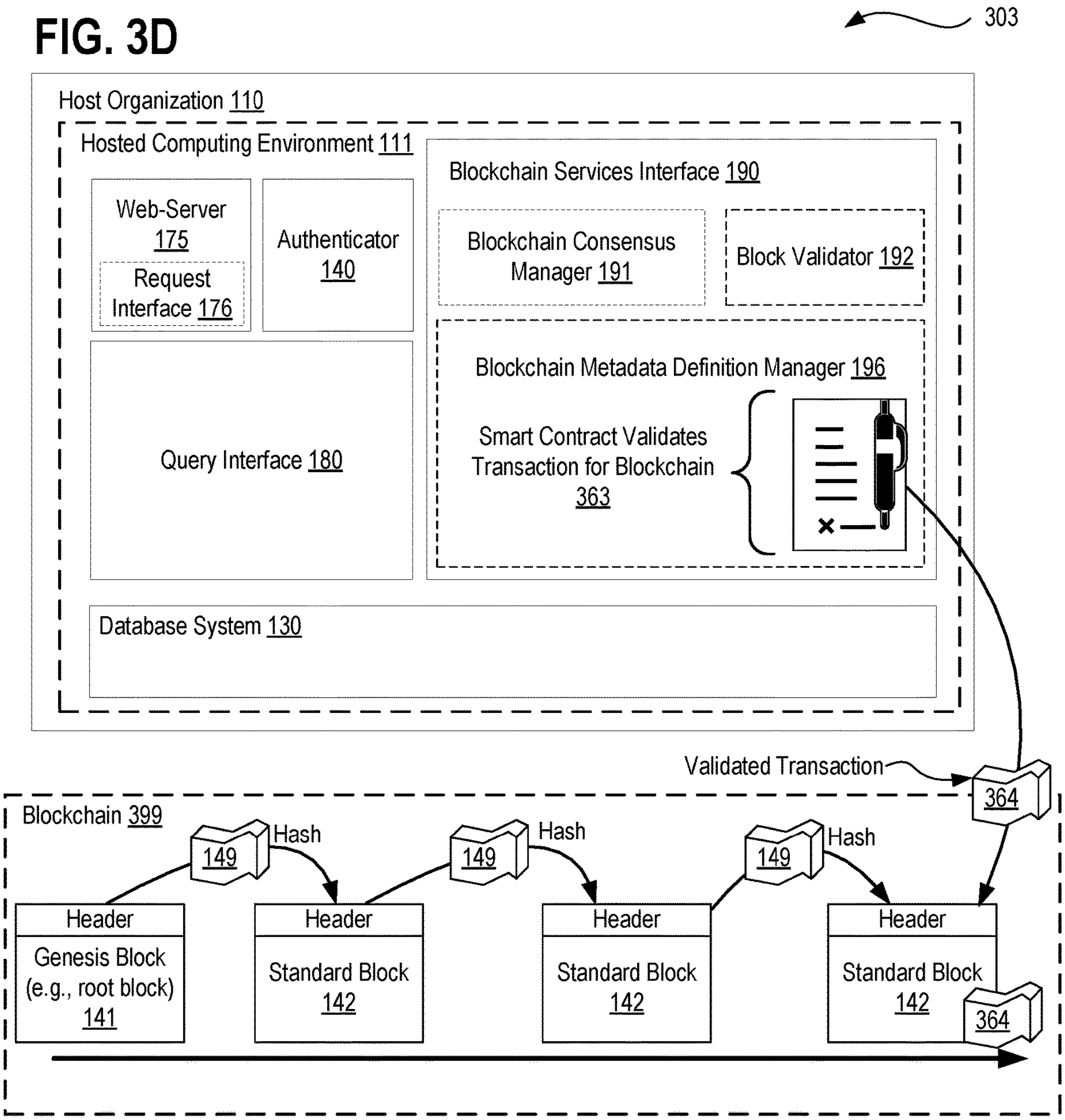
FIG. 3D depicts another exemplary architecture in accordance with described embodiments.

FIG. 3D depicts another exemplary architecture 303 in accordance with described embodiments. In this example architecture, the blockchain consensus manager 241 and the permissions manager 181 operate to support consensus on read and access control processes as further described in relation to FIGS. 10-12.

According to one embodiment, the blockchain metadata definition manager 246 writes data or metadata onto a blockchain by transacting an asset to the blockchain or adding an asset to the blockchain via a new transaction with the blockchain. According to a particular embodiment, the transaction has a specific transaction type, for instance, defined as a blockchain storage transaction type, which triggers execution of a smart contract to perform validation of the transaction and specifically to perform validation of the data or metadata within the asset being added to or transacted onto the blockchain.

For example, such a smart contract 363 may execute via the host organization's blockchain services interface 240 which performs the validation and then transacts the new asset onto the blockchain pursuant to successful validation of the data or metadata within the asset being stored on the blockchain. As shown here at element 363, a smart contract executes and validates the transaction for the blockchain. Subsequently, a validated transaction 364 is then added to or transacted onto the blockchain 399.

Figure 3E:
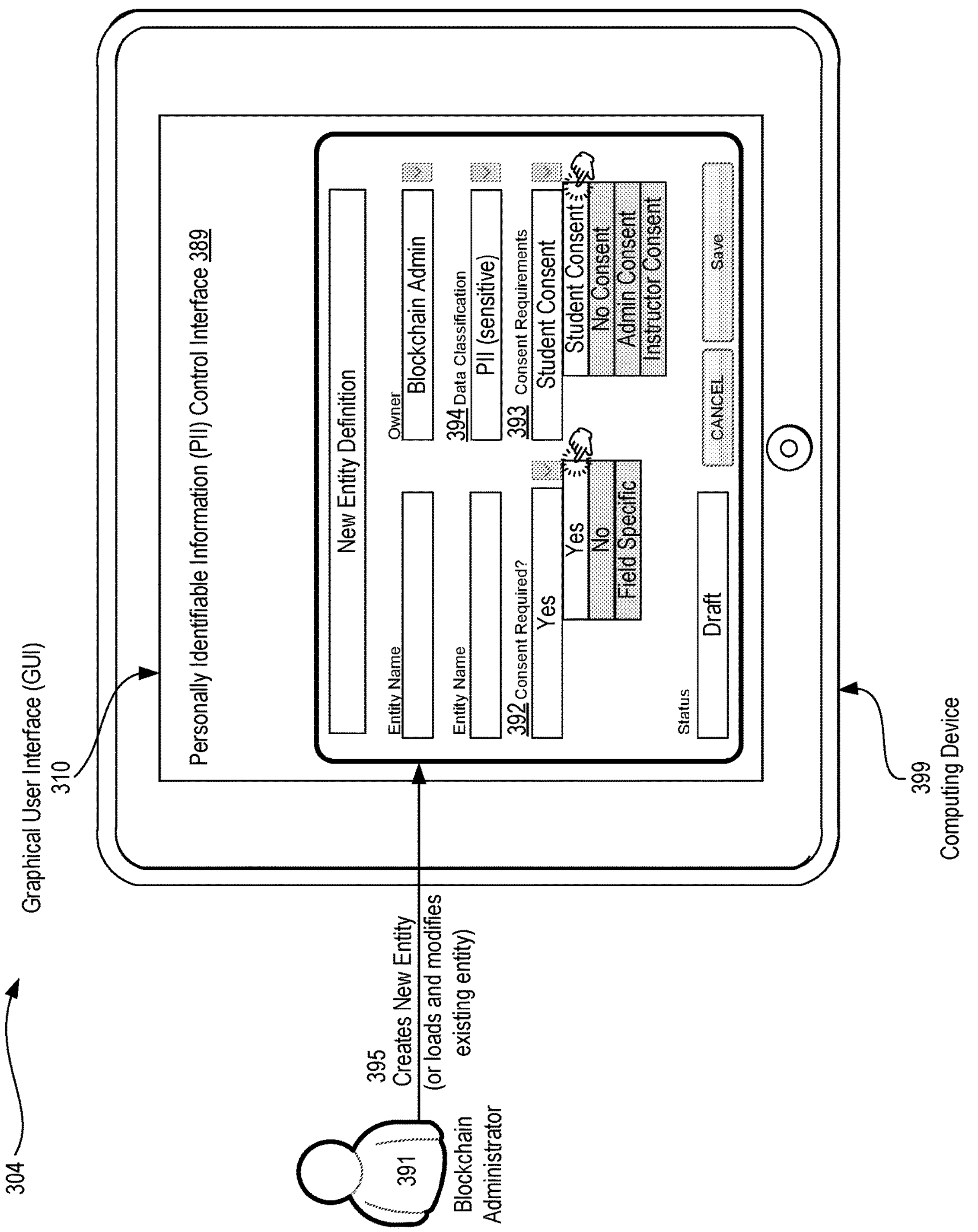
FIG. 3E depicts another exemplary architecture in accordance with described embodiments.

FIG. 3E depicts another exemplary architecture 304 in accordance with described embodiments.

As shown here, there is a GUI 310 executing at a computing device 399, such as a user device of the blockchain administrator, with the GUI 310 being pushed to the computing device 300 by the blockchain metadata definition manager 246 of the host organization.

As shown here, the blockchain administrator 391 may view a Personally Identifiable Information (PII) control interface 389 through which such an administrator may create, alter, and deploy specially customized entity definitions which additionally defined metadata controls configurable to protect the sensitive Personally Identifiable Information (PII) of an end user or other party.

Thus, in addition to the declaration of the new entity, there is additionally the ability for the blockchain administrator to define additional restrictions at either the entity level or at the field level, such as specifying that consent is required 392 for the entity as a whole or for one or more specified fields of the entity as well as the various consent requirements 393 for the entity or the specified fields of the entity. Thus, as is depicted here, the admin may select that "yes," consent is required 392 for the entity as a whole or alternatively that "no" consent is not required for the entity as a whole or alternatively, the admin may select the "field specific" consent required 392 option in which case, the GUI will prompt the admin to enter consent requirements on a field by field basis. For instance, perhaps there is a student, "John Doe" enrolled at a university and the administrator may elect to create an entity definition for students and then simply specify at the entity level that consent is required for all fields of the entity, meaning that consent must be attained and stored somewhere (as described below) before the information can be released to any party which is not identified and authenticated as the owner of that instance of the entity. Alternatively, the administrator may simply elect to specify that consent is required for a sub-set of the fields on a per-field basis, such as applying the consent required restriction to the student entity's social security field, etc.

One of the biggest challenges in the blockchain is storing Personally Identifiable Information (PII) information. Storing PII information in blockchain has potential setback as it will cause the PII to be leaked into multiple nodes, simply due to the inherent nature of the blockchain which copies the stored data to all participating nodes and if there are no access controls, then such information essentially becomes viewable to any party having access to any of the participating nodes of the blockchain. In the case of a public blockchain, there are not even restrictions on one may join as a participating node, and thus, the storage of any Personally Identifiable Information (PII) within such an un-restricted public blockchain would be very dangerous as it would become highly likely that the PII of end-users would be leaked or exposed, thus revealing potentially sensitive information.

Personally identifiable information (PII) is any data that can be used to identify a specific individual. Social Security numbers, mailing or email address, and phone numbers have most commonly been considered PII, but technology has expanded the scope of PII considerably. It can include an IP address, login IDs, social media posts, or digital images. Geolocation, biometric, and behavioral data can also be classified as PII.

This broad definition of PII creates security and privacy challenges, especially when specific and stringent safeguards for it are spelled out in regulations such as the European Union's (EU's) General Data Protection Regulation (GDPR), potentially impacting companies and creating liability in the case of non-compliance.

Newly enacted safeguards in various jurisdictions now grant individuals more rights with respect to the manner in which companies handle their personally identifiable information (PII), and certain regulations impose heavy fines for non-compliance and data breaches, for instance, sometimes specifying a percentage of a company's yearly revenue. Companies working in the EU or with GDPR-impacted data are therefore highly motivated to operate in full compliance. For Information Technology security teams, ensuring compliance means that PII is adequately protected and that the proper reporting processes are in place.

Documented "opt-in" consent is one mechanism by which compliance may be attained, and therefore, permitting a blockchain administrator 391 to not only classify an entire entity or specified fields of an entity with a data classification 394 of "PII (sensitive)" as is shown here, provides the explicit technical mechanism by which such consent may be programmatically attained, tracked, referenced, determined, and otherwise managed within the blockchain ecosystem. Various types of consent may be appropriate in different circumstances, for instance, consent may be mandated for the end-user or student in this example, (or their legal guardian if the student is a minor), whereas in other situations, it may be appropriate that an admin grant consent or it may be appropriate that a course instructor grant consent, etc. For instance, it may be required that the student grant consent to release their social security information as PII whereas it may be appropriate that a course instructor grant consent for the release of interim grades for a particular college course, etc.

There is also the further requirement that not only consent be attained and recorded, but additionally that the consent must explicitly identify the data collected, what it is used for, and how long it will be kept. The use of the specially configured entity creation thus solves this problem by permitting the blockchain admin to specify these constraints and require that they be configured, defined, and captured anytime the entity is instantiated or referenced. For instance, if a new student record is created utilizing the specially configured entity, then it would be required to specify the consent requirements 393 at the time that such a record is created and instantiated for that instance of the entity to be permissibly created and then written onto the blockchain. For instance, a smart contract may execute on top of the newly created entity to force validation and masking requirements, such as checking whether or not consent is required and if so, mandating that the type of consent requirements 393 be specified as well as requiring, for instance, that date restrictions on the data are honored, etc. Where such metadata is created for an entity and written onto the blockchain, there will be no issue with future data removal as the metadata stored for such data is distant from the data itself which may be stored elsewhere, such as within a centralized relational database or within an IPFS type distributed database such as CouchDB which permits data to be stored in a distributed fashion but without enforcing immutability as is done by a blockchain distributed ledger. In other instances, where data is written to an immutable database, it may be necessary to deprecate the data with a new null record so as to terminate access to such data. In certain embodiments, data deprecation may occur automatically by triggering a smart contract to execute upon a monitored data deprecation date, in which case a null record will be written to the blockchain, thus deprecating the previously stored data and making such data inaccessible, even if the data remains stored. Coupled with encryption of such data and destruction of decryption keys, it is possible to ensure that the data is made inaccessible, even if it remains stored in its encrypted form. For such embodiments, it is therefore mandated and enforced through smart contracts that such PII type information (e.g., having a data classification 394) of PII or sensitive is never written onto any blockchain asset in an un-encrypted form.

Certain regulations may specify that users can remove their consent at any time and request that their personal data be deleted pursuant to the specification of an approved reason. In such an event, then the above described data deprecation event would again take place, but prior to the expiration date recorded for the storage of such data. If the data is written to an IPFS or distributed database that does not force immutability (or written to a relational database, etc.), then the data may simply be subjected to a database record delete transaction and then the delete transaction would be committed to the database so as to effectuate the removal of such data.

Thus, one possible data protection solution is to apply data encryption to any PII type data as well as requiring the use of a smart contract which would monitor and enforce restrictions upon such data. Once the data is encrypted, the encrypted key utilized to encrypt such data then are sent to multiple sources that have a programmatically documented need (e.g., granted permission) to access such PII data, and thus have the appropriate key by which to decrypt the data.

This technique does, however, cause the use of a Proxy re-encryption (PRE) event. A proxy re-encryption is generally used when one party, a first actor, wants to reveal the contents of messages sent to the first actor and encrypted with the first actor's public key to a second actor, without requiring that the first actor reveal their private key to the second actor. The first actor obviously does not want the proxy to be able to read the contents of his messages, and thus, the first actor will designate a proxy to re-encrypt one of his messages that is to be sent to the second actor, which in turn generates a new key that the second actor can the utilize to decrypt the message. Subsequently, if the first actor sends a message to the second actor that was encrypted under utilizing the first actor's key, then the proxy will alter the message, allowing the second actor to decrypt it. This technique allows for a number of applications such as e-mail forwarding, law-enforcement monitoring, and content distribution.

However, because all processing, data inquiries, services, functions, and applications executing by the host organization are highly performance intensive, it may be desirable to apply a different technique which minimizes latency and computational burden on the host organization's computing infrastructure.

Additionally, a further complication is that changes need to handled on a case by case basis in the event that a smart contract is utilized. Thus, if the data is stored as key-value pair utilizing a smart contract structure, then it would be desirable for such changes to be implemented programmatically, thus permitting a developer to reference the appropriate key-value pairs from a smart contract utilizing variables which store the information and are determinable at run-time, thus avoiding the problem of having to modify a smart contract for every distinct instance of a newly defined entity definition having consent requirements apply to PII data pursuant to a data classification of PII (sensitive) 394 at the time a new entity is created 395 or loaded and modified via the depicted GUI 310 interface.

According to a particular embodiment, every GUI has a corresponding API via which to interact with the blockchain metadata definition manager 246.

Clicking on an existing entity, including the one just created at GUI 310, will result in the Entity Definition GUI being presented, via which the blockchain administrator may now create or modify any number of fields which are to be stored within that particular entity.

Regardless of the method chosen, the blockchain administrator can declaratively create new entities, and new field definitions, all without writing any code whatsoever, and the blockchain metadata definition manager 246 will then transact the defined metadata for the new application, the new entity, and/or the new field definitions onto the blockchain for voting and consensus.

Until consensus is reached for those fields or entities specifying consent requirements 393 for information having a data classification 394 of PII (sensitive), the defined metadata cannot be utilized and the underlying information (e.g., the PII for a particular student or end-user) cannot be accessed. However, once transacted onto the blockchain and consensus is reached, then other participating nodes or participants on the blockchain can interact with all data for a defined entity subject to the consent requirements 393 having been met.

In such a way, the Salesforce Blockchain is thus configurable as a metadata-driven blockchain that allows the blockchain admin to define in the metadata of the entity using data classification attribute, specifically what data classification 394 applies to any data entity or to any field of such a data entity. The data classification 394 attribute stores what kind of data is stored (e.g., PII/sensitive) and is further configurable to be specified at the entity level or at the field level. Also, an extra attribute may be specified, captured, recorded and later surfaced that captures from whom consent must be acquired, such as a Student at a university in the case of release of transcripts to other colleges or perhaps a course instructor in the event of a request to release interim (e.g., not yet final) course grades to, for example, a university counselor. Thus, if the Student Entity is created and considered as an entity that has PII defined in the data classification 394 attribute and further has a consent owner field defined via the "consent requirements" 393 option which states that it is the student that must grant consent, then the Salesforce Blockchain platform will generate and build out a smart contract which enforces the requirements to request, capture, and store consent from the student (as per the consent requirements 393 attribute) and such information will thus be treated programmatically as private, regardless of the fact that such information may be written to an IPFS or distributed database.

In addition to the above specified metadata, additional information such as the type of applicable regulation, compliance requirement, law, or jurisdiction may additionally be specified and stored (e.g., such as specifying and storing an attribute indicating use within the EU jurisdiction or required GDPR-compliance, etc.).

In such a way, the metadata which is stored directly within the Salesforce Blockchain platform is separated from the underlying user data which is stored elsewhere, such as within an IPFS or distributed database, such as CouchDB, and thus, the underlying data is intentionally not stored on the Salesforce Blockchain platform, despite the corresponding metadata being written onto the blockchain.

The potential problems with storing a user's underlying data having a data classification 394 as PII or sensitive data directly within the blockchain become further exacerbated due to the above mentioned issues of data immutability and data leakage associated with the storage of information on a blockchain.

And yet, at the same time, if the user's underlying PII or sensitive data is not stored directly within the blockchain, then the smart contracts generated to enforce access controls for such data based on the stored metadata requirements written to the blockchain for a particular entity cannot be run on the data because it is not accessible to the smart contract within the blockchain within which the smart contract is executing.

The disclosed improvements to the Salesforce Blockchain platform thus solve this problem by using a combination of decentralized storage such as IPFS or distributed databases such as CouchDB in conjunction with the use of the Salesforce Blockchain platform, such that the metadata for an entity specifying a data classification 394 as PII or sensitive is stored directly within the blockchain itself whereas the underlying user data is never written to the blockchain and instead, the underlying user data is stored in the distributed databases (IPFS or otherwise) that is hosted in all nodes. Stated differently, the defined metadata definition for an entity specifying the PII or sensitive information is written to the blockchain whereas the corresponding user data (e.g., not the meta data defining the user data) is never written onto the blockchain and is instead written to an IPFS or distributed database, thus making the data accessible to all nodes of the distributed database.

A distributed database, is a database that is not limited to one system and is thus not "centralized" as it is spread over different sites. For instance, nodes at multiple computers or nodes across a network of computers will have some or all of the stored information, but there is no monolithic centralized database system having full authority over all the data stored. A distributed database system is located on various sited that do not share physical components. This maybe required when a particular database needs to be accessed by various users globally. However, it does need to be managed such that it looks like one single database to users and applications attempting to execute queries against the distributed database.

With a homogeneous type distributed database, all different sites store database identically. The operating system, database management system and the data structures used are the same at all sites, and thus, management is simplified. Conversely, with a heterogeneous type distributed database, different sites may use different schema and software that can lead to problems in query processing and transactions. Thus, while permissible, greater management complexity is required as translations may be required for different sites to communicate, even for a single transaction.

Distributed data storage is attained in one of two ways. With replication, the entire relation is stored redundantly at multiple sites. If the entire database is available at all sites, it is a fully redundant distributed database, advantageous because it increases the availability of data at different sites and permits multiple requests to be processed in parallel, even against identical records. However, a fully redundant replicated database has certain disadvantages as well. Data needs to be constantly updated, and thus, any change made at one site needs to be recorded at every site for which that relation is stored so as to avoid inconsistency, resulting in significant computational burdens and network communication overhead. Concurrency control also becomes more complex as concurrent access now needs to be checked over a number of sites.

As an alternative, use of a fragmentation type distributed database utilizes fragmented relations such that relations are intentionally divided into smaller parts and each of the fragments are stored in different sites where they may be required. Management complexity here is needed to ensure that fragments can be used to reconstruct the original relation so as to ensure there is no loss of data. Fragmentation is advantageous because duplicate copies of data are eliminated, thus entirely negating the need for checking consistency, as there is only one authoritative copy of each relation. In certain cases, an approach that is hybrid of fragmentation and replication is used.

The IPFS or InterPlanetary File System is a particular variant of a distributed database, providing a protocol and peer-to-peer network for storing and sharing data via a distributed file system. IPFS uses content-addressing to uniquely identify each file in a global namespace connecting all computing devices.

IPFS allows users to not only receive, but to host content in a manner similar to BitTorrent as well. As opposed to a centrally located server, IPFS is built around a decentralized system of user-operators who hold a portion of the overall data, creating a resilient system of file storage and sharing. Any user in the network can serve a file by its content address, and other peers in the network can find and request that content from any node who has it using a distributed hash table (DHT). In contrast to BitTorrent, IPFS aims to create a single global network. This means that if user A and B publish a block of data with the same hash, the peers downloading the content from user A will exchange data with the ones downloading it from user B.

Apache CouchDB is yet another variant of a distributed database, providing an open-source document-oriented NoSQL database, implemented in Erlang. CouchDB uses multiple formats and protocols to store, transfer, and process its data, it uses JSON to store data, JavaScript as its query language using MapReduce, and HTTP for an API.

Unlike a relational database, a CouchDB database does not store data and relationships in tables. Instead, each database is a collection of independent documents. Each document maintains its own data and self-contained schema. An application may access multiple databases, such as one stored on a user's mobile phone and another on a server. Document metadata contains revision information, making it possible to merge any differences that may have occurred while the databases were disconnected.

CouchDB implements a form of multiversion concurrency control (MVCC) so it does not lock the database file during writes. Conflicts are left to the application to resolve. Resolving a conflict generally involves first merging data into one of the documents, then deleting the stale one. Other features of CouchDB include document-level ACID semantics with eventual consistency, (incremental) MapReduce, and (incremental) replication. One of CouchDB's distinguishing features is multi-master replication, which allows it to scale across machines to build high-performance systems. A built-in Web application called Fauxton (formerly Futon) helps with administration.

Continuing with the above embodiment in which the metadata is written to the blockchain directly and the underlying user data is written to a distributed database, because the hash is stored in the blockchain due to the storage of the metadata on the blockchain, it is thus possible to ensure that any stored metadata can always be validated if fudged or manipulated or is questioned in any way. Specifically, by triggering or enforcing consensus, it is possible to ensure that the metadata stored on the blockchain is valid and safe from attack, thus preventing a malicious actor from altering the metadata to indicate that stored information for a user is either not PII or sensitive or altering the metadata to indicate that either consent has been given (when it was not) or to indicate that no consent is required (when in fact consent is mandatory). In such a way, the metadata remains protected by the features of the blockchain and thus in turn, protects access to the underlying user data which is stored within the distributed database system, be it IPFS or CouchDB, etc.

However, as was mentioned above, because the underlying user data is not written to the blockchain, a smart contract enforcing the access restrictions on the data cannot access the underlying user information from the blockchain, even though the metadata is available within the blockchain.

Therefore, in accordance with a particular embodiment, the Salesforce Blockchain platform is specially configured to first check the metadata stored on the blockchain to determine if the data classification 394 is set as PII or to determine if other sensitive information is defined. If so, then the Salesforce Blockchain platform is configured to automatically utilize that information to run a SQL based query or an Oracle query to access the required underlying user information from the distributed database, by querying against IPFS or CouchDB with an Oracle SQL query to retrieve the data.

Stated differently, when the data classification 394 is set as PII or to another sensitive data classification, the Blockchain Services Interface 190 (see FIG. 1) of the Salesforce Blockchain platform will automatically forgo attempting to retrieve the underlying user information from the blockchain (as it does not exist within the blockchain) and instead is configured via the Blockchain Metadata Definition Manager 196 (see FIG. 1) to redirect an SQL base query to a participating node 133 (see FIG. 1) of a connected distributed database system, such as being pre-configured to query against an IPFS or CouchDB database system executing across a network of participating nodes to which the host organization 110 has access through either a participating node on the distributed database system or through a gateway node to the distributed database system.

Once both the metadata is retrieved (from the blockchain) and the underlying user data is retrieved from the distributed database system, the Blockchain Services Interface 190 of the Salesforce Blockchain platform will then proceed to run the smart contract to enforce any remaining provisions defined by the smart contract to execute upon receipt of a blockchain transaction affecting or requesting the protected PII or sensitive information.

This may be referred to as a post-execution smart contract execution in which the smart contract executes after retrieval of both the metadata from the blockchain and also the underlying user data from the distributed database system, where as other smart contracts are pre-execution which execute at the blockchain before conducting any action specified via the received smart contract transaction.

Figure 3F:
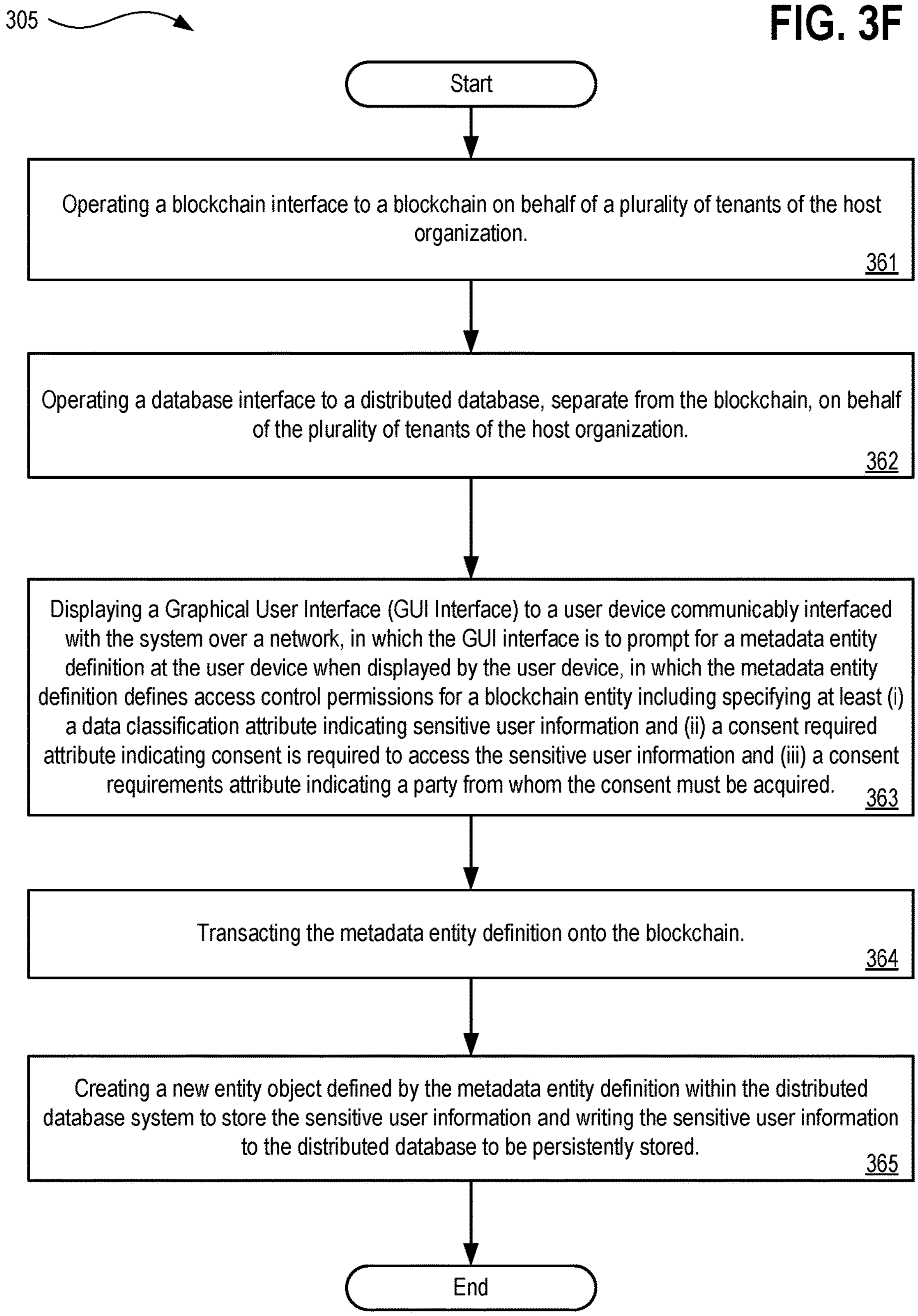
FIG. 3F depicts a flowchart illustrating a method for storing Personally Identifiable Information (PII) via a metadata driven blockchain using distributed and decentralized storage for sensitive user information, operable within a cloud based computing environment through a blockchain service interface.

FIG. 3F depicts a flowchart illustrating a method 305 for storing Personally Identifiable Information (PII) via a metadata driven blockchain using distributed and decentralized storage for sensitive user information, operable within a cloud based computing environment through a blockchain service interface 240. The access control functions utilize aspects of the read on consensus process to enable an entity to designate access controls for data to enable read and write permission for the blockchain. The flowcharts of FIGS. 3A, 3B, and 3C describe three related aspects of access controls, namely, an initial store of data with a set of permissions, a request for writing to the data, and a read request for the data. These functions together provide the ability for a blockchain to implement access controls for data by encrypting the data and then controlling writes to the data using smart contracts while controlling reads of the data using consensus on read, permitting access to the encryption key (or decryption key) via which to retrieve information from a separate distributed database system utilizing SQL structured queries or via which to decrypt encrypted information which is retrieved from the separate distributed database system. These access control functions are applicable to both permissioned (i.e., private) and public blockchains and are separate from the access control layers associated with permissioned blockchains.

Processing of the method 305 begins at block 361 with processing logic operating a blockchain interface to a blockchain on behalf of a plurality of tenants of the host organization.

At block 362, processing logic operates a database interface to a distributed database, separate from the blockchain, on behalf of the plurality of tenants of the host organization.

At block 363, processing logic displays a Graphical User Interface (GUI Interface) to a user device communicably interfaced with the system over a network, in which the GUI interface is to prompt for a metadata entity definition at the user device when displayed by the user device, in which the metadata entity definition defines access control permissions for a blockchain entity including specifying at least (i) a data classification attribute indicating sensitive user information and (ii) a consent required attribute indicating consent is required to access the sensitive user information and (iii) a consent requirements attribute indicating a party from whom the consent must be acquired.

At block 364, processing logic transacts the metadata entity definition onto the blockchain.

At block 365, processing logic creates a new entity object defined by the metadata entity definition within the distributed database system to store the sensitive user information and writing the sensitive user information to the distributed database to be persistently stored.

According to another embodiment of method 305, writing the sensitive user information to the distributed database to be persistently stored includes: generating an SQL query to create a new record or to update an existing record within the new entity object at the distributed database; executing the SQL query against the distributed database to persistently store the sensitive user information within the distributed database system; and in which the access control permissions remain stored at the blockchain as the metadata entity definition and further in which the sensitive user information remains stored within the new entity object at the distributed database without the sensitive user information ever being written to the blockchain.

According to another embodiment, method 305 further includes: receiving a transaction at the blockchain requesting access to the sensitive user information; retrieving the metadata entity definition from the blockchain; determining the metadata entity definition mandates the consent required attribute indicating consent is required to access the sensitive user information; and determining the party from whom the consent must be acquired based on the consent requirements attribute as specified by the metadata entity definition retrieved from the blockchain.

According to another embodiment, method 305 further includes: determining the party from whom the consent must be acquired has granted consent for the requestor to access the sensitive user information; and responsively querying the distributed database requesting retrieval of the sensitive user information.

According to another embodiment, method 305 further includes: executing a smart contract at the blockchain responsive to the transaction received at the blockchain requesting access to the sensitive user information; determining, via execution of the smart contract, that the party from whom the consent must be acquired has granted consent based on availability of a decryption key written onto the blockchain via which to decrypt the sensitive user information; responsively querying the distributed database requesting retrieval of the sensitive user information and passing the decryption key to the distributed database at the time of querying; in which the distributed database system is to retrieve the sensitive user information as stored in an encrypted form and applies the decryption key to decrypt the sensitive user information and returns the sensitive user information in a non-encrypted format; and receiving the sensitive user information from the distributed database in the non-encrypted format.

According to another embodiment, method 305 further includes: executing a smart contract at the blockchain responsive to the transaction received at the blockchain requesting access to the sensitive user information; determining, via execution of the smart contract, that the party from whom the consent must be acquired has granted consent; retrieving a decryption key written onto the blockchain via which to decrypt the sensitive user information; responsively querying the distributed database requesting retrieval of the sensitive user information; receiving the sensitive user information from the distributed database in an encrypted format; and decrypting the sensitive user information via the decryption key.

According to another embodiment, method 305 further includes: executing a smart contract responsive to receiving the transaction at the blockchain, in which the smart contract retrieves the metadata entity definition previously transacted onto the blockchain specifying the access control permissions; and approving or denying access to the sensitive user information based on the execution of the smart contract.

According to another embodiment of method 305, approving or denying access, includes: executing the smart contract; retrieving the metadata entity definition from the access control object previously transacted onto the blockchain pursuant to instructions instantiated by the execution of the smart contract; determining if an initiator of the transaction received at the blockchain requesting access to the blockchain entity object corresponds to a specified blockchain participant having been granted read access, write access, update authority, create authority, or some combination thereof as represented by the stored metadata retrieved from the access control object; and approving or denying the access to the blockchain entity object on the basis of (i) first whether the initiator of the transaction corresponds to any specified blockchain participant within the metadata entity definition identified as a permissible requestor by party from whom the consent must be acquired and (ii) whether sufficient blockchain access permissions have been granted to the permissible requestor and initiator of the transaction as defined by the metadata entity definition.

According to another embodiment, method 305 further includes: auto-generating an access control object specifying the access control permissions using the metadata entity definition received via the input from the GUI interface displayed to the client device; and in which transacting the metadata entity definition onto the blockchain includes transacting the access control object onto the blockchain to stored the metadata entity definition onto the blockchain.

According to another embodiment of method 305, the sensitive user information includes Personally Identifiable Information (PII) for an individual protected by jurisdictional requirements for the handling of PII by companies; or alternatively in which the sensitive user information includes Personally Identifiable Information (PII) for an individual protected by General Data Protection Regulation (GDPR) compliance requirements for companies operating within the European Union.

According to another embodiment of method 305, each one of the plurality of tenants operate as one of a plurality of participating nodes on the blockchain having access to the blockchain; or alternatively in which the host is to operate as one of a plurality of participating nodes on the blockchain having access to the blockchain on behalf of the plurality of tenants and further in which each of the plurality of tenants gain access to the blockchain indirectly through the participating node of the host organization.

According to another embodiment of method 305, each one of the plurality of tenants operate as one of a plurality of participating nodes on the distributed database having access to the distributed database; or alternatively in which the host is to operate as one of a plurality of participating nodes on the distributed database having access to the distributed database on behalf of the plurality of tenants and further in which each of the plurality of tenants gain access to the distributed database indirectly through the participating node of the host organization.

According to another embodiment of method 305, the distributed database includes an InterPlanetary File System (IPFS) compatible type distributed database system; or in which the distributed database includes a CouchDB compatible type distributed database system.

According to another embodiment of method 305, receiving the transaction at the blockchain requesting access to the sensitive user information includes: receiving a transaction at the blockchain requesting access to the blockchain entity subject to the metadata entity definition transacted onto the blockchain; and retrieving the access control permissions specified for the blockchain entity from the blockchain to determine the access control permissions for the sensitive user information.

According to another embodiment of method 305, displaying the GUI interface to the user device includes executing instructions stored in the memory of the system via the processor, in which the instructions cause the system to transmit the GUI interface from a receive interface of the system to a user device communicably interfaced with the system over the network; and in which receiving the input at the system from the GUI interface includes receiving the input at the receive interface of the system.

According to another embodiment of method 305, transacting the metadata entity definition onto the blockchain includes: writing the metadata entity definition into an access control object defining a read on consensus access control mechanism; writing the access control object having the metadata entity definition stored therein onto the blockchain; and committing the access control object to the blockchain responsive to attaining consensus for the access control object.

According to another embodiment of method 305, the metadata entity definition stored within the access control object defining the read on consensus access control mechanism implements read and write permissions as specified via the GUI displayed to the user device; in which the read and write permissions specify one or more blockchain entity names and one or more blockchain field names to which a specified blockchain participant is granted read access, write access, update authority, create authority, or some combination thereof; and in which any specified blockchain participant granted read access for the sensitive user information must query the distributed database system requesting retrieval of the sensitive user information from the distributed database system as the sensitive user information is never written onto the blockchain to which the metadata entity definition is stored.

According to another embodiment of method 305, the system of the host organization implements a cloud computing platform providing on-demand cloud computing services on accessible to subscribers of the cloud computing platform; and in which an initiator of the transaction received at the blockchain requesting access to the blockchain entity object is associated with one of a plurality of customer organizations having subscriber access to the on-demand cloud computing services provided by the cloud computing platform.

Figure 4A:
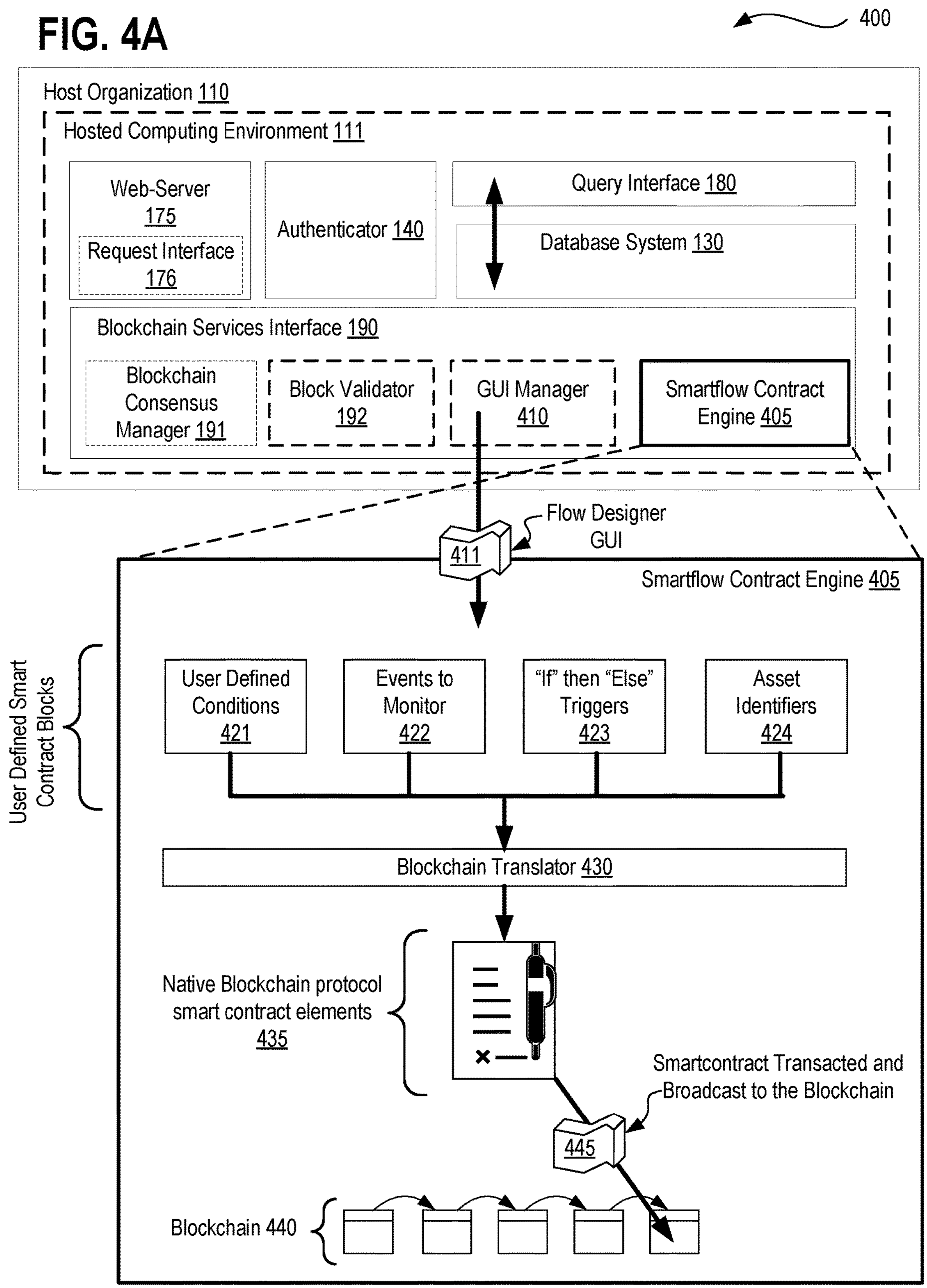
FIG. 4A depicts another exemplary architecture, with additional detail of a blockchain implemented smart contract created utilizing a smartflow contract engine, in accordance with described embodiments.

In accordance with a particular embodiment, there is a non-transitory computer-readable storage media having instructions stored thereupon that, when executed by a processor of a system having at least a processor and a memory therein, the instructions cause the system to perform operations including: operating a blockchain interface to a blockchain on behalf of a plurality of tenants of the host organization; operating a database interface to a distributed database, separate from the blockchain, on behalf of the plurality of tenants of the host organization; displaying a Graphical User Interface (GUI Interface) to a user device communicably interfaced with the system over a network, in which the GUI interface is to prompt for a metadata entity definition at the user device when displayed by the user device, in which the metadata entity definition defines access control permissions for a blockchain entity including specifying at least (i) a data classification attribute indicating sensitive user information and (ii) a consent required attribute indicating consent is required to access the sensitive user information and (iii) a consent requirements attribute indicating a party from whom the consent must be acquired; transacting the metadata entity definition onto the blockchain; creating a new entity object defined by the metadata entity definition within the distributed database system to store the sensitive user information and writing the sensitive user information to the distributed database to be persistently stored FIG. 4A depicts another exemplary architecture 400, with additional detail of a blockchain implemented smart contract created utilizing a smartflow contract engine 405, in accordance with described embodiments. In this example architecture, the blockchain consensus manager 241 and the permissions manager (not shown) operate to support consensus on read and access control processes as further described in relation to FIGS. 10-12.

In particular, there is depicted here within the host organization the blockchain services interface 240 which now includes the smartflow contract engine 405 and additionally includes the GUI manager 410.

Because blockchain utilizes a distributed ledger, creation and execution of smart contracts may be technically complex, especially for novice users. Consequently, a smart flow visual designer allow implementation of smart contracts with greater ease. The resulting smart flow contract has mathematically verifiable auto-generated code, as created by the blockchain translator 430 freeing customers and users from having to worry about the programming language used in any given blockchain protocol. Moreover, the smart flow contract engine implements visual designers that coordinate with the blockchain translator 430 to generate the requisite native code capable of executing on each of the participating nodes of the blockchain, thus further allowing easy processing and verification of the smart contract. According to certain embodiments, each smart flow contract utilizes a mathematical code based verifiable encryption scheme.

Flow designers provide users with a simple, intuitive, web-based interface for designing applications and customized process flows through a GUI based guided flow design experience. The flow designer enables even novice users to create otherwise complex functionality, without necessarily having coding expertise or familiarity with the blockchain.

The GUI manager 410 presents a flow designer GUI 411 interface to a user device via which users may interact with the host organization. The smartflow contract engine 405 in coordination with the GUI manager interprets the various rules, conditions, and operations provided by the user, to generate a smartflow contract which is then translated or written into the target blockchain protocol.

Through the flow designer GUI 411, a user may completely define utilizing visual flow elements how a particular process, event, agreement, contract, purchase, or some other transaction needs to occur, including dependencies, checks, required process inputs and outputs, triggers, etc.

Using the flow designer GUI 411, the user simply drags and drops operational blocks and defines various conditions and "if then else" events, such as if this event occurs, then take this action. As depicted here, there are a variety of user defined smart contract blocks including user defined conditions 421, events to monitor 422, "if" then "else" triggers 423, and asset identifiers 424.

Once the user has completed defining the flow including all of its operational blocks, conditions, triggers and events, the smartflow contract engine takes each of the individual blocks and translates them into a native target blockchain protocol via the blockchain translator 430, and then generates a transaction to write the translated smartflow contract 445 into the blockchain 440 via the blockchain services interface 240.

Once transacted to the blockchain, every participating node with the blockchain will have a copy of the smart contract, and therefore, if any given event occurs, the corresponding trigger or rule or condition will be viewable to all participating nodes, some of which may then take an action based on the event as defined by the smart contract.

The blockchain services interface 240 of the host organization provides customers, users, and subscribers access to different blockchains, some of which are managed by the host organization 110, such as private blockchains, others being public blockchains which are accessible through the host organization 110 which participates as a node on such public blockchains. Regardless, each blockchain utilizes a different blockchain protocol and has varying rules, configurations, and possibly different languages via which interfaces must use to communicate with the respective blockchains. Consequently, the blockchain translator 430 depicted here translates the user defined smart contract blocks into the native or required language and structure of the targeted blockchain 440 onto which the resulting smart contract is to be written or transacted.

Once the smart contract is transacted and broadcast to the blockchain 4451145 it is executed within the blockchain and its provisions, as set forth by the user defined smart contract blocks, are then carried out and enforced.

According to one embodiment, a salesforce.com visual flow designer is utilized to generate the user defined smart contract blocks which are then translated into a blockchain smart contract. According to other embodiments, different visual flow designers are utilized and the blockchain translator 430 translates the user defined smart contract blocks into a blockchain smart contract.

The resulting native blockchain protocol smart contract elements 435 may be embodied within a code, structure, or language as dictated by the blockchain 440 onto which the smart contract is to be written. For instance, if the smart contract is to be written to Ethereum then the blockchain translator 430 must translate the user defined smart contract blocks into the Ethereum compliant "Solidity" programming language. Solidity is a contract-oriented, high-level language for implementing smart contracts specifically on Ethereum. Influenced by C++, Python and JavaScript, the language is designed to target the Ethereum Virtual Machine (EVM). Smart contract elements include support for voting, crowd funding, blind auctions, multi-signature wallets, as well as many other functions.

Conversely, if the smart contract is to be written to Hyperledger, then the language is different, utilizing the Go programming language instead, which permits use of a distributed ledger blockchain for smart contracts, among other capabilities.

While smart contracts are beneficial and supported by many blockchain protocols they may be cumbersome to implement to the requirement that they be programmed in differing languages depending on the particular blockchain being targeted. Therefore, not only must users understand programming constructs, but also the particular syntactical nuances of the required programming language for the blockchain protocol in question.

By utilizing the smart flow contract engine 405, even novice users may create compliant smart contracts by generating the smart contract elements with the flow designer and then leveraging the blockchain translator 430 to actually render the native blockchain programming language code embodying the smart contract elements as defined by the user, subsequent to which the blockchain services interface 240 handles the transacting of the smart contract onto the blockchain.

Consider for example a vendor that sells to Home Depot and wants to execute a smart contract with Home Depot which uses Ethereum. The vendor logs in with the host organization, assuming he is an authenticated user and has access to the cloud subscription services, and then accesses the smartflow contract engine 405 through which the user may generate whatever flow he wishes. When done, the user, via the flow designer GUI 411, instructs the blockchain services interface 240 to execute the smart contract, thus causing the smartflow contract engine to translate the user's custom designed smartflow contract into Ethereum compliant "Solidity" code, subsequent to which the smart contract is then written into the blockchain for execution. The vendor need not know how to program or even understand the details of transacting with the blockchain. Rather, the cloud based services accessible through the host organization 110 remove the complexity from the process and present the user with a simple flow designer GUI 411 through which all the necessary operations may thus be carried out.

According to such embodiments, writing the smart contract to the blockchain requires storing metadata defining the smart contract in the blockchain as supported by the particular blockchain protocol. According to one embodiment, when a transaction occurs on the blockchain, having the metadata for the smart contract therein, the smart contract is executed and the various user defined smart contract events, conditions, and operations are then effectuated.

According to certain embodiments, the user defined smart contract, having been translated and transacted onto the blockchain, triggers events within the host organization.

For example, consider that Wal-Mart and Nestle have an agreement that a shipment must be transported within a climate controlled trailer within a range of 35 to 39 degrees Fahrenheit at all times. Moreover, if the temperature exceeds 39 degrees at anytime, then the payment is nullified.

Within the host organization, a Customer Relationship Management (CRM) platform defines and manages the various relationships and interactions between customers, vendors, potential customers. suppliers, etc. The term CRM is usually in reference to a CRM system, which is a tool that helps businesses with contact management, sales management, workflow processes, productivity and so forth.

In the above example with Wal-Mart and Nestle, the CRM system will possess the requirements for the shipment. Because the host organization through the CRM system monitors the shipment and subscribes to shipment events, such as temperature data, the CRM system will monitor for and become aware of a temperature related event for the particular shipment, which may then be linked back to the smart contract automatically. More particularly, because the host organization operates as a participating node for the blockchain within which the smart contract is executing, the host organization has visibility to both the smart contract terms and conditions accessible via the blockchain and also the CRM requirements for the shipment, such as the required temperature range.

Therefore, upon the occurrence of a smart contract condition violation, the host organization will synchronize the violation with the CRM system (which is not part of the blockchain) to halt the payment associated with that particular shipment, pursuant to the terms of the executing smart contract.

According to one embodiment, the blockchain sends out an event which the CRM system of the host organization will listen to, and then conduct some substantive action based on the event according to what is specified by the user defined smart contract flow. With the above example, the substantive action being to halt payment for the shipment pursuant to the smart contract on the blockchain.

Each of the participating parties for an executing smart contract will likely have their respective CRM systems subscribed to events of the blockchain associated with the executing smart contract, and therefore, both parties are likely to be aware of the event.

According to one embodiment, logic is written into the CRM system to facilitate a specific action responsive to a blockchain event. Stated differently, non-blockchain actions may be carried out pursuant to an executing blockchain smart contract.

Figure 4B:
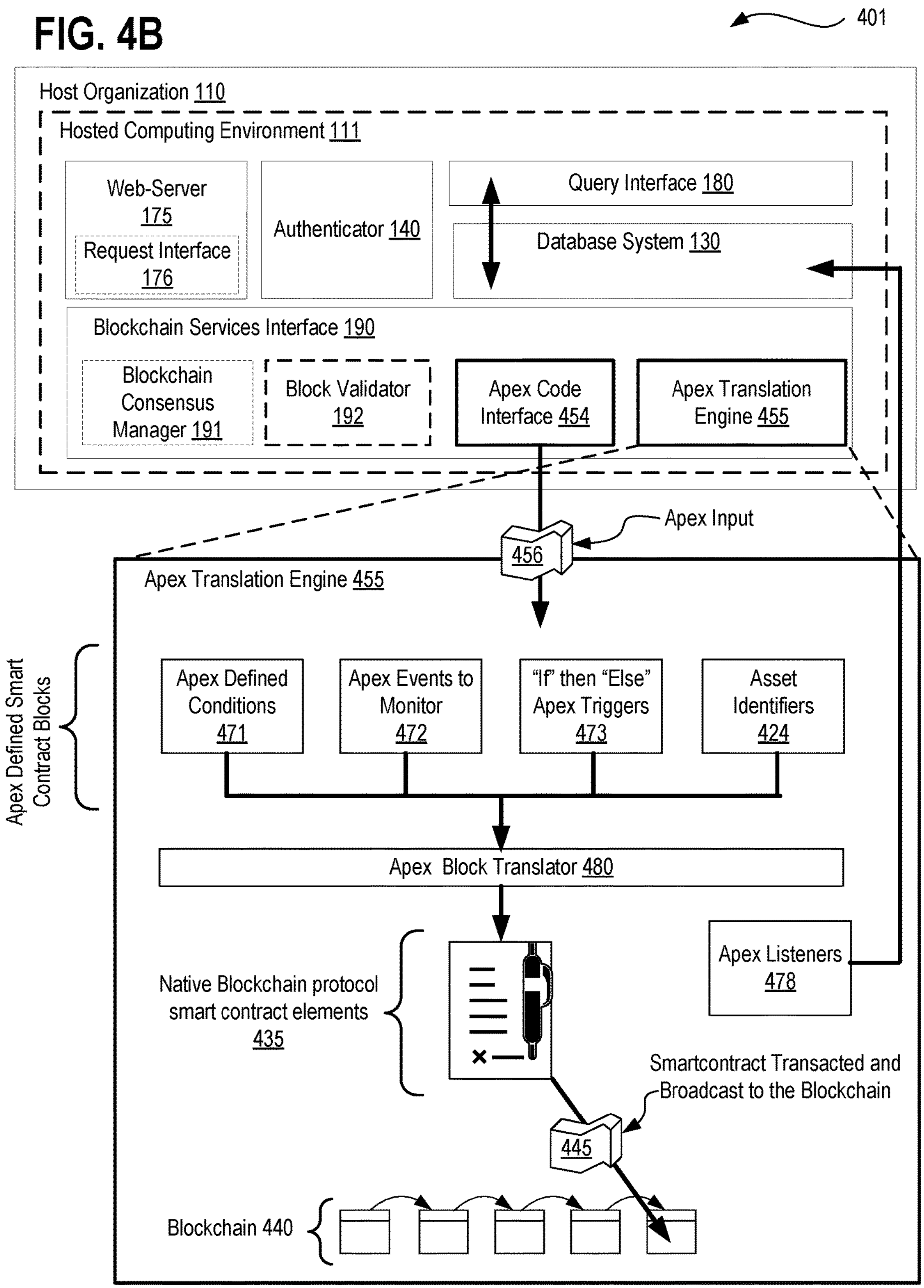
FIG. 4B depicts another exemplary architecture, with additional detail of a blockchain implemented smart contract created utilizing an Apex translation engine, in accordance with described embodiments.

FIG. 4B depicts another exemplary architecture 401, with additional detail of a blockchain implemented smart contract created utilizing an Apex translation engine 455, in accordance with described embodiments. In this example architecture, the blockchain consensus manager 241 and the permissions manager (not shown) operate to support consensus on read and access control processes as further described in relation to FIGS. 10-12.

As depicted here, there is an Apex translation engine 455 within the blockchain services interface 240.

Apex is a programming language provided by the Force.com platform for developers. Apex is similar to Java and C# as it is a strongly typed, object-oriented based language, utilizing a dot-notation and curly-brackets syntax. Apex may be used to execute programmed functions during most processes on the Force.com platform including custom buttons and links, event handlers on record insertion, update, or deletion, via scheduling, or via the custom controllers of Visualforce pages.

Developers of the salesforce.com host organization utilize Apex frequently to implement SQL programming, database interactions, custom events for GUI interfaces, report generation, and a multitude of other functions. Consequently, there is a large community of developers associated with the host organization 110 which are very familiar with Apex and prefer to program in the Apex language rather than having to utilize a less familiar programming language.

Problematically, smart contracts must be written in the native language of the blockchain protocol being targeted for execution of the smart contract on the respective blockchain.

For instance, as noted above, if the smart contract is to be written to Ethereum then the smart contract must be written with the Ethereum compliant "Solidity" programming language.

Like the smart contracts, Apex is a kind of metadata. Therefore, the Apex translation engine 455 permits developers familiar with Apex to program their smart contracts for blockchains utilizing the Apex programming language rather than utilizing the native smart contract protocol programming language.

As depicted here, developers write their smart contracts utilizing the Apex programming language and then provide the Apex input 456 to the Apex translation engine 455 via the depicted Apex code interface 454, for example, by uploading a text file having the developer's Apex code embedded therein.

The Apex translation engine 455 parses the Apex input 456 to identify the Apex defined smart contract blocks and breaks them out in preparation for translation. As despite here, there are Apex defined conditions 471, Apex events to monitor 422, "if" then "else" Apex triggers 423, and as before, asset identifiers 424 which are not Apex specific.

The Apex defined smart contract blocks are then provided to the Apex block translator 480 which converts them into the native blockchain protocol smart contract elements 435 for the targeted blockchain protocol. Once translated, the process is as described above, in which the translated smart contract is transacted and broadcast 445 to the blockchain 440 for execution.

Unlike the visual flow GUI, because Apex is programmatic, users writing Apex code may write programs to execute on a smart contract and are not limited by the available functions within the visual flow GUI.

According to a particular embodiment, the Apex input 456 is first translated into JavaScript and then subsequently translated into a specific blockchain API appropriate for the targeted blockchain protocol upon which the smart contract is to be executed.

According to another embodiment, listening events may be written using the Apex language and provided in the Apex input 456, however, such listening events are to be executed by the host organization. Therefore, the Apex block translator 480 separates out any identified Apex listeners 478 and returns those to the host organization 110 where they may be implemented within the appropriate CRM system or other event monitoring system. In such a way, developers may write the Apex input 456 as a single program and not have to separately create the smart contract and also the related listening events in separate systems.

Figure 4C:
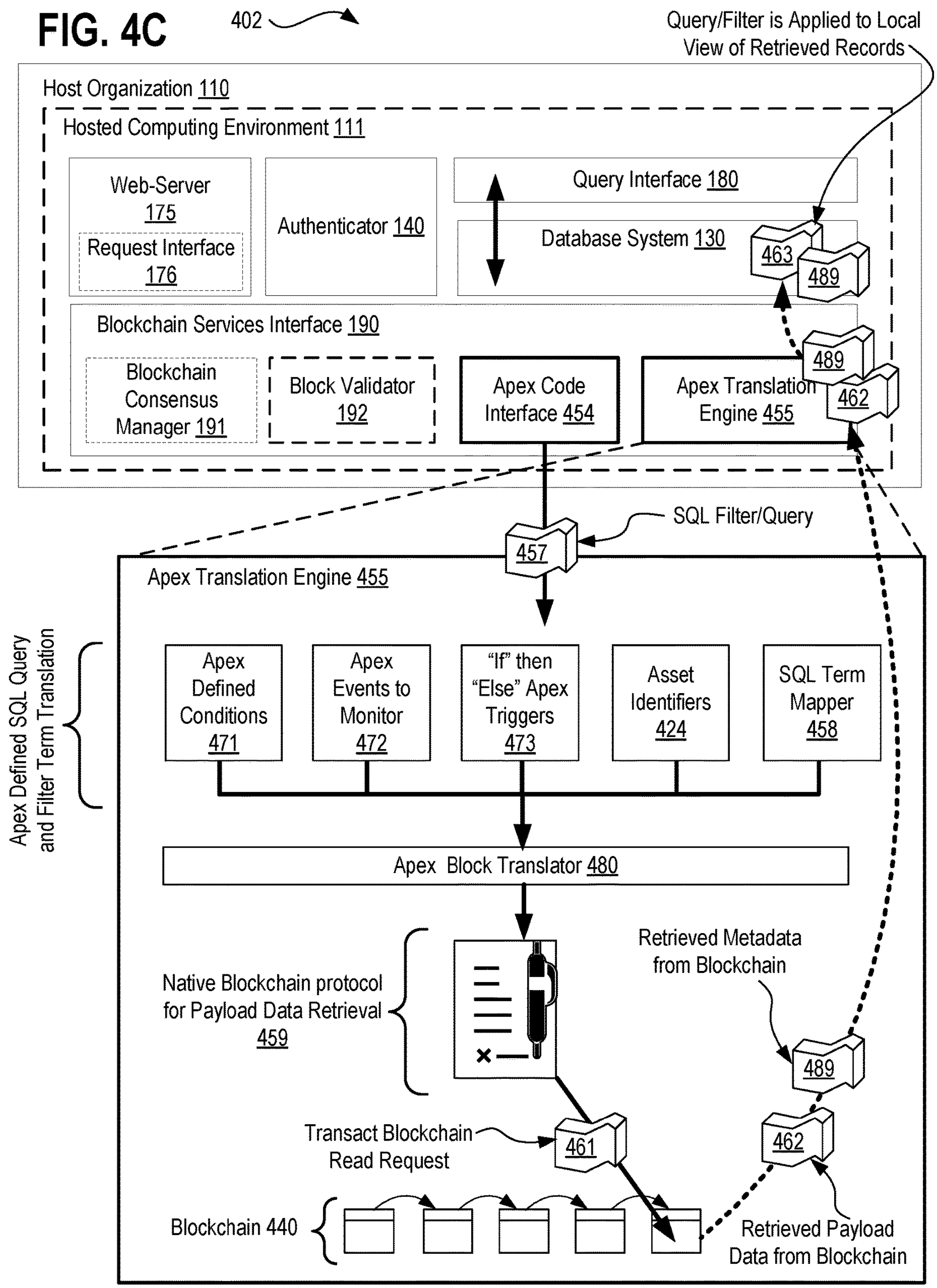
FIG. 4C depicts another exemplary architecture, with additional detail of an SQL Filtering and Query translator utilizing an Apex translation engine for records stored persistently to a blockchain, in accordance with described embodiments.

FIG. 4C depicts another exemplary architecture 402, with additional detail of an SQL Filtering and Query translator utilizing an Apex translation engine 455 for records stored persistently to a blockchain, in accordance with described embodiments. In this example architecture, the blockchain consensus manager 241 and the permissions manager 181 operate to support consensus on read and access control processes as further described in relation to FIGS. 10-12.

As may be viewed here, there is now the Apex translation engine 455 which is to receive an SQL filter or an SQL query which is submitted against the host organization's 110 query interface 180, however, for records that are persisted by the blockchain, 440, it is necessary for the query interface 180 to delegate some of the work to the blockchain services interface 240.

Problematically, the blockchain has no capability whatsoever to receive, process, or transact SQL based queries or filters as the blockchain is not a relational database system. And yet, the host organization 110 provides on-demand and cloud based services to its users at least partially on the premise that users are provided with greater technical capabilities (e.g., permitting use of the blockchain 440) yet with simplified tools, so as to not burden the host organization's users with technical complexity.

Therefore, the host organization implements the Apex translation engine 455 as depicted here which operates in conjunction with the apex code interface 454 to receive the SQL filter/query 457 from the query interface 180 of the host organization 110.

The SQL filter/query 457 is communicated into the Apex translation engine 455 which as part of its Apex defined SQL query and filter term translation blocks is now depicted as including an SQL term mapper 458 which is capable of reading, parsing, and dissecting the incoming SQL filter/query 457 into its constituent parts, such that the appropriate asset identifiers 424 which actually store the various payload data within assets of the blockchain may be referenced, such that the underlying data records may be retrieved from the blockchain 440.

The parsed terms and the appropriate asset identifiers 424 are then transmitted through the Apex block translator 480 and then converted into native blockchain protocol for payload data retrieval at element 459.

The native blockchain protocol for payload data retrieval at element 459 may then be executed against the blockchain 440 by transacting the blockchain read request 461 onto the blockchain 440 resulting in the retrieved payload data from the blockchain at element 462 being returned from the blockchain 440.

This record set as represented by the retrieved payload data from the blockchain 462 is not in the appropriate format for an SQL filter/query 457, however, it does include the necessary data to ultimately fulfill the received SQL filter/query 457. Stated differently, the retrieved payload data from the assets of the blockchain includes data representing the records being queried, albeit in a wholly incompatible format, corresponding to the format of the blockchain, often with the data being hashed or serialized and thus, needing conversion back into a readable format based on metadata 489 retrieved from the blockchain describing the structure of the stored data.

The retrieved payload data from the blockchain 462 is next returned back to the apex translation engine 455 which converts the data from the blockchain into a readable format. Next the translated records are communicated to the database system 130 within a temporary view 463 of the returned record set at which point the SQL query/filter (e.g., element 457) is then applied to the temporary view 463 at the database system 130 utilizing the original SQL filter/query terms or utilizing translated and optimized SQL filter/query terms, so as to return the originally requested record set responsive to the incoming SQL filter/query.

In such a way, it is thus possible for a user to issue SQL query/filters against data which is stored on the blockchain 440 without the user needing any understanding of how to interact with the blockchain or how to transact with the blockchain, and indeed, without requiring the user even having knowledge that such data is stored on the blockchain 440.

According to one embodiment, the data stored on the blockchain is queried or filtered using the SQL filter/query 457 request and more particularly, the filtering requested is to be done based on relationships between the data elements stored within the blockchain.

Notably, however, there is no construct for "relationships" between data elements for payload data stored within assets on the blockchain as the blockchain is not a relational database system.

Nevertheless, such SQL filter/query 457 requests are made possible through the host organization 110 based on the defined metadata 489 declared, defined, and stored to the blockchain by transacting the metadata to the blockchain to describe the structure and relationships of data being written onto the blockchain by, for example, a declared application. Such metadata may be defined through the creation and declaration of the application in accordance with related embodiments as is described in greater detail below.

In such a way, it is possible to define entities that are related to one another, similar to the manner in which entities are related to one another in a relational database system, with the distinction that such records are written to a DLT platform such as the blockchain 440. Notably, the records within the blockchain are not inherently related to one another as with a relational database, but rather, it is necessary to retrieve both the data and also the metadata which defines such records.

It is therefore in accordance with such embodiments that the Apex translation engine 455 translates the relationships between the defined entities on behalf of the blockchain which then in turn permits the host organization's database system 130 and/or query interface 180 to perform the necessary JOIN operations on the data to form a unified table or a JOIN table view, against which the SQL filter/query 457 request may then be applied.

According to a particular embodiment, any transaction written onto the blockchain results in a leaf node persisting data as an off-chain stored database representation which may later be correlated to an RDBMS format by the Apex translation engine 455.

According to such an embodiment, relational tables are later created by the Apex translation engine based on the retrieved payload data from the blockchain and based on the metadata 489 transacted onto the blockchain and retrieved concurrent with the retrieved payload data.

According to the described embodiments, anytime there is a change to the metadata which defines the structure of such data, the metadata changes are updated by transacting the new metadata definition onto the blockchain, and consequently, any such changes to the metadata are automatically translated into any RDBMS formatted tables which are built on retrieved data, since the Apex translation engine with retrieve and reference the updated metadata definitions.

According to such embodiments, once the RDBMS formatted tables are built by the Apex translation engine, the SQL filter/query 457 request is then queried against the built RDBMS tables at the host organization's 110 database systems 130. According to another embodiment, the RDBMS tables are built first by retrieving the metadata 489 from the blockchain, but without retrieving the payload data. Subsequently, the SQL filter/query 457 request is applied to the RDBMS formatted tables and based on the query, the Apex translation engine identifies the appropriate asset identifiers 424 within which the payload data is stored on the blockchain 440, identifying the corresponding block number for the data on the blockchain before then retrieving the payload data from the blockchain and populating the retrieved data into the previously formatted RDBMS tables, which are structured but empty. The retrieved payload data is then populated into the empty RDBMS tables so as to facilitate the SQL filter/query 457 request being applied against the now populated RDBMS tables in fulfillment of the request.

In such a way, it is then possible to query against the data in the blockchain utilizing SQL queries and it is possible to filter using SQL based on the relationships, notwithstanding the fact that the authoritative source of the data is ultimately the payload data written to assets transacted onto the blockchain 440 and not a relational database system.

By creating a separate table view with the block ID and block number that is persisted to the blockchain for any changes, it is possible to perform much faster lookups utilizing the separate view while still validating that the reference data is current by utilizing the block ID to check the data at the blockchain without having to perform a time-intensive search of the blockchain for the data in question, as the block ID permits reference directly to a single block.

To be clear, according to such an embodiment, there are two queries. A first SQL based query against the temporary view in the database system through the RDBMS formatted tables and then a fast lookup for the block ID and block number is performed and the Apex translation engine then goes back to the blockchain to validate that the queried data is current and accurate, based on the table look up of the block ID and block number which is maintained as the asset identifiers 424 by the Apex translation engine.

Additionally, because the data is represented in an RDBMS format, it is further permissible to perform JOINs on data stored within the blockchain. Such JOINs are important as they permit analytics to be performed utilizing data stored in the blockchain which would not otherwise be possible.

According to such embodiments, the RDBMS formatted table representation in the database system 130 is not an immutable table, however, it is restricted in such a way that no entity has authority to make changes to the RDBMS formatted table, with the exception of the Apex translation engine's transaction playback mechanism discussed below.

Therefore, it is only the blockchain monitoring/event listener component which is enabled to update this table and which performs the necessary synchronizations from the blockchain authoritative source back to the RDBMS formatted table and temporary view in the database system 130 of the host organization anytime that changes to either the metadata or changes to the persisted data stored to the blockchain are observed by the event listener.

According to further embodiments, there is additionally a transaction playback mechanism for processing SQL filter/query 457 requests when the blockchain is inaccessible and a recovery mechanism for blockchain data restoration in the event the blockchain becomes permanently inaccessible or in the highly unlikely event that the data on the blockchain becomes corrupted.

According to such embodiments, the playback mechanism permits SQL filter/query 457 requests to be processed by the host organization 110 without validating the data stored within the blockchain to verify the temporary host organization's view of the data is current.

It is possible that a SQL filter/query 457 request is received while the blockchain 440 is in accessible. Accordingly, the Apex translation engine in conjunction with the database system 130 of the host organization record all transactions that add, update, or delete data for the temporary view. While such changes are transacted onto the blockchain, those changes are recorded as a series of updates and maintained at the host organization. These changes represent a non-authoritative source, but may nevertheless be referenced.

Therefore, in the event that the blockchain 440 is inaccessible, the recorded changes to the data may be replayed by the database system 130 to update the temporary view of the data at the host organization utilizing the replayed add, delete, and update transactions, thus bringing the temporary view into synchronization with the authoritative source of the same data stored on the blockchain. Once the replay is completed, the SQL filter/query 457 request may then be processed against the temporary view of the data, without requiring the intermediate operation of the Apex translation engine locating the asset identifiers 424 for the data stored on the blockchain to validate and verify the data is current.

Thus, the blockchain may be queried and the SQL filter/query 457 request fulfilled utilizing SQL based language queries and filters even when the blockchain cannot be accessed on a temporary basis.

Such a transaction playback mechanism permits the RDBMS formatted tables and temporary view to self-heal and come back up to a fully restored state at the blockchain level, without needing to reference the blockchain. For example, the host organization's systems will recognize that the blockchain node went down or is inaccessible, and so it then replays all transactions observed and re-applies the metadata to determine the proper state, similar to the manner that all participating nodes on the blockchain would self-update, with the exception that reference is not being made to the blockchain's nodes and likely is much slower than retrieving the state data and current information from the blockchain directly. Notwithstanding the speed penalty, the benefit is that valid data may nevertheless be retrieved despite the blockchain node being down.

According to another embodiment, there is a recovery and restoration mechanism for data stored on the blockchain in the event that the blockchain 440 becomes permanently inaccessible. While this scenario is highly unlikely, it does present the opportunity to perform a data restoration if necessary. Also permissible is the ability to perform a data migration from the blockchain 440 where the data is persisted as the authoritative source to a new blockchain, in the event that the host organization or users wish to relocate their data.

Such an embodiment operates similar to the playback of all recorded transactions which is described above, with the added addition that once the playback is complete, all metadata 489 and the records from the temporary view at the database system 130 of the host organization is then written onto a restored blockchain 440 or written to a new blockchain repository, thus creating new assets on the blockchain within which the records are persisted as payload data and updating the block IDs and asset identifiers 424 for such data, so as to fully recover or restore all data on the blockchain 440 after a catastrophic failure or pursuant to an intentional data migration.

According to a particular embodiment, changes to the metadata are recognized by the host organization's event listener which looks for changes at the blockchain that affect any of the assets within which such metadata is stored. Thus, once metadata is committed to the blockchain pursuant to consensus for a transacted asset, the blockchain services interface will retrieve the updated version of the metadata so that the RDBMS formatted tables for the temporary view within the host organization 110 may be re-built based on the new version of the metadata. For example, the metadata is translated to an SQL data definition language and then based on the metadata, the RDBMS data tables which are empty or the RDBMS data representation for populated tables are rebuilt or restructured according to the new metadata utilizing the translated SQL data definition language.

According to described embodiments, anytime that a blockchain event occurs, cryptographic data is returned and the data is then persisted in the metadata format. The cryptographic data is translated into a format which is understood by other systems, such as using SQL data definitions or a REST standard or some other standardized decrypted format for others systems to reference and consume. This data is then pushed out to other systems which rely upon the data stored in the blockchain which is now inaccessible such that those systems may also synch up any other database with a temporary view of the data or synch up any entity listing for events from the blockchain affecting such data. For instance, an analytics engine may constantly listen to a data feed from the event listener for changes to the blockchain so that it may feed the analytics engine. Similarly, an AI engine may listen to the feed so that it may input training data to the AI, etc.

Figure 5A:
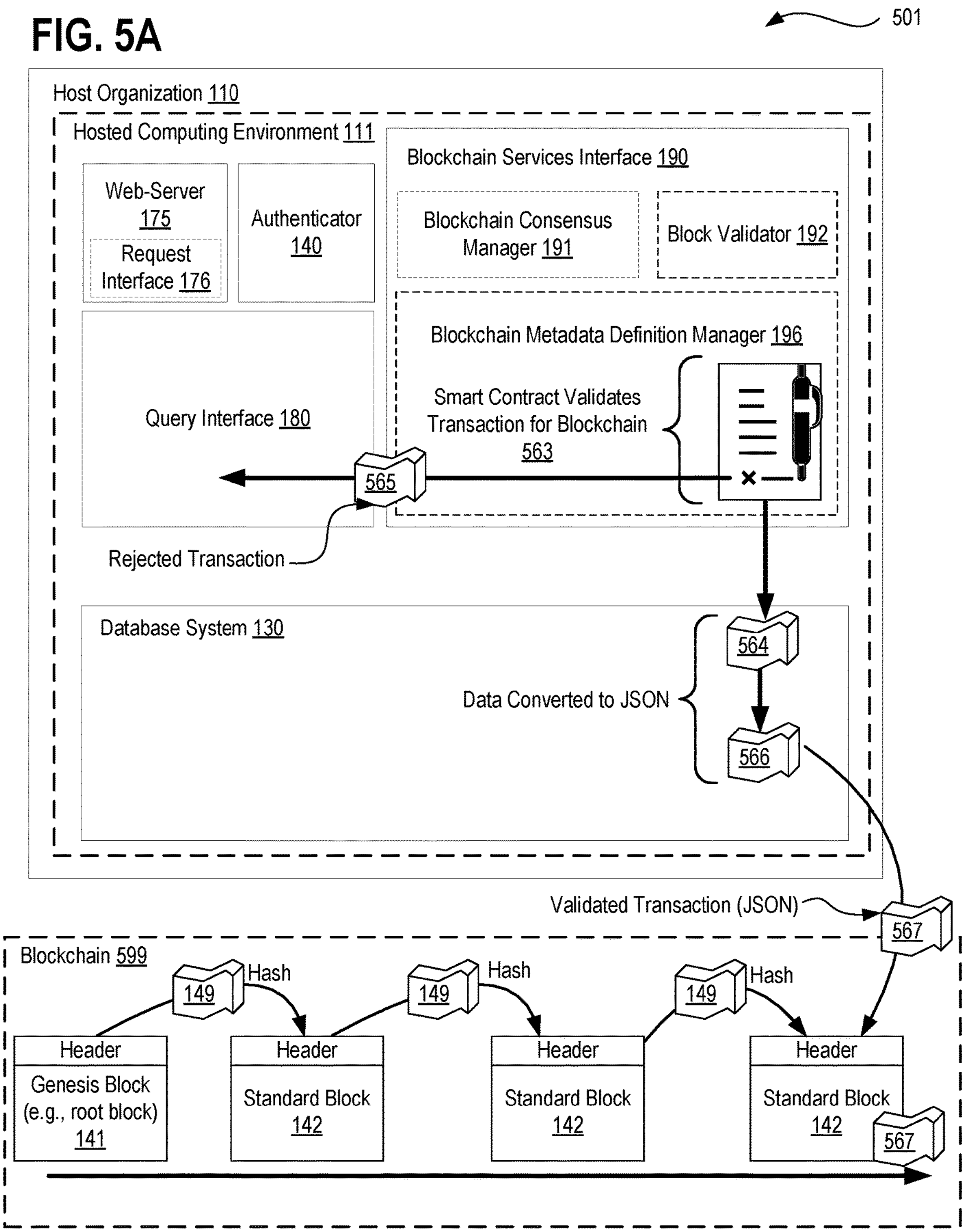
FIG. 5A depicts another exemplary architecture in accordance with described embodiments.

FIG. 5A depicts another exemplary architecture 501 in accordance with described embodiments. In this example architecture, the blockchain consensus manager 241 and the permissions manager 181 operate to support consensus on read and access control processes as further described in relation to FIGS. 10-12.

Conventional solutions permit the storage of free-form text within an asset transacted onto the blockchain, for instance, storing such data within a payload portion of the asset, however, because such data is not validated, there is a risk that corrupted or incorrect data is written to the blockchain and later retrieved on the assumption that such data is valid.

By executing a smart contract to perform transaction validation of the entity or asset being transacted onto the blockchain, it is therefore possible to enforce various masks, data structures, data types, data format, or other requirements prior to such data being written to the blockchain 599.

According to such embodiments, the blockchain metadata definition manager 246 executes smart contract validation 563, and if the data to be written to the blockchain is not compliant with the requirements set forth by the executed smart contract, then the transaction is rejected 565, for instance, sending the transaction back to a query interface to inform the originator of the transaction. Otherwise, assuming the transaction is compliant pursuant to smart contract execution, then the transaction is validated 564 and written to the blockchain.

According to one embodiment, the smart contract applies a data mask to validate compliance of the data or metadata to be written to the blockchain. In other embodiments, the smart contract enforces rules which are applied to the data as part of the validation procedure.

According to one embodiment, the smart contract executes as part of a pre-defined smart contract system which executes with any blockchain which permits the use of smart contracts, and the smart contract performs the necessary data validation.

According to one embodiment, the data or metadata to be written to the blockchain 599 is converted to a JSON format to improve storage efficiency. JavaScript Object Notation (JSON) provides an open-standard file format that uses human-readable text to transmit data objects consisting of attribute-value pairs and array data types or any other serializable value. It is a very common data format used for asynchronous browser-server communication, including as a replacement for XML in some AJAX-style systems. Additionally, because JSON is a language-independent data format, it may be validated by the smart contract on a variety of different smart contract execution platforms and blockchain platforms, regardless of the underlying programming language utilized for such platforms.

Thus, as depicted here, data or metadata to be written to the blockchain may be converted into a JSON format 566 (e.g., within database system 130 of the host organization 110) and the validated and converted JSON data is then transacted onto the blockchain.

Figure 5B:
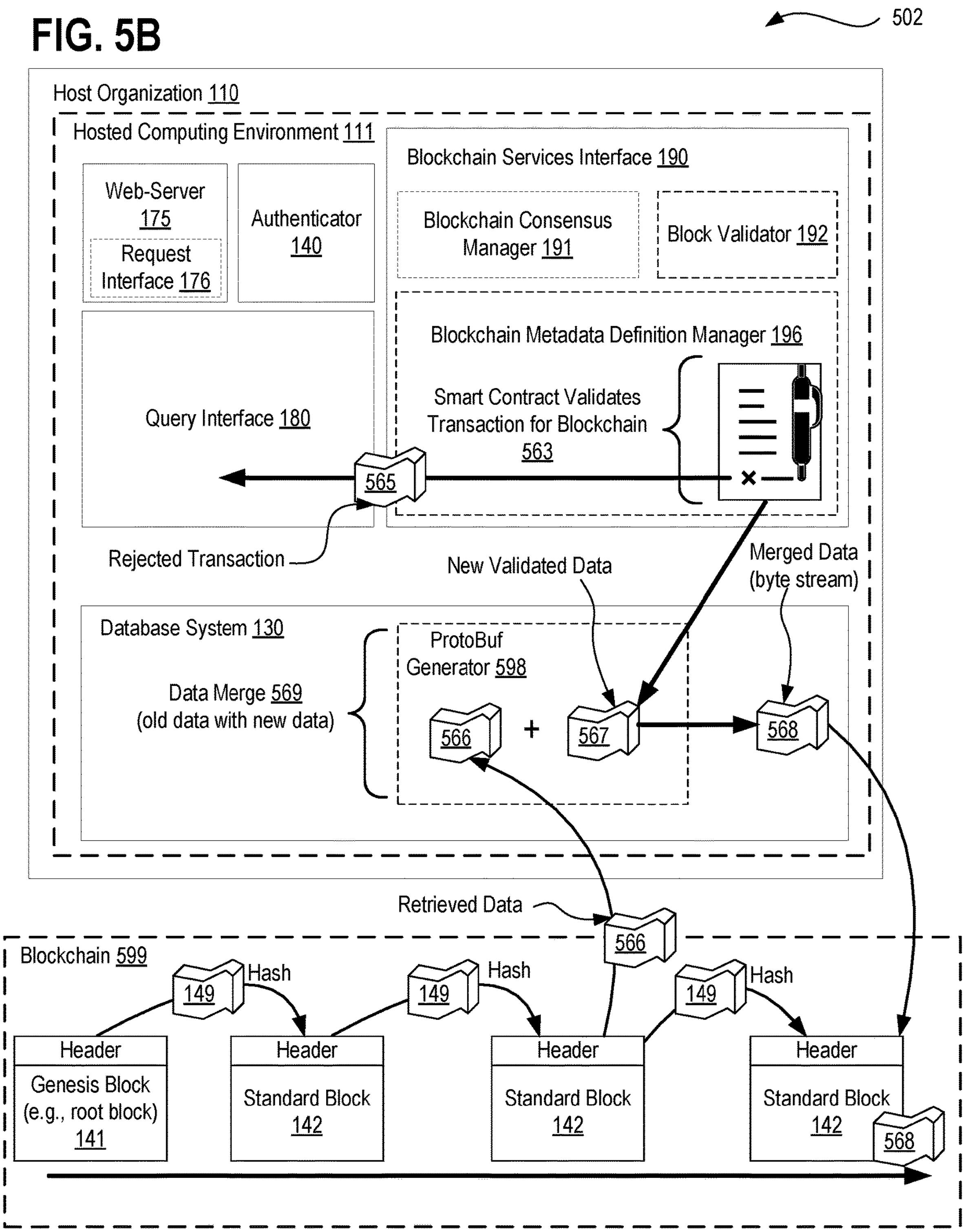
FIG. 5B depicts another exemplary architecture for performing dynamic metadata validation of stored data in accordance with described embodiments.

FIG. 5B depicts another exemplary architecture 502 for performing dynamic metadata validation of stored data in accordance with described embodiments. In this example architecture, the blockchain consensus manager 241 and the permissions manager 181 operate to support consensus on read and access control processes as further described in relation to FIGS. 10-12.

According to certain embodiments, it is desirable to improve the efficiency of data stored on the blockchain 599, and therefore, all new transactions having data to be written to the blockchain perform a data merge 569 process prior to writing the new data to the blockchain. This is performed by first retrieving old data, such as a previously written stored record from the blockchain, for instance, pulling retrieved data 566 into the database system 130 of the host organization, and then merging the retrieved data 566 with the new validated data 567 having been checked by the executed smart contract, resulting in merged data 568. The merged data 568 is then written to the blockchain, for instance, by embedding the merged data 568 within a new asset which is added to the blockchain or by updating an existing asset and replacing a payload portion of the existing asset with the merged data 568, thus having an entire updated and validated record stored on one block of the blockchain for more efficient retrieval.

According to one embodiment, the data merge 569 process is performed by a protobuf generator 598 which reduces the total size of the data in addition to merging the retrieved data 566 with the new validated data 567. For example, via performance of a dynamic protobuf generation for the retrieved data 566 with the new validated data 567, the data is made to be extremely small and efficient.

Protocol Buffers (referred to as a protobuf or protobuff) provide a means for serializing structured data, thus converting the retrieved data 566 and the new validated data 567 into a merged serialized byte stream at the protobuf generator 598. This has the added benefit of permitting encryption of the merged data and providing such data in a byte stream format which is easily usable by any other application later retrieving the stored data. The protobuf generator 598 utilizes an interface description language that describes the structure of the data to be stored with a program that generates source code from that description for generating or parsing a stream of bytes that represents the structured data represented by the retrieved data 566 and the new validated data 567 (e.g., a validated JSON transaction as shown at element 567).

Such an approach enables the storing and interchanging all kinds of structured information. For instance, a software developer may define the data structures (such as the retrieved data 566 and the new validated data 567) and the protobuf generator 598 then serializes the data into a binary format which is compact, forward- and backward-compatible, but not self-describing (that is say, there is no way to tell the names, meaning, or full datatypes of fields without an external specification), thus providing a layer of encryption and data security for the stored data.

In such a way, the protobuf generator 598 improves efficiency of network communication and improves interoperability with other languages or systems which may later refer to such data.

Thus, consider the previously described example of the student's stored record with the student's first name, last name, phone number, and student ID.

According to a particular embodiment, processing begins with generating a protobuf of the metadata describing the student record as provided by and defined by the application seeking to store data on the blockchain, thus resulting in protobuffed student record metadata or serialized (e.g., JSON) compliant student record metadata. Next, processing validates the student data within the stored record against the metadata to ensure compliance (e.g., by executing the smart contract) and then processing generates a protobuf of the student data within the stored record resulting in protobuffed student record data. Next, both the protobuffed or serialized metadata describing the student record and the protobuffed or serialized data of the student record is then written to the blockchain. Thus, storing the protobuffed or serialized version of the data results in more efficient storage of such data on the blockchain. According to such embodiments, metadata defined by an application which is used for validation purposes is also stored in its protobuffed or serialized version, thus resulting in efficient storage of protobuffed or serialized metadata on the blockchain.

According to such embodiments, the data merge 569 process includes adding new fields and new data to the stored record which is then re-written to the blockchain 599 with subsequent to dynamically validating the new fields using the metadata.

For instance, according to such embodiments, processing includes taking the retrieved data 566, adding in the new fields, such as adding in a student's newly assigned universal ID (e.g., such as a universally unique identifier (UUID) or a globally unique identifier (GUID) as a 128-bit number used to identify information within the host organization) to the previously stored student's first name, last name, and phone number, so as to generate the merged data 568, subsequent to which processing dynamically validates merged data 568 based on the metadata by executing the smart contract. If the metadata has previously been written to the blockchain then there is no need to update or store the metadata again, which is likely the case for merged data 568 which will constitute an updated record. Thus, only the merged data 568 is written to the blockchain. If the data is new (e.g., not retrieved and not merged) then processing dynamically validates the new data using metadata provided by the application and then stores both the new data and the metadata onto the blockchain.

Metadata, as defined by the application seeking to store the data onto the blockchain, may specify, for example, a student record has three mandatory fields and one optional fields, such as mandatory first name, last name, and student ID, and optionally a student phone number, thus permitting validation of data to be written to the blockchain. The metadata may further define a format, data mask, or restrictions for the data fields, such as names must not have numbers, and the phone number must have a certain number of digits, etc.

Multiple different applications may store data onto the blockchain, with each of the multiple different applications defining different metadata for their respective stored records, and thus permitting the smart contract execution to perform validation of different kinds of data based on the variously defined metadata for the respective applications. For example, a student record with a student name, phone number, UUID will have different metadata requiring different data validation of a credit card record with a credit card number, expiration data, security code, etc. Regardless, the same processing is applied as the dynamically applied metadata validation process is agnostic of the underlying data, so long as such data is in compliance with the defined metadata for the data of the data record to be stored.

Figure 5C:
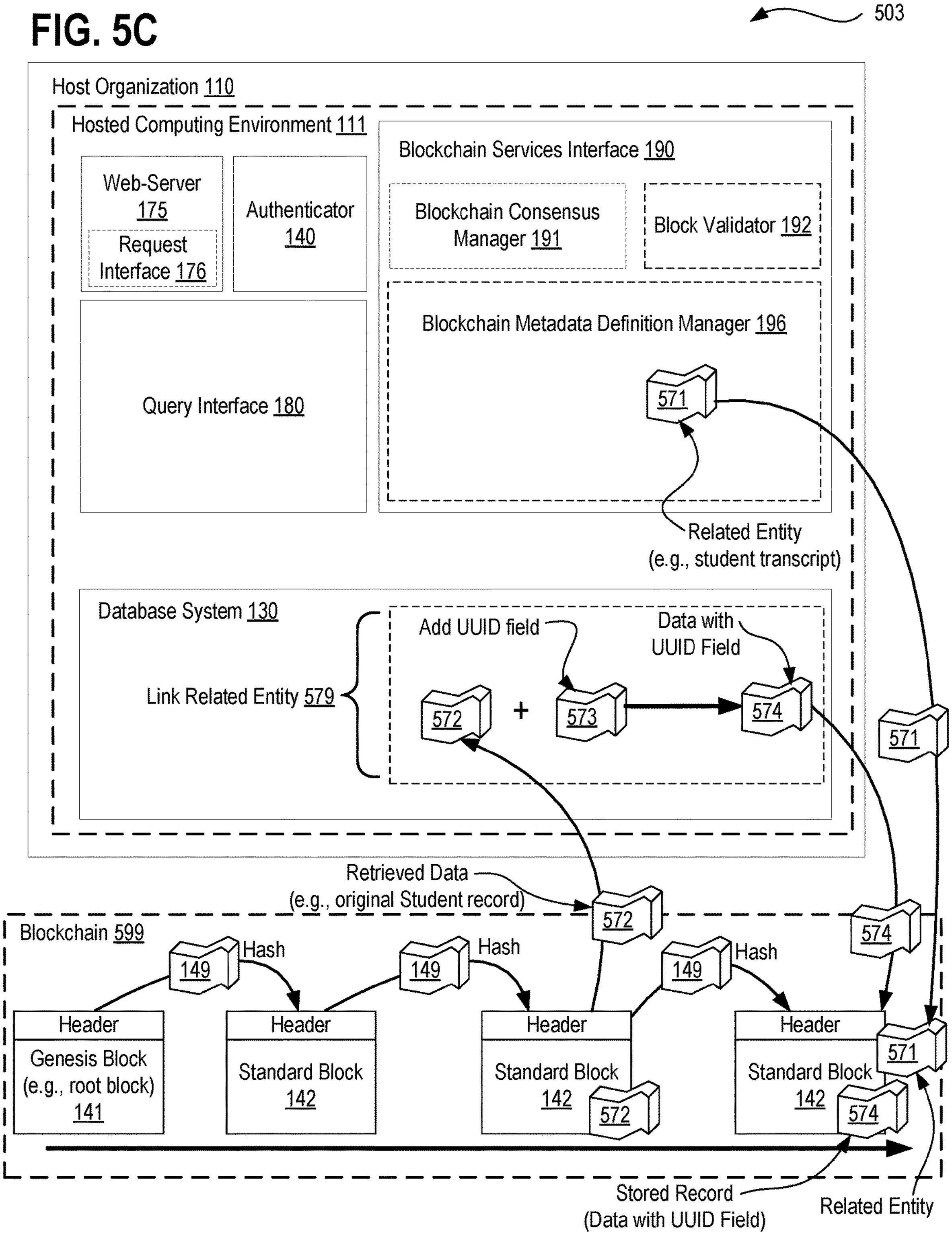
FIG. 5C depicts another exemplary architecture for storing related entities in accordance with described embodiments.

FIG. 5C depicts another exemplary architecture 503 for storing related entities in accordance with described embodiments. In this example architecture, the blockchain consensus manager 241 and the permissions manager 181 operate to support consensus on read and access control processes as further described in relation to FIGS. 10-12.

In the example of the saved student record as described above, there was a student record saved to the blockchain having, for example, a student first name, student last name, student phone number, and a student ID. Also stored was metadata defined by an application seeking to store the student record, with such metadata being utilized for dynamic validation of the student record.

According to further embodiments, related entities are stored on the blockchain and linked with the previously stored record. Consider for example, a stored student record on the blockchain for which a new student transcript is provided.

As depicted here, a link related entity 579 process is performed in which retrieved data 572 is modified to add a UUID field 573 identifying the related entity, providing a link between the related entity 571 and the data record previously stored on the blockchain and retrieved 572 for modification. This results now in data with the UUID field 574, which has not yet been stored. Next, the data with the UUID field 574 linking and identifying the new related entity 571 is then written to and stored within the blockchain, resulting in the stored record now having the original data of the stored record, but also a UUID field 574 linking to and identifying the new related entity. Next, the related entity 571 is written to the blockchain as metadata with the same UUID data field, thus permitting subsequent retrieval of the related entity 571 from the blockchain by first referencing the UUID within the stored record and then retrieving the linked related entity 571 stored within the blockchain as metadata.

Thus, if a student record defines the student's name, phone number, and student ID, then a transcript for the student may be stored as metadata on the blockchain. A new UUID is automatically generated for the transcript to be stored and then within the student record, a related entity field within the student record is updated to store the new UUID generated for the transcript, thus linking the student record updated with the related entity field identifying the UUID for the transcript with the separately stored transcript which is written to the blockchain as stored metadata. In such a way, any number of related entities may be added to the blockchain, each being stored as metadata within the blockchain and linked to another stored record via the data field for the related entity. Multiple related entity fields may be added to any record, each using a different UUID to link to and identify the related entity in question. For instance, if the student has a transcript and also medical records, each are separately saved to the blockchain as metadata, each identified separately by a unique UUID, and each UUID being updated within the student's stored record as separate related entity fields. As before, the updated record with the related entity field identifying the UUID for the separately stored related entity may be stored in its protobuffed or serialized version.

Figure 6A:
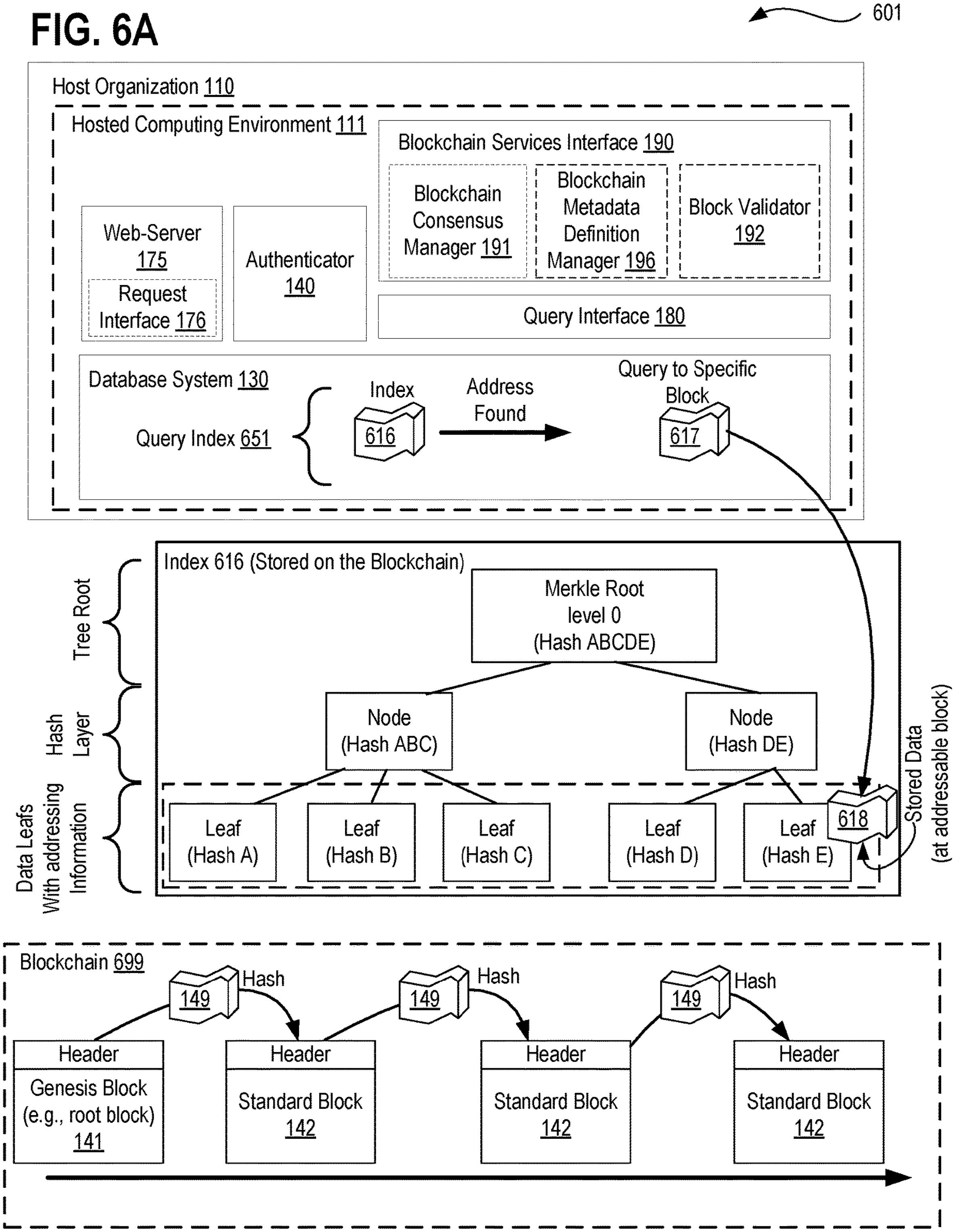
FIG. 6A depicts another exemplary architecture for retrieving stored records from addressable blocks using an indexing scheme, in accordance with described embodiments.

FIG. 6A depicts another exemplary architecture 601 for retrieving stored records from addressable blocks using an indexing scheme, in accordance with described embodiments. In this example architecture, the blockchain consensus manager 241 and the permissions manager (not shown) operate to support consensus on read and access control processes as further described in relation to FIGS. 10-12.

Use of the Merkle tree index 616 or a Merkle DAG tree index permits retrieval of stored records from the blockchain by going to a particular block of the blockchain based on the Merkle tree index, thus permitting retrieval of a stored record in a more efficient manner. For instance, the Merkle tree index identifies an address for one of many addressable blocks on the blockchain, then retrieval of the stored record negates the need to traverse the blockchain looking for the stored record in question and instead permits the retrieval of the stored record directly from the block identified by the Merkle tree index.

Thus, as depicted here, processing performs a query 651 to the index 616 to identify an address for the desired data, subsequent to which a query to a specific block 617 is performed to retrieve the stored data at the addressable block based on the address without having to traverse the blockchain or traverse the tree to find the data.

According to certain embodiments, the index 616 is stored within the blockchain 699 as an entity, for instance, the index may be stored as an asset on the blockchain. Additionally, by storing the stored records within a Merkle tree index 616 which itself is stored onto the blockchain, it is possible to retrieve any data from the index 616 by going to a particular block with an index. Thus, if the index is known, it is not necessary to query 651 the index 616 for the address, but instead, go directly to a node for a known address within the index and receiving back anything at that node. If the address points to a leaf within the index 616 then the data stored within the leaf is returned based on a direct query to that address within the index 616. If the address points to a node having a sub-tree beneath it, such as additional nodes or simply multiple leafs, then the entire sub-tree 654 is returned. For instance, if the address ABC is used, then the entire node having hash ABC is returned, including the three leafs beneath that node, including the leaf having hash A, the leaf having hash B, and the leaf having hash C.

If the index 616 stores addressing information for specific blocks within the blockchain, then based on the returned addressing information, the specific block of the blockchain may be checked to retrieve the stored record to be retrieved. Alternatively, if the addressing is stored within the index 616 along with the latest information of the stored record, then going to the index 616 using an address will return both the addressing information for a block on the blockchain where the stored record is located as well as returning the latest information of that stored record, thus negating the need to query the blockchain further.

Figure 6B:
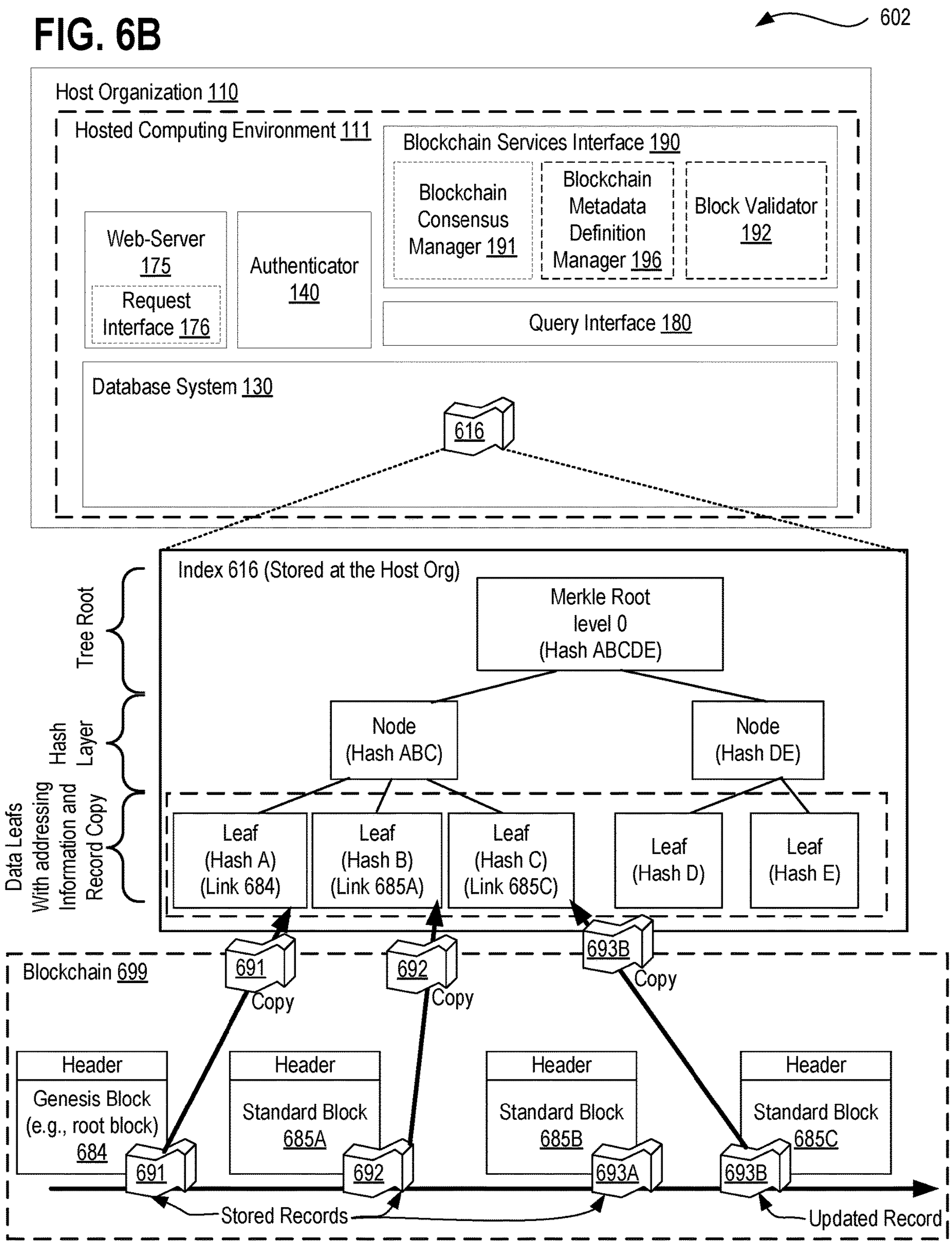
FIG. 6B depicts another exemplary architecture for building an index from records in the blockchain and maintaining the index, in accordance with described embodiments.

FIG. 6B depicts another exemplary architecture 602 for building an index from records in the blockchain and maintaining the index, in accordance with described embodiments. In this example architecture, the blockchain consensus manager 241 and the permissions manager (not shown) operate to support consensus on read and access control processes as further described in relation to FIGS. 10-12.

According to a particular embodiment, it is desirable to enable extremely fast access to the data records stored within the blockchain through the use of the index 616. As noted above, the index 616 may store only an address of an addressable block on the blockchain within which the underlying stored record is kept, thus permitting retrieval of the record from the blockchain using the address retrieved from the index 616. Alternatively, both the latest information, that is to say, the up to date and current version of a particular record stored by the blockchain may be stored within the index along with the addressable block of the blockchain where the underlying stored record is kept by the blockchain. To be clear, this results in duplicative records being persisted. A latest and current version of a record is kept within the blockchain, considered as the authoritative record, however, for the sake of improving query speeds, a second copy of the same record is kept within the index 616 along with the address on the blockchain of where the authoritative version of that record is maintained.

According to such an embodiment, an index 616 may therefore be built or generated by the host organization by referring to the underlying stored records within the blockchain.

As shown here, within the blockchain 699 there are multiple stored records at different addressable blocks of the blockchain. Stored record 691 is located at the root block 684. Stored record 692 located at block 685A, stored record 693A located at 685B, and finally an updated record 693B is stored at block 685C, with the updated record depreciating previously store record 693A as no longer current.

Any of these stored records may be retrieved from the blockchain by walking or traversing the blockchain searching for the relevant record, locating the relevant record, and then retrieving the stored record from the located block.

Building the index 616 improves the retrieval efficiency of this process by providing at least the address for the block within the blockchain where the stored record is kept. As described above, an index 616 with such addressing information may be checked, returning the addressable block of the blockchain for the stored record (e.g., element 618), and then the stored record may be retrieved from the blockchain without having to traverse or walk multiple blocks of the blockchain. For example, the index 616 may be checked for the location of updated record 693B, with the index returning the location of addressable blockchain block 685C, and then block 685C may be queried directly to retrieve the latest and most current version of the authoritative stored record which is updated record 693B at standard block 685C.

Alternatively, both the contents or the data of updated record 693B and the location of addressable blockchain block 685C identifying where the most current version of the authoritative updated record 693B is kept within the index 616, thus wholly negating the need to retrieve anything from the blockchain. While this results in an additional copy of the updated record 693B being stored within the index 616, the speed with which the data of the updated record 693B may be retrieved is vastly improved. This is especially true where the index 616 itself is stored within the host organization rather than being written to the blockchain. In such an embodiment, the index 616 is checked within the host organization 110 and both the location of the stored record is returned as well as the contents or the data of the stored record, with such data corresponding to the copy of the data from the stored record in the blockchain being returned from the index 616 stored at the host organization. Thus, the application receiving such information is subsequently checked to validate the information stored within the blockchain by retrieving the stored record from the blockchain using the location for the stored record within the blockchain as returned by the index 616 or the application may simply utilize the copy of the data returned from the index 616 itself, depending on the data consistency requirements and concerns of that particular application.

Thus, as may be observed here, the data leafs of the index 616 now include not just addressing information providing the location of the block in question within the blockchain, but additionally persist a copy of the stored record within the blockchain, thus providing duplicative locations from which to retrieve such data. One copy of the stored records is retrievable from the blockchain itself, but a copy of the stored record in the blockchain is also retrievable from the index 616.

As depicted here, the leaf hash A now has a link to location 684, thus providing the location or addressing information for root block 684 on the blockchain 699 where stored record 691 is persisted. However, leaf hash A additionally now has a copy of stored record 691 which is persisted within the index 616 itself, thus permitting retrieval of the data or contents from stored record 699 directly from the index 616 stored on the host organization without necessarily having to retrieve the stored record from the blockchain, despite the blockchain having the authoritative copy of the stored record 691. By identifying the records to be indexed (e.g., all student records for example) and then searching for and retrieving those records from the blockchain and recording the location of those records within the index 616 along with a copy of the stored records retrieved, such an index 616 may be built and utilized for very fast retrieval of the record contents. Further depicted is leaf hash B having a link to the blockchain block location 685A along with a copy of stored record 692 located within the index 616 and because stored records 693A was updated and thus deprecated by updated record 693B, the leaf hash C is built with a link to blockchain block location 685C along with a copy of the updated record 693B from the blockchain to be persisted within the index 616 stored at the host organization 110 (e.g., within the database system 130 of the host organization 110). In alternative embodiments where the index 616 is saved within the blockchain, retrieval efficiency is still improved as only the index 616 needs to be retrieved, which will have within it the duplicative copies of the stored records as described above.

The index 616 may then be searched much more quickly than searching the blockchain or in the event the hash or address is known for a leaf or node within the index 616, then the address may be utilized to go directly to the leaf or node within the index 616 from which all contents may thus be retrieved. For instance, if the address or hash points to a leaf, then the location information for the addressable block 618 within the blockchain will be returned along with the persisted duplicate copy of the stored record at that blockchain location. If the address or hash points to a node with sub-nodes or multiple leafs beneath it, then the entire sub-tree 654 will be returned, thus providing the contents of multiple records within the respective leafs (end-points) of the sub-tree returned.

Figure 6C:
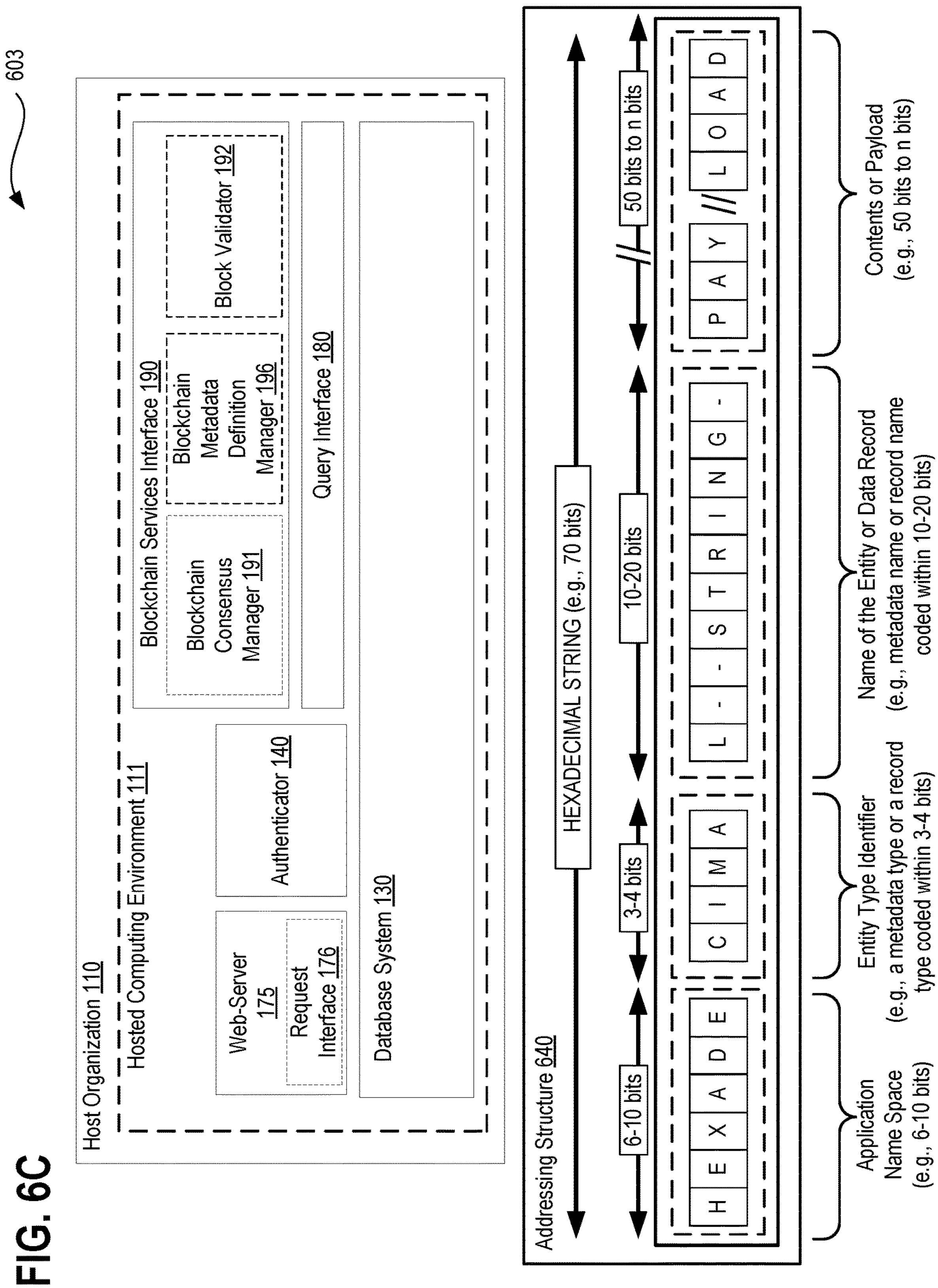
FIG. 6C depicts another exemplary architecture for utilizing an addressing structure to form an address for retrieving information from the index, in accordance with described embodiments.

FIG. 6C depicts another exemplary architecture 603 for utilizing an addressing structure to form an address for retrieving information from the index, in accordance with described embodiments. In this example architecture, the blockchain consensus manager 241 and the permissions manager 181 operate to support consensus on read and access control processes as further described in relation to FIGS. 10-12.

Structuring of the addresses within the Merkle tree index permits very fast access to the specific node or leaf within which the location information for the stored records within the blocks on the blockchain is provided as well as, according to certain embodiments, a copy of the stored record. Without the structured address, it is necessary to begin at the root of the Merkle tree index 616 and then step through each level until the desired node or leaf is found. While this traversal of an index 616 is faster than walking or traversing the blocks of the blockchain, even faster access is realized by referring directly to a single leaf or a node (and thus it's sub-nodes or leafs) via a structured address as depicted via the addressing data structure 640 shown here.

Specifically depicted here is an addressing structure 640 for the indexing scheme utilizing the Merkle tree index 616 which is broken into four primary components which make up a hexadecimal string. The first portion provides an application namespace of an exemplary 6-10 bits (though the size may differ) in which a specific application may be coded. For instance, the student records discussed above may be defined by and utilized in conjunction with a student record look-up API or interface coded as "SLDB" (e.g., Student Lookup DataBase) which converts to hex "534c4442." This application namespace field is then followed by an entity type identifier of an exemplary 3-4 bits (though the size may differ) to identify the type or kind of information stored, such as a stored record or a metadata entity or a related entity stored as metadata, etc. For example, the information may be the contents of a student record which may be coded as SR which converts to hex "5352" or the information may be metadata defining a student record which may be coded as MD which converts to hex "4d44" or the information may be a related entity. Certain related entities are stored as metadata with the same type identifier (e.g., MD/4d44) or alternatively may be stored as metadata with a unique entity type identifier, such as being coded RE for related entity which converts to hex "5245."

Next, within the addressing structure 640 is the name of the entity or data record of an exemplary 10-20 bits (though the size may differ) to specify what is being stored (not the contents, but the name of the stored information). Thus, metadata defining a student record may be coded as SRAMD (e.g., for Student Record Application MetaData) which converts to hex "5352414d4420" or the stored information may be the student record itself, thus being named STUDREC (e.g., for Student Record) which converts to hex "5354554452454320" or perhaps the stored information is a related entity within which there is stored a student's transcript named TRNSCRPT which converts to hex "54524e534352505420" or the stored information may be a stored a student's medical records named MEDREC which converts to hex "4d454452454320." Any extra space for the respective portions of the addressing structure may be padded with leading zeros depending on the application's use and means of parsing such data.

Lastly, there is a contents or payload portion of the addressing structure having therein the actual information to be stored, such as the contents of a stored record (e.g., the values making up a student's record), or metadata defining a record (e.g., the metadata by which to define, validate, structure, mask, or type the actual stored contents. Similarly, there may be stored within the payload or contents portion of the addressing structure 640, metadata identifying a related entity via a linked UUID which corresponds to a UUID field within a stored record (e.g. a student record may include a related entity field with a UUID for a student's transcript, thus linking the student's record with the student's separately stored transcript within a related entity metadata stored asset on the blockchain).

Within the payload or contents portion of the addressing structure 640, the application developer utilizing the indexing scheme has nearly unlimited flexibility of what may be stored, up to the size limits imposed, such as a 70 bit total limit for an extremely small, efficient, albeit restrictive addressing structure 640 up to n bits (e.g., hundreds or thousands depending on the use case) within which significantly more information may be stored.

Because the information is stored as a hexadecimal string, the information may easily be protobuffed, serialized, encrypted, and decrypted as well as every efficiently transmitted across networks and utilized by heterogeneous applications without regard to any specialized formats.

Figure 6D:
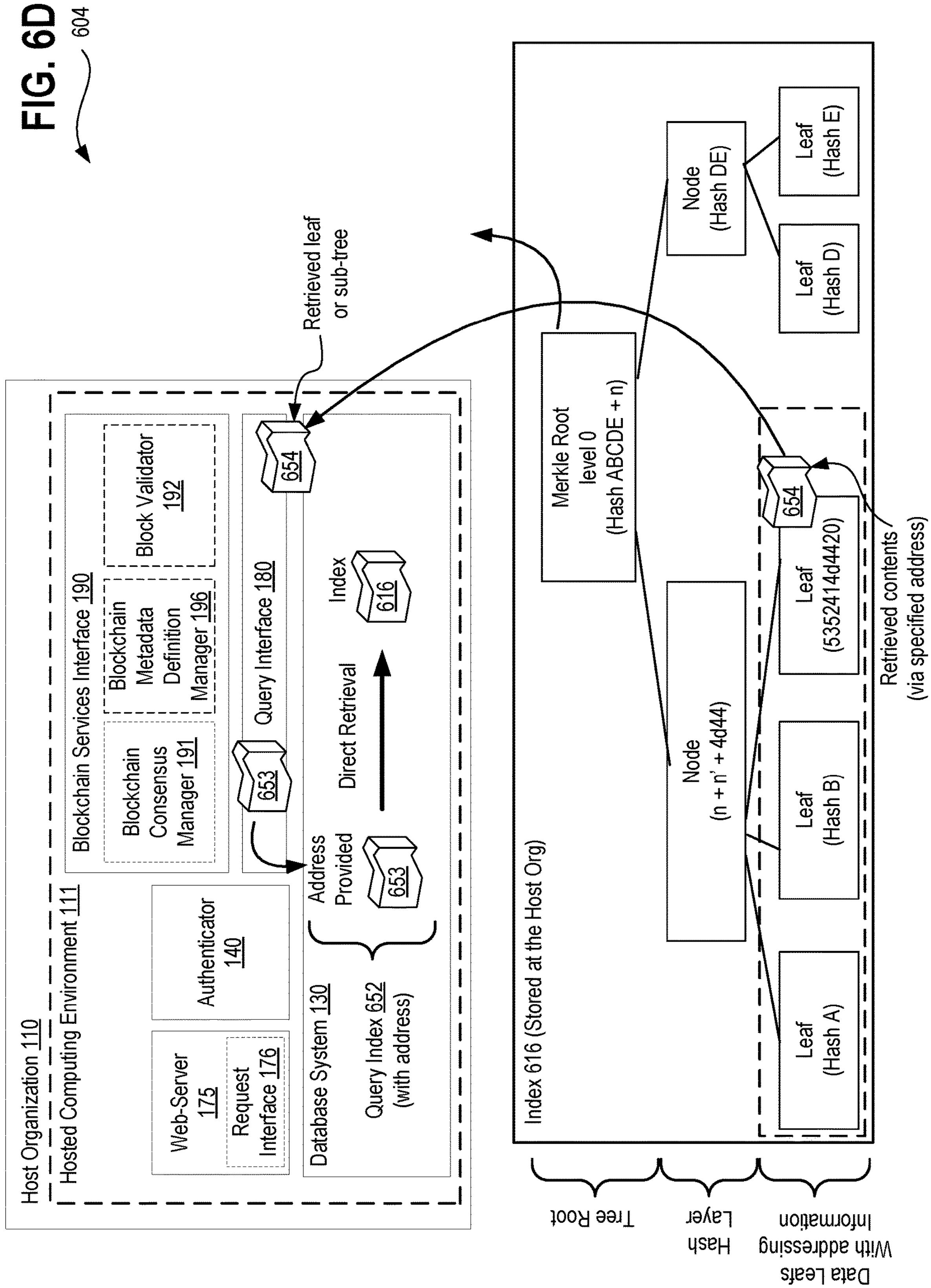
FIG. 6D depicts another exemplary architecture for utilizing an address to retrieve information from the index, in accordance with described embodiments.

FIG. 6D depicts another exemplary architecture 604 for utilizing an address to retrieve information from the index, in accordance with described embodiments. In this example architecture, the blockchain consensus manager 241 and the permissions manager 181 operate to support consensus on read and access control processes as further described in relation to FIGS. 10-12.

As depicted here, the query interface 180 provides an address 653 via which to perform a query 652 against the index using the address, thus permitting direct retrieval from the index 616 of either a leaf or a sub-tree of the index 616 depending on what retrieved data is queried for via the address.

Consider a query 652 against the index 616 address using the indexing scheme and address structure from the example above.

For example, the application namespace for a student record look-up API or interface is coded as "SLDB" (e.g., Student Lookup DataBase) which converts to hex "534c4442" followed by the type or kind of information stored coded as MD (for metadata) which converts to hex "4d44" followed by metadata defining a student record coded as SRAMD which converts to hex "5352414d4420."

This results in an address of 534c4442+4d44+5352414d4420 or 534c44424d445352414d4420. It is not necessary to define the address for the contents or payload since this is the data being retrieved, however, such data may be written to the index using the above address concatenated with the hexadecimal representation of the contents or payload.

Nevertheless, querying against the index 616 using the address 534c4442+4d44+5352414d4420 provides a fully qualified address down to a leaf in the Merkle tree index having therein the payload or contents to be retrieved, which in this case is the metadata for an application called "SLDB" (e.g., Student Lookup DataBase) which defines the coding of student records for that application.

Similarly, if a student record is to be retrieved, then querying the index 616 using the address 534c4442 (for the Student Lookup DataBase)+5352 (for SR or a Student Record)+5354554452454320 provides a fully qualified address down to a leaf in the Merkle tree index having therein the student record payload or contents to be retrieved, which in this case is the student record information for the application called "SLDB" (e.g., Student Lookup DataBase) which is defined by the metadata retrieved above. If the student's UUID or student ID is utilized as a leading portion of the stored student record payload, then the address may be further qualified to retrieve a specific record's contents only for that particular student.

Another benefit of such an indexing scheme is the ability to query for information using a non-fully-qualified address or a partial address. For example, continuing with the above example, the developer may trigger the index to return all the metadata for their specific application by submitting a partial address to the index 616 for direct retrieval by specifying their address and the entity type identifier for their metadata. Thus, such a partial address forms the hex string for the application namespace portion corresponding to the "SLDB" (e.g., Student Lookup DataBase) which converts to hex "534c4442" followed by the type or kind of information stored coded as MD (for metadata) which converts to hex "4d44," thus resulting in 534c4442+4d44 or simply 534c44424d44.

Querying the index 616 for direct retrieval using this partial address will cause the index to return all metadata for the "SLDB" (e.g., Student Lookup DataBase) application, regardless of what such metadata is named or how many leafs or sub-trees are consumed to store such data. More particularly, querying the index 616 using the partial address will return an entire sub-tree below the node of the Merkle tree index hashed with the hex string 534c4442+4d44. Similarly, all student records may be retrieved (via an entire sub-tree being returned) by specifying a partial address for direct retrieval, such as specifying to the query of the index 616 the address 534c4442 (for the Student Lookup DataBase)+5352 (for SR or a Student Record) without any specifically named student records.

In the event the contents or payload information in the index includes both the location information for the stored record within the blockchain as well as the contents of the stored record copied from the blockchain into the index 616, then it is not necessary to retrieve anything further from the blockchain. If only the location information of the contents within a specified block of the blockchain is provided (thus resulting in a much smaller storage volume and faster retrieval due to a smaller index) then the blockchain services interface 240 will subsequently utilize the location information to fetch the contents of the stored record directly from the specified block on the blockchain without having to traverse or walk multiple blocks of the blockchain in search of the specified stored record.

Figure 6E:
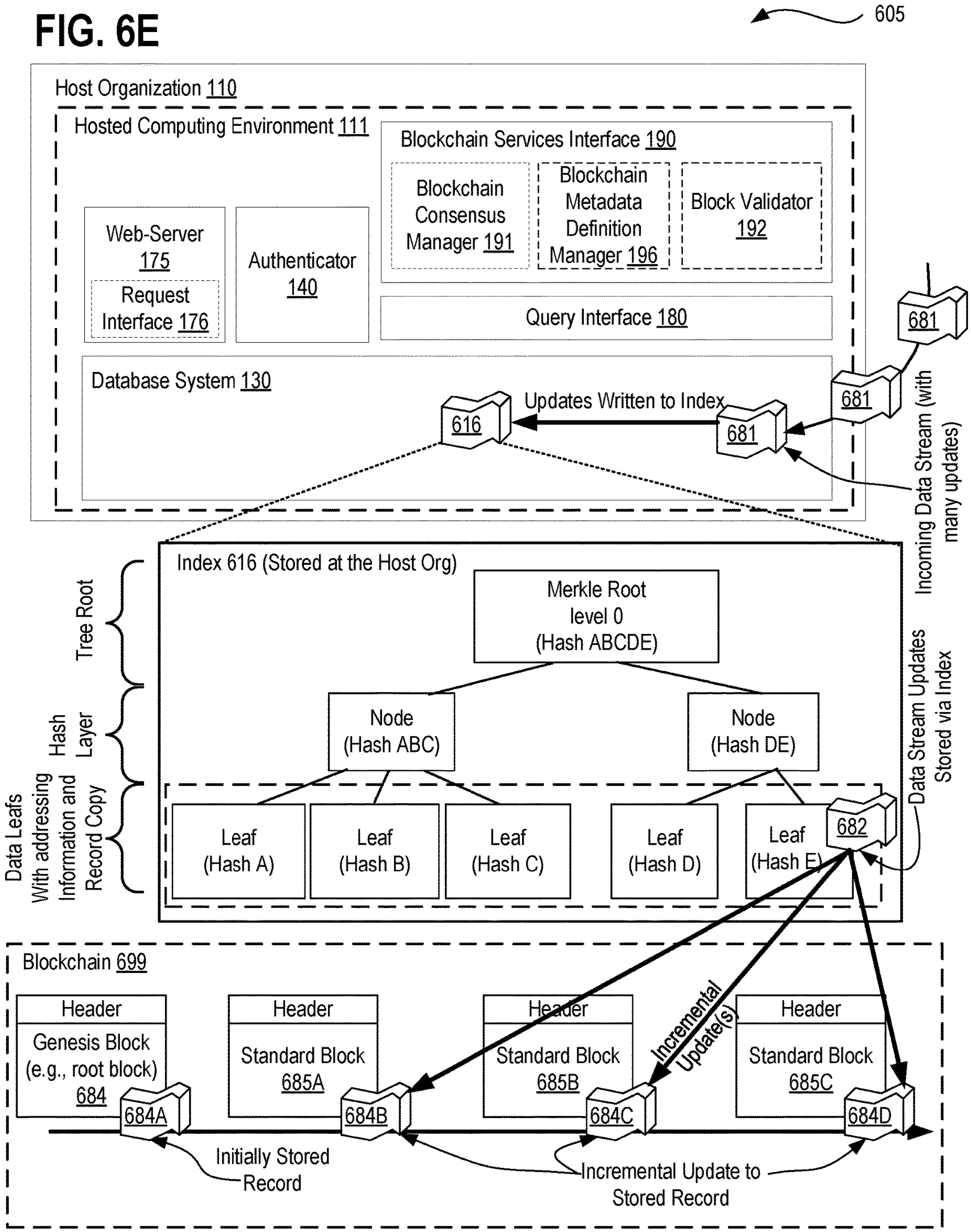
FIG. 6E depicts another exemplary architecture for incrementally updating a blockchain asset for stored records using an index to store current updates, in accordance with described embodiments.

FIG. 6E depicts another exemplary architecture 605 for incrementally updating a blockchain asset for stored records using an index to store current updates, in accordance with described embodiments. In this example architecture, the blockchain consensus manager 241 and the permissions manager 181 operate to support consensus on read and access control processes as further described in relation to FIGS. 10-12.

In certain situations, it is desirable to store information within the blockchain, however, the volume and frequency of information updates for the stored records render use of the blockchain impractical given that blockchain storage is very poorly suited for information storage with many updates at a high frequency.

As shown here, an incoming data stream 681 with many updates is received at the host organization and the updates are written into the index 616 resulting in the data stream updates being stored via the index as shown at element 682. Periodically, incremental updates are then written into the blockchain by, for example, transacting with the blockchain to add a new asset having the stored record(s) with the incremental updates taken from the index 616 and pushed into the blockchain as stored records. For example, stored record 684A is initially stored on the blockchain 699 with an initial batch of data from the data stream. Next, more data stream updates are written first to the index 616 at the host organization and after a period of time, the incremental updates are then again written to the blockchain, resulting in repetitive incremental updates shown here as incremental update 684B, then incremental update 684C, and then incremental update 684D, and so on.

Consider for example the storage of an information stream from IoT devices (Internet of Things) devices which are reporting various telemetry data such as status, errors, location, events, configuration changes, etc. If the collection of such data scales to a large group of IoT devices in the hundreds the blockchain may be overwhelmed due to the frequency of data storage requests.

However, storing the information within the index 616, especially when the index is stored within the host organization, overcomes this problem as the database system 130 of the host organization easily accommodates a high frequency of database updates and interactions.

Therefore, in the event it is nevertheless desired to make such data available on the blockchain and to be stored upon the blockchain, then the frequency problem may be overcome by first writing the many updates (e.g., from the IoT devices or other such updates) directly into the index 616 within the host organization 110 and then periodically writing incremental updates to the blockchain for persistent storage of the data within the blockchain. For example, IoT device data streams may be collected by the host organization 110 into the index and then once every 10 minutes, every hour, every 24 hours (or some other period) the incremental update to the IoT device data stream (measured from the last update to the blockchain to the currently available data) is then pushed, flushed, added, or transacted onto the blockchain. Thus, the latest block of the blockchain then persistently stores the latest portion of the IoT device data stream and thus is accessible directly from the blockchain or alternatively available from the index 616 at the host organization.

In certain embodiments, the index purges or flushes the incremental data by storing the incremental update to the blockchain and then the index removes the stored contents or payload portion from the index 616 and retains only the block location information on the blockchain via which to locate the underlying stored records. Stated differently, once the incremental information is written to the blockchain, the index 616 may be cleaned up such that it retains where to locate the stored records having the incremental information on a specific block of the blockchain, but the index 616 itself no longer retains the contents of such stored records as they are available within the blockchain and because such data, which grows very quickly, may slow the index in an undesirable manner.

Pushing the whole change (e.g., all of the IoT data stream ever collected) to the blockchain in its entirety is problematic as all data prior to the incremental update is replicated over and over again within the blockchain. Thus, pushing only the incremental changes or updates to the blockchain provides efficient use of the blockchain for purposes of storage and efficient use of the index 616 by which to buffer the incoming data stream or incoming high frequency updates as well as via which index 616 permits fast identification of location information indicating where the incremental information is stored (e.g., within which block on the blockchain).

Figure 7A:
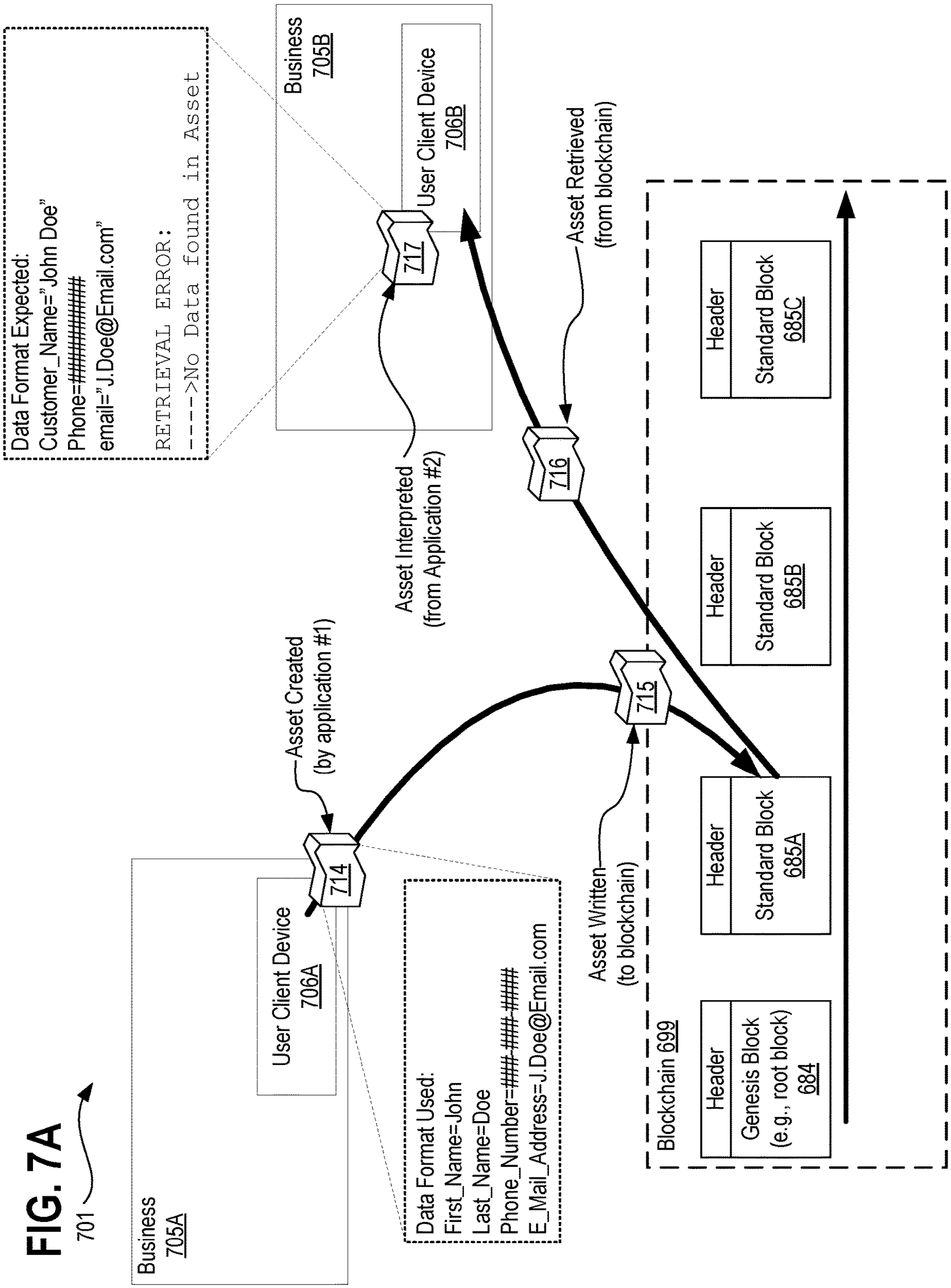
FIG. 7A depicts another exemplary architecture in accordance with described embodiments.

FIG. 7A depicts another exemplary architecture 701 in accordance with described embodiments.

Many customer organizations and businesses operate in a network-centric manner as they are obligated by the marketplace to solve customer problems. Therefore, it becomes necessary for businesses, including sometimes unrelated business organizations, to share data amongst one another on behalf of their customers.

Understandably, however, different businesses have a fundamental lack of trust in one another. Thus, many businesses find themselves in a situation today where they need to share data to satisfy their customers, and yet, they cannot trust that the other businesses with whom they share data can be trusted.

Distributed Ledger Technology and blockchain platforms specifically solve the issue of trust as is described above. This is true because data written onto the blockchain is immutable insomuch that updates may be provided, but the historical data is always accessible, and further still, all participating nodes for the blockchain cooperatively contribute to consensus based upon an agreed consensus model. The exception to this is the modified DLT technology discussed above for which a shared ledger (e.g., element 157 at FIG. 1C, et seq.) is hosted internally to a host organization and for which the host organization operates as the single and centralized trust authority, or alternatively for which trust determination is delegated to a customer organization operating a modified DLT shared ledger instance 157, pursuant to which the customer organization then determines for themselves who has access rights, such as what partner organizations or users, etc., have consent from the customer organization to access data in the modified DLT shared ledger.

Therefore, utilization of DLT technologies and blockchain technology specifically is considered to solve the issue of trust amongst businesses wishing to share data.

Notwithstanding the issue of trust having been largely solved, there remains two further obstacles which prevent adoption of the technology.

Firstly, adoption of blockchain is technologically complex and exceedingly difficult for most business to implement on their own. Even a technical evaluation of such data requires specialized computer programmers and developers having adequate skill in this particular area of expertise coupled with an understanding of the needs of the business, often provided by a technical business analyst, and then the procurement of additional computing infrastructure and either the development of a blockchain platform and protocol themselves or the identification and then participation with an existing public or private blockchain that meets the needs of the business. These developers must understand how to package and transact assets (sometimes called "coins") onto the blockchain and how to transfer those assets, within which their information of interest is embedded, between nodes and make such data available to other participating nodes on the blockchain, such that the information may be shared. Further still, there needs to be a consensus model by such a blockchain which is acceptable to the business. For these reasons alone, adoption of blockchain technologies, though promising, remains an insurmountable burden for many businesses.

Secondly, even assuming the above mentioned obstacles are overcome, there remains a significant problem with data standardization across applications for information which is written to, stored within, or persisted by the blockchain. For instance, even assuming a business manages to transact information to the blockchain and make that data accessible to another business, there simply is no guarantee whatsoever that the information written to the blockchain by a first business will be understandable by a second business. Therefore, the transportability of data amongst businesses wishing to share data presents another significant problem, due to the lack of standardization of data written onto the variously available blockchain platforms.

Consider the exemplary depiction shown here at FIG. 7, in which there are two businesses 705A and 705B, which have managed to agree to share data with one another and have successfully implemented the necessary computing architecture to transact with a blockchain 699.

With all data sharing agreements in place, business 705A creates an asset via its application #1 executing at the user client device 706A, and as depicted, embeds a customer record into that asset 714 which is to then be transacted onto the blockchain 699. As shown here, application #1 creates the asset with the following information:

Data Format Used:
First_Name=John
Last_Name=Doe
Phone_Number=###-###-####
E_Mail_Address=J.Doe@Email.com Notably, for this record, there are four fields, including "First_Name" and "Last_Name" followed by "Phone_Number" which has a particular format mask used as well in which there are hyphens "-" required in between certain digits, and finally an email address which has a field identifier of "E_Mail_Address."

Each of the various fields are then populated with data.

The created asset is then transacted onto the blockchain 699 as depicted by the asset written 715 onto the blockchain and at some later time, business 705B elects to retrieve the information via its own application #2.

As shown here, business 705B transacts with the blockchain and the asset retrieved 716 is successfully transmitted to the application #2 executing at user client device 706B.

All seems well, until the application #2 utilizes its own understanding of the data to interpret the asset 717 via the code executing at application #2, which expects the following information:

| Data Format Expected: |
|---|
| Customer_Name="John Doe"<br>Phone=##########<br>email="J.Doe@Email.com"<br>RETRIEVAL ERROR:<br>---->No Data Found in Asset |

As might be expected, application #2 encounters a retrieval error message: "No Data found in Asset."

This is the result when application #2 looks for a field named "Customer_Name" and yet there is no such field. Application #2 additionally looks for the field "Phone" and finds no such field, and finally searches for "email" and again finds no such field.

While a human reader may readily understand that "First_Name" with the value "John" represents a sub-portion of the field "Customer_Name," such logic simply is not available within applications and computing programs which simply search for the field name that they are instructed (e.g., programmed) to search for, which is "Customer_Name" and not a combination of "First_Name" and "Last_Name."

While such a conversion between the two field types would be trivial for any programmer, the fact remains that the two applications by each of the respective businesses are simply incompatible, and if they are to be made compatible, then custom translation for these fields needs to be programmed.

Fundamentally, the non-transferability of this date is due to a lack of data standardization. The two distinct application entities each are enabled to write to the blockchain and retrieve from it, and an agreement is in place between the businesses to share such data, and yet, the two entity applications lack the ability to share the data because there is no definition of what constitutes a customer's name. One application expects this to be a combination of "First_Name" and "Last_Name" fields whereas another application expects the field "Customer_Name" to be utilized as a single field for the customer's full name.

Figure 7B:
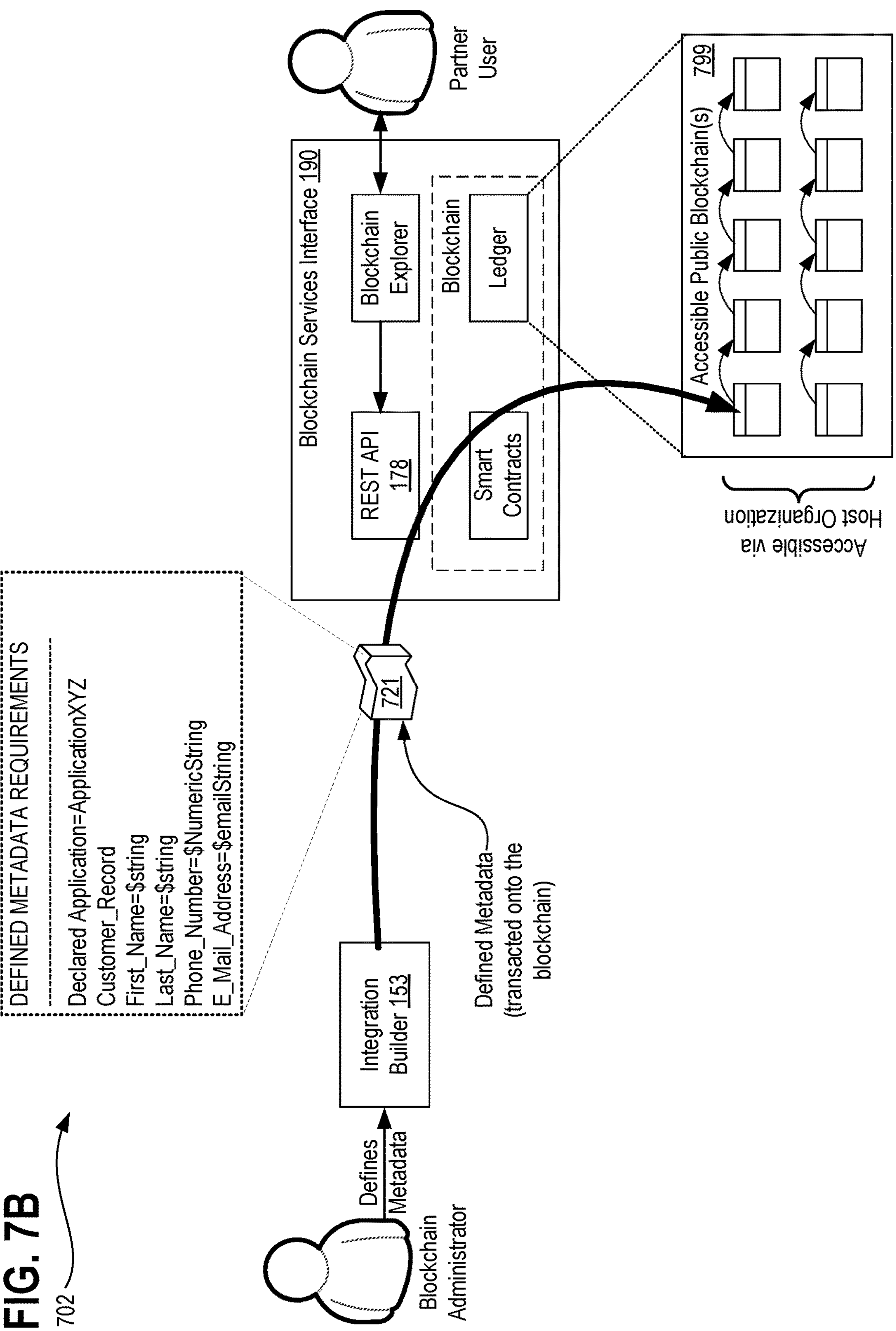
FIG. 7B depicts another exemplary architecture in accordance with described embodiments.

FIG. 7B depicts another exemplary architecture 702 in accordance with described embodiments.

In particular, there is now depicted a blockchain administrator defining metadata for the data utilized by an application which then standardizes the data which is written onto the blockchain on behalf of the two businesses, business 705A and business 705B.

As depicted here, the blockchain administrator defines metadata via the integration builder's GUIs or via the integration builder's API, and that defined metadata 721 is then pushed onto the specified blockchain 799.

Now, there is, transacted onto the blockchain, a clearly defined metadata specifying the requirements for the declared application "ApplicationXYZ" and specifically for the "Customer_Record," which is now structured as follows, as per the defined metadata:

| DEFINED METADATA REQUIREMENTS |
|---|
| Declared Application=ApplicationXYZ<br>Customer_Record<br>First_Name=$string<br>Last_Name=$string<br>Phone_Number=$NumericString<br>E_Mail_Address=$emailString |

Because the defined metadata 721 is transacted onto the blockchain, any application with permission to access data records on the blockchain 799 will be able to read and write data in compliance with the requirements specified by the defined metadata 721. This may be the specifically declared application, "ApplicationXYZ," or this may be other applications which utilized the data generated or managed by the declared application. Any application can read out the metadata 721 and operate in compliance with the requirements.

Figure 7C:
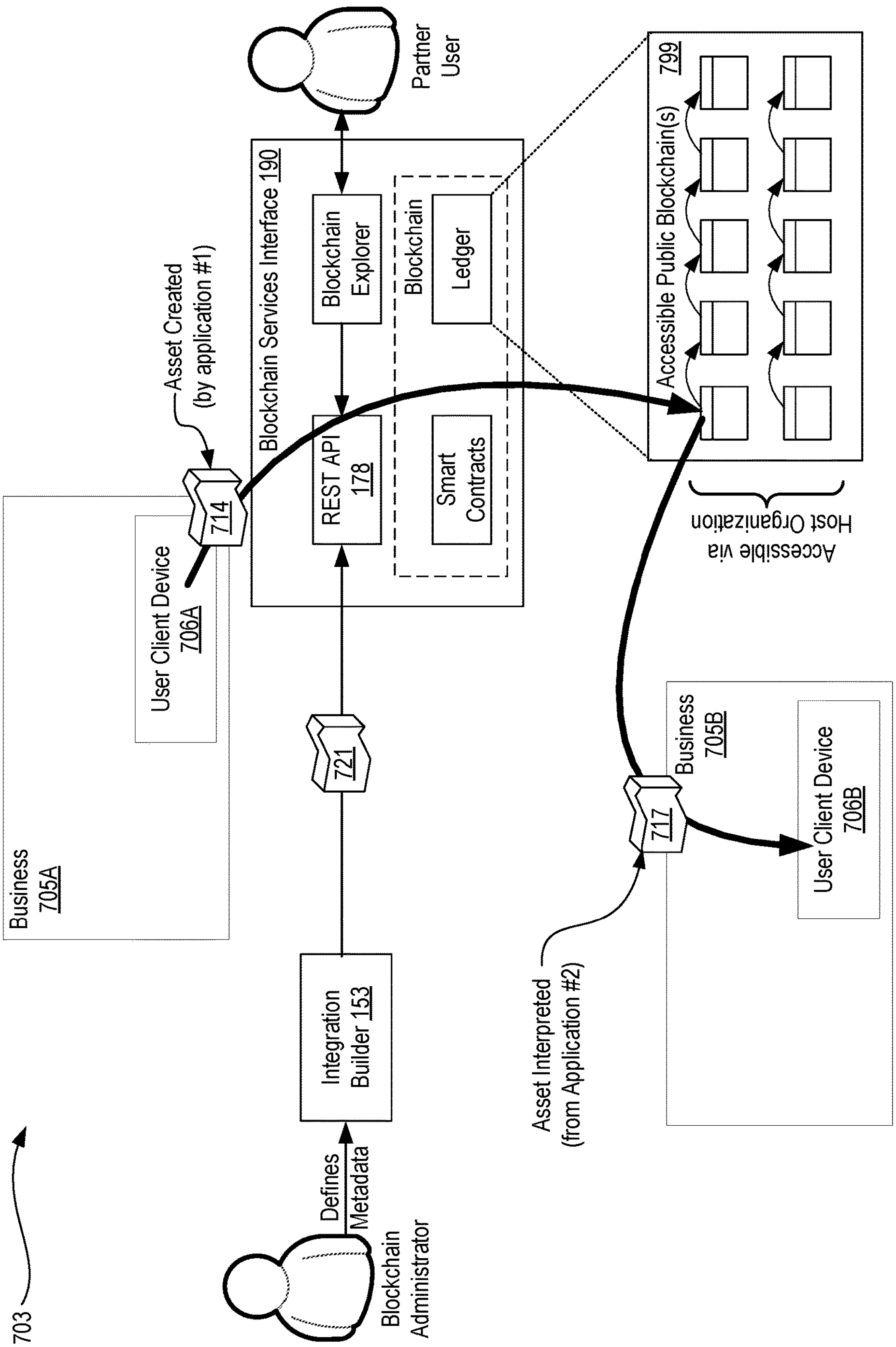
FIG. 7C depicts another exemplary architecture in accordance with described embodiments.

FIG. 7C depicts another exemplary architecture 703 in accordance with described embodiments.

In particular, it is now depicted that businesses 705A and 705B are enabled to share data transacted onto the blockchain 799 and because the defined metadata 721 specifies the requirements for formatting such data, the data written to the blockchain 799 and retrieved from the blockchain will embody a known format, and thus be transferable between the various businesses.

As shown here, the blockchain administrator defines the metadata via the blockchain services interface 240 which is transacted onto the blockchain, and then later, business 705A creates an asset 714 via application #1 and it writes that asset having the details of a customer record into the blockchain Subsequently, business 705B retrieves the asset from the blockchain and when the asset is interpreted 717 via application #2 executing at business 705B, that data is successfully interpreted and understood by the application because there is a known and defined metadata structure for the customer record data.

Therefore, according to a particular embodiment, there are operations by a system of a host organization that declare a new application and transact defined metadata for the new application onto a blockchain. For instance, such operations may include operating a blockchain interface to the blockchain on behalf of a plurality of tenants of the host organization, in which each one of the plurality of tenants operate as a participating node with access to the blockchain. Such operations may further include, receiving, from a user device communicably interfaced with the system, first input declaring the new application. Such operations may further include, receiving second input from the user device adding a plurality of network participants for the new application, in which the network participants are granted access rights to the new application. Such operations may further include, receiving third input from the user device declaring a plurality of entity types for the new application. Such operations may further include, receiving fourth input from the user device declaring one or more new field definitions for each of the plurality of entity types. Such operations may further include, generating a blockchain asset having encoded therein as the defined metadata for the new application, at least (i) the plurality of network participants declared, (ii) the plurality of entity types declared, and (iii) the one or more new field definitions declared for each of the plurality of entity types. Such operations may further include, transacting the blockchain asset having the defined metadata encoded therein for the new application onto the blockchain.

According to the operations of another embodiment, the blockchain asset has a defined transaction type; and in which the defined transaction type for the blockchain asset having the defined metadata encoded therein associates the defined metadata for the new application with a smart contract to execute data validation for any data transacted onto the blockchain for the new application; in which the smart contract validates the data transacted onto the blockchain for the new application is in compliance with the defined metadata for the new application transacted onto the blockchain.

According to another embodiment such operations may further include: receiving a transaction at the blockchain specifying data for the new application; and triggering a smart contract based on the received transaction specifying the data for the new application; and executing the smart contract to validate the specified data for the new application is in compliance with the defined metadata for the new application; and in which the transaction is rejected if the specified data is non-compliant with the defined metadata for the new application.

According to the operations of another embodiment, transacting the blockchain asset onto the blockchain includes: adding a transaction to a new block on the blockchain specifying the defined metadata for the new application as payload data for the transaction; subjecting the added transaction to consensus by participating nodes of the blockchain, in which the added transaction is subjected to a consensus protocol by the participating nodes of the blockchain prior to the added transaction being accepted as part of a primary chain of the blockchain by the participating nodes of the blockchain; and in which the defined metadata for the new application is persisted within an accepted transaction on a new block of the blockchain pursuant to successful consensus for the added transaction.

According to another embodiment such operations may further include: receiving new input at the system, in which the new input declares a second new application; and receiving additional input at the system selecting one of the plurality of entity types declared for the first new application as a selected entity type for the second new application, in which the selected entity type inherits the one or more new field definitions as specified via the defined metadata for the respective one or more entity types associated with the first new application.

According to the operations of another embodiment, multiple different declared applications specify at least one of the plurality of entity types declared for the first new application as a selected entity type for the multiple different declared applications; and in which a single instance of the defined metadata corresponding to the respective one of the plurality of entity types declared for the first new application and all of the one or more new field definitions associated with the respective entity type declared for the first new application controls both (i) the respective one of the plurality of entity types declared for the first new application and (ii) the selected entity type for all of the multiple different declared applications having selected the respective entity type declared for the first application.

According to the operations of another embodiment, receiving the fourth input from the user device declaring one or more new field definitions for each of the plurality of entity types further includes receiving the fourth input defining a field definition type for each of the one or more new field definitions; and in which each field definition type is selected from the group including: integer, Boolean, numeric, alphanumeric, date, hyperlink, computed, or custom.

According to another embodiment such operations may further include: authenticating the user device with the host organization as being associated with one of the plurality of tenants; and in which the one of the plurality of tenant is a subscriber to cloud based on-demand services provided by the host organization over a public Internet.

According to another embodiment such operations may further include: executing an event listener to monitor any changes to the blockchain associated with the new application; and triggering an event when the changes to the blockchain associated with the new application are observed by the event listener.

According to another embodiment such operations may further include: receiving fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and monitoring, via an event listener, for any change to the blockchain meeting the specified event and the one or more event conditions.

According to the operations of another embodiment, each network participant is granted access rights to the new application and to data on the blockchain associated with the new application.

According to the operations of another embodiment, each of the plurality of network participants are selected from among the group including: a user of the host organization associated with one of the plurality of tenants of the host organization; a partner user corresponding to one of the plurality of tenants of the host organization; a customer organization corresponding to one of the plurality of tenants of the host organization; a non-user of the host organization; a partner organization which is not one of the plurality of tenants of the host organization; and one or more participating nodes on the blockchain which correspond to either a tenant of the host organization or a customer organization which subscribes to cloud computing services from the host organization; and one or more participating nodes on the blockchain which do not subscribe to cloud computing services from the host organization.

According to the operations of another embodiment, receiving the first input from the user device declaring the application further includes: receiving with the first input for the new application declared one or both of specified administrative control for the new application or ownership for the new application declared.

According to another embodiment such operations may further include: receiving instructions to deploy the new application declared and the defined metadata for the new application onto the blockchain; and in which transacting the blockchain asset having the defined metadata encoded therein for the new application onto the blockchain includes deploying the new application and the defined metadata via the blockchain responsive to receiving the instructions to deploy.

According to the operations of another embodiment, receiving the inputs defining each of (i) the plurality of network participants declared, (ii) the plurality of entity types declared, and (iii) the one or more new field definitions declared for each of the plurality of entity types includes receiving the inputs as programming code via an API at a blockchain metadata definition manager exposed by the host organization.

According to another embodiment such operations may further include: transmitting a GUI to the user device from a blockchain metadata definition manager, in which the GUI prompts for the inputs defining each of (i) the plurality of network participants declared, (ii) the plurality of entity types declared, and (iii) the one or more new field definitions declared for each of the plurality of entity types; in which the inputs are received at the GUI via one or more interactive click events, drag events, drop down selection events, text input events, and touch events; and in which receiving the inputs includes receiving the inputs from the GUI transmitted to the user device.

According to the operations of another embodiment, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

According to another embodiment such operations may further include: receiving an SQL query at a receive interface requesting data associated with the new application; translating the SQL query into native blockchain executable code via an Apex translator engine at the host organization; executing the native blockchain executable code against the blockchain to retrieve the data requested; and returning the data requested responsive to receipt of the SQL query.

According to another embodiment such operations may further include: generating a virtual table within a database system of the host organization; and structuring the virtual table at the database system of the host organization based on the metadata declared for the new application; in which entity types are represented as tables within the virtual table and further in which the one or more new field definitions declared for each of the plurality of more entity types for the new application are represented as columns within the tables at the virtual table.

According to the operations of another embodiment, the virtual table includes a materialized view hosted at the database system of the host organization structured based on the metadata declared for the new application; and in which the materialized view hosted at the database system of the host organization does not store any data associated with the new application; and in which SQL queries requesting read-only access are processed against the materialized view by translating the read-only SQL queries into a blockchain transaction to retrieve the requested data associated with the new application from the blockchain.

According to another embodiment such operations may further include: retrieving the defined metadata for the new application from the blockchain, including plurality of entity types declared for the new application, the one or more new field definitions declared for each of the plurality of entity types, and any field types applied to the one or more new field definitions; generating a materialized view of the data persisted with the blockchain within a virtual table at the host organization by structuring the virtual table based on the defined metadata for the new application; in which the materialized view represents the structure of the data associated with the new application which is persisted to the blockchain without storing the data associated with the new application within the materialized view at the host organization.

According to another embodiment such operations may further include: receiving, at the host organization, an SQL statement from a user device, in which the SQL statement is directed toward the materialized view requesting an SQL update or an SQL insert for the data persisted to the blockchain and associated with the new application; processing the SQL statement against the materialized view by translating the SQL statement requesting the SQL update or the SQL insert into a corresponding blockchain transaction to update or add the data associated with the new application at the blockchain; and issuing an acknowledgement to the user device confirming successful processing of the SQL statement against the materialized view pursuant to the corresponding blockchain transaction being accepted by consensus to the blockchain and successfully updating or adding the data associated with the new application at the blockchain.

According to another embodiment such operations may further include: receiving an SQL statement directed toward the materialized view at the host organization; in which the SQL statement specifies one or more of (i) a SELECT from SQL statement, (ii) an INSERT into SQL statement, and (iii) an UPDATE set SQL statement; and in which the SQL statement received is processed by translating the SQL statement into a corresponding blockchain transaction and executing the corresponding blockchain transaction against the blockchain in fulfillment of the SQL statement directed toward the materialized view at the host organization.

According to another embodiment such operations may further include: in which the metadata defined for the new application represents user specified relationships between two or more of the plurality of entity types by linking together assets at the blockchain.

According to another embodiment such operations may further include: declaring, at the host organization, new business logic for the new application within a table structure having one or more relationships between elements of the new business logic and one or more of the plurality of entity types for the new application; and defining the new business logic any all relationships within the metadata persisted to the blockchain.

According to another embodiment such operations may further include: executing an event listener to monitor for any changes to the defined metadata for the new application at the blockchain; and triggering an event when the changes to the metadata for the new application at the blockchain are observed by the event listener; and in which the triggered event automatically pushes a metadata update to the host organization to update a materialized view of the data associated with the new application by re-structuring the materialized view at the host organization based on the metadata update triggered by the event listener.

According to the operations of another embodiment, triggering the event via the event listener based on changes to the metadata for the new application further includes: triggering one or more of: a business user defined process flow to execute responsive to changes to the defined metadata persisted to the blockchain; a business user defined data retrieval operation to execute responsive to changes to the defined metadata persisted to the blockchain; a business user defined data filtering operation to execute responsive to changes to the defined metadata persisted to the blockchain; an administrator defined process flow to update a data analytics feed responsive to changes to the defined metadata persisted to the blockchain; and an administrator defined process flow to update an Artificial Intelligence (AI) training data stream responsive to changes to the defined metadata persisted to the blockchain.

According to a particular embodiment, there is non-transitory computer-readable storage media having instructions stored thereupon that, when executed by a processor of a system having at least a processor and a memory therein, the instructions cause the system to perform operations including: operating a blockchain interface to the blockchain on behalf of a plurality of tenants of the host organization, in which each one of the plurality of tenants operate as a participating node with access to the blockchain; receiving, from a user device communicably interfaced with the system, first input declaring a new application; receiving second input from the user device adding a plurality of network participants for the new application, in which the network participants are granted access rights to the new application; receiving third input from the user device declaring a plurality of entity types for the new application; receiving fourth input from the user device declaring one or more new field definitions for each of the plurality of entity types; generating a blockchain asset having encoded therein as the defined metadata for the new application, at least (i) the plurality of network participants declared, (ii) the plurality of entity types declared, and (iii) the one or more new field definitions declared for each of the plurality of entity types; and transacting the blockchain asset having the defined metadata encoded therein for the new application onto the blockchain.

According to yet another embodiment, there is a system to execute at a host organization, in which the system includes: a memory to store instructions; a processor to execute instructions; in which the processor is to execute a blockchain services interface on behalf of on behalf of a plurality of tenants of the host organization, in which each one of the plurality of tenants operate as a participating node with access to the blockchain; a receive interface to receive first input from a user device communicably interfaced with the system, the received first input declaring a new application; the receive interface to further receive second input from the user device adding a plurality of network participants for the new application, in which the network participants are granted access rights to the new application; the receive interface to further receive third input from the user device declaring a plurality of entity types for the new application; the receive interface to further receive fourth input from the user device declaring one or more new field definitions for each of the plurality of entity types; a blockchain services interface to generate a blockchain asset having encoded therein as the defined metadata for the new application, at least (i) the plurality of network participants declared, (ii) the plurality of entity types declared, and (iii) the one or more new field definitions declared for each of the plurality of entity types; and in which the blockchain services interface further is to transact the blockchain asset having the defined metadata encoded therein for the new application onto the blockchain.

According to the embodiment of the system, the receive interface is further to receive fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and in which the system further includes an event listener, in which the event listener is to monitor for any change to the blockchain meeting the specified event and the one or more event conditions and trigger the declared event responsive to a monitored change on the blockchain.

Therefore, according to a particular embodiment, there are operations by a system of a host organization that declare a new application and transact defined metadata for the new application onto a blockchain. For instance, such operations may include operating a blockchain interface to the blockchain on behalf of a plurality of tenants of the host organization, in which each one of the plurality of tenants operate as a participating node with access to the blockchain. Such operations may further include, receiving, from a user device communicably interfaced with the system, first input declaring the new application. Such operations may further include, receiving second input from the user device adding a plurality of network participants for the new application, in which the network participants are granted access rights to the new application. Such operations may further include, receiving third input from the user device declaring a plurality of entity types for the new application. Such operations may further include, receiving fourth input from the user device declaring one or more new field definitions for each of the plurality of entity types. Such operations may further include, generating a blockchain asset having encoded therein as the defined metadata for the new application, at least (i) the plurality of network participants declared, (ii) the plurality of entity types declared, and (iii) the one or more new field definitions declared for each of the plurality of entity types. Such operations may further include, transacting the blockchain asset having the defined metadata encoded therein for the new application onto the blockchain.

According to the operations of another embodiment, the blockchain asset has a defined transaction type; and in which the defined transaction type for the blockchain asset having the defined metadata encoded therein associates the defined metadata for the new application with a smart contract to execute data validation for any data transacted onto the blockchain for the new application; in which the smart contract validates the data transacted onto the blockchain for the new application is in compliance with the defined metadata for the new application transacted onto the blockchain.

According to another embodiment such operations may further include: receiving a transaction at the blockchain specifying data for the new application; and triggering a smart contract based on the received transaction specifying the data for the new application; and executing the smart contract to validate the specified data for the new application is in compliance with the defined metadata for the new application; and in which the transaction is rejected if the specified data is non-compliant with the defined metadata for the new application.

According to the operations of another embodiment, transacting the blockchain asset onto the blockchain includes: adding a transaction to a new block on the blockchain specifying the defined metadata for the new application as payload data for the transaction; subjecting the added transaction to consensus by participating nodes of the blockchain, in which the added transaction is subjected to a consensus protocol by the participating nodes of the blockchain prior to the added transaction being accepted as part of a primary chain of the blockchain by the participating nodes of the blockchain; and in which the defined metadata for the new application is persisted within an accepted transaction on a new block of the blockchain pursuant to successful consensus for the added transaction.

According to another embodiment such operations may further include: receiving new input at the system, in which the new input declares a second new application; and receiving additional input at the system selecting one of the plurality of entity types declared for the first new application as a selected entity type for the second new application, in which the selected entity type inherits the one or more new field definitions as specified via the defined metadata for the respective one or more entity types associated with the first new application.

According to the operations of another embodiment, multiple different declared applications specify at least one of the plurality of entity types declared for the first new application as a selected entity type for the multiple different declared applications; and in which a single instance of the defined metadata corresponding to the respective one of the plurality of entity types declared for the first new application and all of the one or more new field definitions associated with the respective entity type declared for the first new application controls both (i) the respective one of the plurality of entity types declared for the first new application and (ii) the selected entity type for all of the multiple different declared applications having selected the respective entity type declared for the first application.

According to the operations of another embodiment, receiving the fourth input from the user device declaring one or more new field definitions for each of the plurality of entity types further includes receiving the fourth input defining a field definition type for each of the one or more new field definitions; and in which each field definition type is selected from the group including: integer, Boolean, numeric, alphanumeric, date, hyperlink, computed, or custom.

According to another embodiment such operations may further include: authenticating the user device with the host organization as being associated with one of the plurality of tenants; and in which the one of the plurality of tenant is a subscriber to cloud based on-demand services provided by the host organization over a public Internet.

According to another embodiment such operations may further include: executing an event listener to monitor any changes to the blockchain associated with the new application; and triggering an event when the changes to the blockchain associated with the new application are observed by the event listener.

According to another embodiment such operations may further include: receiving fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and monitoring, via an event listener, for any change to the blockchain meeting the specified event and the one or more event conditions.

According to the operations of another embodiment, each network participant is granted access rights to the new application and to data on the blockchain associated with the new application.

According to the operations of another embodiment, each of the plurality of network participants are selected from among the group including: a user of the host organization associated with one of the plurality of tenants of the host organization; a partner user corresponding to one of the plurality of tenants of the host organization; a customer organization corresponding to one of the plurality of tenants of the host organization; a non-user of the host organization; a partner organization which is not one of the plurality of tenants of the host organization; and one or more participating nodes on the blockchain which correspond to either a tenant of the host organization or a customer organization which subscribes to cloud computing services from the host organization; and one or more participating nodes on the blockchain which do not subscribe to cloud computing services from the host organization.

According to the operations of another embodiment, receiving the first input from the user device declaring the application further includes: receiving with the first input for the new application declared one or both of specified administrative control for the new application or ownership for the new application declared.

According to another embodiment such operations may further include: receiving instructions to deploy the new application declared and the defined metadata for the new application onto the blockchain; and in which transacting the blockchain asset having the defined metadata encoded therein for the new application onto the blockchain includes deploying the new application and the defined metadata via the blockchain responsive to receiving the instructions to deploy.

According to the operations of another embodiment, receiving the inputs defining each of (i) the plurality of network participants declared, (ii) the plurality of entity types declared, and (iii) the one or more new field definitions declared for each of the plurality of entity types includes receiving the inputs as programming code via an API at a blockchain metadata definition manager exposed by the host organization.

According to another embodiment such operations may further include: transmitting a GUI to the user device from a blockchain metadata definition manager, in which the GUI prompts for the inputs defining each of (i) the plurality of network participants declared, (ii) the plurality of entity types declared, and (iii) the one or more new field definitions declared for each of the plurality of entity types; in which the inputs are received at the GUI via one or more interactive click events, drag events, drop down selection events, text input events, and touch events; and in which receiving the inputs includes receiving the inputs from the GUI transmitted to the user device.

According to the operations of another embodiment, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

According to another embodiment such operations may further include: receiving an SQL query at a receive interface requesting data associated with the new application; translating the SQL query into native blockchain executable code via an Apex translator engine at the host organization; executing the native blockchain executable code against the blockchain to retrieve the data requested; and returning the data requested responsive to receipt of the SQL query.

According to another embodiment such operations may further include: generating a virtual table within a database system of the host organization; and structuring the virtual table at the database system of the host organization based on the metadata declared for the new application; in which entity types are represented as tables within the virtual table and further in which the one or more new field definitions declared for each of the plurality of more entity types for the new application are represented as columns within the tables at the virtual table.

According to the operations of another embodiment, the virtual table includes a materialized view hosted at the database system of the host organization structured based on the metadata declared for the new application; and in which the materialized view hosted at the database system of the host organization does not store any data associated with the new application; and in which SQL queries requesting read-only access are processed against the materialized view by translating the read-only SQL queries into a blockchain transaction to retrieve the requested data associated with the new application from the blockchain.

According to another embodiment such operations may further include: retrieving the defined metadata for the new application from the blockchain, including plurality of entity types declared for the new application, the one or more new field definitions declared for each of the plurality of entity types, and any field types applied to the one or more new field definitions; generating a materialized view of the data persisted with the blockchain within a virtual table at the host organization by structuring the virtual table based on the defined metadata for the new application; in which the materialized view represents the structure of the data associated with the new application which is persisted to the blockchain without storing the data associated with the new application within the materialized view at the host organization.

According to another embodiment such operations may further include: receiving, at the host organization, an SQL statement from a user device, in which the SQL statement is directed toward the materialized view requesting an SQL update or an SQL insert for the data persisted to the blockchain and associated with the new application; processing the SQL statement against the materialized view by translating the SQL statement requesting the SQL update or the SQL insert into a corresponding blockchain transaction to update or add the data associated with the new application at the blockchain; and issuing an acknowledgement to the user device confirming successful processing of the SQL statement against the materialized view pursuant to the corresponding blockchain transaction being accepted by consensus to the blockchain and successfully updating or adding the data associated with the new application at the blockchain.

According to another embodiment such operations may further include: receiving an SQL statement directed toward the materialized view at the host organization; in which the SQL statement specifies one or more of (i) a SELECT from SQL statement, (ii) an INSERT into SQL statement, and (iii) an UPDATE set SQL statement; and in which the SQL statement received is processed by translating the SQL statement into a corresponding blockchain transaction and executing the corresponding blockchain transaction against the blockchain in fulfillment of the SQL statement directed toward the materialized view at the host organization.

According to another embodiment such operations may further include: in which the metadata defined for the new application represents user specified relationships between two or more of the plurality of entity types by linking together assets at the blockchain.

According to another embodiment such operations may further include: declaring, at the host organization, new business logic for the new application within a table structure having one or more relationships between elements of the new business logic and one or more of the plurality of entity types for the new application; and defining the new business logic any all relationships within the metadata persisted to the blockchain.

According to another embodiment such operations may further include: executing an event listener to monitor for any changes to the defined metadata for the new application at the blockchain; and triggering an event when the changes to the metadata for the new application at the blockchain are observed by the event listener; and in which the triggered event automatically pushes a metadata update to the host organization to update a materialized view of the data associated with the new application by re-structuring the materialized view at the host organization based on the metadata update triggered by the event listener.

According to the operations of another embodiment, triggering the event via the event listener based on changes to the metadata for the new application further includes: triggering one or more of: a business user defined process flow to execute responsive to changes to the defined metadata persisted to the blockchain; a business user defined data retrieval operation to execute responsive to changes to the defined metadata persisted to the blockchain; a business user defined data filtering operation to execute responsive to changes to the defined metadata persisted to the blockchain; an administrator defined process flow to update a data analytics feed responsive to changes to the defined metadata persisted to the blockchain; and an administrator defined process flow to update an Artificial Intelligence (AI) training data stream responsive to changes to the defined metadata persisted to the blockchain.

According to a particular embodiment, there is non-transitory computer-readable storage media having instructions stored thereupon that, when executed by a processor of a system having at least a processor and a memory therein, the instructions cause the system to perform operations including: operating a blockchain interface to the blockchain on behalf of a plurality of tenants of the host organization, in which each one of the plurality of tenants operate as a participating node with access to the blockchain; receiving, from a user device communicably interfaced with the system, first input declaring a new application; receiving second input from the user device adding a plurality of network participants for the new application, in which the network participants are granted access rights to the new application; receiving third input from the user device declaring a plurality of entity types for the new application; receiving fourth input from the user device declaring one or more new field definitions for each of the plurality of entity types; generating a blockchain asset having encoded therein as the defined metadata for the new application, at least (i) the plurality of network participants declared, (ii) the plurality of entity types declared, and (iii) the one or more new field definitions declared for each of the plurality of entity types; and transacting the blockchain asset having the defined metadata encoded therein for the new application onto the blockchain.

According to yet another embodiment, there is a system to execute at a host organization, in which the system includes: a memory to store instructions; a processor to execute instructions; in which the processor is to execute a blockchain services interface on behalf of on behalf of a plurality of tenants of the host organization, in which each one of the plurality of tenants operate as a participating node with access to the blockchain; a receive interface to receive first input from a user device communicably interfaced with the system, the received first input declaring a new application; the receive interface to further receive second input from the user device adding a plurality of network participants for the new application, in which the network participants are granted access rights to the new application; the receive interface to further receive third input from the user device declaring a plurality of entity types for the new application; the receive interface to further receive fourth input from the user device declaring one or more new field definitions for each of the plurality of entity types; a blockchain services interface to generate a blockchain asset having encoded therein as the defined metadata for the new application, at least (i) the plurality of network participants declared, (ii) the plurality of entity types declared, and (iii) the one or more new field definitions declared for each of the plurality of entity types; and in which the blockchain services interface further is to transact the blockchain asset having the defined metadata encoded therein for the new application onto the blockchain.

According to the embodiment of the system, the receive interface is further to receive fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and in which the system further includes an event listener, in which the event listener is to monitor for any change to the blockchain meeting the specified event and the one or more event conditions and trigger the declared event responsive to a monitored change on the blockchain.

FIG. 8A depicts another exemplary architecture 801 in accordance with described embodiments.

As shown here, there is a GUI 810 executing at a computing device 899, such as a user device of the blockchain administrator, with the GUI 810 being pushed to the computing device 800 by the blockchain metadata definition manager 246 of the host organization.

As shown here, the blockchain administrator may view the deployed applications as shown at the top of the GUI 810 and by clicking the "new" button at the GUI 810, the declarative capability is provided for the blockchain administrator to declare a new application. While depicted here is the declaration of a new application via the GUI 810, the blockchain administrator may alternatively utilize an API provided via the blockchain metadata definition manager 246 to create the new application.

Figure 8B:
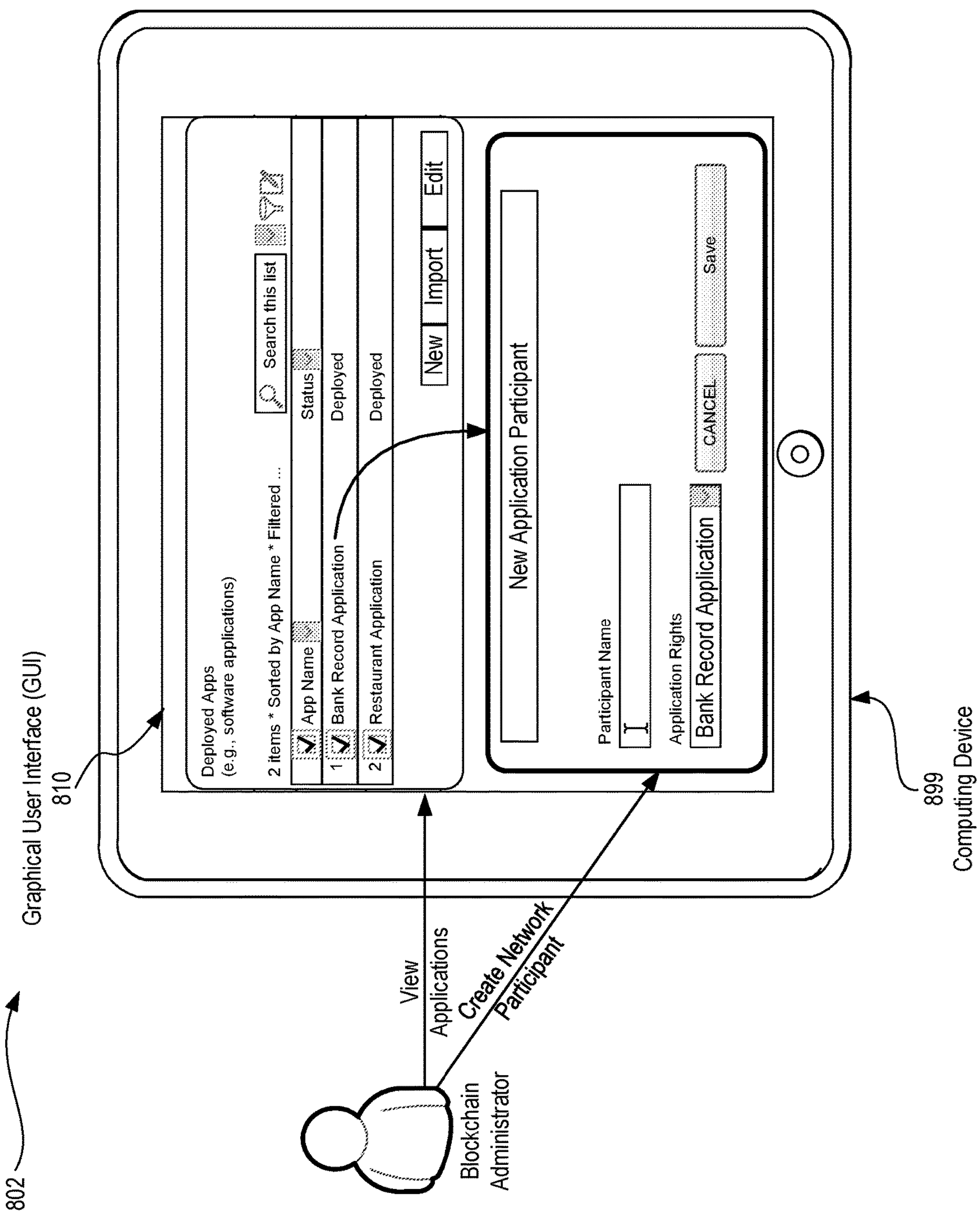
FIG. 8B depicts another exemplary architecture in accordance with described embodiments.

FIG. 8B depicts another exemplary architecture 802 in accordance with described embodiments.

In addition to the declaration of the new application or declaring the new application, there is additionally the ability for the blockchain administrator to define what participants have access to the data associated with this particular application, thus defining the network participants for this newly declared application.

Figure 8C:
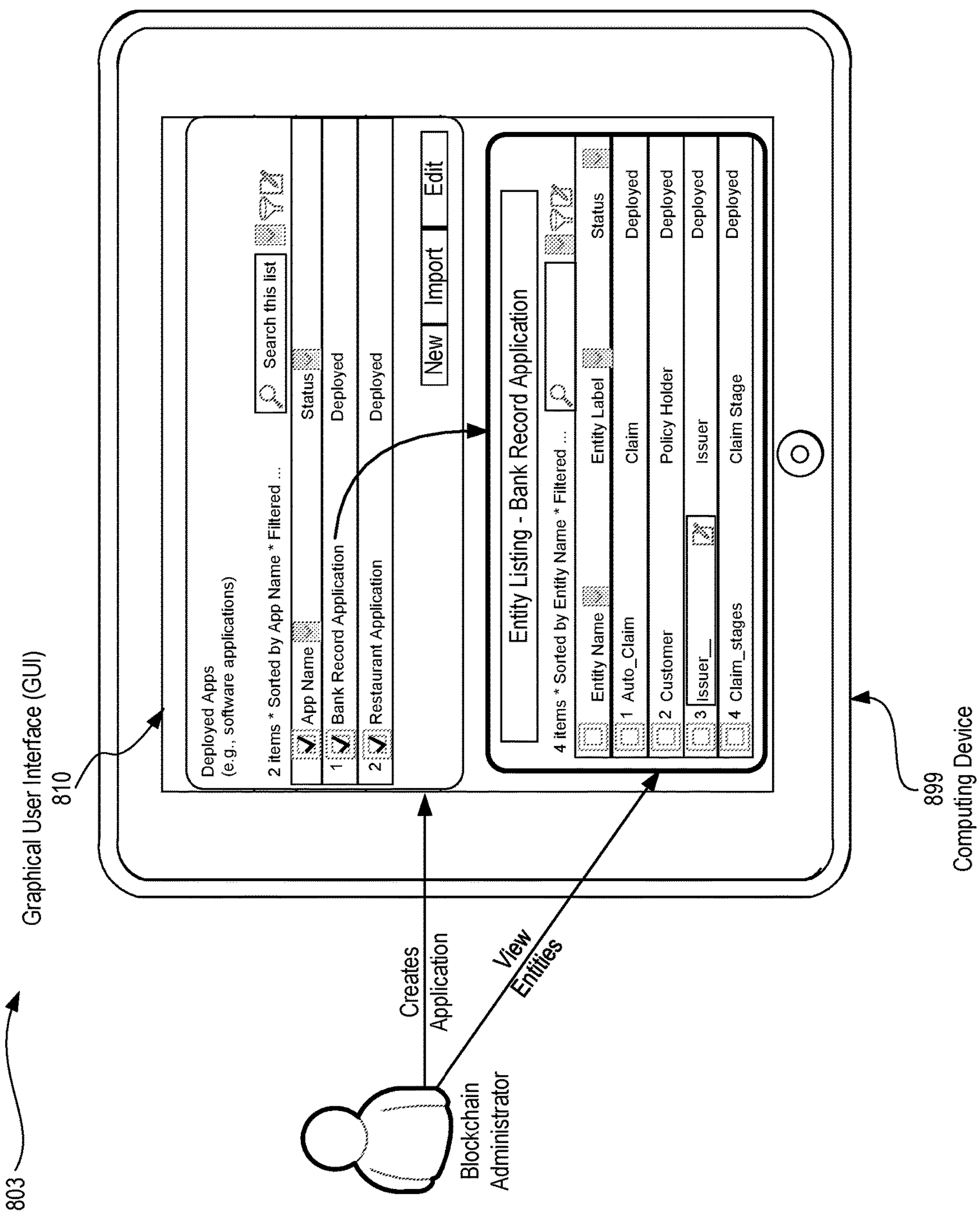
FIG. 8C depicts another exemplary architecture in accordance with described embodiments.

FIG. 8C depicts another exemplary architecture 803 in accordance with described embodiments.

There is again depicted the GUI 810, however, now depicted is the blockchain administrator viewing and editing entities for the "bank record application" by clicking on that application.

Thus, the blockchain administrator may first declare or create a new "application" and then once created, the blockchain administrator may edit or view that application and may create or declare new "entities" within the application, with each declarative entity defining the metadata for a particular custom field within which the application may ultimately store information in compliance with the defined metadata and which other applications may also interact with such data and reference such data, and possibly update, add to, or delete such data where adequate permissions exist, but again, doing so in compliance with the defined metadata.

For example, there is defined here for the bank record application, a "claim" having the entity name "Auto_Claim" and thus, any application wishing to write information to the blockchain pertaining to claims, at least to the extent such information will be utilized by the bank record application, then it is necessary to comply with the requirements of the defined entity "Auto_Claim."

Figure 8D:
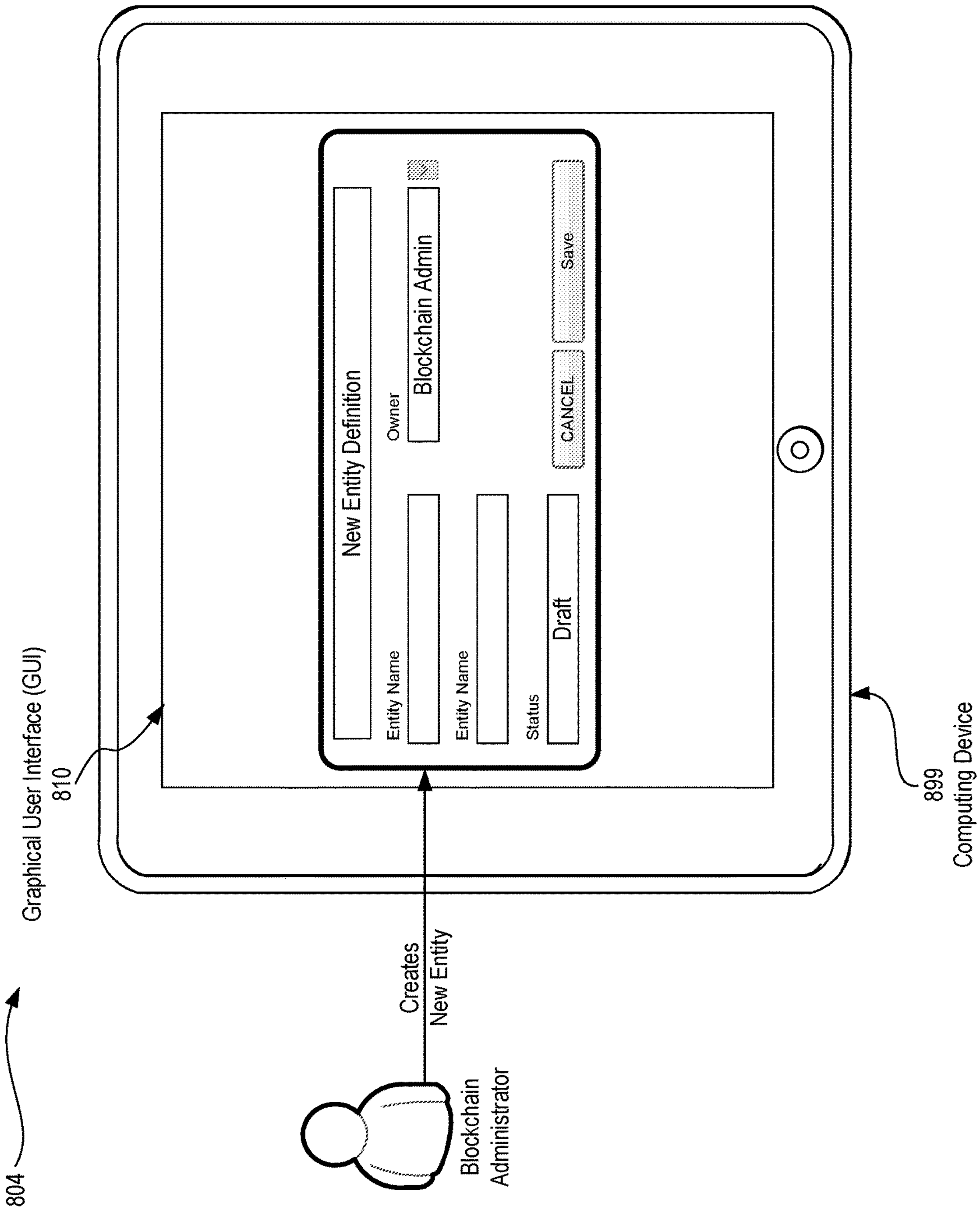
FIG. 8D depicts another exemplary architecture in accordance with described embodiments.

FIG. 8D depicts another exemplary architecture 804 in accordance with described embodiments.

Depicted here is a GUI 810 resulting from the blockchain administrator clicking on the "new" button on the prior screen to declare and create a new entity within the newly created application, or within a viewed application.

As shown here, there is a "New Entity Definition" GUI presented, in which the blockchain administrator can now create a new entity by entering the entity name, entity label, and selecting an owner for the entity, which be default is the user creating the entity. Clicking save then creates and declares this new entity. The blockchain administrator may additionally change the status to "deployed" and once saved, the entity will be transacted onto the blockchain, whereas in draft status, it will be retained only at the host organization's blockchain metadata definition manager 246.

According to a particular embodiment, every GUI has a corresponding API via which to interact with the blockchain metadata definition manager 246.

Figure 8E:
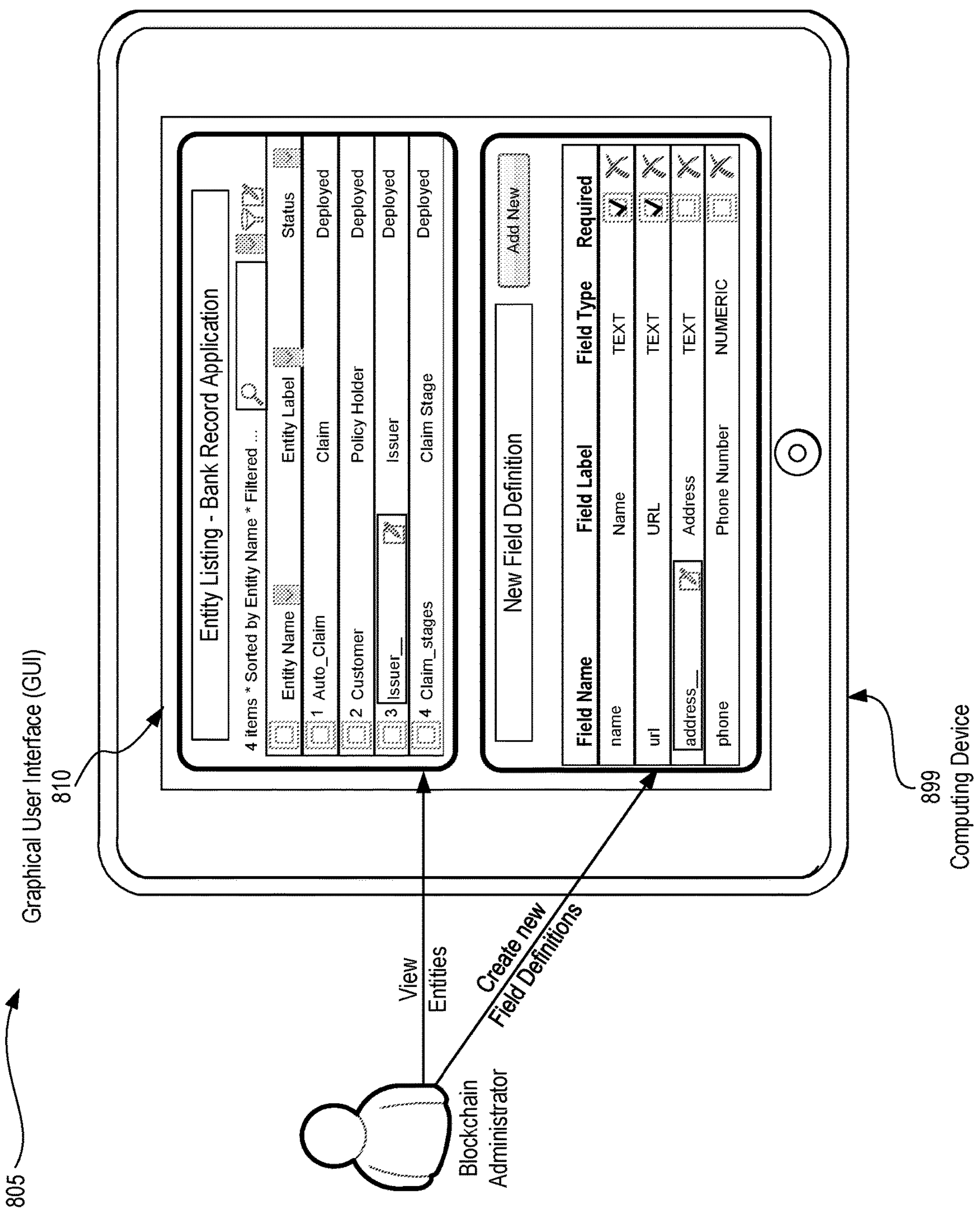
FIG. 8E depicts another exemplary architecture in accordance with described embodiments.

FIG. 8E depicts another exemplary architecture 805 in accordance with described embodiments.

Clicking on an existing entity, including the one just created at the prior GUI 810 as depicted at FIG. 8D, will result in the Field Definition GUI being presented, via which the blockchain administrator may now create any number of fields which are to be stored within that particular entity.

By way of analogy, it may be helpful to think of the declared application as a computer program, albeit one that runs via the cloud, and the declarative entities as tables comparable to tables in a relational database, and finally the declarative fields as column identifiers or populatable fields within a table, and lastly, the collection of fields would thus form a record. While the comparison is not exact, relationships between the various declarative elements and the metadata defined for them should help to illustrate their use.

Because the defined metadata specifies precisely what data is permissible, and the format and type of that data, any permitted application may then both successfully write information to the blockchain in a predictable and predefined format as specified by the metadata and additionally, applications with whom they are sharing may also successfully retrieve the information from the blockchain, knowing based on the defined metadata, how that information is supposed to look, and be structured, and thus how that information is to be interpreted.

Because the information is defined in blockchain via the metadata, all the participants know what each element of data means, based on the defined metadata, and therefore, for that network of participants, all participating nodes can share information via the blockchain.

Moreover, the participants are not restricted to the existing metadata transacted onto the blockchain, but they may create additional elements, create new metadata definitions, alter metadata definitions, etc.

For example, Bank Wells Fargo may decide that they, as a participant, require a new entity having fields X, Y, and Z. That participant may therefore define that metadata for the new entity (via the API or the GUI) having the fields X, Y, and Z, and then transact that new entity onto the blockchain.

The new entity will then be subjected to consensus by the other participating nodes. If the other participating nodes disagree, then consensus is not reached, and the change is negated. However, if consensus is reached, then the new entity having fields X, Y, and Z is transacted onto the blockchain by writing the defined metadata for that new entity onto the blockchain within a consensus block, or stated differently, the entity having already been written onto the blockchain, once consensus is attained, becomes a part of the "primary" chain on the blockchain which is accepted by all participants as the main chain.

According to another embodiment, smart contracts are executed for transactions on the blockchain which attempt to write or update data on the blockchain for an entity having defined metadata. For instance, there may be a trigger which causes the execution of the smart contract, in which case the smart contract retrieves or applies the defined metadata to validate that every field within the entity has a data type, data naming compliance, and a date mask which is in compliance with the requirements of the defined metadata.

Where the smart contract enforces the defined metadata, any transaction which fails compliance is either prohibited from being transacted onto the blockchain or if written to the blockchain, the transaction will never be accepted into a block on the main chain as the smart contract validation failure will prevent the transaction from reaching consensus for acceptance.

Thus, through the use of the described GUIs, it is possible for business users lacking programming and program development expertise to nevertheless declare a new application and declare new entity names as well as declaratively create new field definitions for those entity names. For those with greater technical expertise, they may utilize the APIs to interact with the blockchain metadata definition manager 246, if it is preferable for them to do so.

Regardless of the method chosen, the blockchain administrator can declaratively create a new application, new entities, and new field definitions, all without writing any code whatsoever, and the blockchain metadata definition manager 246 will then transact the defined metadata for the new application, the new entity, and/or the new field definitions onto the blockchain for voting and consensus.

Until consensus is reached, the defined metadata cannot be utilized. However, once transacted onto the blockchain and consensus is reached, then other participating nodes or participants on the blockchain can interact with all data for the declared application and the smart contract execution by the blockchain services interface 240 will force or mandate compliance with those interactions.

Figure 8F:
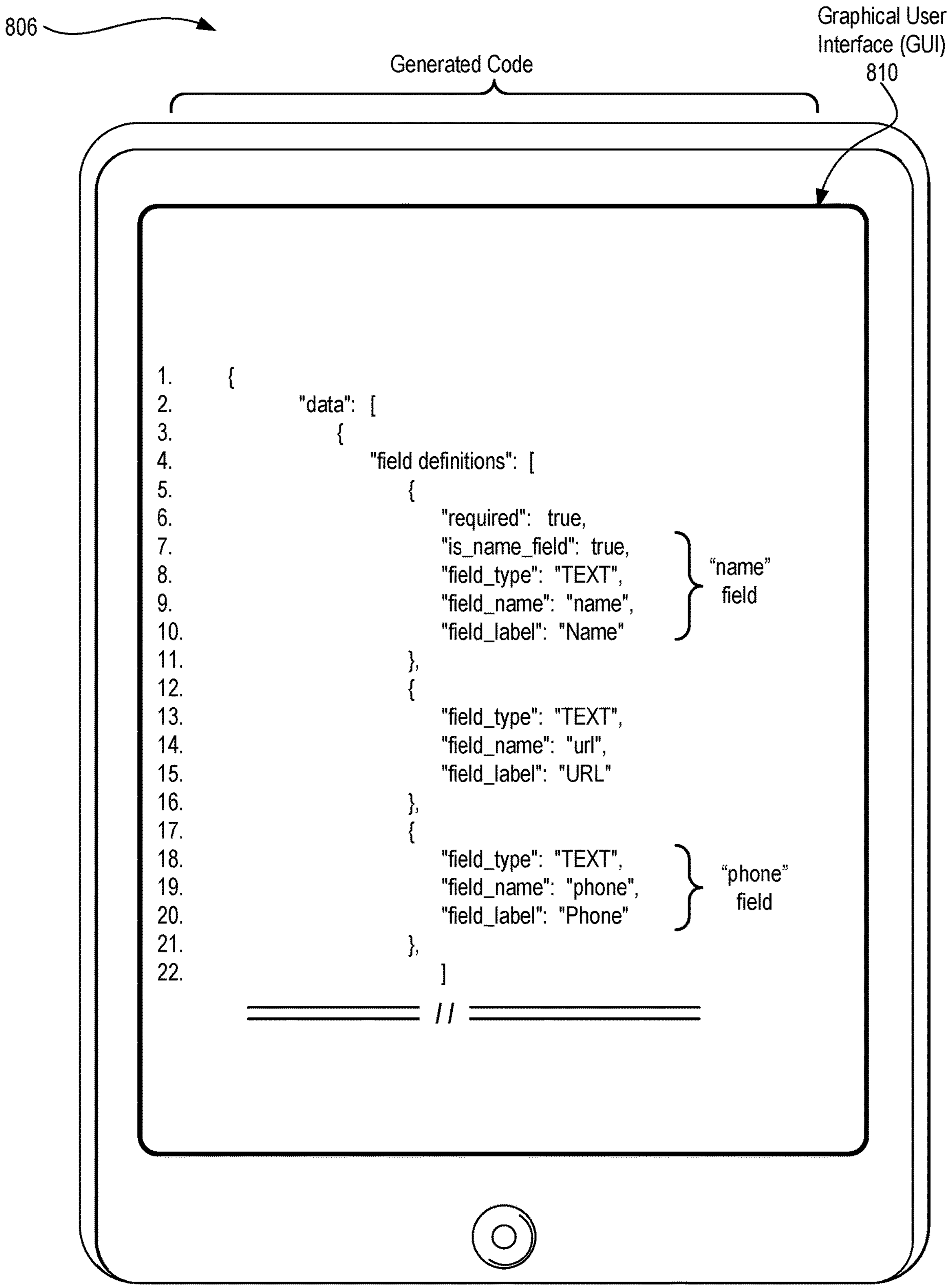
FIGS. 8F and 8G depict another exemplary architecture in accordance with described embodiments.
Figure 8G:
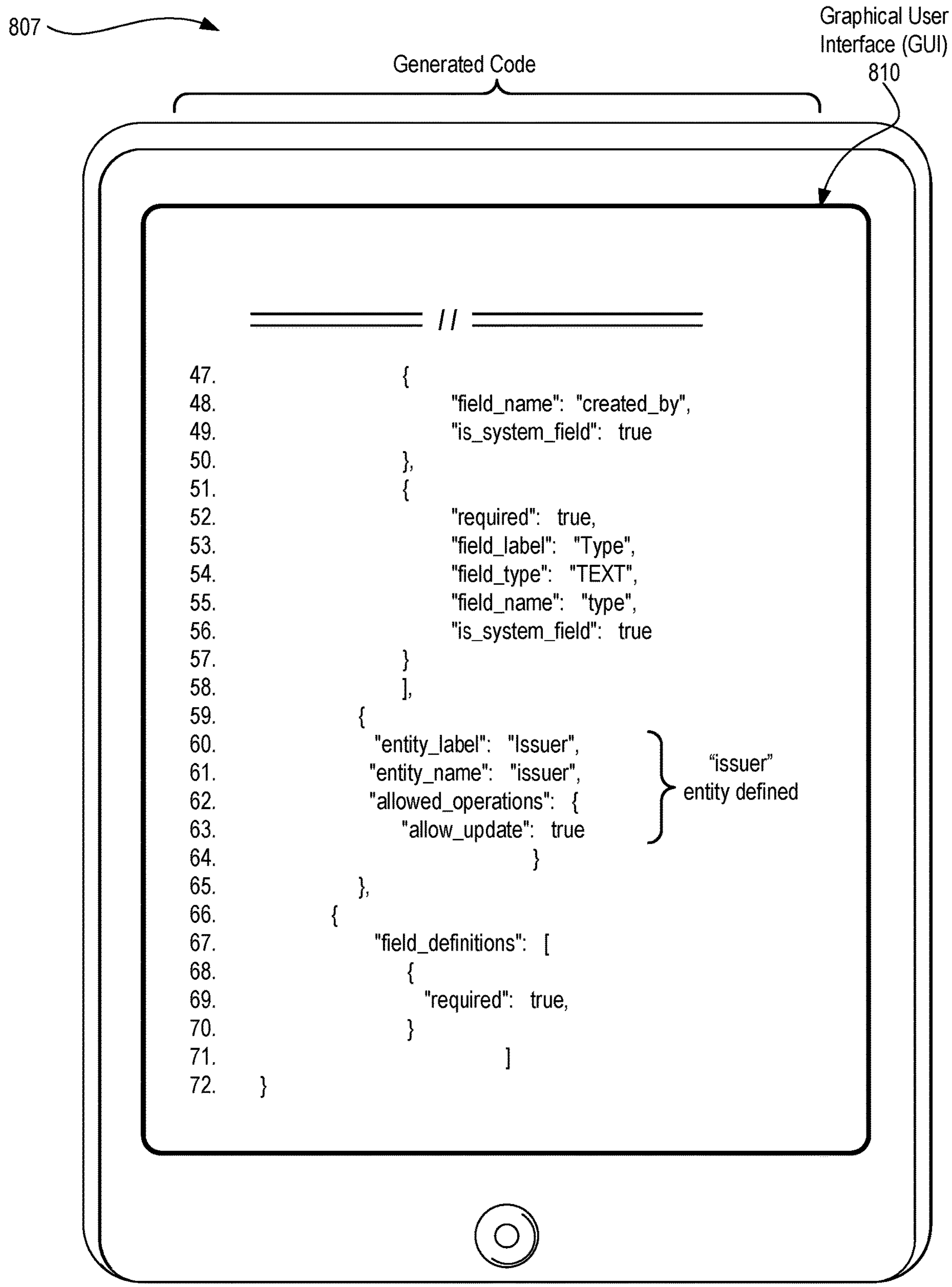

FIGS. 8F and 8G depict another exemplary architecture 806 and 807, respectively, in accordance with described embodiments.

Depicted here is the generated code which is created on behalf of the blockchain administrator's declarative actions to define the application and declare the entity and declare the various defined fields, resulting in the API compliant code being represented within the defined metadata, despite no code having been written by the blockchain administrator. In other embodiments, a programmer or developer may elect to utilize the API to generate this code, in which case the GUIs will reflect the coded entities and the coded defined fields, just as if they had been declared via the GUIs originally.

Thus, the disclosed platform permits the creation of the necessary code to transact with the blockchain and to interact with the blockchain and to define and declare an application, and entities for that application (which may be depicted as tables within a database system via a materialized view as is discussed below), and to further define and declare new field definitions for each entity, and also define permissible network participants which may utilize the declared application.

In such a way, the declarative metadata platform performs all the heavy lifting on behalf of the blockchain administrator, allowing a non-programmer to create all the necessary code to interact with the blockchain for the newly declared application by using only point and click actions through a series of GUIs.

Moreover, the constructs of an application, and allowed network participants, and new declarative entities and new declarative field definitions are presented in a familiar manner to the blockchain administrator since the various elements may be thought of as database tables, columns, fields, and records, etc., despite the fact that database entries and database tables are not being created. Instead, the information is transacted onto the blockchain as an asset, while permitting the blockchain administrator to point and click their way through the entire process without any knowledge or requirement that the blockchain administrator understands how to transact to the underlying blockchain or how to add and update or transfer assets on a blockchain. Therefore, practice of the disclosed embodiments drastically reduces the complexity on the part of a non-programmer user operating as a blockchain administrator.

And yet, for more sophisticated users having programming knowledge and understanding of blockchain, the same code may be written and generated via the APIs exposed by the blockchain services interface 240 and specifically the blockchain metadata definition manager 246 provided by the host organization.

Figure 9A:
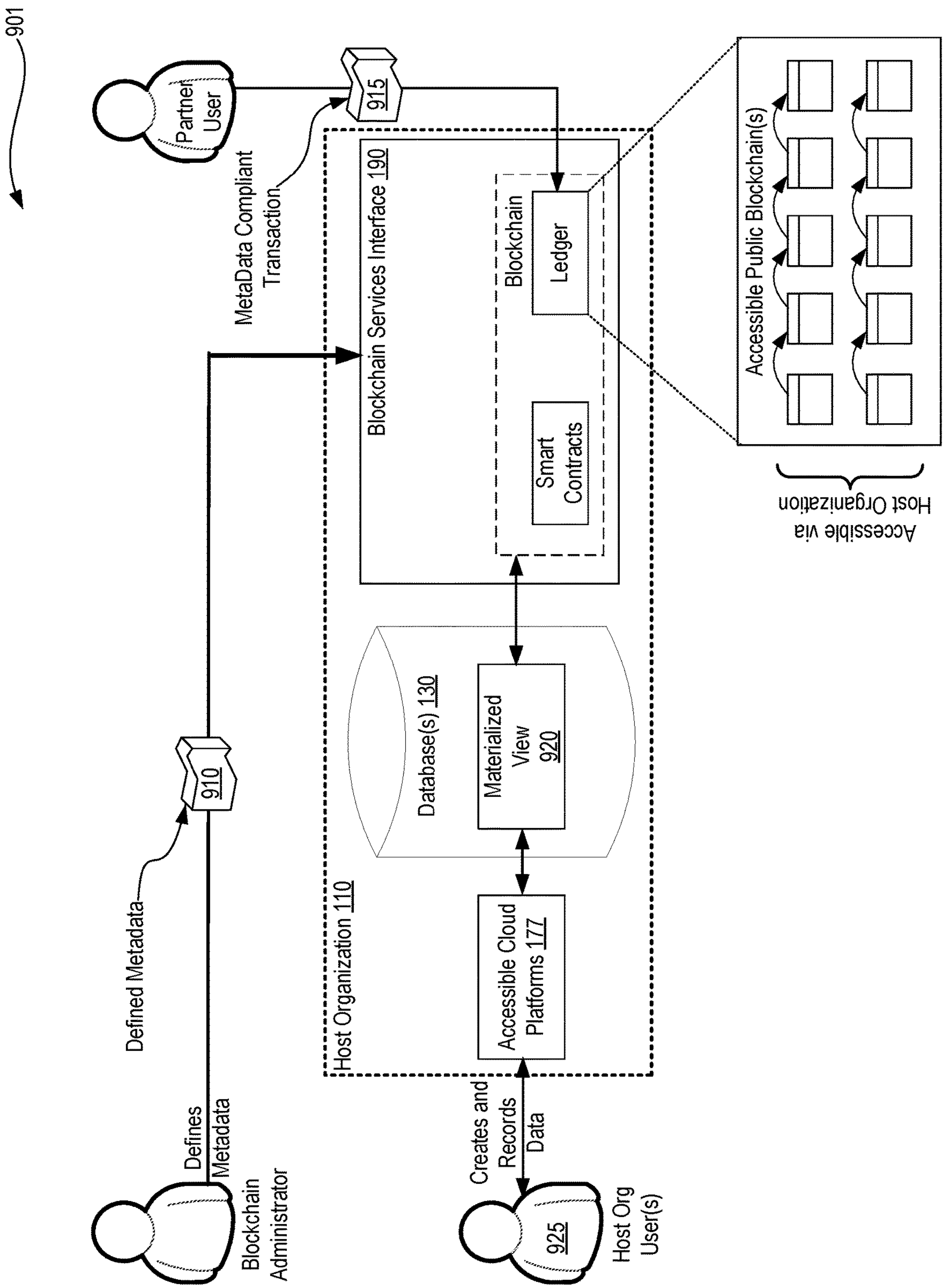
FIG. 9A depicts another exemplary architecture in accordance with described embodiments.

FIG. 9A depicts another exemplary architecture 901 in accordance with described embodiments.

As shown here, the blockchain administrator transacts the defined metadata 910 onto the blockchain, which presumably will be accepted once consensus is reached, and a partner user next transacts a metadata compliant transaction 915 onto the blockchain.

Further depicted here, is the materialized view 920 which permits a host organization user 925 to interact with the data transacted onto the blockchain via the metadata compliant transaction 915 from the accessible cloud platforms 177 available via the host organization 110.

In computing, a materialized view 920 is a database object that contains the results of a query. For example, the materialized view 920 may be a local copy of data located remotely, or may be a subset of the rows and/or columns of a table or join result, or may be a summary using an aggregate function.

The process of setting up a materialized view is sometimes called materialization. On a sense, data materialization is a form of caching the results of a query, similar to other forms of pre-computation, in which database administrators leverage materialized views for performance reasons for purposes of optimization.

In any database management system following the relational model, a view is a virtual table representing the result of a database query. Whenever a query or an update addresses an ordinary view's virtual table, the DBMS converts these into queries or updates against the underlying base tables.

Conversely, a materialized view takes a different approach insomuch that the query result is cached as a concrete ("materialized") table that may be updated separate from the original base tables. Such an approach permits for more efficient access, at the cost of extra storage and of some data being potentially out-of-date. Materialized views find use especially in data warehousing scenarios, where frequent queries of the actual base tables can be expensive.

In the example depicted here, the accessible cloud platforms 177 generally utilize information stored within the database systems 130 of the host organization 110, however, where certain information is transacted to the blockchain and thus persisted at the blockchain, the materialized view permits the accessible cloud platforms 177 to interact with data stored by the blockchain via the materialized view 920. In such a way, both the host organization user 925 and the accessible cloud platforms may interact with the blockchain data as if it were data stored within the database systems 130 of the host organization simply by referencing the materialized view.

Thus, it is in accordance with certain embodiments that any time information is transacted to the blockchain, the smart contract triggers and executes a validation scheme for the data transacted onto the blockchain to ensure it is in compliance with the defined metadata 910 and the smart contract additionally generates the materialized view 920 so as to create a referenceable copy within the database 130 of the host organization 110, thus permitting the standard query interface of the host organization to reference the information within the materialized view, which in turn corresponds to the information transacted onto the blockchain.

Thus, any entity which is declared and created for the blockchain, and for which data is then written or transacted onto the blockchain, will automatically have an equivalent entity (e.g., a table in a relational database) created within the database of the host organization 110 within the materialized view, and as defined fields are created and accepted onto the blockchain, those corresponding columns will then be created within the host organization database system 130, and then when data is transacted onto the blockchain, that corresponding entity table within the database system 130 of the host organization will then be populated, within the materialized view, such that users and processes interacting with the data from the side of the host organization, may access the information from the materialized view.

Consequently, developers and users may interact with the declared application which utilizes data and defined metadata persisted to the blockchain without any knowledge that they are actually utilizing blockchain and without any requirement that such users have any knowledge of how to interact with the blockchain.

According to certain embodiments, a new table is not created within the database system 130 of the host organization and therefore, it is not necessary to synchronize any data between the database system 130 of the host organization and the blockchain. Rather, a channel, pipeline, or view of the data persisted by the blockchain external from the host is represented via the materialized view at the database system 130 of the host organization, but the materialized view, although being referenceable, is not a copy that is synchronized back to the blockchain and does not allow updates or modifications. The materialized view is only permissible for read-only referencing from the database system 130 of the host organization. All modifications, updates, changes, etc., must be transacted onto the blockchain, and a refreshed materialized view will then pull those changes from the blockchain and reflect those modifications at the database system 130. While such an arrangement creates additional overhead, the arrangement expressly negates the need to synchronize data within the materialized view as such data is wholly non-authoritative.

Consequently, developers, programs, processes, and users may utilize standard SQL queries to interact with the blockchain data, by referencing the materialized view 920. For example, specifying SELECT from $Table_Name WHERE . . . when specifying the entity name as the table name for the materialized view 920 will result in a database query result being returned by the host organization's database system 130, despite the fact that the authoritative copy of the data resides within the blockchain itself. While this structure does create some duplicative data, and thus arguably results in wasted storage, the structure has the benefit of greatly simplifying queries originating from any of the accessible cloud platforms 177 which may utilized standard SQL without having to identify the blockchain or construct more complex blockchain transactions to retrieve the data, as the replication of the data to the materialized view 920 is performed automatically by the smart contract triggers. According to such embodiments, SQL commands which update, create, or delete records are not permitted for execution against the materialized view, however, such SQL commands which update, create, or delete records will be accepted and translated to the apex translation engine and Apex code interface 454 (shown at FIG. 4B) into native blockchain executable compliant code to perform the equivalent action of an SQL update, create, or delete command, but as a blockchain transaction which is then transacted against the blockchain, submitted for consensus, and then accepted onto the blockchain assuming voting or consensus is successful. Note also that a smart contract will execute to validate the transaction against the blockchain to enforce data compliance with the defined metadata persisted at the blockchain.

For example, an SQL query submitted from a host organization user may request an update for customer record John Doe for a specified application. Because such information is persisted at the blockchain, the SQL cannot be executed against the database systems 130 of the host organization. Moreover, the blockchain does not accept an SQL query which requests, "Please return all data for customer record John Doe." The information on the blockchain is not human readable and also does not permit this kind of a query.

Consequently, the Apex code interface 454 will translate the SQL code received into native blockchain code to transact updated payload data onto the blockchain for the customer record John Doe for the specified application. Note that when this occurs, the newest and latest information for customer record John Doe will now be reflected at the blockchain as the most up to date information and also at any materialized view of the same data, however, the old information for customer record John Doe remains within the blockchain as the blockchain records are immutable, thus creating an immutable audit trail which may be referenced at any time. Thus, any party with access rights to such data, can look back at prior blocks of the blockchain to determine what information was previously recorded for customer record John Doe, or in the case that customer record John Doe is deleted, such a change will be again reflected by the blockchain, but the old record itself remains immutably within the prior blocks of the blockchain, though the application will understand that such information is indicated as "deleted" and thus, the deleted record will not be referenced as live current data, but it always remains available, as per the inherent design of the DLT blockchain technology.

In alternative embodiments, the Apex code interface 454 (shown at FIG. 4B) is utilized to translate SQL database queries into a native blockchain protocol, permitting the translated SQL query to then be executed against the blockchain and generate a result set, which is then translated back into an SQL compliant format and returned responsive to the SQL queries. In yet other embodiments, a smart contract engine performs transactions against the blockchain to retrieve the defined entities and defined fields and translates those into the materialized view which is then stored within the host organization database system 130, subsequent to which non-translated SQL queries may be executed to retrieve the blockchain data directly from the materialized view.

Because the application itself is declarative, as are the declared entities and the declared defined fields for those entities, all data constructs are wholly customizable and may be tailored to the particular needs of the business, subject only to consensus on the blockchain by the network participants or the participating nodes which operate on that particular blockchain.

Figure 9B:
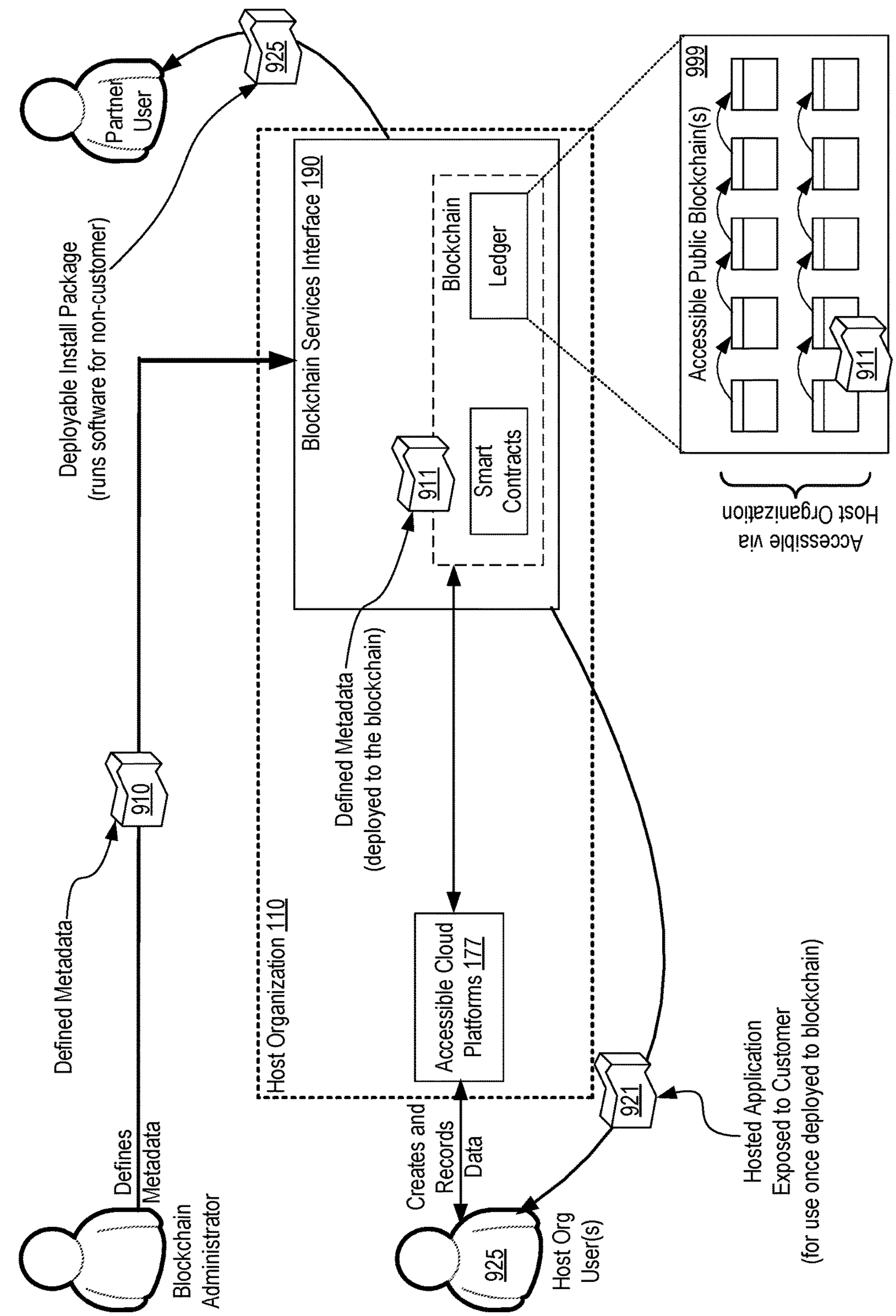
FIG. 9B depicts another exemplary architecture in accordance with described embodiments.

FIG. 9B depicts another exemplary architecture 902 in accordance with described embodiments.

As shown here, the defined metadata 910 has now been deployed to the blockchain as shown at element 911. Consequently, the declaratively defined application, its entities, and field definitions may now be utilized by any authorized network participants. In many circumstances, the authorized network participants will be host organization users 925 which have access to the various cloud services of the host organization 110, and thus, the hosted application 921 is exposed to the customers for use once deployed to the blockchain.

However, there is a need in certain circumstances for a partner user to access the software as an authorized network participant. Problematically, such a partner user having been authorized as a network participant and thus, granted permissions to interact with the declared application is not necessarily a customer of the host organization, and it may not be desirable to force them to become a subscribing customer of the host organization.

In order to deploy the declared application for use by non-customers of the host organization, there are two requirements in accordance with certain embodiments. Firstly, the blockchain administrator must define the permissible network participants, which may be done by defining an Internet Protocol (IP) address for those network participants in accordance with certain embodiments. The IP address may correspond to a host organization user, identified by IP, or the network participant may be a non-customer of the host organization, again identified by IP. In such a way, the participating nodes on the blockchain which may permissibly access the application and utilize the application may be identified and may communicate with one another and share data with one another, assuming they are correctly identifiable by the IP addresses defined by the blockchain administrator as added network participants for that particular application.

In certain embodiments, some or all of the added network participants are non-users or non-subscribers of the host organization, and thus, they cannot authenticate with the host organization and thus cannot identify themselves to the host organization via authentication credentials. It is therefore in accordance with such embodiments that an identified network participant that is a non-customer of the host organization and wishing to utilize the application as a permissible network participant (defined by the blockchain administrator) yet a non-customer of the host organization, proceeds through a two-step authentication process. Firstly, they must provide their IP which must correspond with an added network participant. The non-customer will then be presented with a challenge, responsive to which they need to return a public key. The non-customer will have been given the public key in advance by the blockchain administrator so that they may successfully traverse the authentication challenge.

Once the non-customer provides both their IP and responds to the challenge with the public key, then that public key is utilized every time that non-customer attempts to utilize the declared application to negotiate trust amongst the participating nodes on the blockchain.

Therefore, in accordance with a particular embodiment, a deployable install package 925 is transmitted to the partner user, in which the deployable install package 925 runs software for the non-customer, allowing them to access the declared application.

According to a particular embodiment, the deployable install package 925 is a generic software package which does not include functionality of the declared application, but rather, provides the non-customer partner organization to access the blockchain services interface of the host organization, such that the non-customer partner org may then transact with the blockchain through the host organization through the use of the declared application to which that particular non-customer partner org was added as an authorized network participant.

According to such an embodiment, the generic deployable install package 925, once installed and executed, will prompt the non-customer partner organization for a shared public key which will have been transmitted to them separately by the blockchain administrator that added the non-customer partner org as an authorized network participant for that particular declared application.

According to one embodiment, the deployable install package 925 issues the challenge based on the IP address of the non-customer partner organization which will have been configured by the blockchain administrator as part of the metadata for the declared application when adding the non-customer partner organization as an authorized network participant.

Therefore, the identical generic deployable install package 925 deployable install package 925 will operate differently based on where it is executed. If the deployable install package 925 is executed from a system having an IP address which is not in range or does not correspond to a configured IP for the authorized network participant, then the deployable install package 925 when executed will simply indicate that the location associated with that IP address is not an authorized network participant for any declared application.

If the identical deployable install package 925 is transmitted to a different person who is an authorized network participant for a different declared application, then the deployable install package 925, when executed, will prompt the user to enter the shared public key for the different declared application, thus necessitating that both the correct shared public key be provided and that the deployable install package 925 be executed from an IP address which is already configured as corresponding to an authorized network participant.

In such a way, the deployable install package 925 may be shared, distributed, or even published via the host organization's support pages, without any non-authorized user being granted to the declared application in question, so long as they cannot both spoof the IP and provide the correct shared public key responsive to the challenge.

In certain embodiments, a user based authentication challenge may additionally be provided for a known user, without necessitating that such a user or the non-customer partner organization associated with the user subscribe to any services from the host organization.

While users of the declared application may utilize an API to interact with the declared application and thus interact with the blockchain indirectly through the declared application, it is not necessary for them to do so.

Rather, according to a particular embodiment, the deployable install package 925 provides a UI which is dynamically generated from the metadata persisted at the blockchain for the declared application to which the executor of the deployable install package 925 is an authorized network participant.

Therefore, it is not necessary for the deployable install package 925 to have any application specific UIs. Rather, any GUI, API, or UI needed for the declared application will be dynamically constructed by the deployable install package 925 based on the associated metadata for the declared application.

In such a way, a non-customer partner organization which subscribes to no services whatsoever from the host organization may nevertheless utilize the blockchain services interface of the host organization (through the declared application) and utilize, interact with, and store data on the blockchain which is made accessible through the host organization's blockchain services interface.

According to a particular embodiment, once the deployable install package 925 is executed a user may authenticate with the declared application through the dynamically built UI which will associate the public key provided via by the user responsive to the initial challenge, and then proceed to generate GUI display screens based on the defined metadata for the declared application, including any defined entities and any defined field definitions, via which the non-customer of the host organization may enter data which is transacted onto the blockchain, update such data on the blockchain, and retrieve data from the blockchain, including data written to the blockchain by another organization, but with whom the data associated with the declared application is being shared, thus forming a common collection of data on the blockchain for all authorized network participants which utilize the new declared application.

Thus, the GUIs permit a blockchain administrator to define an application, define entities, define fields for each of those entities, and define permissible network participants, and then allow both host organization users and non-customer users to access the hosted software in which all the declarative metadata resides within a blockchain. Such a blockchain may operate wholly outside of the host organization and even outside of the control of the host organization, so long as the blockchain is accessible to the host organization. In alternative embodiments, the declarative metadata resides within a modified DLT which is operated internally to the host organization and for which the host organization is the single centralized trust authority.

Where the declarative metadata is hosted on an accessible blockchain outside of the host organization, such as blockchains 999 shown here, the declared applications interact with the information on the blockchain by transacting with the blockchain to retrieve payload data from assets, to update assets, to create assets, etc., Notably, however, the authoritative copy of the data is hosted external to the host organization on the accessible blockchain(s) 999 and is not stored by any table within the database systems 130 of the host organization. The materialized view discussed above is an optional feature, but even when used, the information within the materialized view is not the authoritative copy. Any transactions making modifications to the data associated with the application, must not only comply with the defined metadata, but must also be updated at the blockchain 999. Where a modified DLT is operated internally, the data associated with the application must be updated within the modified DLT as the authoritative source. Such application data is therefore persisted by an accessible blockchain 999 as the ultimate authoritative copy of the data. Thus, even if the materialized view is deleted or corrupted, or becomes out of synch with the accessible blockchain, there is no affect upon the operations of the declared application because the data for that application and the metadata defining the structure and of such data is stored by the accessible blockchain 999.

Figure 9C:
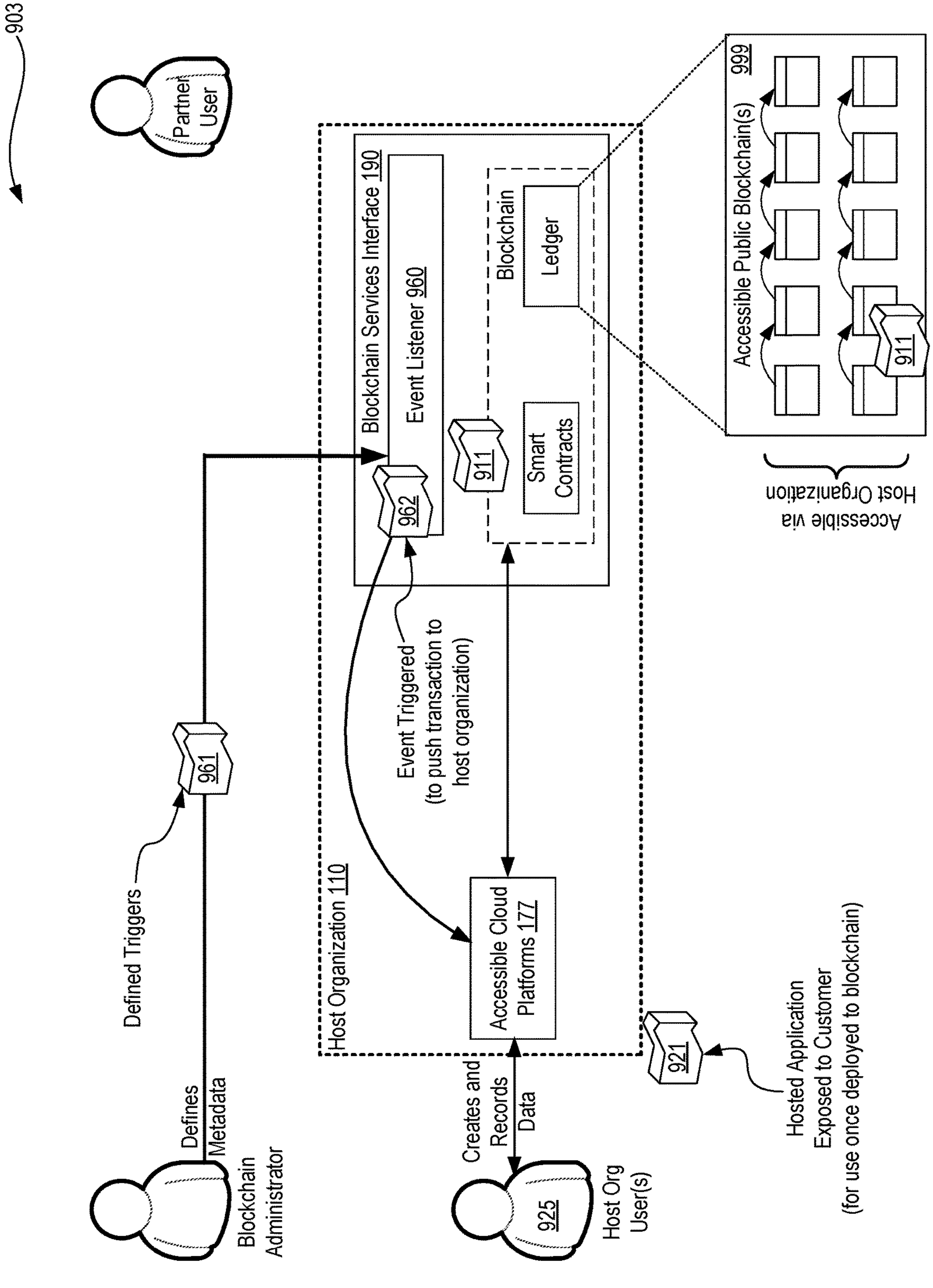
FIG. 9C depicts another exemplary architecture in accordance with described embodiments.

FIG. 9C depicts another exemplary architecture 903 in accordance with described embodiments.

As shown here, there is an event listener 960 within the blockchain services interface 240 which accepts defined triggers 961 from the blockchain administrator and then operates to listen for specified events which occur on the blockchain, responsive to which, an event is triggered or fired, shown here as the event triggered 962 so as to push transactions to the host organization or to initiate the execution of a flow or data processing flow, or any defined operations as specified by the blockchain administrator. While this is a similar mechanism to that which is utilized to trigger the smart contract execution automatically to enforce data compliance with the defined metadata, the event listener and the defined triggers 961 permits the blockchain administrator to define any executable operations to occur based on their own customized criteria, regardless of operations performed by the smart contract execution.

Therefore, according to a particular embodiment, any time that any change occurs within the accessible blockchain matching the defined triggers 961 which is in the possession of the event listener 960, the event listener will fire an event or events (event triggered 962) back into the accessible cloud platforms 177, and the blockchain administrator can write any kind of flow via code submitted via the API to the blockchain services interface 240 or via the GUIs (e.g., via the integration builder and associated GUIs) which permits the blockchain administrator to create the flow, for example, create a smart contract to be executed or some other flow as defined by the blockchain administrator, and that flow will then cause updates within the accessible cloud platforms 177 as defined by the event triggered 962 responsive to the change having occurred on the blockchain as monitored by the event listener 960. According to one embodiment, a database transaction is performed within the database systems 130 of the host organization or within the accessible cloud platform responsive to an event triggered 962. In another embodiment, a GUI is triggered and pushed to a user client device presenting information based on the change having occurred within the blockchain, as monitored by the event listener 960.

Figure 10:
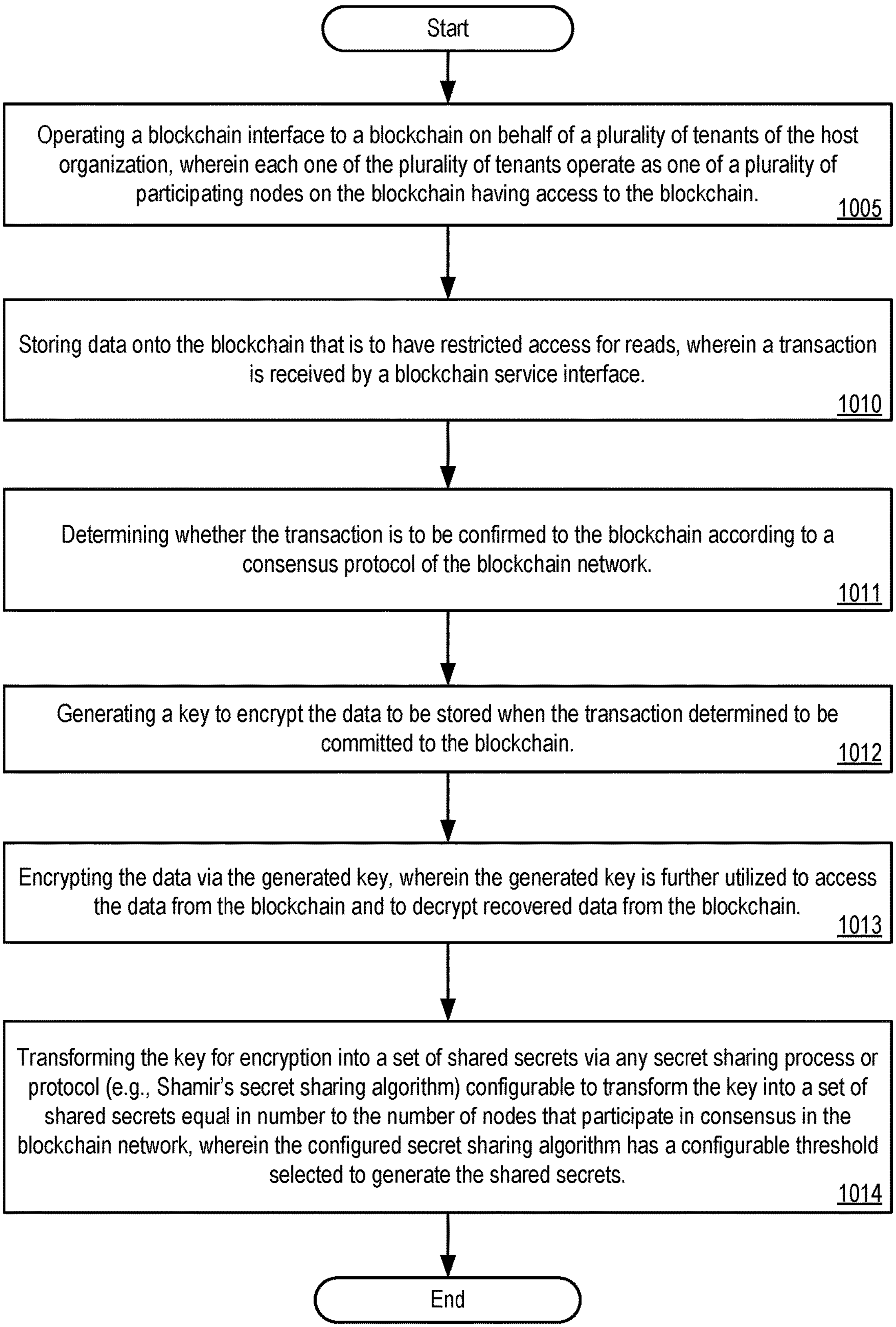
FIG. 10 is a flowchart of one embodiment of a process for consensus on read. This process may be implemented by the block consensus manager or similar component of the blockchain services interface.

FIG. 10 is a flowchart of one embodiment of a process for consensus on read. This process may be implemented by the block consensus manager 241 or similar component of the blockchain services interface 240. The consensus on read process can be triggered by a node 133 in the blockchain network seeking to access data in the blockchain to read that data where the data is protected by a permissions scheme or similar mechanism to control access to the data. This process is separate from the access control layer 162 in the blockchain services interface 240. If the data to be accessed is managed by a consensus on read process, then the consensus on read process must be satisfied to enable the requesting node to access the data from the blockchain which is protected by encryption. A request to read data in the blockchain can have any level of granularity where fields, records, metadata or similar data in the blockchain can be separately protected by the process.

The method 1000 begins with processing logic at block 1005 for operating a blockchain interface to a blockchain on behalf of a plurality of tenants of the host organization, wherein each one of the plurality of tenants operate as one of a plurality of participating nodes on the blockchain having access to the blockchain.

When the data is first stored in the blockchain that is to have restricted access for reads, the transaction is received by the blockchain service interface 240 (Block 1010). The blockchain consensus manager 241 determines whether the transaction is to be confirmed to the blockchain according to the consensus protocol of the blockchain network (block 1011). Where the transaction is to be committed, the blockchain consensus manager 241 generates a key to encrypt the data to be stored (Block 1012). The key is utilized to encrypt the data and the key will also be recovered and utilized to decrypt the data to access it. The key for encryption is transformed into a set of shared secrets (Block 1013). Any secret sharing process or protocol can be utilized (e.g., Shamir's secret sharing algorithm) that can transform the key into a set of shared secrets equal in number to the number of nodes that participate in consensus in the blockchain network (block 1014). Similarly, any secret sharing algorithm that has a desired threshold or configurable threshold can be selected to generate the shared secrets. Using such a shared secret algorithm ensures that the data can only be accessed where a threshold number of the shared secrets are provided by the other nodes in the blockchain network to reconstitute the key needed for decryption. The threshold can be fixed or configurable. The threshold can be any value, such as number equal to half or two-thirds of the number of participating nodes.

As each shared secret is generated by the secret sharing algorithm, the shared secret designated for a particular node in the blockchain network is encrypted using the public key of that node. Thus, only the associated node can decrypt the shared secret assigned to it and provide it in the case of a granted read request as part of the consensus on read process. These encrypted shared secrets are stored as metadata for the associated transaction data upon consensus for committing the transaction to the blockchain.

Subsequently, after the protected data is stored in the blockchain, then any node that seeks to service a request to access the protected data must initiate a read request that is broadcast to the other nodes of the blockchain network. This read request identifies the data to be accessed and may include information about the node or entity that is requesting to access the data (e.g., a set of credentials for the entity). Each of the nodes then executes its consensus on read process and makes a determination whether the credentials or other criteria for accessing the requested data are met. Each node that determines that the criteria for reading the data are met, provides its shared secret to the requesting node. The requesting node can collect the shared secrets and determine whether a defined threshold number of the shared secrets have been provided. If the threshold number of shared secrets is not returned, then the consensus on read process denies the read request and it cannot be completed.

In some embodiments, the consensus on read process may enforce a time limit or window within which the process must receive the threshold number of shared secrets. If the threshold number of shared secrets are provided by the other nodes, then the requesting node can utilize the shared secret algorithm to transform the shared secrets into the key used to encrypt the requested data and then the requested data can be decrypted and accessed. After the data has been accessed then the requesting node can discard the key such that it will have to be requested and reformed again on subsequent accesses.

When the encrypted data from the initial transaction is stored in the blockchain, the associated metadata including the shared secrets for each node in the blockchain network is also stored in the blockchain. The metadata format can be defined and organized as detailed herein with relation to the other disclosed embodiments. The metadata can identify the shared secrets, owner of the transaction data, permissions or privileges for access control associated with the transaction data, privacy information related to the transaction data, ownership information for the transaction data and similar information. The metadata can define these attributes of the transaction on an object, record, field or similar component level consistent with the format of the transaction data. Owners of transaction data can be users, nodes or similar entities that operate on and utilize the blockchain network. Further embodiments for access control processes and right to forget processes are defined herein below that utilize this additional detailed meta data along with the principles of the consensus on read process.

According to one embodiment, method 1000 is performed by a system of a host organization for managing read access of data in a blockchain. According to such an embodiment, the system provides a blockchain interface to a blockchain on behalf of a plurality of tenants of the host organization, in which the processing of the method via the system includes at least: receiving a transaction to be stored to the blockchain via the blockchain interface; encrypting transaction data using a key generated by the blockchain interface; dividing the key into a set of shared secrets corresponding to each node in the blockchain network; receiving a request to access the transaction data by the blockchain interface; receiving at least one of the shared secrets from a node in the blockchain network indicating consensus; and decrypting the transaction data in response to receiving the at least one of the shared secrets.

According to another embodiment, method 1000 further includes: encrypting each shared secret in the set of shared secrets using a public key of the respective node.

According to another embodiment, method 1000 further includes: storing encrypted the at set of shared secrets in the blockchain as metadata for the transaction data upon consensus for the transaction.

According to another embodiment of method 1000, the transaction data is decrypted in response to receiving a threshold number of shared secrets.

According to another embodiment of method 1000, a decryption key is recovered from received shared secrets.

According to another embodiment, method 1000 further includes: denying access to the transaction data in response to a number of the received shared secrets being below a threshold for recovering the key for encryption.

According to a particular embodiment, there is a computing system of a host organization configured to perform a method for managing read access of data in a blockchain, the computer system providing a blockchain interface to a blockchain on behalf of a plurality of tenants of the host organization, the computing system including: a computer readable medium having stored therein the blockchain interface; and a processor coupled to the blockchain interface, the processor configured to execute the blockchain interface, the block chain interface to receive a transaction to be stored to the blockchain, to encrypt transaction data using a key generated by the blockchain interface, to divide the key into a set of shared secrets corresponding to each node in the blockchain network, to receive a request to access the transaction data, to receive at least one of the shared secrets from a node in the blockchain network indicating consensus, and to decrypt the transaction data in response to receiving the at least one of the shared secrets.

According to another embodiment, there is a computer-readable medium having stored therein a set of instructions, which when executed cause a computer system of a host organization to perform a set of operations of a method for managing read access of data in a blockchain, the computer system providing a blockchain interface to a blockchain on behalf of a plurality of tenants of the host organization, the set of operations including: receiving a transaction to be stored to the blockchain via the blockchain interface; encrypting transaction data using a key generated by the blockchain interface; dividing the key into a set of shared secrets corresponding to each node in the blockchain network; receiving a request to access the transaction data by the blockchain interface; receiving at least one of the shared secrets from a node in the blockchain network indicating consensus; and decrypting the transaction data in response to receiving the at least one of the shared secrets.

Figure 11A:
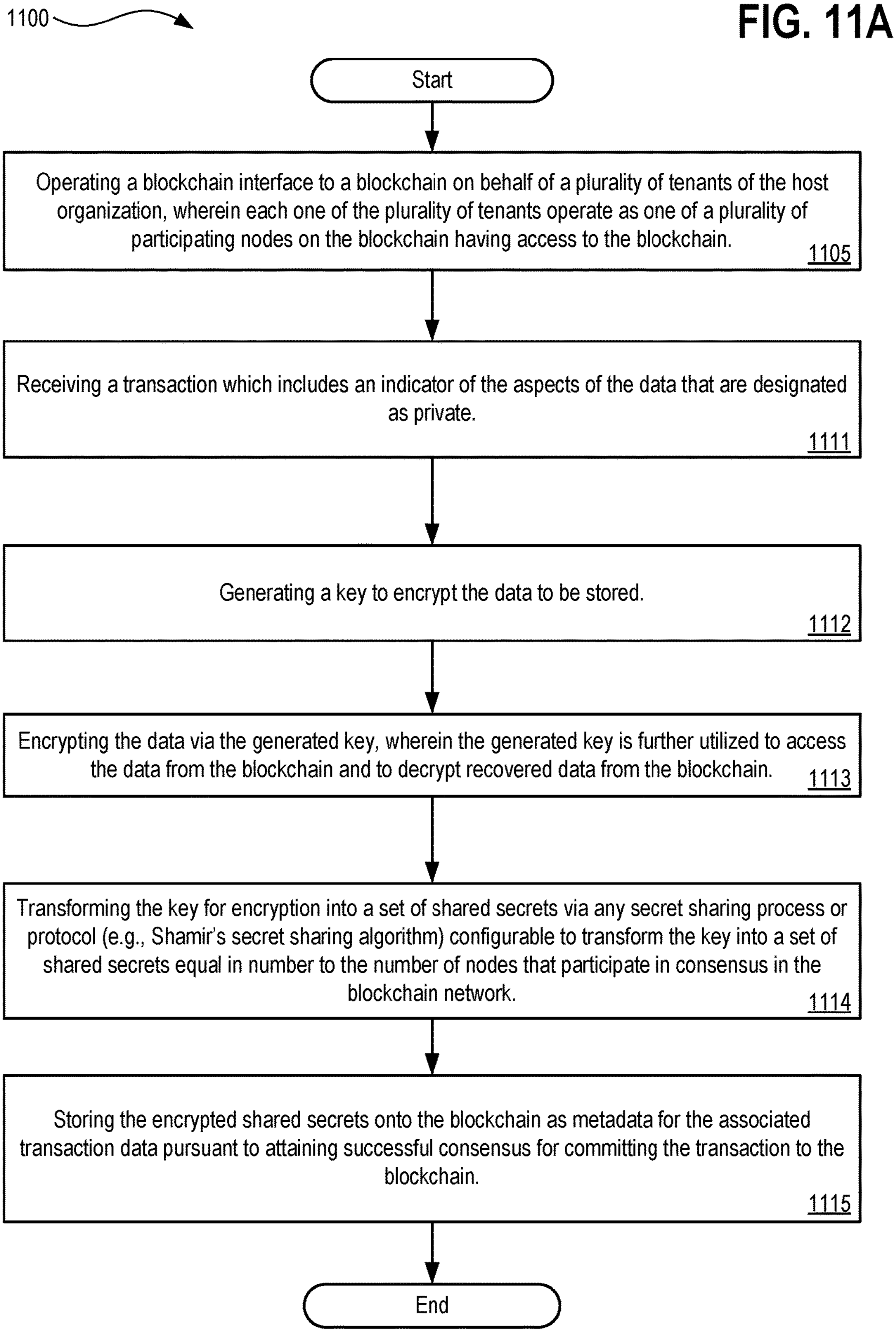
FIGS. 11A, 11B, and 11C depict flowcharts related to a set of processes for implementing a right to forget function within a blockchain service interface.
Figure 11B:
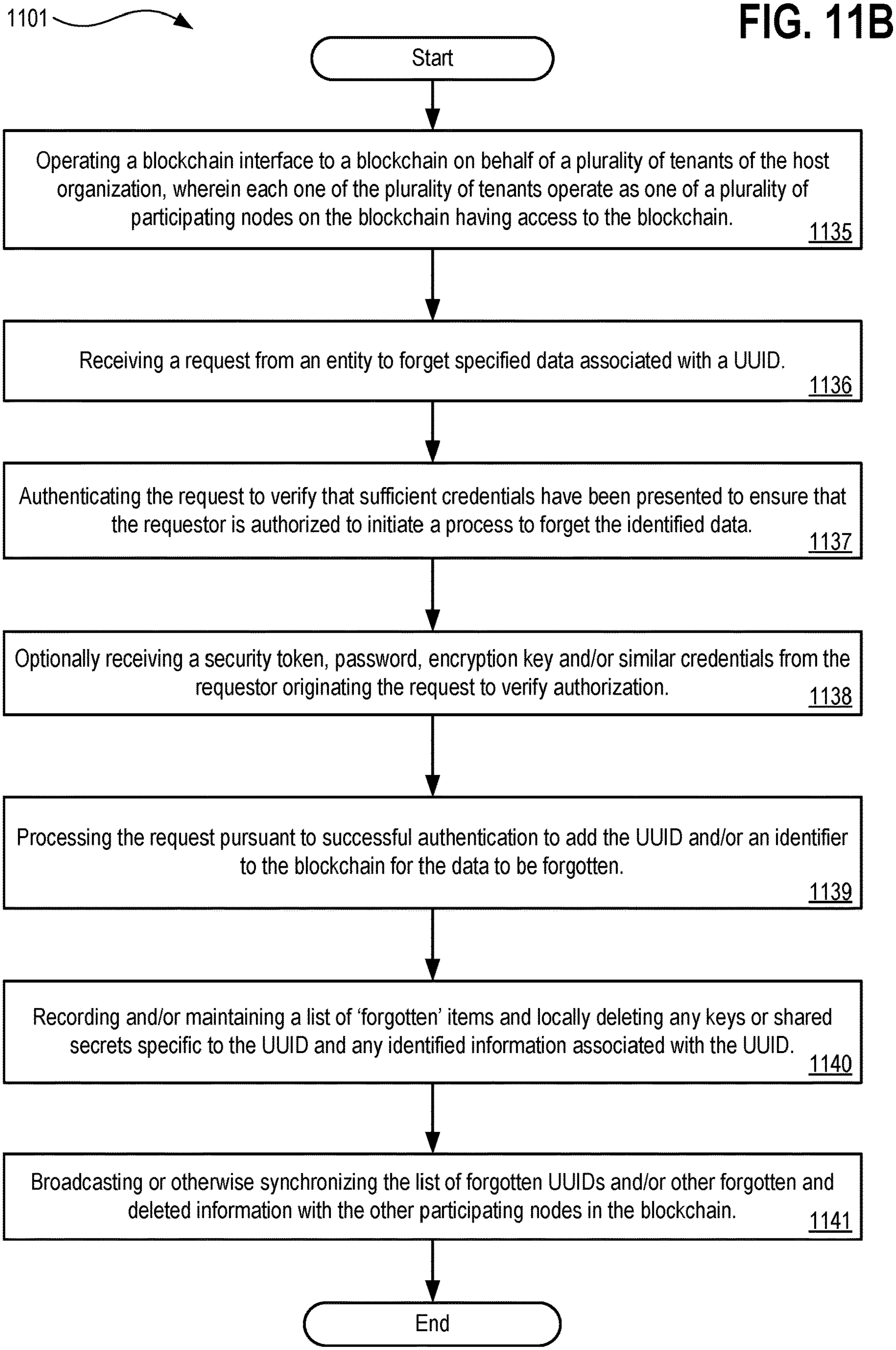
Figure 11C:
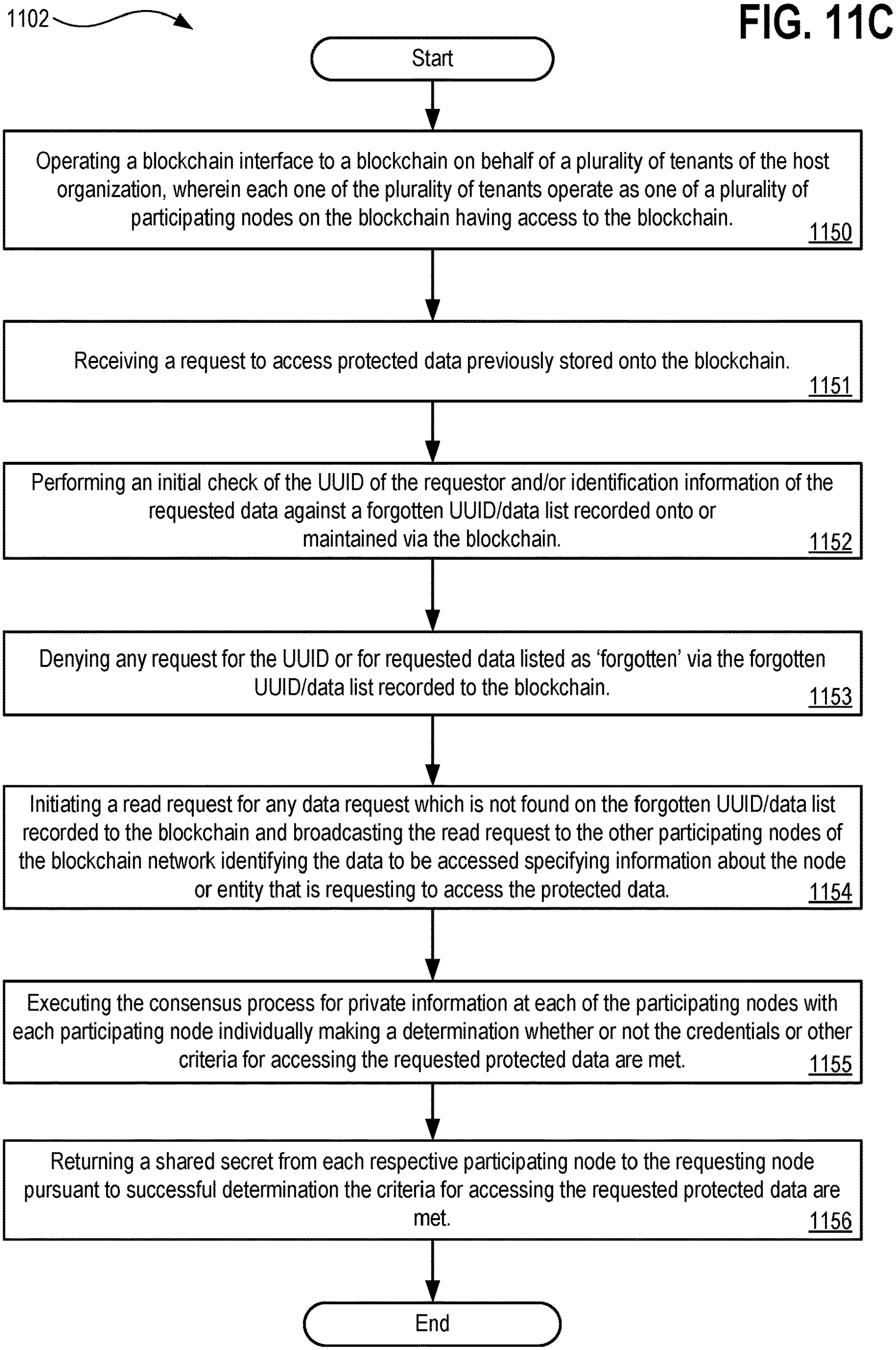

FIGS. 11A, 11B, and 11C depict flowcharts related to a set of processes for implementing a right to forget function within a blockchain service interface 240. The right to forget function utilizes aspects of the consensus on read process to enable an entity to designate data as private data and to have the blockchain 'forget' the data that is private upon request of the entity. This functionality can help enable a blockchain that implements the right to forget function to be compliant with GDPR. The flowcharts of FIGS. 11A-11C describe three related aspects of the right to forget process, namely, an initial store of private data also referred to as private information or PI information, a request for the data to be 'forgotten,' and an access request. These functions together provide the ability for a blockchain to 'forget' data by encrypting the private data and then deleting the encryption key upon request of the controlling entity to ensure the data cannot be accessed again, and thus the right to forget function is effectively able to designate data as 'forgotten' by the blockchain since it cannot be subsequently accessed even though the data is present in an encrypted form on the blockchain.

The General Data Protection Regulation (GDPR) is a regulation for data protection and privacy in the European Union (EU) and the European Economic Area (EEA). The GDPR also addresses the transfer of personal data outside the EU and EEA areas. The GDPR increases control by individuals over their personal data and simplifies the regulatory environment for international business by unifying the regulation within the EU.

With reference first to FIG. 11A, processing of the method 1100 begins with operating a blockchain interface to a blockchain on behalf of a plurality of tenants of the host organization, wherein each one of the plurality of tenants operate as one of a plurality of participating nodes on the blockchain having access to the blockchain (block 1105).

The specific processing for the right to forget process is initiated by a node receiving a transaction to be stored to the blockchain at a blockchain interface where the transaction includes a unique user identifier (UUID) for the entity that is associated with this data (Block 1111). In addition, the received transaction includes an indicator of the aspects of the data that are to be designated private. The entirety of the data or any aspect of the data at any level of granularity can be designated private, e.g., an object, record, field of the data and/or metadata. Upon the transaction being determined to be committed to the blockchain based on the consensus of the nodes in the blockchain, an object and metadata format for the transaction data are determined that is utilized to store the data on the blockchain where the object and metadata will include the owning entity UUID or similar identifier and a set of indicators to identify the object, record, field or similar component of the data that is designated as private.

The blockchain consensus manager 241 or permissions manager generates a key to encrypt the data to be stored (Block 1112). The key utilized to encrypt the data and will be utilized to decrypt the data to access it. The key is then transformed into a set of shared secrets (Block 1114). Any secret sharing process or protocol can be utilized (e.g., Shamir's secret sharing algorithm) that can transform the key into a set of shared secrets equal in number to the number of nodes that participate in consensus in the blockchain network. Similarly, a secret sharing algorithm that has a desired threshold or configurable threshold can be selected to generate the shared secrets. Using such a shared secret algorithm ensures that the data can only be accessed where a threshold number of the shared secrets are provided by the other nodes in the blockchain network to reconstitute the key needed for decryption. The threshold can be fixed or configurable. The threshold can be any value, such as number equal to half or two-thirds of the number of participating nodes.

As each shared secret is generated by the secret sharing algorithm, the shared secret designated for a particular node in the blockchain network is encrypted using the public key of that node. Thus, only the associated node can decrypt the shared secret assigned to it and provide it in the case of a granted read request as part of consensus on read. These encrypted shared secrets are stored as metadata for the associated transaction data upon consensus for committing the transaction to the blockchain (Block 1115).

FIG. 11B is a flowchart of the process for servicing a request to 'forget' private data in the blockchain network.

Processing of the method 1101 begins with operating a blockchain interface to a blockchain on behalf of a plurality of tenants of the host organization, wherein each one of the plurality of tenants operate as one of a plurality of participating nodes on the blockchain having access to the blockchain (block 1135).

The permissions manager 181 receives a request from an entity to forget specified data associated with a UUID (Block 1136). The permissions manager 181 or related component may authenticate the request to verify that sufficient credentials have been presented to ensure that the requestor is authorized to initiate a process to forget the identified data (Block 1137). A requestor may optionally present a security token, password, encryption key and/or similar credentials to verify authorization, in which the resented token, password, encryption key and/or similar credentials are received by the permissions manager 181 at the host organization to effectuate the authentication request (Block 1138). If authenticated, then the request is processed to add the UUID and/or an identifier for the data to be forgotten (Block 1139). The process can be configured to 'forget' all data associated with an UUID, or a specific object, record or field identified by the request. The UUID and any data identification information can then be recorded to a list of 'forgotten' items (Block 1140) If there are any keys or shared secrets specific to the UUID or identified information associated with the UUID, then the node can delete this local information (Block 1140). In addition, the node can also broadcast or similarly synchronize the list of forgotten UUIDs and/or information with other nodes in the blockchain (Block 1141).

FIG. 11C is a flowchart of the process for servicing a request to access 'forgotten' private data in the blockchain network.

Processing of the method 1102 begins with operating a blockchain interface to a blockchain on behalf of a plurality of tenants of the host organization, wherein each one of the plurality of tenants operate as one of a plurality of participating nodes on the blockchain having access to the blockchain (block 1150).

After the private data is stored in the blockchain, any node that seeks to service a request to access the protected data (Block 1151) makes an initial check of the UUID of the requestor and/or identification information of the requested data against the forgotten UUID/data list (Block 1152). If the UUID or requested data is listed as 'forgotten' then the request to access this data is denied (Block 1153).

Conversely, if the UUID or the requested data is not found on the list, then the permission manager 181 must initiate a read request that is broadcast to the other nodes of the blockchain network and identifies the data to be accessed and includes information about the node or entity that is requesting to access the data (i.e., the UUID and possibly a set of credentials for the entity) (Block 1154). Each of the nodes then executes its consensus process for private information and makes a determination whether the credentials or other criteria for accessing the requested data are met (Block 1155). Each node that determines that the criteria for reading the data are met, provides its shared secret to the requesting node (Block 1156). The requesting node then can collect the shared secrets and determine whether a defined threshold number of the shared secrets have been provided. If the threshold number of shared secrets is not returned, then the consensus process denies the read request and it cannot be completed.

In some embodiments, the consensus process can have a time limit or window within which the process must receive the threshold number of shared secrets. If the threshold number of shared secrets are provided by the other nodes, then the requesting node can utilize the shared secret algorithm to transform the shared secrets into the key and then the requested data can be decrypted and accessed. After the data has been accessed then the requesting node can discard the key such that it will have to be requested and reformed again on subsequent accesses.

According to disclosed embodiments, private information (PI information) may be stored directly in the blockchain or in a distributed storage. A node that seeks to add PI information to the blockchain can interact with the REST API to create/update the PI information. Metadata associated with the PI information, i.e., the PI metadata is defined via the Metadata API of the blockchain platform. In turn, the REST API manages the creation of the key for a record with the PI information and the storage of the PIN information in the blockchain or in the distributed storage. Non PI data and a hash of the PI data can be stored in the blockchain via the REST API. The metadata can be stored in the blockchain via the Metadata API as separate metadata and/or as part of a consent and GDPR model.

In the distributed storage case, the hash of the PI data is stored in the blockchain while the actual PI data is stored off the blockchain. Deleting the PI information at the off-chain storage location leaves only a hash of the PI information in the blockchain. The hash is a one-way function and cannot be used to retrieve the PI information when deleted. In some cases, the hash can be stored with ciphertext to further protect it.

According to another embodiment, the methods 1100, 1101, and 1102 are performed by a system of a host organization for providing a right to forget data in a blockchain. According to such embodiments, such a system performs processing providing a blockchain interface to a blockchain on behalf of a plurality of tenants of the host organization each serving as nodes in a blockchain network, the method including: receiving a request including an identifier of a requestor, the request to access transaction data designated as private; requesting access to the transaction data from nodes in the blockchain network including the identifier of the requestor; receiving at least one shared secret from a node in the blockchain network indicating consensus to access the transaction data by the requestor; and denying access to the transaction data in response to receiving insufficient shared secrets from the nodes indicating the transaction data is permanently unavailable to access.

According to another embodiment of methods 1100, 1101, and 1102, the processing performed by the system further includes: determining whether the identifier of the requestor is on a forgotten list before requesting access to the transaction data.

According to another embodiment of methods 1100, 1101, and 1102, the processing performed by the system further includes: receiving a request to forget data associated with a unique user identifier; and adding the unique user identifier to a forgotten list.

According to another embodiment of methods 1100, 1101, and 1102: the transaction data is decrypted in response to receiving a threshold number of shared secrets.

According to another embodiment of methods 1100, 1101, and 1102: a decryption key is recovered from received shared secrets.

According to another embodiment of methods 1100, 1101, and 1102: denying access to the transaction data is in response to a number of received shared secrets being below a threshold for recovering a key for encryption.

According to another embodiment of methods 1100, 1101, and 1102, the processing performed by the system further includes: defining object and metadata for the transaction data to be stored in the blockchain including identification of private information for objects and fields.

According to a particular embodiment, there is a computing system of a host organization configured to perform a method for providing a right to forget data in a blockchain, the computer system providing a blockchain interface to a blockchain on behalf of a plurality of tenants of the host organization each serving as nodes in a blockchain network, the computer system including: a computer readable medium having stored therein the blockchain interface and a permissions manager; and a processor coupled to the blockchain interface, the processor configured to execute the blockchain interface and the permissions manager, the permissions manager to receive a request including an identifier of a requestor, the request to access transaction data designated as private, to request access to the transaction data from nodes in the blockchain network including the identifier of the requestor, to receive at least one shared secret from a node in the blockchain network indicating consensus to access the transaction data by the requestor, and to deny access to the transaction data in response to receiving insufficient shared secrets from the nodes indicating the transaction data is permanently unavailable to access.

According to yet another embodiment, there is a computer-readable medium having stored therein a set of instructions, which when executed cause a computer system of a host organization to perform a set of operations of a method for managing read access of data in a blockchain, the computer system providing a blockchain interface to a blockchain on behalf of a plurality of tenants of the host organization, the set of operations including: receiving a request including an identifier of a requestor, the request to access transaction data designated as private; requesting access to the transaction data from nodes in the blockchain network including the identifier of the requestor; receiving at least one shared secret from a node in the blockchain network indicating consensus to access the transaction data by the requestor; and denying access to the transaction data in response to receiving insufficient shared secrets from the nodes indicating the transaction data is permanently unavailable to access.

Figure 12A:
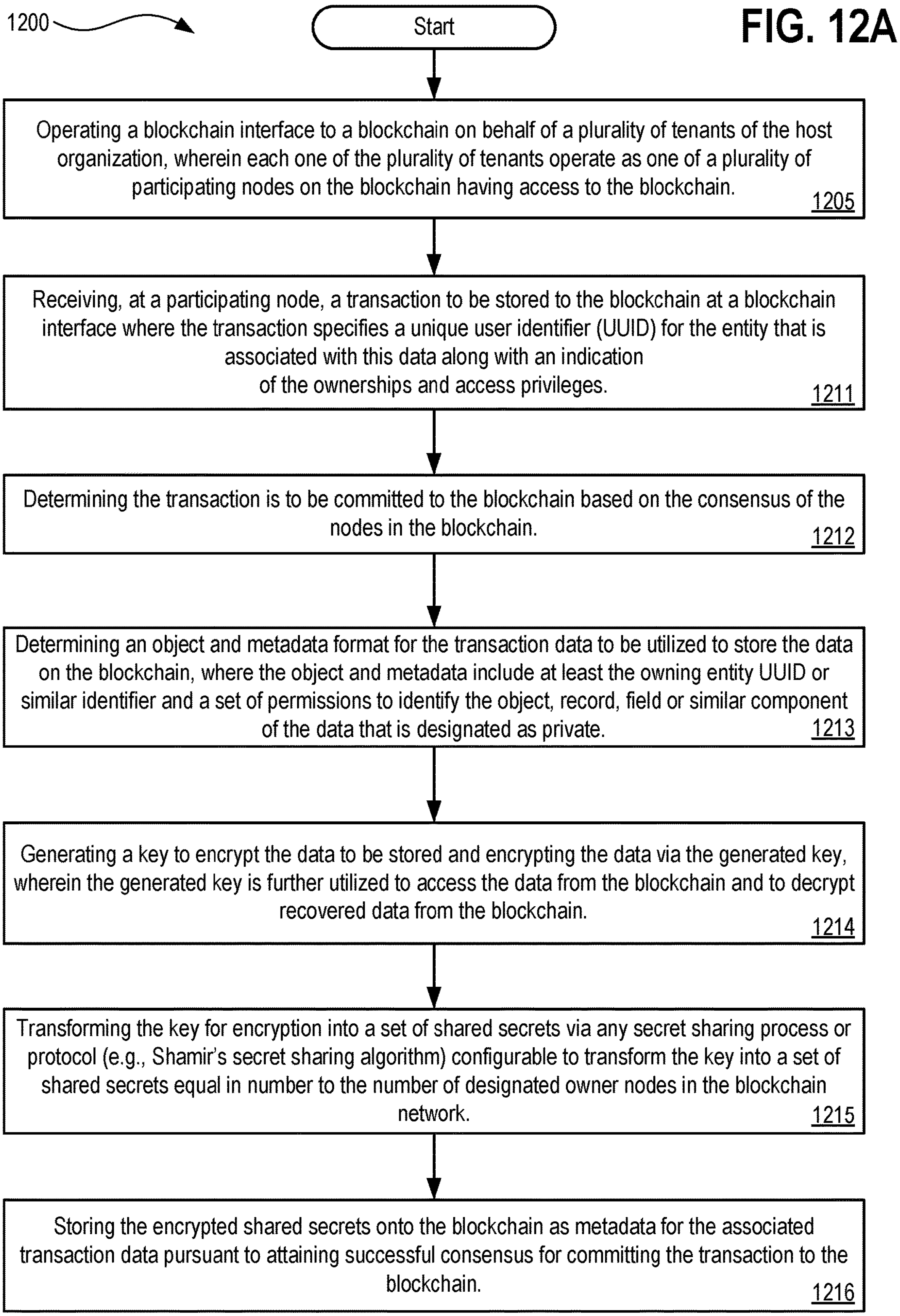
FIGS. 12A, 12B, and 12C depict flowcharts related to a set of processes for implementing an access control function within a blockchain service interface.
Figure 12B:
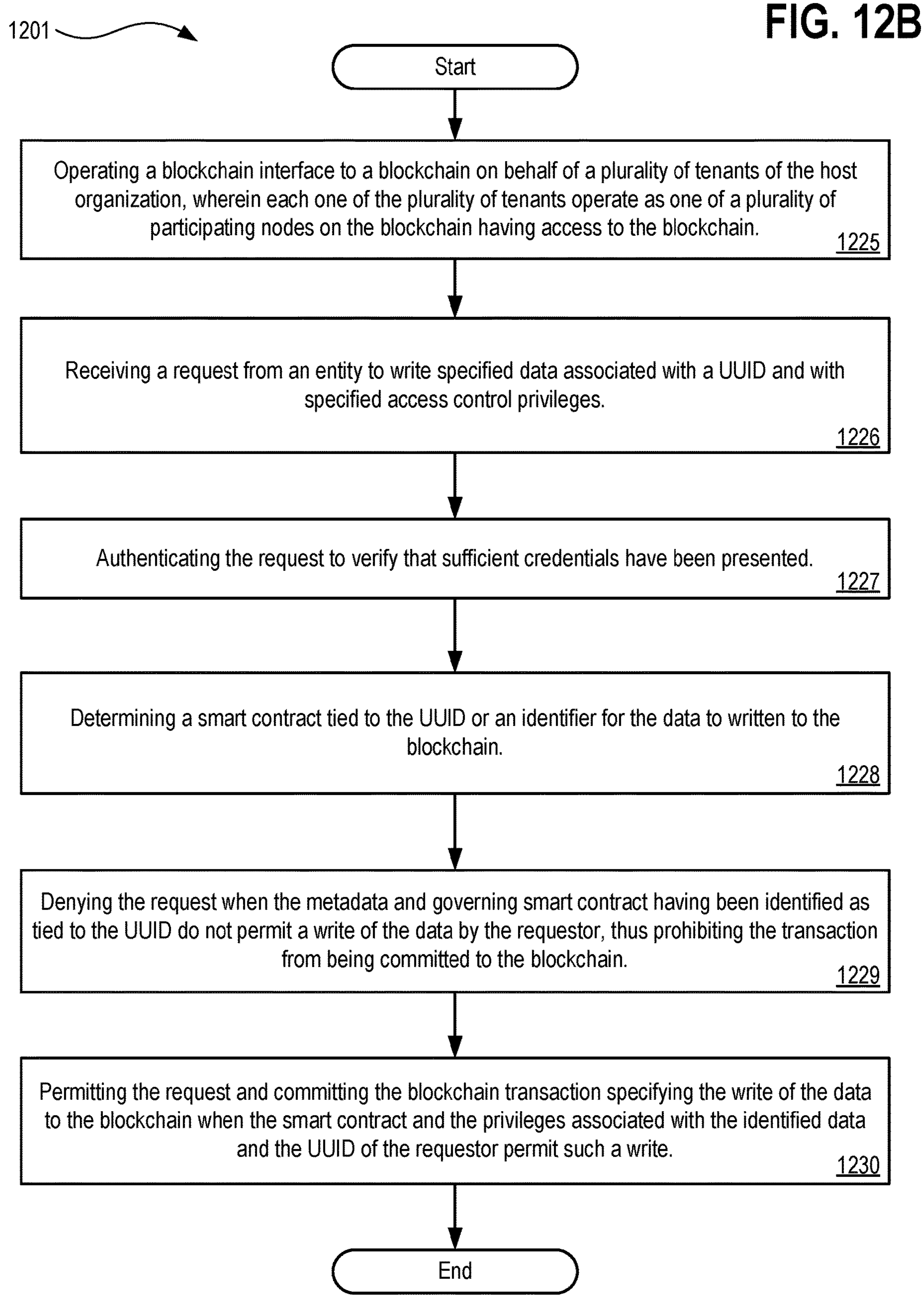
Figure 12C:
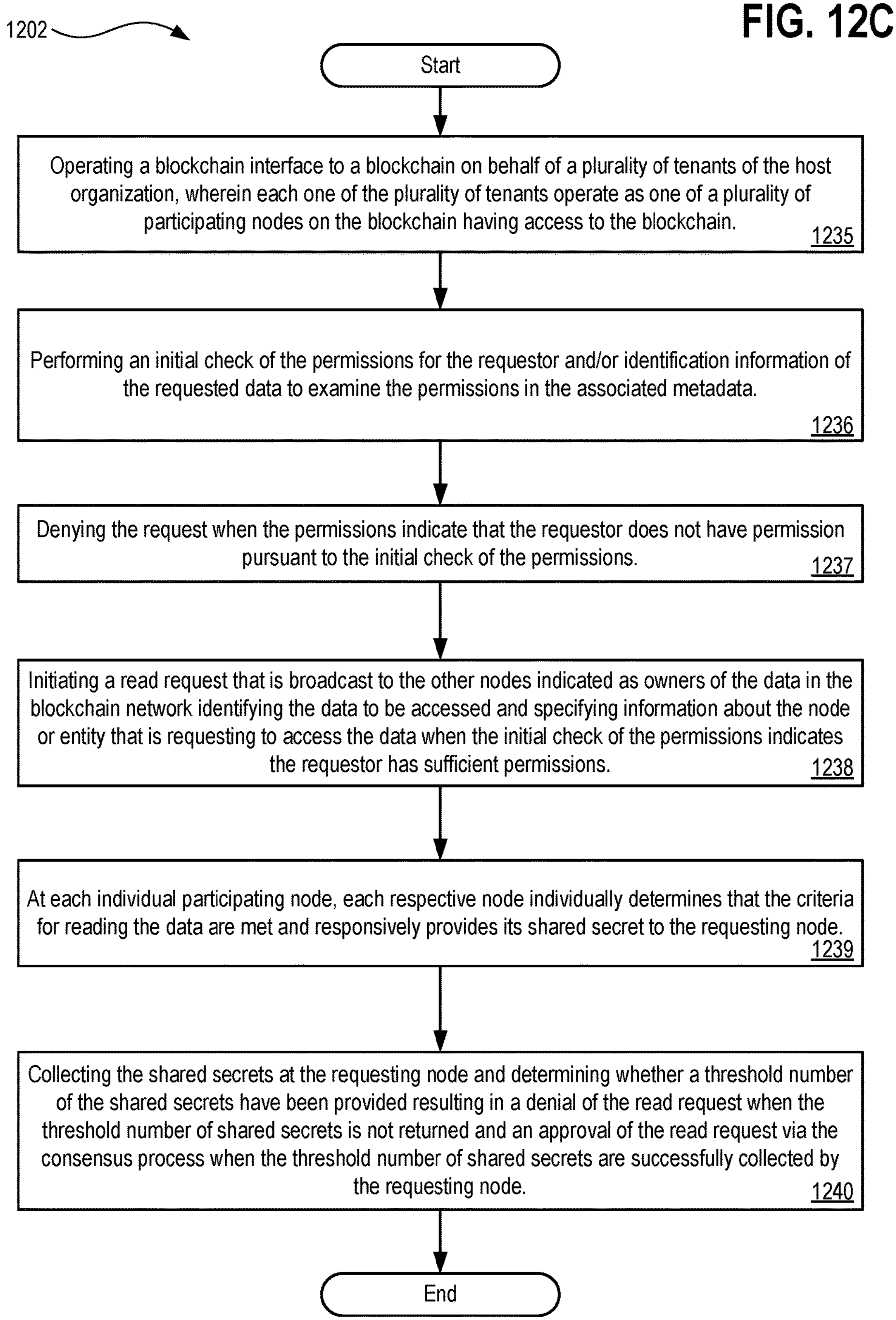

FIGS. 12A, 12B, and 12C depict flowcharts related to a set of processes for implementing an access control function within a blockchain service interface 240. The access control functions utilize aspects of the read on consensus process to enable an entity to designate access controls for data to enable read and write permission for the blockchain. The flowcharts of FIGS. 12A, 12B, and 12C describe three related aspects of access controls, namely, an initial store of data with a set of permissions, a request for writing to the data, and a read request for the data. These functions together provide the ability for a blockchain to implement access controls for data by encrypting the data and then controlling writes to the data using smart contracts while controlling reads of the data using consensus on read. These access control functions are applicable to both permissioned (i.e., private) and public blockchains and are separate from the access control layers associated with permissioned blockchains.

With reference first to FIG. 12A, processing of the method 1200 begins with operating a blockchain interface to a blockchain on behalf of a plurality of tenants of the host organization, wherein each one of the plurality of tenants operate as one of a plurality of participating nodes on the blockchain having access to the blockchain (block 1205).

Next, the access controls process continues with a node receiving a transaction to be stored to the blockchain at a blockchain interface where the transaction includes a unique user identifier (UUID) for the entity that is associated with this data along with an indication of the ownerships and access privileges (i.e., permissions) for the data (Block 1211). In addition, the received transaction includes an indicator of the aspects of the data that are to have defined permissions. The entirety of the data or any aspect of the data at any level of granularity can have defined permissions, e.g., an object, record, field of the data and/or metadata. Upon the transaction being determined to be committed to the blockchain based on the consensus of the nodes in the blockchain (Block 1212), an object and metadata format for the transaction data are determined that is utilized to store the data on the blockchain where the object and metadata will include the owning entity UUID or similar identifier and a set of permissions to identify the object, record, field or similar component of the data that is designated as private (Block 1213).

The blockchain consensus manager 241 or permissions manager 181 generates a key to encrypt the data to be stored (Block 1214). The key utilized to encrypt the data and that will also be utilized to decrypt the data to access it, is then transformed into a set of shared secrets (Block 1214). Any secret sharing process or protocol can be utilized (e.g., Shamir's secret sharing algorithm) that can transform the key into a set of share secrets equal in number to the number of designated owner nodes in the blockchain network (Block 1215). Similarly, a secret sharing algorithm that has a desired threshold or configurable threshold can be selected to generate the shared secrets. Using such a shared secret algorithm ensures that the data can only be accessed where a threshold number of the shared secrets are provided by the owner nodes in the blockchain network to reconstitute the key needed for decryption.

As each shared secret is generated by the secret sharing algorithm, the shared secret designated for a particular owner node in the blockchain network is encrypted using the public key of that node. Thus, only the associated node can decrypt the shared secret assigned to it and provide it in the case of a granted read request as part of consensus on read. These encrypted shared secrets are stored as metadata for the associated transaction data upon consensus for committing the transaction to the blockchain along with the access privileges for the data (Block 1216).

FIG. 12B is a flowchart of the process for servicing a request to write data in the blockchain network.

With reference to FIG. 12B, processing of the method 1201 begins with operating a blockchain interface to a blockchain on behalf of a plurality of tenants of the host organization, wherein each one of the plurality of tenants operate as one of a plurality of participating nodes on the blockchain having access to the blockchain (block 1225).

The permissions manager 181 receives a request from an entity to write specified data associated with a UUID and access control privileges (Block 1226). The permissions manager 181 or related component may authenticate the request to verify that sufficient credentials have been presented to ensure that the requestor is authorized to initiate a write process to change the identified data (Block 1227). For example, a requestor may present a security token, password, encryption key and/or similar credentials to verify authorization. If authenticated, then the request is processed to determine or to identify either a smart contract tied to the UUID or to identify or determine an identifier for the data to written to the blockchain (Block 1228). A smart contract can set forth and manage the process for data to be added to the blockchain that serves as a write of the data such that the data added to the blockchain serves to replace prior data in the blockchain though that data itself cannot be modified.

The smart contract for a UUID or data associated with an UUID, or a specific object, record or field identified by the request is looked up in the blockchain and the metadata associated with the data to be written is examined to determine if the privileges allow for writes. If the metadata and governing smart contract do not permit a write of the data by the requestor then the process denies the write and the associated transaction is not committed or the portion related to the specific data managed by the access controls is not committed. Conversely, if the smart contract and the privileges associated with the identified data and the UUID of the requestor do permit a write, then the transaction and/or the portion of the data in the transaction identified to be written can be committed to the blockchain (Block 1230) and will reference the data that is written to such that it will function to replace it.

FIG. 12C is a flowchart of the process for servicing a request to read data with access control privileges in the blockchain network.

With reference to FIG. 12C, processing of the method 1202 begins with operating a blockchain interface to a blockchain on behalf of a plurality of tenants of the host organization, wherein each one of the plurality of tenants operate as one of a plurality of participating nodes on the blockchain having access to the blockchain (block 1235).

After the access controlled data is stored in the blockchain, any node that seeks to service a request to access the data makes an initial check of the permissions for the requestor and/or identification information of the requested data to examine the permissions in the associated metadata (Block 1236). If the permissions indicate that the requestor does not have permission, then the request to access this data is denied (Block 1237). If the UUID and the metadata of the requested data does not prohibit access, then the permission manager 181 must initiate a read request that is broadcast to the other nodes (Block 1238) indicated as owners of the data in the blockchain network and identifies the data to be accessed and includes information about the node or entity that is requesting to access the data (i.e., the UUID and possibly a set of credentials for the entity). Each of the nodes then executes its consensus process for access controlled data and makes a determination whether the credentials or other criteria for accessing the requested data are met (Block 1239). Each node that determines that the criteria for reading the data are met, provides its shared secret to the requesting node. The requesting node then can collect the shared secrets and determine whether a defined threshold number of the shared secrets have been provided (Block 1240). If the threshold number of shared secrets is not returned, then the consensus process denies the read request and it cannot be completed. In some embodiments, the consensus process can have a time limit or window within which the process must receive the threshold number of shared secrets. If the threshold number of shared secrets are provided by the other nodes, then the requesting node can utilize the shared secret algorithm to transform the shared secrets into the key and then the requested data can be decrypted and accessed. The threshold can be fixed or configurable. The threshold can be any value, such as number equal to half or two-thirds of the number of participating nodes. After the data has been accessed then the requesting node can discard the key such that it will have to be requested and reformed again on subsequent accesses.

In the context of a distributed enterprise platform, both role based and attribute based control can be implemented. Role based control defines the access rights of a user and the attribute based control extends access rights to attributes such as properties of a resource, entities and the execution environment. The access controls can be divided into entity level and record level access in combination with blockchain. The entity level access is similar to a object or field level control that allows a set of defined users or partners to access an entity in a blockchain as well as associated fields. A record level access can be similar to sharing settings in other platforms that allow access to the record based on permission defined by the record owner.

In this example use case, the access controls (which are also referred to as "permissions") are definable and configurable in relation to participants, records, record policies, and record authorization. A participant in this use case is represented with participant metadata in the blockchain, which can be a defined set of users or entities that have ownership or access privileges over specified data in the blockchain. A record in this context can be a metadata entity that contains the identifier for an entity that extends the record (e.g., a customer entity includes an identifier for a record entity. Participants are associated in this example with the record entity. Access is defined at the record level to manage entity access.

In such a use case, a record policy can be a junction object that keeps the record and participant access policy. Access levels can be defined with two types, a permission level (e.g., read, write, and read/write) and a consensus level (e.g., where there are multiple owners) such as one or majority. A record authorization can track transactions about individual authorization by each record owner in relation to the record policy.

For example, access control may be described in relation to an access request from a third party (i.e., a non owner). For sake of the example, a third party may be a college requesting to review transcripts of a student (i.e., the owner) from another institution (e.g., a high school) that manages the transcripts using the blockchain as described herein. The process starts with the third part (college) asking to access the transcripts. An access request handler queries the blockchain to determine permission for access. If access is already granted, then a verification can be returned.

Where access has not yet been granted, then the access request handler can send access requests to the owners. When all of the owners (or a majority) approve the access, then the policy/permissions for the transcripts are updated in the blockchain. The access request of the third party can then be accepted to grant access to the requested record (e.g., the transcripts) in the blockchain. If access is not approved by the owners, then the access is blocked.

According to another embodiment, the methods 1200, 1201, and 1202 are performed by a system of a host organization for providing access controls for data a blockchain, the system providing a blockchain interface to a blockchain on behalf of a plurality of tenants of the host organization each serving as nodes in a blockchain network, the method including: receiving a request including an identifier of a requestor, the request to access transaction data having defined privileges; requesting access to the transaction data from nodes in the blockchain network, a request for access including the identifier of the requestor; receiving at least one shared secret from an owner node in the blockchain network indicating consensus to access the transaction data by the requestor; and denying access to the transaction data in response to receiving insufficient shared secrets from the nodes indicating the requestor does not meet requirements of the defined privileges of the transaction data.

According to another embodiment of methods 1200, 1201, and 1202, the processing performed by the system further includes: determining whether the identifier of the requestor has read access privileges before requesting access to the transaction data.

According to another embodiment of methods 1200, 1201, and 1202, the processing performed by the system further includes: receiving request to write data associated with the transaction data; and determining whether the request to write is permitted by the privileges of the transaction data by a smart contract.

According to another embodiment of methods 1200, 1201, and 1202, the transaction data is decrypted in response to receiving a threshold number of shared secrets.

According to another embodiment of methods 1200, 1201, and 1202, a decryption key is recovered from received shared secrets.

According to another embodiment of methods 1200, 1201, and 1202, denying access to the transaction data is in response to a number of received shared secrets being below a threshold for recovering a key for encryption.

According to another embodiment of methods 1200, 1201, and 1202, the processing performed by the system further includes: defining object and metadata for the transaction data to be stored in the blockchain including identification of access privileges for objects and fields.

According to a particular embodiment, there is a computing system of a host organization configured to perform a method for providing a right to forget data in a blockchain, the computer system providing a blockchain interface to a blockchain on behalf of a plurality of tenants of the host organization each serving as nodes in a blockchain network, the computer system including: a computer readable medium having stored therein the blockchain interface and a permissions manager; and a processor coupled to the blockchain interface, the processor configured to execute the blockchain interface and the permissions manager, the permissions manager to receive a request including an identifier of a requestor, the request to access transaction data having defined privileges, to request access to the transaction data from nodes in the blockchain network, a request for access including the identifier of the requestor, to receive at least one shared secret from an owner node in the blockchain network indicating consensus to access the transaction data by the requestor, and to deny access to the transaction data in response to receiving insufficient shared secrets from the nodes indicating the requestor does not meet requirements of the defined privileges of the transaction data.

According to yet another embodiment, there is a computer-readable medium having stored therein a set of instructions, which when executed cause a computer system of a host organization to perform a set of operations of a method for managing read access of data in a blockchain, the computer system providing a blockchain interface to a blockchain on behalf of a plurality of tenants of the host organization, the set of operations including: receiving a request including an identifier of a requestor, the request to access transaction data having defined privileges; requesting access to the transaction data from nodes in the blockchain network, a request for access including the identifier of the requestor; receiving at least one shared secret from an owner node in the blockchain network indicating consensus to access the transaction data by the requestor; and denying access to the transaction data in response to receiving insufficient shared secrets from the nodes indicating the requestor does not meet requirements of the defined privileges of the transaction data.

Figure 13:
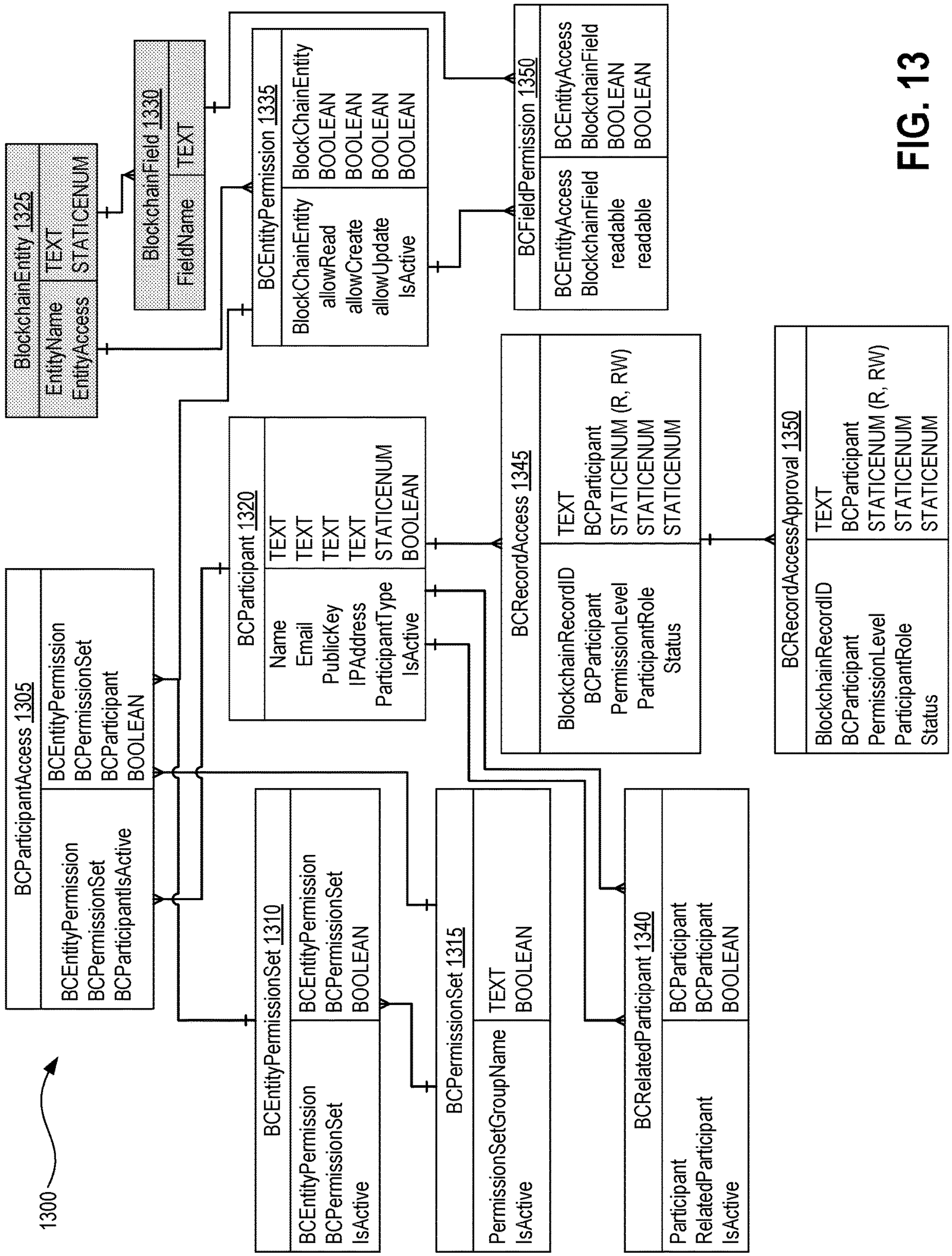
FIG. 13 depicts an exemplary access control data model within blockchain in accordance with the described embodiments.

FIG. 13 depicts an exemplary access control data model 1300 within blockchain in accordance with the described embodiments.

For instance, as may be observed within the access control data model 1300, there are several tables depicted in yellow each of which define an "access control object" which is written onto the blockchain. The depicted access control objects include: a Blockchain Entity Permission Set (BCEntityPermissionSet) at element 1310, a Blockchain Participant Access (BCParticipantAccess) at element 1305, a Blockchain Permission Set (BCPermissionSet) at element 1315, a Blockchain Participant (BCParticipant) at element 1320, a Blockchain Entity Permission (BCEntityPermission) at element 1335, a Blockchain Related Participant (BCRelatedParticipant) at element 1340, a Blockchain Record Access (BCRecordAccess) at element 1345, a Blockchain Record Access Approval (BCRecordAccessApproval) at element 1350, and a blockchain Field Permission (BCFieldPermission) at element 1355. Further depicted at the upper right hand side of the diagram (shaded grey blocks) are specialized blockchain entity objects, including the Blockchain Entity (BlockchainEntity) at element 1325 and the Blockchain Field (BlockchainField) at element 1330. These objects do not define access control policies and rules, but rather, define metadata for entities which are written to the blockchain.

One of the biggest issues with respect to utilization of conventional blockchain implementations is that a smart contract needs to be written for each and every access attempt seeking to retrieve data stored within the Blockchain data. This problem is then exacerbated further with respect to permissioned blockchain implementations utilized by enterprises.

It is therefore described herein, systems, methods, and apparatuses which implement user access controls in a metadata driven blockchain operating via Distributed Ledger Technology (DLT) using granular access control objects and ALFA/XACML visibility rules in conjunction with a cloud based computing environment. Such systems and methods therefore operate to provide access to users within the metadata-driven Blockchain through the use of granular access control objects enforced via ALFA/XACML visibility rules.

The term ALFA is an abbreviation for "Abbreviated Language For Authorization," which provides a pseudocode language heavily utilized in the formulation of access-control policies.

The term "XACML" is an abbreviation for "eXtensible Access Control Markup Language," which utilizes XML as its main encoding language, yet provides a more lightweight notation over traditional XML, defining a declarative fine-grained, attribute-based access control policy language, an architecture, and a processing model describing how to evaluate access requests according to the rules defined in policies.

ALFA policies are easily converted into real XACML 3.0 policies which may then be loaded into an XACML policy management tool.

Similar to XACML, ALFA has three structural elements including a policy set (PolicySet), a Policy, and a Rule. Like with XACML, a PolicySet in ALFA can contain PolicySet and Policy elements; a Policy in ALFA can contain Rule elements; and a Rule in ALFA contains a decision (either Permit or Deny). Additionally, utilizing ALFA, it is further possible to add Rule elements to a PolicySet and a Policy element. PolicySet, Policy, and Rule elements can be nested or referenced to within the ALFA framework.

In order to resolve conflicts between siblings ALFA, as is also the case with XACML, utilizes combining algorithms, of which there are several.

With respect to the use of access control mechanisms within blockchain, there is a need to control the data explosion of information and data being collected via blockchain and a posteriori, analyzed by different entities, all of which leads to the debut of data security and privacy issues.

Moreover, there is the problem of personally identifiable information in which some data written to the blockchain may store some personally identifiable information and may be shared among different institutions and organizations. Hence, there is the need to control the accesses to such data resources by third-entities, despite the traditional notion of blockchain being open, transparent and accessible by any participating node.

It is therefore desirable to improve privacy of certain data written to blockchain implementations through the use of the user access control to such data which is sometimes held by different parties, and which may be required to be accessible to certain defined third-parties, all of whom may have different objectives.

It is therefore described in accordance with certain embodiments that an Access Control Data Model is implemented within Blockchain having multiple data structures, shown here as the access control objects, including a BC Participant 1320, a BC Entity Permission 1335, a BC Permission Set 1315, a BC Participant Access 1305, a BC Record Access 1345 and a BC Record Authorization or BC Record Access Approval 1345 type access control object.

According to such an embodiment, the BC Participant 1320 is an abstract concept in which a participant is unique within the network and has a public/private key but can be tied to a same user across various networks enabling granular controls. A BC Participant 1320 can also be a group or a node. A BC Entity Permission 1335 captures the policy for the particular entity. A BC Permission Set 1315 captures policies across all entities and can create a policy set. A BC Participant Access 1305 data structure captures a participant's access to the BC Entity permission or BC Permission set. A BC Record Access 1345 data structure holds the policy for a record and a participant providing the access role and access permission. A BC Record Authorization or BC Record Access Approval 1345 captures the authorization from the owners when a policy is added. By default, a policy remains pending until consensus on the policy is reached by the owners.

Smart contracts then evaluate the entity objects and decide if the access may permissibly be given to the user based on the user to participant mapping and the access control objects. This can be used to specify the create/transfer/update of the information in the blockchain and what fields can be updated by the user.

The notation "BC" preceding each of the data structures is not required, and thus, any of the depicted objects, such as BC Permission Set may be referred to as simply "Permission set," and so forth for all of the depicted data structure objects.

Figure 14:
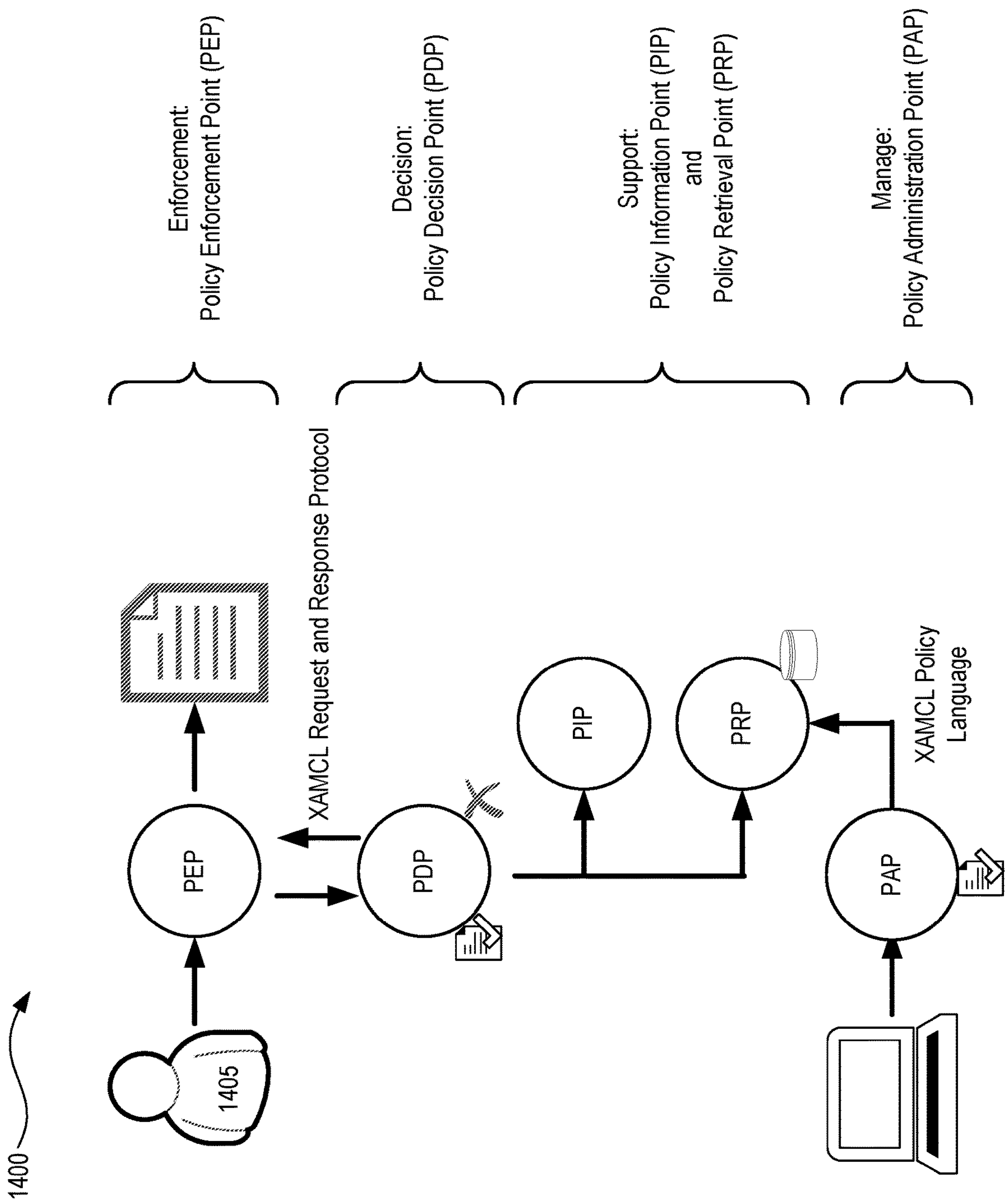
FIG. 14 depicts exemplary access visibility rules within a blockchain in accordance with the described embodiments.

Because the blockchain implementation utilizes the above described metadata platform, it is thus possible to store access privilege objects or access policy objects within the blockchain itself, and therefore, it is possible for an executing smart contract to retrieve and infer the applicable rules and policies from the objects having already been written onto the blockchain. For example, such rules may be written onto the blockchain via a Policy Administration Point (PAP) such as that which is depicted at FIG. 14.

The various access control objects permit for the abstraction of the user in a way that is never before feasible. Through the use of the BC Participant access control object, it is possible to abstract the notation of a user away from any particular organization or entity and instead, permit the user to be represented globally across all entities through the use of the BC participant 1320 access control object written to the blockchain which uniquely identifies that user at the blockchain level, such that any entity which must handle operations on behalf of that user or make any reference to that user may do so utilizing the global BC Participant access control object for that particular user.

Consider for example a student, John, at ASU. If the student access records from the ASU system, there may be a user name or a user ID specific to the user John at ASU. However, if the same human user John goes to a different collage, such as NYU, the different collage will have a different user ID or user name for the user John due to the implementation of a different User ID management system. Thus, the same person has disconnected and multiple user identifiers, which is undesirable. Because the user, John, is identified by different User IDs, the user John simply cannot login and access his data from both ASU and NYU utilizing the same User ID, as the two colleges utilize different User ID management systems.

However, practice of the disclosed embodiments permits the same user, John, to access his data utilizing the same Blockchain Participant 1320 access control object, regardless of which participating node the user attempts to access such information from. Stated differently, because a blockchain participant 1320 access control object is stored on the blockchain for the exemplary user John, it will not matter whether the user John attempts to access his information from an ASU associated node on the blockchain network or an NYU associated node on the blockchain network, as each will ultimately reference the global blockchain participant access control object specifically for the user John, which is stored on the blockchain network itself, rather than being stored and maintained by either of the ASU or NYU User ID management systems.

In certain embodiments, an entity such as the ASU or NYU college may continue to utilize their own User ID management system, but correlate all user IDs to the BC participant access control objects stored upon the blockchain, such that any data access affiliated with their users are resolved to the BC Participant access control object on the blockchain. Alternatively, an entity may update their own User ID management system to adopt the global BC Participant access control objects, for at least the users having some association or affiliation with the particular entity in question (e.g., a college may adopt the BC Participant access control objects from the blockchain for every student at the college, but may ignore others which are not associated with a student at that college). In yet another alternative embodiment, an entity having its own User ID management system may transition to exclusive use of the BC Participant access control objects stored upon the blockchain and shutdown their own User ID management system subsequent to such a transition, such that all interactions on behalf of users with that entity reference the BC Participant access control objects on the blockchain, thus eliminating the redundant non-blockchain system.

Continuing with the example from above, once both colleges ASU and NYU reference the BC Participant access control object on the blockchain, it becomes essentially irrelevant from which entity the user attempts to access his information because regardless of whether the user John is a student at ASU, or a student at NYU, or a transfer student from ASU to NYU, etc., the access request on behalf of the exemplary user John will reference the BC Participant access control object stored on the blockchain upon which both ASU and NYU are participating nodes.

In such a way, there is a participant object 1320 stored upon the blockchain which is exclusively and globally tied to a particular user throughout the entire blockchain network, no matter how many participating nodes join the blockchain network.

According to another embodiment, the user attempts access through a participating node on the blockchain as a user of the blockchain node and the login attempt is resolved or processed through any Identity Management System (IMS) operated by a particular enterprise, organization, or entity. An identity-management system or IMS refers to an information system or a set of technologies that can be used for enterprise or cross-network identity management to provide authentication services for the users associated with that particular enterprise.

Therefore, it is permissible for a business, or a college continuing with the example from above, to continue to utilize its own identity management system, so long as the user id is either identical to the BC Participant access control object stored on the blockchain or is able to be resolved to, via some cross referencing, to the BC Participant access control object stored on the blockchain.

In another embodiment, the user of a participating node authenticates with an entity through that entity's own Identity Management System without that user's information being passed to the blockchain, so long as information is not attempted to be accessed from the blockchain utilizing that user's ID. Notably, however, because the user ID is either identical or cross-referenceable to an identical ID for the same user on both the blockchain network via the BC Participant access control object and also within the for the user on both the organization's Identity Management System, the identical access privileges given to that user will be applicable on both sides. Specifically, the access permissions, rules, etc., will be identical for the same user for any transaction on the blockchain and also for any transaction which occurs within the organization's systems. Further still, the same user will further have the same access permissions, rules, etc., if the user attempts to make a blockchain transaction through another participating node on that blockchain. For example, if the user logs in through the NYU system instead of the ASU system, the same access permissions, rules, etc., will nevertheless apply for that user despite attempting access through a different participating node on the blockchain since the user's access permissions, rules, etc., are tied to the user's BC Participant 1320 access control object on the blockchain.

The BC Participant 1320 access control object itself does not store the various access permissions, rules, etc., but rather, stores only limited information for the user, such as the user's name, email, public key, private key, IP Address, participant type, participant status (e.g., active or inactive), etc. Refer to element 1320 which depicts a possible implementation.

The various access permissions, rules, etc., are stored by other access control objects on the blockchain. For example, there may be a blockchain entity 1325 level object which defines, for example, "car," and within the "car" entity 1325 level object, there may further be defined the "VIN" number for the car, the "Make," the "Model," the "Trim," the "Color," etc., all of which is defined via blockchain field objects 1330 associated with the blockchain entity objects 1325 which are written onto the blockchain.

Once the entity level object 1325 is stored on the blockchain, it is then further permissible to define that a particular user having a specific User ID, or a user group, etc., having a defined participant ID associated with a specified public key has permission to see a specified object, or has permission to perform certain types of transactions, such as an update transaction, or a create transaction, or a read transaction, etc.

For example, a manufacturer may have the ability to perform a create transaction on the blockchain for a new vehicle, including specifying the VIN number for that vehicle, where as a car dealer has the ability to read the object with the VIN number for a vehicle but cannot create or even update the object. Similarly, it may be that a student has the permissions to inspect, retrieve, read, and otherwise reference their own grade for a college course within a college transcript object stored on the blockchain, but that student cannot modify, delete, create, or update such an object. Further still, that student cannot perform any transaction for another student's transcript, and thus, while the student may read their own transcript, they cannot read the transcript grades of another student. Taken further, a college professor may have permissions defined allowing that professor to see the grades of multiple students and update, create, or modify the grades of students which are actively enrolled in a course with that professor, however, such a professor would not have permission to alter the grades of a student not enrolled with that professor's active courses.

Or a student may have the ability to request to see the grade, but is prohibited from seeing the grade until affirmative approval is received at the blockchain permitting the student to see the grade. Any number of rules may be devised, however, all such rules are captured by the BC entity policy access control object or a BC entity permission 1325 access control object which is linked with the participant.

These rules, permissions, etc. are inferred from the access control objects written onto the blockchain and enforced at run-time via a smart contract which executes at the blockchain.

While access control models are well known, it was not previously possible to enforce access control rules and policies via the blockchain. However, through practice of the disclosed embodiments, it is now possible to define such policies and permissions via the above described metadata platform, with such access control objects being written to the blockchain and then enforce the access permissions through the use of a smart contract executing at runtime and infer the applicable rules from the access control objects already written to the blockchain based on the access control objects themselves as well as the additional context of the participant ID (e.g., user) that is requesting access to automatically allow or deny access to the requested information from the blockchain.

Conversely, the way that blockchains operate presently it is required that every access control permission, rule, policy, etc., be tailor made and specifically constructed via a custom coded smart contract, through a process which is not only technically complex and labor intensive, but is also error-prone. For example, for a rule that says student, John, may access his transcript and grades but not the grades of other students, it was necessary with conventionally implemented blockchains to create a smart contract that explicitly defined the rule for the public key associated with the user John. As many more users are accommodated and as the rules become increasingly complex, there becomes a larger number of smart contracts required to enforce such rules and the smart contracts themselves become extremely complex, to the point where they are potentially unwieldy and very difficult if not impossible to maintain, as there literally must be a coded entry for every single user or participant. Such problems, in practicality, often prevent organizations from migrating data to a blockchain platform given the above complexities, instead utilizing well known and established access control mechanism for their non-distributed monolithic data stores.

Stated differently, there is no presently known mechanism by which to store and execute access control rules and policies from the blockchain.

However, by tying together the dynamic access control system together with the blockchain platform, it is possible for a generic smart contract to infer the information needed from the access control objects already written onto the blockchain based on the contextual knowledge determined from what user is making the access request and the metadata already written to the blockchain defining the various access control objects needed to understand and control any access request to the blockchain.

Because the access control objects are stored utilizing the metadata platform a single agnostic smart contract may be utilized for different customer organizations as the smart contract only needs to know to go and retrieve the access control objects upon receipt of a blockchain transaction requesting access to any blockchain entity object. In such a way, all access control permissions may be resolved dynamically at runtime and such policies, rules, permissions, etc., may be updated at anytime through the updating of the access control objects without needing to update or change the smart contract or the underlying blockchain platform's configuration.

FIG. 14 depicts exemplary access visibility rules 1400 within a blockchain in accordance with the described embodiments.

In accordance with described embodiments, the Access Control Data Model is implemented within Blockchain supports XACML standards pursuant to the following rules: (1) Policies will be stored in Blockchain; (2) Rules are broken down into more granular rules as well as criteria that is provided upon access to data in the blockchain; (3) smart contracts infer the XACML/ALFA based rules to be applied based upon what is stored in the blockchain with the smart contracts then applying the inferred rules at runtime of any access request, thus allowing the platform to dynamically decide at runtime, based on the context, whether or not a given user has access, and thus, whether or not permission or authorization may actually be granted or must be denied for the particular request. For example, a smart contract may enforce a rule to allow access to a particular record for the determined user or user group, but only between 9 AM to 12 PM.

As may be observed here, there is a user which makes a request into the PEP or policy enforcement point which then engages the XAMCL request and response protocol. The PDP or policy decision point evaluates the request and either approves or denies the request. In order to facilitate the approval or denial, the PIP or Policy Information Point and the Policy Retrieval Point operate to pull, via XAMCL policy language, the appropriate inferred policy rules from the blockchain and based on the retrieved policies, the approval or denial is then determined.

The PAP, or Policy Administration Point, manages access authorization policies. The PDP, or Policy Decision Point, evaluates access requests against authorization policies before issuing access decisions. The PEP, or Policy Enforcement Point, intercepts user's access request to a resource, makes a decision request to the PDP to obtain the access decision (i.e. access to the resource is approved or rejected), and acts on the received decision. The PIP, or Policy Information Point, is the system entity that acts as a source of attribute values (i.e. a resource, subject, environment). The PRP, or Policy Retrieval Point, is the point at which the XACML access authorization policies are stored.

As shown here, the system, policies, rules, etc., may be managed via the Policy Administration Point or PAP.

For example, through the use of the PAP, it is not necessary for any user or administrator to code any smart contract code. Rather, through the GUIs provided via the PAP, an admin may define, for example, user x may access grades upon approval by professor y, and the administrator upon setting up the rules in the GUI and saving them or deploying them, will trigger the GUI to generate and output the appropriate metadata which is written to the blockchain via the access control objects (subject to consensus). Once that metadata is represented on the blockchain via the access control objects a generic smart contract provided with the blockchain platform will execute and will go and retrieve the appropriate access control objects to infer the applicable rules for the user associate with the access request and then determine dynamically at run-time any applicable criteria and then enforce the rules which are written to the blockchain via metadata within the access control objects.

The smart contract which enforces the access controls is wholly agnostic as to what user, organization, criteria, or rules are applicable for any given access request. Rather, the smart contract is coded in such a way that it knows to refer to the access control objects from which it may then be determined at run time, what rules or permissions are to be enforced. In such a way, those access control objects may be updated, modified, added to, etc., without any programmatic or coding change to the smart contract responsible for inferring such rules and enforcing the rules.

Stated differently, the generic smart contract will already be present on the blockchain ready to execute for any data access request, and my utilize consensus mechanisms such as, for example, consensus on read, as described above.

Regardless of the consensus mechanism, the smart contract will retrieve the metadata from the access control objects to infer the rules and based on the known user which is determined from the originator of the access request (e.g., what user is requesting access), the smart contract will then enforce the rules for the referenced entity objects as they apply specifically to that particular user, without any of the entity objects, users, or access permissions being coded within the smart contract. In such a way, an entirely generic smart contract may be utilized for any company or organization, so long as such organizations utilize the metadata platform for configuring their access control objects to define such rules and permissions on the blockchain.

Further provided, a part of the access control objects, it is further permissible to group entity objects and apply permissions to them for a particular user (e.g., participant) or for a group of participants or a group that defines many participants.

For example, it is permissible via the access control objects to define that user John may access an defined entity group having multiple entities within it. For example, user John may access both a grades entity object and also a schedule entity object. Or a group of users may have read access to a defined entity group having both vehicle entity objects and also part number objects. Thus, the access control objects may define that a single user participant 1320 may access a single entity 1325, or may define that a group of user participants 1320 may access a single access a single entity 1325, or may define that a single user participant 1320 may access a group of blockchain entities 1325, or may define that multiple user participants 1320 may access such a group of multiple blockchain entities 1325.

According to the described embodiments, the access control objects may include embedded criteria which is to be enforced, but which is wholly unknown by the executing smart contract until run time because the criteria is not coded into such a smart contract.

For example, consider a medical patient having undergone a clinical trial and provides consent for certain doctors to see the information. Such a user may define that the doctors have consent to view the information for no more than 3 months from the conclusion of the clinical trial.

With such an example, it simply cannot be known at the time that the criteria is written to the blockchain whether or not the criteria will resolve to permissible access or prohibited access at the time that some future unknown access request is received to the blockchain. For example, one month after the clinical trial, a request by the doctor to retrieve the data would be permissible, however, at three months and one day after the conclusion of the clinical trial, the identical request by the exact same doctor for the exact same information would be a prohibited access.

Therefore, it is in accordance with the described embodiments that a smart contract interpreter operates to dynamically resolve criteria at run time and determine whether or not a rule applies and whether or not an access request is permissible or impermissible.

According to one embodiment, every transaction that is received at the blockchain, regardless of whether it is a get, put, or post transaction, triggers the smart contract to reference the XACML via a pre-defined link or reference, at which point the XACML rule is retrieved, executed on-the-fly to determine the present result of a specified criteria, and then return the results of the criteria to the smart contract which is embedded into the smart contract's current runtime execution for only that transaction.

The pre-defined XACML link or reference may be specified within the access control objects. For example, one of the permissions applied to a given entity object may specify a XACML link or reference to be followed rather than a particular pre-defined permission, thus permitting some dynamic criteria to be resolved at run-time.

For example, the doctor seeking to access a patient's medical information from a clinical trial may resolve to a permitted transaction or a prohibited transaction based on whether or not the clinical trial completed within the last 3 months or more than the last 3 months, which simply cannot be known until the time that the transaction is received at the blockchain.

Therefore, the smart contract interpreter will reference the blockchain entity 1325 having the patient's medical records which is associated with a blockchain entity permission 1335 that defines an XACML link or reference. The smart contract interpreter will therefore follow the link to the XACML, execute the rule defined by the XACML on the fly to determine whether or not the present time is within 3 months of the clinical trial, embed the results of the XACML rule into the current execution of the smart contract, which will then enforce the dynamic criteria, permitting access to the patient's medical information if indeed the doctor is making the request within 3 months of the clinical trial and prohibiting access by the doctor to the patient's medical information if the doctor is making the request after 3 months of the conclusion of the clinical trial.

Any number of permissible rules may be defined by the XACML link or reference, such as employees may access records during business hours, with the question of whether or not it is currently "business hours" being determined by executing the XACML and returning the results to the smart contract interpreter.

According to another embodiment, the access control objects will be default be mentioned or initiated as "private" regardless of the underlying blockchain being public, private, or permissioned, etc.

Thus, only the owner of data will initially have access to a data record written onto the blockchain and the owner of the data must affirmatively grant access to the data transacted onto the blockchain to one or more additional users (e.g., participants) or to one or more additional groups of participants.

For example, consider the professor creating a new grade for a student and transacting the new grade onto the blockchain. Here, the professor is the "owner" of the record, and upon creating a new grade for student John, the record on the blockchain will be private and will be limited to only the professor. The professor may then expand access to permit, for example, the student John, to see the record, thus permitting both the professor and also the student John to see the record without permitting any other student to see the record. An application GUI would typically be utilized and programmed to permit the professor to add the record and to further facilitate the professor's ability to expand permissions, however, from the perspective of the blockchain itself, the record is private upon creation and accessible only to the creator/owner of that record.

Figure 15A:
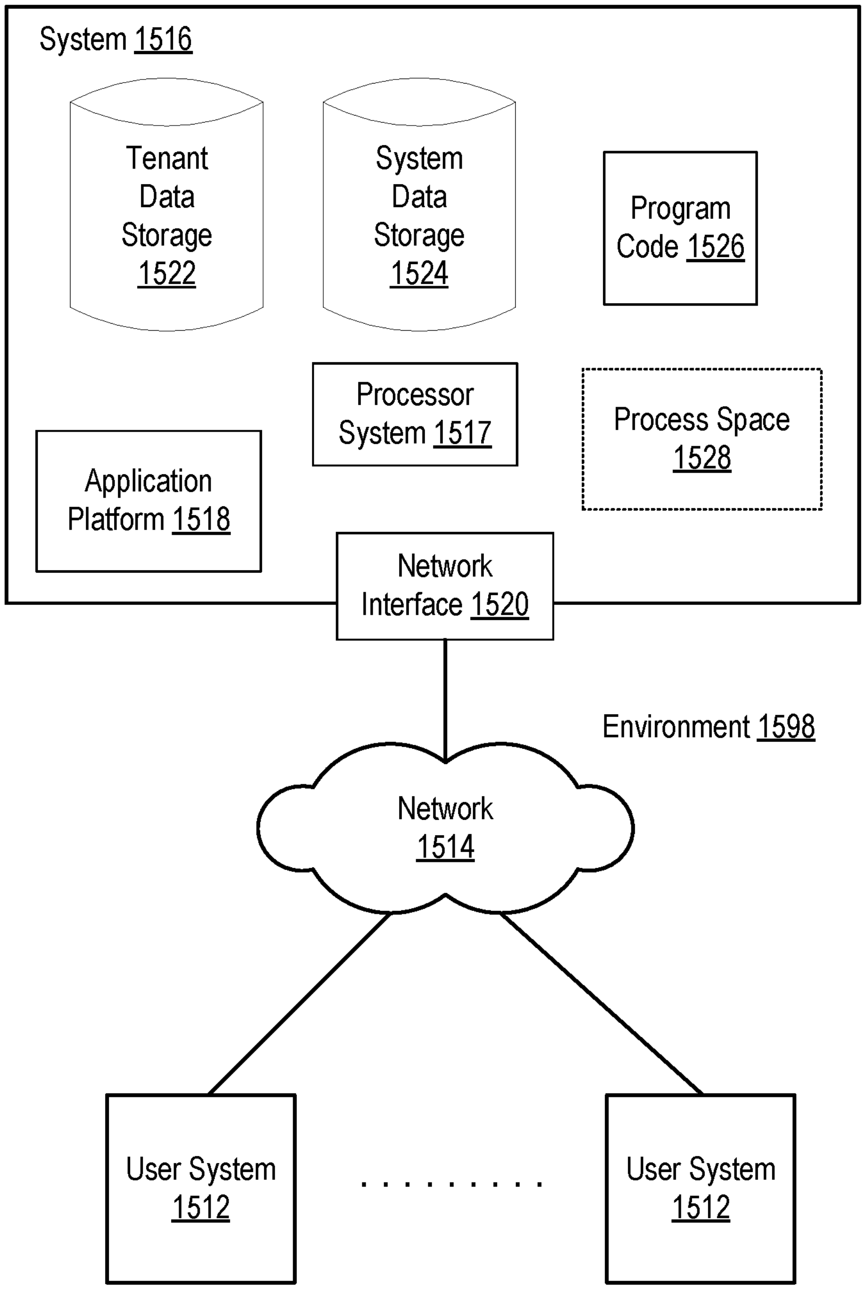
FIG. 15A illustrates a block diagram of an environment in which an on-demand database service may operate in accordance with the described embodiments.

FIG. 15A illustrates a block diagram of an environment 1598 in which an on-demand database service may operate in accordance with the described embodiments. Environment 1598 may include user systems 1512, network 1514, system 1516, processor system 1517, application platform 1518, network interface 1520, tenant data storage 1522, system data storage 1524, program code 1526, and process space 1528. In other embodiments, environment 1598 may not have all of the components listed and/or may have other elements instead of, or in addition to, those listed above.

Environment 1598 is an environment in which an on-demand database service exists. User system 1512 may be any machine or system that is used by a user to access a database user system. For example, any of user systems 1512 may be a handheld computing device, a mobile phone, a laptop computer, a work station, and/or a network of computing devices. As illustrated in FIG. 15A (and in more detail in FIG. 15B) user systems 1512 might interact via a network 1514 with an on-demand database service, which is system 1516.

An on-demand database service, such as system 1516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1516" and "system 1516" is used interchangeably herein.

A database image may include one or more database objects. A relational database management system (RDMS)

or the equivalent may execute storage and retrieval of information against the database object(s). Application platform 1518 may be a framework that allows the applications of system 1516 to run, such as the hardware and/or software, e.g., the operating system. In an embodiment, on-demand database service 1516 may include an application platform 1518 that enables creation, managing and executing one or more applications developed by the provider of the on-demand database service, users accessing the on-demand database service via user systems 1512, or third party application developers accessing the on-demand database service via user systems 1512.

The users of user systems 1512 may differ in their respective capacities, and the capacity of a particular user system 1512 might be entirely determined by permissions (permission levels) for the current user. For example, where a salesperson is using a particular user system 1512 to interact with system 1516, that user system has the capacities allotted to that salesperson. However, while an administrator is using that user system to interact with system 1516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1514 is any network or combination of networks of devices that communicate with one another. For example, network 1514 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1512 might communicate with system 1516 using TCP/IP and, at a higher network level, use other common Internet protocols to communicate, such as HTTP, FTP, AFS, WAP, etc. In an example where HTTP is used, user system 1512 might include an HTTP client commonly referred to as a "browser" for sending and receiving HTTP messages to and from an HTTP server at system 1516. Such an HTTP server might be implemented as the sole network interface between system 1516 and network 1514, but other techniques might be used as well or instead. In some implementations, the interface between system 1516 and network 1514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1516, shown in FIG. 15A, implements a web-based Customer Relationship Management (CRM) system. For example, in one embodiment, system 1516 includes application servers configured to implement and execute CRM software applications as well as provide related data, code, forms, webpages and other information to and from user systems 1512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1516 implements applications other than, or in addition to, a CRM application. For example, system 1516 may provide tenant access to multiple hosted (standard and custom) applications, including a CRM application. User (or third party developer) applications, which may or may not include CRM, may be supported by the application platform 1518, which manages creation, storage of the applications into one or more database objects and executing of the applications in a virtual machine in the process space of the system 1516.

One arrangement for elements of system 1516 is shown in FIG. 15A, including a network interface 1520, application platform 1518, tenant data storage 1522 for tenant data 1523, system data storage 1524 for system data 1525 accessible to system 1516 and possibly multiple tenants, program code 1526 for implementing various functions of system 1516, and a process space 1528 for executing MTS system processes and tenant-specific processes, such as running applications as part of an application hosting service. Additional processes that may execute on system 1516 include database indexing processes.

Several elements in the system shown in FIG. 15A include conventional, well-known elements that are explained only briefly here. For example, each user system 1512 may include a desktop personal computer, workstation, laptop, PDA, cell phone, or any wireless access protocol (WAP) enabled device or any other computing device capable of interfacing directly or indirectly to the Internet or other network connection. User system 1512 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 1512 to access, process and view information, pages and applications available to it from system 1516 over network 1514. Each user system 1512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1516 or other systems or servers. For example, the user interface device may be used to access data and applications hosted by system 1516, and to perform searches on stored data, and otherwise allow a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 1512 and all of its components are operator configurable using applications, such as a browser, including computer code run using a central processing unit such as an Intel Pentium® processor or the like. Similarly, system 1516 (and additional instances of an MTS, where more than one is present) and all of their components might be operator configurable using application(s) including computer code to run using a central processing unit such as processor system 1517, which may include an Intel Pentium® processor or the like, and/or multiple processor units.

According to one embodiment, each system 1516 is configured to provide webpages, forms, applications, data and media content to user (client) systems 1512 to support the access by user systems 1512 as tenants of system 1516. As such, system 1516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 15B:
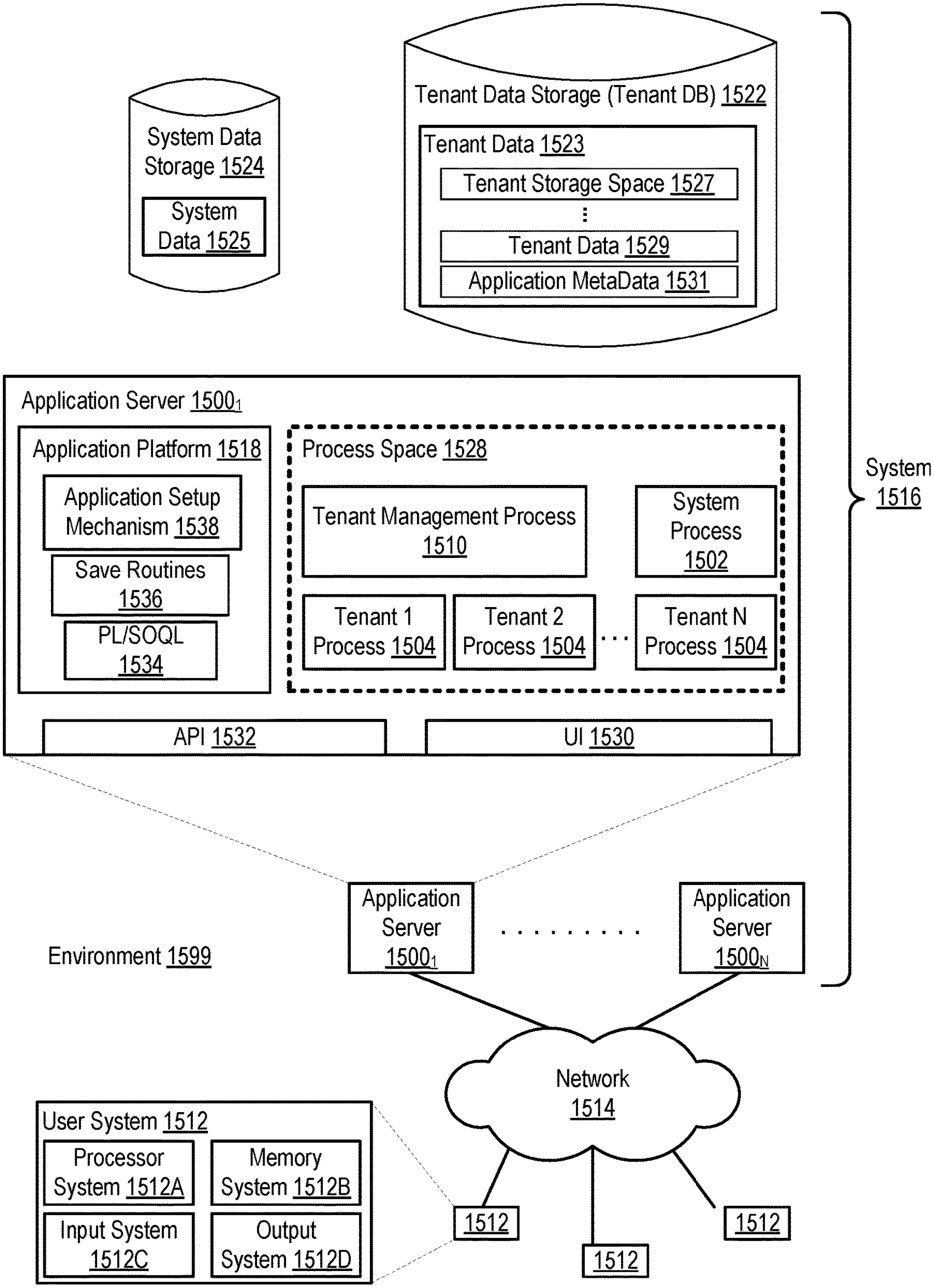
FIG. 15B illustrates another block diagram of an embodiment of elements of FIG. 15A and various possible interconnections between such elements in accordance with the described embodiments.

FIG. 15B illustrates another block diagram of an embodiment of elements of FIG. 15A and various possible interconnections between such elements in accordance with the described embodiments. FIG. 15B also illustrates environment 1599. However, in FIG. 15B, the elements of system 1516 and various interconnections in an embodiment are illustrated in further detail. More particularly, FIG. 15B shows that user system 1512 may include a processor system 1512A, memory system 1512B, input system 1512C, and output system 1512D. FIG. 15B shows network 1514 and system 1516. FIG. 15B also shows that system 1516 may include tenant data storage 1522, having therein tenant data 1523, which includes, for example, tenant storage space 1527, tenant data 1529, and application metadata 1531. System data storage 1524 is depicted as having therein system data 1525. Further depicted within the expanded detail of application servers $\mathbf{1500}_{1\text{-}N}$ are User Interface (UI) 1530, Application Program Interface (API) 1532, application platform 1518 includes PL/SOQL 1534, save routines 1536, application setup mechanism 1538, process space 1528 includes system process space 1502, tenant 1-N process spaces 1504, and tenant management process space 1510. In other embodiments, environment 1599 may not have the same elements as those listed above and/or may have other elements instead of, or in addition to, those listed above.

User system 1512, network 1514, system 1516, tenant data storage 1522, and system data storage 1524 were discussed above in FIG. 15A. As shown by FIG. 15B, system 1516 may include a network interface 1520 (of FIG. 15A) implemented as a set of HTTP application servers 1500, an application platform 1518, tenant data storage 1522, and system data storage 1524. Also shown is system process space 1502, including individual tenant process spaces 1504 and a tenant management process space 1510. Each application server 1500 may be configured to tenant data storage 1522 and the tenant data 1523 therein, and system data storage 1524 and the system data 1525 therein to serve requests of user systems 1512. The tenant data 1523 might be divided into individual tenant storage areas (e.g., tenant storage space 1527), which may be either a physical arrangement and/or a logical arrangement of data. Within each tenant storage space 1527, tenant data 1529, and application metadata 1531 might be similarly allocated for each user. For example, a copy of a user's most recently used (MRU) items might be stored to tenant data 1529. Similarly, a copy of MRU items for an entire organization that is a tenant might be stored to tenant storage space 1527. A UI 730 provides a user interface and an API 1532 provides an application programmer interface into system 1516 resident processes to users and/or developers at user systems 1512. The tenant data and the system data may be stored in various databases, such as one or more Oracle™ databases.

Application platform 1518 includes an application setup mechanism 1538 that supports application developers' creation and management of applications, which may be saved as metadata into tenant data storage 1522 by save routines 1536 for execution by subscribers as one or more tenant process spaces 1504 managed by tenant management process space 1510 for example Invocations to such applications may be coded using PL/SOQL 1534 that provides a programming language style interface extension to API 1532. Invocations to applications may be detected by one or more system processes, which manages retrieving application metadata 1531 for the subscriber making the invocation and executing the metadata as an application in a virtual machine.

Each application server 1500 may be communicably coupled to database systems, e.g., having access to system data 1525 and tenant data 1523, via a different network connection. For example, one application server 15001 might be coupled via the network 1514 (e.g., the Internet), another application server 1500N−1 might be coupled via a direct network link, and another application server 1500N might be coupled by yet a different network connection. Transfer Control Protocol and Internet Protocol (TCP/IP) are typical protocols for communicating between application servers 1500 and the database system. However, it will be apparent to one skilled in the art that other transport protocols may be used to optimize the system depending on the network interconnect used.

In certain embodiments, each application server 1500 is configured to handle requests for any user associated with any organization that is a tenant. Because it is desirable to be able to add and remove application servers from the server pool at any time for any reason, there is preferably no server affinity for a user and/or organization to a specific application server 1500. In one embodiment, therefore, an interface system implementing a load balancing function (e.g., an F5 Big-IP load balancer) is communicably coupled between the application servers 1500 and the user systems 1512 to distribute requests to the application servers 1500. In one embodiment, the load balancer uses a least connections algorithm to route user requests to the application servers 1500. Other examples of load balancing algorithms, such as round robin and observed response time, also may be used. For example, in certain embodiments, three consecutive requests from the same user may hit three different application servers 1500, and three requests from different users may hit the same application server 1500. In this manner, system 1516 is multi-tenant, in which system 1516 handles storage of, and access to, different objects, data and applications across disparate users and organizations.

As an example of storage, one tenant might be a company that employs a sales force where each salesperson uses system 1516 to manage their sales process. Thus, a user might maintain contact data, leads data, customer follow-up data, performance data, goals and progress data, etc., all applicable to that user's personal sales process (e.g., in tenant data storage 1522). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1516 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1516 might also maintain system level data usable by multiple tenants or other data. Such system level data might include industry reports, news, postings, and the like that are sharable among tenants.

In certain embodiments, user systems 1512 (which may be client systems) communicate with application servers 1500 to request and update system-level and tenant-level data from system 1516 that may require sending one or more queries to tenant data storage 1522 and/or system data storage 1524. System 1516 (e.g., an application server 1500 in system 1516) automatically generates one or more SQL statements (e.g., one or more SQL queries) that are designed to access the desired information. System data storage 1524 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 16:
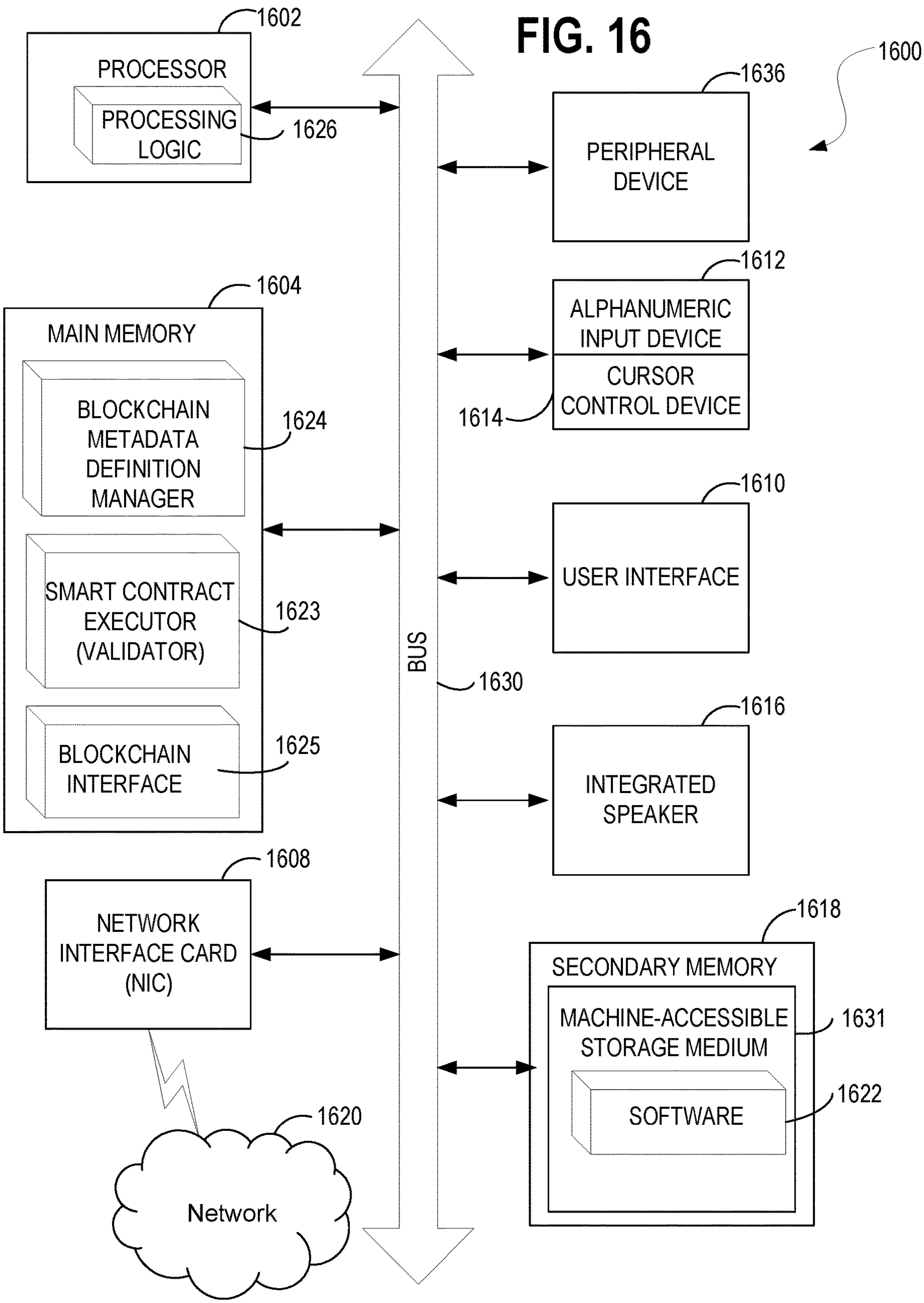
FIG. 16 illustrates a diagrammatic representation of a machine in the exemplary form of a computer system, in accordance with one embodiment.

FIG. 16 illustrates a diagrammatic representation of a machine 1600 in the exemplary form of a computer system, in accordance with one embodiment, within which a set of instructions, for causing the machine/computer system 1600 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1600 includes a processor 1602, a main memory 1604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1618 (e.g., a persistent storage device including hard disk drives and a persistent database and/or a multi-tenant database implementation), which communicate with each other via a bus 1630. Main memory 1604 includes a blockchain metadata definition manager 1624 and a smart contract executor (e.g., smart contract validator) 1623 and a blockchain interface 1625. Main memory 1604 and its sub-elements are operable in conjunction with processing logic 1626 and processor 1602 to perform the methodologies discussed herein.

Processor 1602 represents one or more general-purpose processing devices such as a microprocessor, central processing unit, or the like. More particularly, the processor 1602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1602 may also be one or more special-purpose processing devices such as an application specific integrated circuit (ASIC), a field programmable gate array (FPGA), a digital signal processor (DSP), network processor, or the like. Processor 1602 is configured to execute the processing logic 1626 for performing the operations and functionality which is discussed herein.

The computer system 1600 may further include a network interface card 1608. The computer system 1600 also may include a user interface 1610 (such as a video display unit, a liquid crystal display, etc.), an alphanumeric input device 1612 (e.g., a keyboard), a cursor control device 1614 (e.g., a mouse), and a signal generation device 1616 (e.g., an integrated speaker). The computer system 1600 may further include peripheral device 1636 (e.g., wireless or wired communication devices, memory devices, storage devices, audio processing devices, video processing devices, etc.).

The secondary memory 1618 may include a non-transitory machine-readable storage medium or a non-transitory computer readable storage medium or a non-transitory machine-accessible storage medium 1631 on which is stored one or more sets of instructions (e.g., software 1622) embodying any one or more of the methodologies or functions described herein. The software 1622 may also reside, completely or at least partially, within the main memory 1604 and/or within the processor 1602 during execution thereof by the computer system 1600, the main memory 1604 and the processor 1602 also constituting machine-readable storage media. The software 1622 may further be transmitted or received over a network 1620 via the network interface card 1608.

Figure 17:
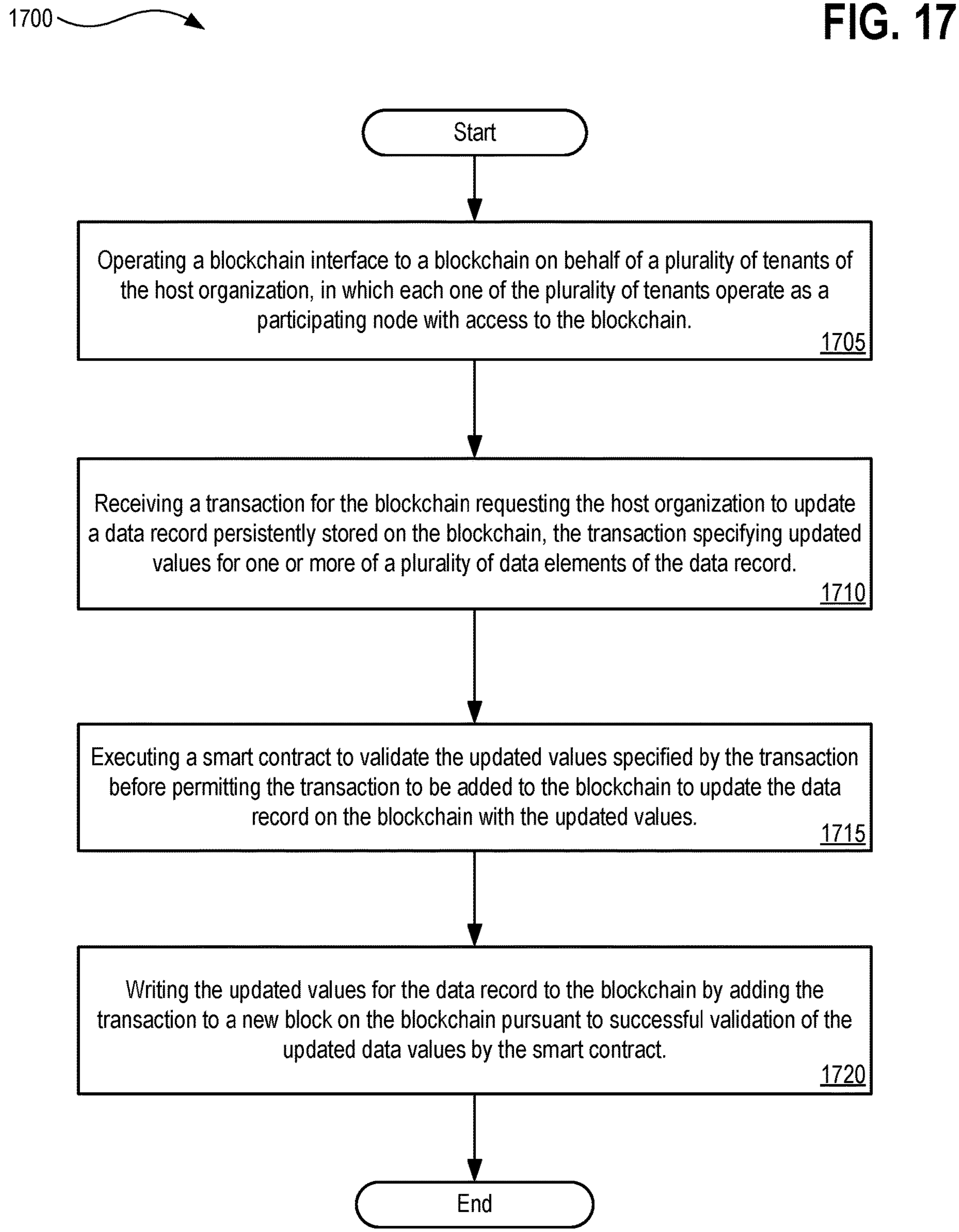
FIG. 17 depicts a flow diagram illustrating a method for implementing efficient storage and validation of data and metadata in accordance with described embodiments.

FIG. 17 depicts a flow diagram illustrating a method 1700 for implementing efficient storage and validation of data and metadata within a blockchain using Distributed Ledger Technology (DLT) in conjunction with a cloud based computing environment such as a database system implementation supported by a processor and a memory to execute such functionality to provide cloud based on-demand functionality to users, customers, and subscribers.

Method 1700 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1750, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1700 depicted at FIG. 17, at block 1705, processing logic operates a blockchain interface to a blockchain on behalf of a plurality of tenants of the host organization, in which each one of the plurality of tenants operate as a participating node with access to the blockchain.

At block 1710, processing logic receives a transaction for the blockchain requesting the host organization to update a data record persistently stored on the blockchain, the transaction specifying updated values for one or more of a plurality of data elements of the data record.

At block 1715, processing logic executes a smart contract to validate the updated values specified by the transaction before permitting the transaction to be added to the blockchain to update the data record on the blockchain with the updated values.

At block 1720, processing logic writes the updated values for the data record to the blockchain by adding the transaction to a new block on the blockchain pursuant to successful validation of the updated data values by the smart contract.

According to another embodiment, method 1700 further includes: performing a data merge operation for the data record persistently stored on the blockchain, in which the data merge operation includes: retrieving the data record in its entirety from the blockchain to retrieve all of the plurality of data elements of the data record; merging the validated updated values as specified by the transaction for the blockchain into the plurality of data elements of the data record to form a complete data record having the validated updated values embodied therein; in which writing the updated values for the data record to the blockchain by adding the transaction to a new block on the blockchain includes writing the complete data record having the validated updated values embodied therein to the new block of the blockchain; in which the complete data record deprecates all prior versions of the data record stored on the blockchain and does not reference any prior version of the data record stored on the blockchain.

For example, the data merge operation permits data of a data record to be retrieved from a single block of the blockchain, regardless of how many updates the data record has previously undergone. While some data is thus duplicated (e.g., the non-updated values will now be present in a prior block and also the new block to which the complete record having been merged is written). Notwithstanding the data-redundancy, data retrieval is made more efficient and faster.

According to another embodiment of method 1700, writing the updated values for the data record to the blockchain by adding the transaction to a new block on the blockchain includes: writing the updated values into the new block on the blockchain with a reference to a prior block on the blockchain; in which retrieval of a complete and current version of the data record requires any data elements of the stored data record which are not modified by the updated values to be retrieved from the prior block on the blockchain based on the reference and retrieval of the updated values from the new block on the blockchain.

For example, rather than performing a data merge operation which improves retrieval but results in redundancy of stored data, the stored data record is instead represented by multiple blocks on the blockchain, with newer updated information being stored within a new block of the blockchain along with a reference pointer to a prior location on the blockchain from which the non-updated values of the stored data record may be retrieved.

According to another embodiment, method 1700 further includes: performing a data merge operation and a data serialization for the data record persistently stored on the blockchain; in which the data merge operation includes (i) retrieving the data record in its entirety from the blockchain and (ii) merging the updated values into the retrieved data record form a complete data record having the updated values embodied therein; in which the data serialization operation includes converting the complete data record formed by the data merge operation and having the updated values embodied therein into a serialized byte stream; and in which writing the updated values for the data record to the blockchain by adding the transaction to the new block on the blockchain includes writing the serialized byte stream to the new block on the blockchain.

For example, the updated record resulting from the data merge operation may be serialized (e.g., via a protobuf generator or other serialization means) to form a smaller and more efficient record to be stored to the blockchain, and potentially providing a layer of data security through abstraction resulting from the serialization and optionally permitting further encryption of the serialized updated record where a high degree of data security is warranted.

According to another embodiment, method 1700 further includes: executing a protobuf generator to convert the complete data record formed by the data merge operation and having the updated values embodied therein into the serialized byte stream.

According to another embodiment of method 1700, the serialized byte stream forms at least one of: a binary format serialized byte stream; a JavaScript Object Notation (JSON) compatible format serialized byte stream; an plain text or American Standard Code for Information Interchange (ASCII) compatible format serialized byte stream; an encrypted serialized byte stream; a protobuffed serialized byte stream; and a hexadecimal format serialized byte stream.

For example, the data serialization operation may produce any of a variety of formats depending upon the needs of the application developer's needs with respect to security and ease of interoperability of the serialized data.

According to another embodiment, method 1700 further includes: receiving a first transaction for the blockchain requesting the host organization to store the data record on the blockchain as a new stored data record, in which the new stored data record includes a plurality of data elements embedded therein as specified by the first transaction; and in which receiving the transaction for the blockchain requesting the host organization to update the data record persistently stored on the blockchain includes receiving a second transaction for the blockchain, in which the second transaction specifies the updated values for the new stored data record previously transacted onto the blockchain.

For example, an original and new record to be stored to the blockchain is still subjected to data validation, however, there is no need to update an original and new data record. Subsequently, updates to the original data record may be applied and stored on the blockchain subject to data validation.

According to another embodiment, method 1700 further includes: receiving a first transaction for the blockchain requesting the host organization to store metadata on the blockchain, the metadata defining a valid format for the data record and the plurality of data elements stored by the data record; in which receiving the transaction for the blockchain requesting the host organization to update the data record persistently stored on the blockchain includes receiving a second transaction for the blockchain, in which the second transaction specifies the updated values for the stored data record as previously transacted onto the blockchain; and in which executing the smart contract to validate the updated values specified by the transaction includes retrieving the metadata from the blockchain stored pursuant to the first transaction and validating the updated values using the retrieved metadata.

For example, the metadata defining the appropriate format for the record may be permissibly stored onto the blockchain and then retrieved for use by the executed smart contract in performing the data validation. Additionally, it is further permissible to protobuf or serialize the metadata stored to the blockchain if desired.

According to another embodiment, method 1700 further includes: rejecting the transaction and prohibiting the updated values from being written to the data record persistently stored to the blockchain upon a failed validation of the updated values specified by the transaction.

According to another embodiment, method 1700 further includes: determining a transaction type based on the transaction received; identifying the smart contract to be executed based on the determined transaction type; and in which executing the smart contract to validate the updated values includes executing the smart contract identified based on the transaction type.

For example, transactions with the blockchain may be "typed" such that different transactions correspond to different transaction types. According to such an embodiment, based on the transaction type, a smart contract may be identified or looked up according to the determined transaction type. Subsequently, execution of the smart contract is based on the determined transaction type and smart contract identification. In certain embodiments, the transaction type is expressly specified with the transaction whereas in other embodiments the transaction type is derived based on the contents of the transaction.

According to another embodiment of method 1700, in which executing the smart contract to validate the updated values specified by the transaction includes: retrieving metadata defining a valid format for the data record persistently stored on the blockchain; validating the updated values specified by the transaction using the metadata retrieved; and issuing a successful validation result or a failed validation result based on the validation, in which the transaction is prohibited from being added to the blockchain pursuant to the failed validation result and in which the transaction is permitted to be added to the blockchain pursuant to the successful validation result.

For example, execution of the smart contract acts as a quality control and may be utilized to ensure that corrupted, malicious, or malformed data is not transacted onto the blockchain.

According to another embodiment of method 1700, the data record is stored on the blockchain within an asset's payload portion via a CREATE asset command term for the blockchain; and in which the data record is associated with a transaction type for stored data records which are to be stored in their entirety with any update within a new block of the blockchain deprecating any prior version of the data record.

According to another embodiment of method 1700, the data record is stored on the blockchain within an asset's payload portion via a CREATE asset command term for the blockchain; and in which the data record is associated with a transaction type for stored data records which are to be stored incrementally; in which any update to the stored data record writes the updated values specified by the transaction to a new block on the blockchain with a reference to a prior block on the blockchain within which the stored data record was previously stored; and in which retrieval of the stored data record from the blockchain requires retrieval of the updated values from the new block on the blockchain and retrieval of any remaining values not modified by the updated values from the prior block on the blockchain.

For example, storing records on the blockchain may leverage the CREATE asset command term to transact new assets onto the blockchain, within which the stored data record is then encoded or embodied, for instance, within a payload portion of the new asset. Subsequent updates to the stored data record may then update the asset using the UPDATE asset command function or generate an entirely new asset for a complete record with updated information generated via the data merge operation discussed above, in which case either the UPDATE asset command function may be utilized in which case the new version is created in its entirety but with a reference to a prior deprecated version of the stored data record or the CREATE asset command term may be utilized to simply remove all reference to any prior version and write the complete updated record to the blockchain as a new asset, depending on the blockchain protocol and the considerations of the application developer.

According to another embodiment, method 1700 further includes: receiving a second transaction for the blockchain requesting the host organization to store a related entity, the related entity to be persistently stored to the blockchain via a second asset separate and distinct from a first asset within which the stored data record is persistently stored on the blockchain; transacting with the blockchain via a CREATE asset transaction to add the second asset to the blockchain and storing the related entity within a payload portion of the second asset; and relating the related entity stored within the second asset to the stored data record within the first asset via a universally unique identifier (UUID) assigned to the related entity.

According to another embodiment, method 1700 further includes: retrieving the stored data record from the blockchain; updating the stored data record to include the UUID assigned to the related entity; and writing the updated stored data record having the UUID included therein to the blockchain.

According to another embodiment of method 1700, the stored data record includes a student record having embedded therein via the plurality of data elements at least a student first name, a student last name, and a student ID; in which the related entity includes a student transcript; relating the related entity stored within the second asset to the stored data record within the first asset via a universally unique identifier (UUID) assigned to the related entity includes linking the student transcript with the student record via the UUID assigned to the student transcript; in which updating the stored data record to include the UUID includes updating the student record to include the UUID linking the student record with the student transcript; and in which writing the updated stored data record having the UUID included therein to the blockchain includes writing the student record to the blockchain having embedded therein the student first name, the student last name, the student ID and the UUID assigned to the student transcript stored on the blockchain via a separate and distinct second asset.

For example, storage of other information which is not part of one of the data elements of the stored data record may nevertheless be stored onto the blockchain via the related entity functionality in which the related entity (such as a student transcript or a student medical record, etc.) is written to the blockchain as metadata stored within a separate asset from the stored data record and then linked with the stored data record by including a UUID assigned automatically to the related entity in the plurality of data elements of the stored data record, thus requiring an update to the stored data record to effectuate the link.

According to another embodiment of method 1700, metadata defining a valid format for the data record is stored on the blockchain within an asset's payload portion via a CREATE asset command term for the blockchain; and in which the metadata is associated with a transaction type for stored metadata.

For example, storage of metadata may also leverage the CREATE asset command term, although it is different in terms of its transaction type and also stored contents.

According to another embodiment of method 1700, the added transaction is subjected to a consensus protocol by the participating nodes of the blockchain prior to the added transaction being accepted as part of a primary chain of the blockchain by the participating nodes of the blockchain.

For example, transacting on the blockchain retains consensus schemes required for that blockchain so as to ensure transaction validity.

According to another embodiment of method 1700, the metadata is accessible only to one of the plurality of tenants of the host organization having defined and transacted the metadata onto the blockchain; or in which alternatively the metadata is accessible all of the plurality of tenants operating as one of the participating nodes with access to the blockchain regardless of which one of the plurality of tenants defined and transacted the metadata onto the blockchain.

For example, it is possible to define and store metadata to the blockchain with the intention that it remain domain-specific to the particular tenant organization that created the metadata for their specific application. However, there may be instances in which an administrator for the host organization wishes to create non-domain-specific metadata which is then made accessible to any tenant organization operating as a participating node within the blockchain or in certain instances, a tenant organization may wish to create such metadata for a particular application which is then made accessible to other tenant organizations.

According to another embodiment of method 1700, modification of the metadata transacted onto the blockchain is under the exclusive control of the one of the plurality of tenants having transacted the metadata onto the blockchain for persistent storage via the blockchain; in which a new consensus is required to write changes to the metadata onto the blockchain when the metadata is accessible to any of the plurality of tenants operating as one of the participating nodes with access to the blockchain; and in which no consensus is required to write changes to the metadata onto the blockchain when the metadata is accessible for exclusive use by only the one of the one of the plurality of tenants having originally transacted the metadata onto the blockchain.

For example, where the metadata is accessible to other tenant organizations, then modifications are subjected to consensus controls, however, if the metadata is domain specific and limited to the exclusive use by the tenant organization having created it and stored it on the blockchain originally, then it is not necessary to enforce consensus of such modifications, though optionally, the blockchain protocol may require the consensus operation regardless.

According to another embodiment of method 1700, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

For example, certain blockchains are implemented by the host organization itself, in which the host organization defines the blockchain protocol and facilitates access to the blockchain on behalf of its tenant organizations who then operate as participating nodes on the host org provided blockchain, optionally with non-tenant orgs also permitted as participating nodes at the discretion of the host organization. However, there are also existing blockchain implementations which are not defined by or implemented by the host organization and thus, operate external from the host organization with such blockchain protocols having been defined by a third party or an outside consortium or standards body. In such an event, the host organization may nevertheless facilitate access to the blockchain by operating as a participating node itself on the blockchain, via which the host organization may then have access to the functions of the blockchain. In such an event, permissions and access rights may be granted by the tenant orgs to the host organization to act on their behalf as a proxy, or the host organization may implement virtual participating nodes on the blockchain within which each tenant org may operate as a participating node, thus providing a 1:1 correspondence between the tenant orgs and the virtual nodes implemented by the host organization or the host organization may execute the associated smart contract and perform validation of stored data record update transactions for the blockchain, but then permit the tenant organization's own participating node to self-authenticate with and then actually transact with the blockchain, for instance, via the host organization provided API. In such a way, tenant orgs may add transactions to the blockchain (subject to consensus) regardless of which the blockchain is implemented by the host organization or a third party.

According to another embodiment, method 1700 further includes: maintaining an index for a plurality of data records persistently stored to the blockchain; in which the index defines at least a location for each of the plurality of data records persistently stored to the blockchain, the location defining one addressable block of the blockchain from which to retrieve a respective data record persistently stored to the blockchain.

According to another embodiment of method 1700, the index includes a Merkle Tree compatible index; and in which the index is persistently stored at the host organization or persistently stored to the blockchain or persistently stored at both the host organization and the blockchain.

For example, such an index may be utilized to improve retrieval speeds, with the index being maintained within one or both of the host organization and the blockchain. While duplicative data is persistently stored, the retrieval time for fetching records indexed is greatly reduced due to the index defining a specific location of the data within the blockchain, such as at which block such data is stored.

According to another embodiment of method 1700, the index defines for each of the plurality of data records persistently stored to the blockchain, both (i) the location for each of the plurality of records persistently stored to the blockchain and (ii) a copy of any contents of the plurality of record records persistently stored to the blockchain; and in which maintaining the index includes writing the updated values for the data record to the index when the updated values for the data record are written to the blockchain pursuant to successful validation of the updated values.

According to another embodiment, method 1700 further includes: receiving a second transaction requesting retrieval, from the blockchain, of the updated data record previously written to the blockchain; retrieving the updated data record from the index without interacting with the blockchain; and returning the updated data record retrieved from the index responsive to the second transaction requesting the retrieval.

For example, in addition to indexing location information, contents of the records may also be retrieved, wholly negating the need to transact with the blockchain for a read-only retrieval request which has been previously indexed. Where the contents of such stored records are indexed in this way retrieval speed will be increased dramatically over conventional blockchain retrieval transactions, especially when the index is persisted and maintained at the host organization, thus eliminating any interaction with the blockchain whatsoever for a read-only retrieval.

According to another embodiment of method 1700, nodes and leafs of the index are retrievable via full or partial addresses as defined by an addressing structure for the index; in which the method further includes maintaining the addressing structure for the index, in which the addressing structure includes at least: a first portion of the addressing structure defining an application namespace; a second portion of the addressing structure defining an entity type identifier; and a third portion of the addressing structure defining a name for an entity or a data record stored by the blockchain and indexed by the index.

For example, any node or leaf or sub-tree below a node may be directly referenced and retrieved from the index without having to walk, traverse, or search the index when the address is known, thus further increasing retrieval speeds.

According to another embodiment of method 1700, referencing the index with a fully qualified address will return contents of leaf from the index, the contents of the leaf; and in which referencing the index with a partial address will return a sub-tree beneath a node of the index matching the partial address, in which the sub-tree includes multiple leafs of the index structured below the node of the index matching the partial address.

For example, contents of any leaf may be returned by a call to the index with the full addresses, specifying the application namespace, the entity type identifier and the name of the entity or record, however, use of a partial address may be extremely beneficial as it permits the return of all matching records within a sub-tree beneath a node. For example, if desired, an application which stores student records may return all metadata for the application by specifying a partial address with the application namespace and the entity type identifier, but lacking specification of any specific entity name. Similarly, all student records may be returned using a partial address specifying the application namespace code and specifying the entity type identifier for the student data records, but lacking specification of any specific entity name.

According to another embodiment, method 1700 further includes: receiving multiple subsequent transactions specifying additional updated values for one or more of a plurality of data elements of the data record persistently stored to the blockchain; buffering the multiple subsequent transactions specifying the additional updated values to the index by updating the index with each of the multiple subsequent transactions upon receipt without writing corresponding updates to the blockchain; and incrementally updating the data record persistently stored to the blockchain by periodically adding a single incremental update transaction to the blockchain representing all of the additional updated values received via the multiple subsequent transactions.

For example, certain applications, such as a data stream from a group of IoT devices (Information of Things) results in updates with too high of frequency of changes and updates due to the endless stream of data to be practical for storage within a blockchain. However, buffering such information via the index and then periodically flushing such data to the blockchain via a single incremental update transaction overcomes this problem, thus permitting such high-frequency data record updates to nevertheless be transacted to and stored on the blockchain.

According to a particular embodiment, there is non-transitory computer readable storage media having instructions stored thereon that, when executed by a system of a host organization having at least a processor and a memory therein, the instructions cause the system to perform the following operations: operating a blockchain interface to a blockchain on behalf of a plurality of tenants of the host organization, in which each one of the plurality of tenants operate as a participating node with access to the blockchain; receiving a transaction for the blockchain requesting the host organization to update a data record persistently stored on the blockchain, the transaction specifying updated values for one or more of a plurality of data elements of the data record; executing a smart contract to validate the updated values specified by the transaction before permitting the transaction to be added to the blockchain to update the data record on the blockchain with the updated values; and writing the updated values for the data record to the blockchain by adding the transaction to a new block on the blockchain pursuant to successful validation of the updated data values by the smart contract.

Figure 18:
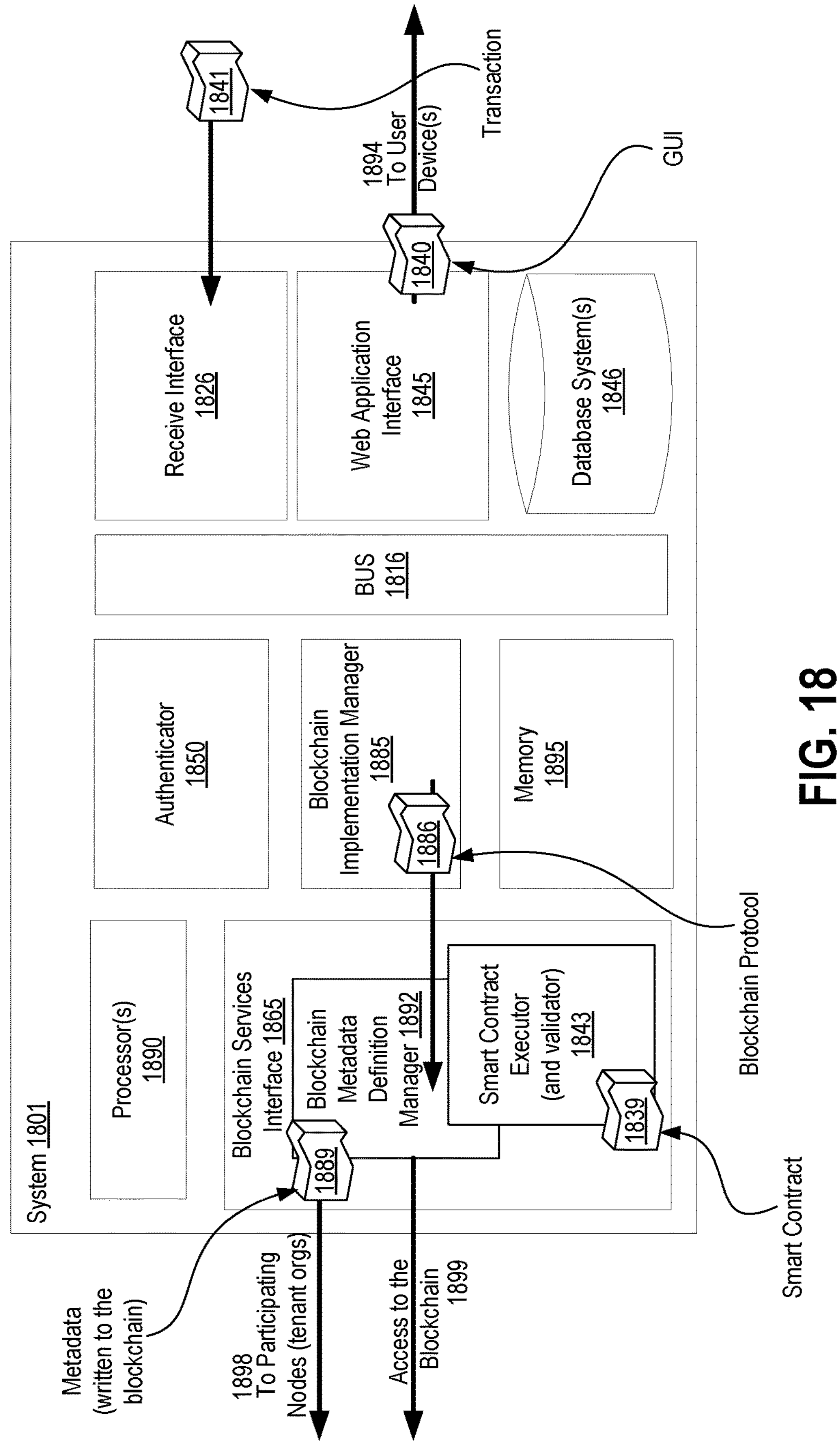
FIG. 18 shows a diagrammatic representation of a system within which embodiments may operate, be installed, integrated, or configured.

FIG. 18 shows a diagrammatic representation of a system 1801 within which embodiments may operate, be installed, integrated, or configured. In accordance with one embodiment, there is a system 1801 having at least a processor 1890 and a memory 1895 therein to execute implementing application code for the methodologies as described herein. Such a system 1801 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 1801, which may operate within a host organization, includes the processor 1890 and the memory 1895 to execute instructions at the system 1801. According to such an embodiment, the processor 1890 is to execute a blockchain services interface 1865 on behalf of on behalf of a plurality of tenants 1898 of the host organization, in which each one of the plurality of tenants 1898 operate as a participating node with access to the blockchain 1899. Internal to the blockchain services interface 1865, there is depicted the blockchain metadata definition manager 1892, depicted here as writing metadata onto the blockchain via its access to the blockchain 1899 as provided by the blockchain services interface 1865.

A receive interface 1826 of the system 1801 is to receive a transaction 1841 for the blockchain requesting the host organization to update a data record persistently stored on the blockchain, in which the transaction specifies updated values for one or more of a plurality of data elements of the data record. Such a system further includes a smart contract 1839 executable via the processor 1890 and the smart contract executor and validator 1843 via which to validate the updated values specified by the transaction 1841 before permitting the transaction to be added to the blockchain to update the data record on the blockchain with the updated values. A blockchain services interface 1865 is further provided via which to the system 1801 is to write the updated values for the data record to the blockchain by adding the transaction 1841 to a new block on the blockchain pursuant to successful validation of the updated data values by the smart contract 1839.

A blockchain protocol 1886 for the blockchain defines a group of functions for the blockchain (e.g., as provided by the blockchain implementation manager 1885), in which the group of base functions are accessible to any participating node (e.g., tenant org) 1898 of the blockchain. The system 1801 may further persist metadata 1889 onto the blockchain; in which the receive interface 1826 is to further receive a transaction 1841 requesting such metadata 1889 to be stored to the blockchain, sometimes for use with validating updated values of a received transaction 1841. According to such a system 1801, the blockchain services interface 1865 is further to add the transaction 1841 to a new block on the blockchain pursuant to successful validation by the smart contract 1839.

According to such an embodiment of the system 1801, the receive interface 1826 may pass the transaction data contents of the transaction 1841 to be stored within in index persisted by the database system(s) 1846.

According to such an embodiment of the system 1801, a GUI 1840 may be pushed to the user devices 1894 via which the user devices or admin computing devices may interact with the blockchain metadata definition manager 1892.

According to another embodiment of the system 1801, the blockchain services interface 1865 is to interact with and provide access to the blockchain 1899.

According to another embodiment of the system 1801, the receive interface 1826 communicates with a user client device 1894 remote from the system and communicatively links the user device with the system via a public Internet. According to such an embodiment, the system operates at a host organization as a cloud based service provider to the user device 1899; in which the cloud based service provider hosts a receive interface 1826 exposed to the user client device via the public Internet, and further in which the receive interface receives inputs from the user device as a request for services from the cloud based service provider. GUIs may be transmitted to the user devices 1894 via the Web Application Interface 1845.

Bus 1816 interfaces the various components of the system 1801 amongst each other, with any other peripheral(s) of the system 1801, and with external components such as external network elements, other machines, client devices, cloud computing services, etc. Communications may further include communicating with external devices via a network interface over a LAN, WAN, or the public Internet. Authenticator 1850 provides authentication services for users seeking access to the database systems 1846, clouds, and other services of the host organization.

Figure 19A:
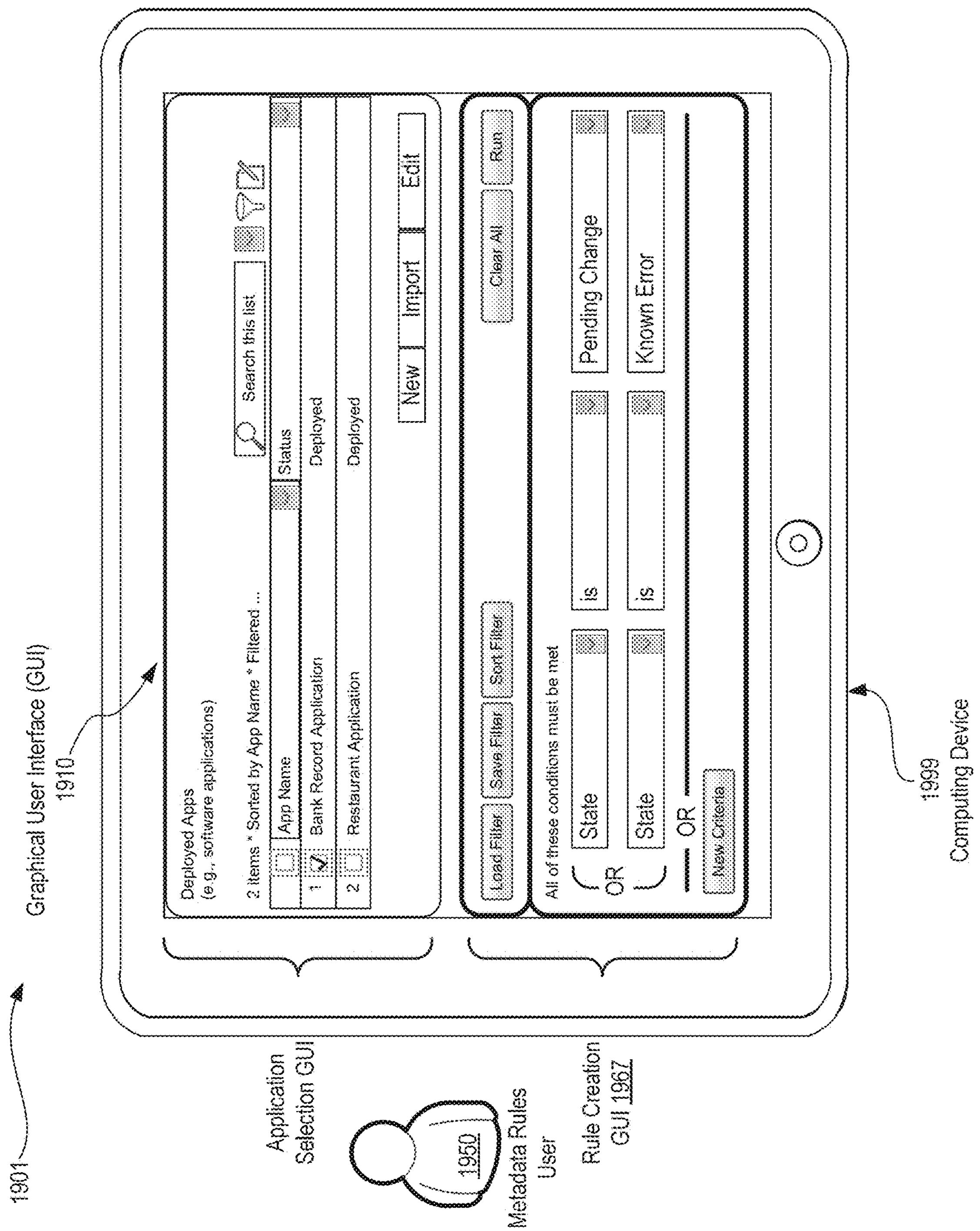
FIG. 19A depicts another exemplary architecture in accordance with described embodiments.

FIG. 19A depicts another exemplary architecture 1901 in accordance with described embodiments.

In particular, there is now depicted a metadata rules user 1950 utilizing the computing device 1999 and specifically utilizing the graphical user interface (GUI) 1910 to configure metadata rules to be applied to transactions occurring on the blockchain.

As shown here, there is an application selection GUI via which the metadata rules user 1950 may first select one or more applications to which a new metadata rule is to be applied, and then at the bottom, there is a rule creation GUI via which the metadata rules user 1950 may create a new rule to be deployed to the blockchain.

As shown here, the Rule Creation GUI provides the metadata rules user 1950 with a condition builder interface, via which the user may select through the GUI, states which must be present, and an operator, such as "is" or "not" or "includes" or "does not include" or "is equal to" or "is greater than" or "is less than" and so forth, and then the descriptor, such as "pending change" for a rule that is to be applied when the "state is pending change" or when the "state is known error," or some other new criteria to be added.

The GUI additionally permits the user to load existing filters or rules already declared and available via the system or to save the newly created rule or filter, or to sort, etc. Further still, the "Run" capability, which is discussed in greater detail below, permits the metadata rules user 1950 to simulate execution of the newly defined rule without actually transacting anything onto the blockchain and without pushing the newly created rule to the blockchain for consensus and acceptance.

Notably, the Application Selection GUI permits the metadata rules user 1950 to create rules which are to be applied to transactions associated with a particular application, such as the "bank record application" which is depicted as having been selected here within the application selection GUI. However, it is also permissible to have metadata rules applied to specific transactions on the blockchain or to all transactions on the blockchain.

Therefore, it is in accordance with the described embodiments that several sub-operations are performed, including sub-operation (1): rules are defined in an expression builder GUI, such as the Rule Creation GUI 1967 depicted here. Sub-operation (2): the rules are stored in the same format in all blockchains, regardless of the blockchain protocol, with the format of such rules being agnostic as to the native syntax of the target blockchain as depicted at element 1968 of FIG. 19C showing the "blockchain syntax agnostic rules" (e.g., generic formatted rules). Sub-operation (3): Any blockchain having smart contract execution capabilities includes a pre-defined smart contract that can infer the rule from the blockchain syntax agnostic rules (see element 1968 of FIG. 19C) and then execute the smart contract with the inferred rules. According to such an embodiment, the rule engine is developed within the smart contract which is later executed when a matching transaction is received at the blockchain.

Figure 19B:
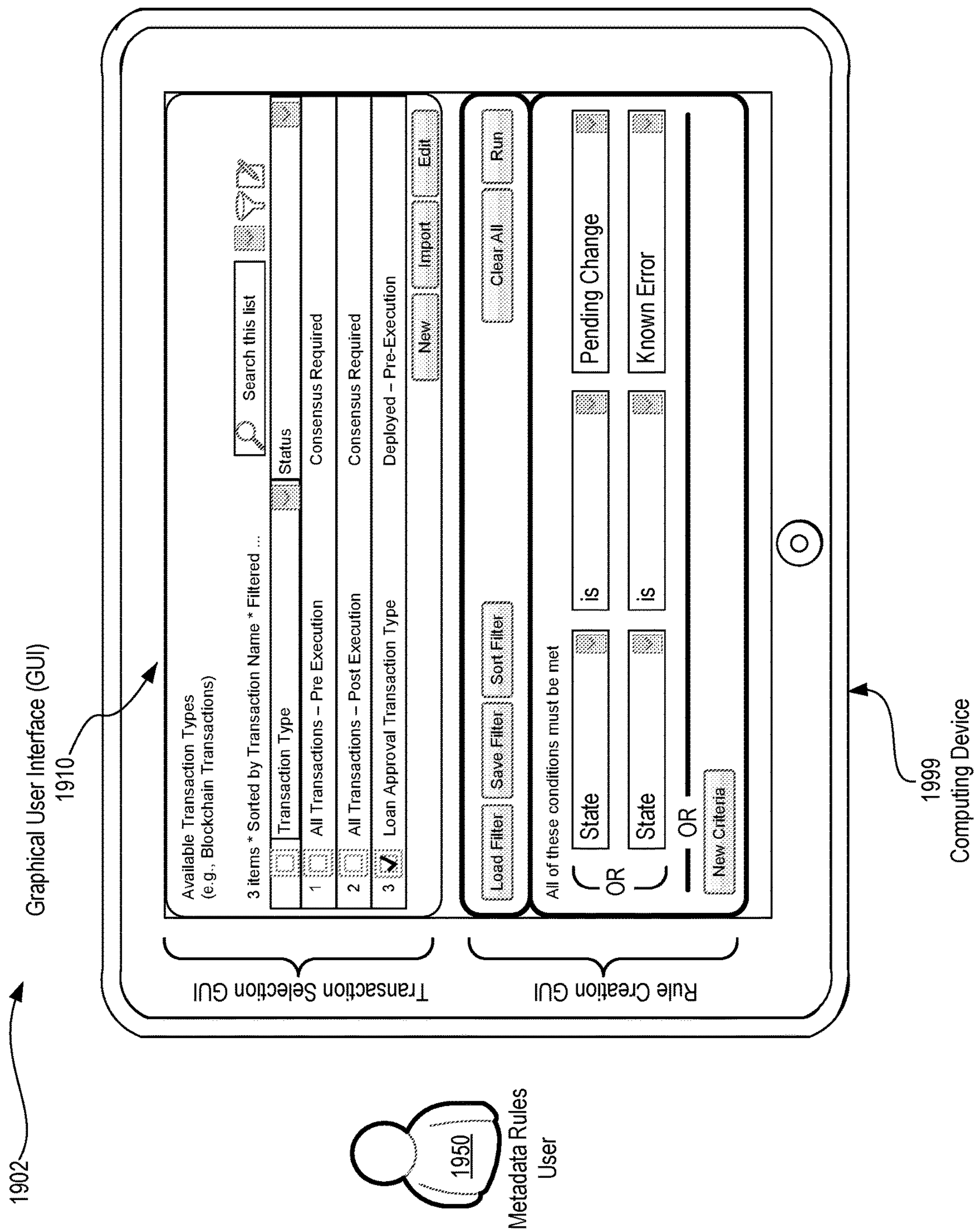
FIG. 19B depicts another exemplary architecture in accordance with described embodiments.
Figure 19C:
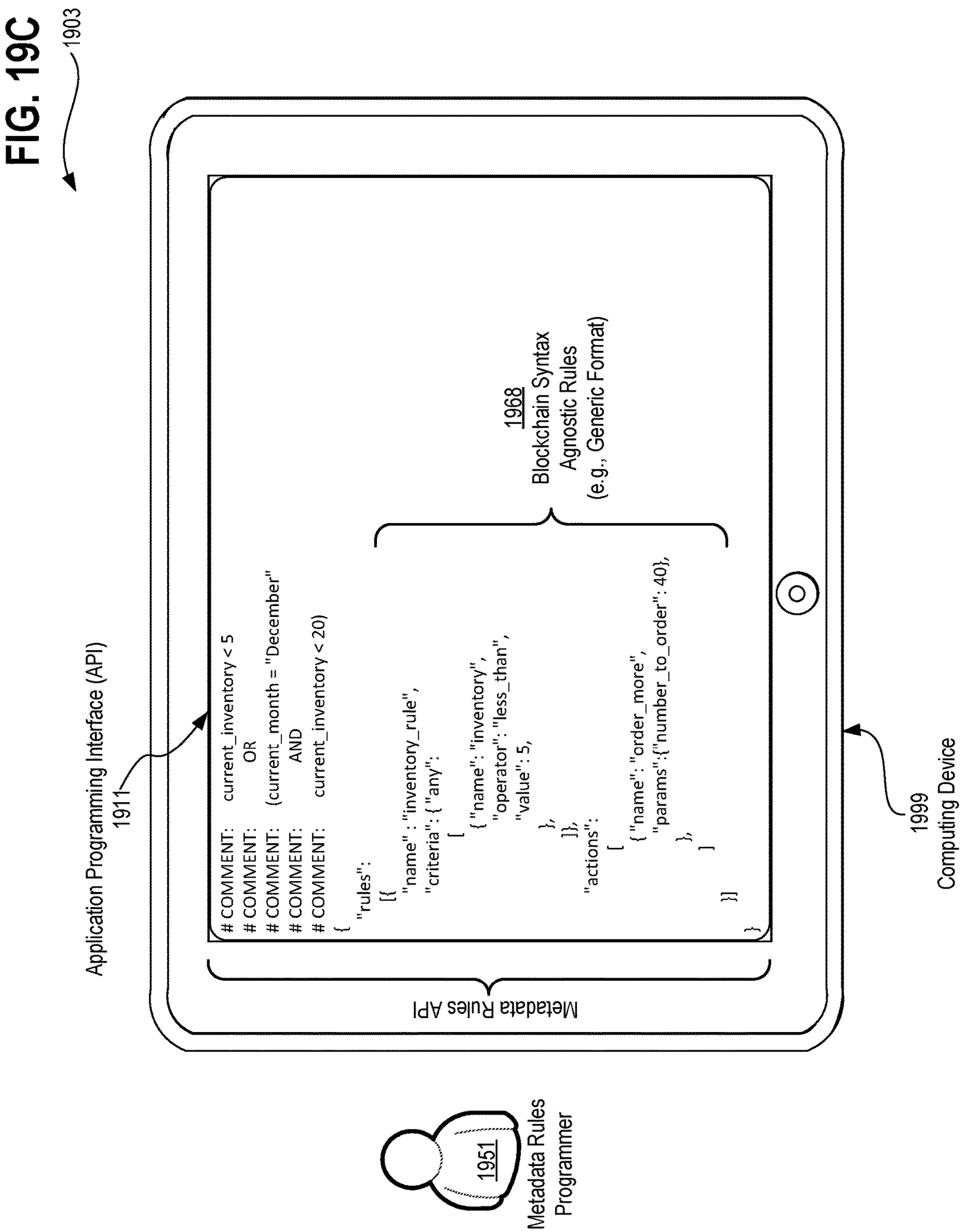
FIG. 19C depicts another exemplary architecture in accordance with described embodiments.

FIG. 19B depicts another exemplary architecture 1902 in accordance with described embodiments.

There is again depicted the metadata rules user 1950 utilizing the computing device 1999 and specifically utilizing the graphical user interface (GUI) 1910 to configure metadata rules to be applied to transactions occurring on the blockchain.

Whereas the prior GUI permitted the metadata rules user to apply newly defined rules or apply previously created rules to transactions associated with a particular application previously declared, the transaction selection GUI depicted here permits the metadata rules user 1950 to apply rules specifically to transactions of a given type or to all transactions on the blockchain, regardless of type, and regardless of whether such transactions happen to be associated with any declared application.

As shown here, there are various permissible configurations for newly defined metadata rules or for available previously defined metadata rules. For example, the metadata rules user 1950 may apply a new or existing rule to "All transactions—Pre Execution" in which case the rule is, as described, executed for every transaction which arrives on the blockchain prior to executing the transaction itself. Such pre-execution rules may be utilized for any defined criteria and conditions, but are ideally suited for validation procedures, such as validating that alphanumeric characters are not entered into a numeric field, or that a date entered into a date field corresponds to a valid date format, or complies with certain restrictions, such as within a permissible number of days, or represents a date which is not in the future or not in the past, and so forth. Additional validation schemes to occur prior to execution of a received transaction at the blockchain may include, for example, a validation that an account holder has sufficient funds available for a requested funds transfer. For example, if a user wants to transfer 1 bitcoin value or some other unit of value to another user, a pre-execution rule may check to validate that the user or account holder has possession of the funds equal to or greater than the amount of funds to be transferred.

Additionally permissible are post execution metadata rules for all transactions. Such rules may be utilized to take some action after a transaction occurs on the blockchain, such as triggering a notification or issuing a confirmation to a transaction requestor, or pushing transaction data to a log or to an analytics engine or to an AI engine, etc. Many possibilities exist, but the rule creation and application to a post-execution transaction means that the rule will be applied to every transaction on the blockchain after execution of the transaction or alternatively, based on the rule's conditions and criteria, to every transaction on the blockchain which matches the defined criteria and conditions, after execution of the transaction on the blockchain.

There is further permissible the application of defined metadata rules to any transaction having a particular transaction type (for pre or post transaction execution) or for any transaction having a particular transaction type and which meets certain defined criteria and conditions in accordance with the defined rule as set forth by the rule creation GUI. For example, as is depicted here, the metadata rules user 1950 has selected the "Loan Approval Transaction Type," for application of a particular rule, which as depicted by the GUI, happens to have already been defined and deployed to the blockchain for pre-execution. The deployed state indicates that consensus has already been reached for this existing metadata rule, whereas any newly defined rule would require consensus to be reached before the status would indicate a "deployed" state.

Ultimately, the GUIs will consume the entered data provided by the metadata rules user 1950 and auto-generate applicable code. For example, the exemplary code depicted here may be output by the GUI and transacted onto the blockchain for consensus and then execution against the matching transactions:

```
# COMMENT:     current_inventory < 5
# COMMENT:               OR
# COMMENT:   (current_month = "December"
# COMMENT:               AND
# COMMENT:      current_inventory < 20)
{
    "rules":
        [{
          "name" : "inventory_rule",
          "criteria":        {       "any":
                              [
                                   {        "name": "inventory",
                                            "operator": "less_than",
                                            "value": 5,
                                   },
                              ]},
```

-continued

```
        "actions":
                                [
                                  {      "name": "order_more",
                                         "params":{"number_to_order": 40},
                                  },
                                ]
            }]
}
```

Thus, as depicted here, the GUIs output appropriate syntax, which according to this example, will be applied to transactions for which the "current inventory" is less than 5 or in situations in which the "current month" is December and for which the "current inventory" is less than 20, presumably because there is a spike in demand for the month of December, and so the metadata rules creator has indicated that such rules are to be applied anytime inventory falls below five or in the special situation of December when inventory falls below twenty.

Such syntax may then be processed through the Apex translation engine to transform the blockchain platform agnostic syntax into a native blockchain syntax for the targeted blockchain to which the rule is to be applied and executed via smart contracts on that respective blockchain, as was described previously with regard to, for example, FIGS. 4A and 4B with issuance (deployment) of metadata to the blockchain and retrieval thereof being depicted at FIG. 4C.

The code the follows the syntax then implements the necessary rule via smart contract execution. Notably, the code is created by the GUI interface on behalf of the metadata rules user 1950, thus greatly simplifying the configuration and creation of such rules.

One of the biggest problems for business users seeking to leverage the capabilities of Blockchain technology is the creation and programming of business rules for smart contracts execution.

Problematically, each of the different blockchain platforms have different smart contract requirements for executing such business rules, resulting in different syntaxes, different permissible conditions and criteria and different mechanisms by which to deploy any created rules to the respective blockchain.

Consequently, any validation schemes and workflows to execute such business rules are written via smart contracts which are then deployed to the respective blockchain, and because of the differing syntaxes, such rules must be manually written by programmers and developers specifically for a particular blockchain to which such rules are to be applied and utilized.

It is therefore in accordance with the described embodiments that metadata rules users, blockchain administrators, and programmers utilizing the metadata driven blockchain platform may create metadata driven business rules which are then executed via the same smart contracts on the respective blockchain platforms, but without necessitating the metadata rules users, blockchain administrators, and programmers create different rules syntax for every different platform.

Therefore, it is permissible for blockchain administrators and metadata rule users to define a business rule within their own cloud environment utilizing GUIs provided by the host organization's which then generates the necessary syntax and metadata defining such rules which is then stored in Blockchain as metadata as well as, according to certain embodiments, being converted into a native blockchain smart contract execution format.

As software systems utilizing blockchain grow in complexity and usage, it becomes burdensome to business users if every change to the logic and/or behavior of the system breaks previously configured smart contracts and business rules, thus requiring the business users to write and deploy new code, which is a significant problem with decentralized networks given that the business user is often not in a position to dictate how and when the blockchain platform they are using is updated or modified.

Therefore, use of the metadata driven business rules engine in blockchain provides such business users with a simple interface, allowing anyone to capture new rules and logic defining the behavior of a system, including non-programmers through the use of the GUIs. Such rules, represented by the metadata written to the blockchain, may then be executed by the blockchain via smart contract execution. When changes to the behavior of the blockchain platform occur, the metadata does not need to be re-written or re-coded, rather, the metadata stored on the blockchain is simply read and executed in accordance with the new behavior of the blockchain platform, as the defined metadata rules are agnostic in terms of such changes to the underlying blockchain platform. However, in certain situations, the host organization's Blockchain Metadata Definition Manager 246 may need to trigger a re-conversion of the defined metadata rules into native smart contract executable code for the blockchain in question, but such events may be automated and do not require any specific action on the part of the business user and certainly do not require the business user to re-write their business rules or the associated code to implement such rules. In other embodiments, the metadata, having been written to the blockchain, may simply be re-read by the smart contract execution engine and interpreted and executed appropriately at the blockchain's backend processor, without any action by the host organization or the business user, depending upon the capabilities of the particular blockchain platform for which the business rules have been applied.

According to a particular embodiment, a blockchain administrator may define marketing logic and business rules for a specific declared application (DApp), such as one selected via the Application Selection GUI at FIG. 19A. For example, blockchain administrator or other metadata rules user having appropriate permissions may then define conditions specifying when certain customers or items are eligible for a discount based on the transaction in blockchain. The conditions may be specified for certain customers, or certain items, or other criteria, such as inventory levels, date ranges, or whatever business logic is appropriate of the needs of the business's objectives.

Normally, the creation of such business rules requires specialized syntax to be developed by a programmer for execution via a blockchain platform's smart contract execution engine, with such syntax being different for different blockchain platforms. However, in the event that the metadata rules user or blockchain administrator utilizes the Blockchain Metadata Definition Manager 246 provided by the host organization's suite of blockchain services, then the blockchain administrator need only define the rule via the GUIs, associating them with particular declared applications or specific types of transactions (or all transactions), and then, once the submitted rule is approved by the blockchain network's consensus mechanism, the defined rule will be executed automatically by host organization's blockchain services interface and associated smart contract execution and management engines.

FIG. 19C depicts another exemplary architecture 1903 in accordance with described embodiments.

As shown here, there is also permissible entry of the metadata rules via an Application Programming Interface (API) 1911 via the metadata rules user in the event that a metadata rules programmer 1951 or developer wishes to create the rule syntax manually or in the event that another application is utilized to push the appropriate syntax to the metadata rules creation engine, which may permissibly be accomplished via the metadata rules API to the same effect as if the metadata rules user configures such rules via the GUIs depicted at element 1910 of FIGS. 19A and 19B.

Regardless of how such metadata rules are written, be it via the GUIs provided or the API interface, the defined rules may be utilized to enforce validation requirements for data entry and input submitted to an application or to trigger various execution flows, such as discounting merchandise for certain customers or based on certain inventory levels as noted above.

Once defined, the metadata rules written to the blockchain are executed at the blockchain network level using the blockchain's smart contract execution engine where available or executed via the host organization's smart contract execution engine when such capabilities are not available via the blockchain platform.

Utilizing such metadata rules driven smart contracts, exemplary validations may include, for example, prohibiting entry of incorrect data (e.g., telephone numbers with incorrect numbers of digits or malformed email addresses, etc.) or the entry of improper type data, such as entering alpha characters into a numeric only field, etc.

However, very often, the rules are not validation specific, but represent more complex business rules to be defined via the blockchain metadata definition manager 246. For instance, as noted above in the inventory application example, there may be various actions to be taken based on inventory levels being too high or inventory levels being diminished, etc. Such metadata rules may be utilized therefore for the management of stock levels across multiple partners, each of which may have their own local inventories, but for which the rules are applied based on an aggregate inventory, etc.

Prior solutions required that programmers and developers code the rules into a native blockchain executable format for smart contract execution resulting in a process which was overly complex, error prone, and simply not available to novice or non-programmer business users, who are the very individuals most likely to craft and define such rules. This arrangement therefore added cost and complexity on the part of businesses wishing to utilize the blockchain technology and leverage the capabilities of smart contract execution, as it was necessary to pay a highly skilled developer to code the rules into the engine, while not addressing the problem of the high potential for error.

Because the metadata rules are defined and written to the blockchain utilizing a blockchain agnostic format, it is possible for the same metadata rule to be created once and then applied to multiple different blockchain platforms. Moreover, because the UI allows the user to create the full syntax (either via the GUIs or the API), it is further possible of the GUI condition builder to specify conditions specific to the needs of the business developer or program such conditions through the API.

Further still, regardless of whether the GUI or the API is utilized, the defined metadata rules are restricted to the creation of permissible entities, field definitions, and field types for an associated application or for an associated transaction because the metadata driven blockchain platform will not allow the creation of a rule or condition which violates the defined metadata for a declared application or a declared entity or its dependent field definitions and field types.

In such a way, creation of metadata rules is restricted to only those conditions, criteria, transactions and declared applications for which the blockchain administrator or metadata rules user has permissions to interact with and for which such defined business rules is in compliance with the metadata for the associated declared application (DApp), entity, etc.

By restricting the definition of the metadata rules to only permissible entries in compliance with previously defined metadata definitions for existing applications, entities, transaction types, etc., it is therefore further possible to significantly reduce the possibility for security holes, logic errors, or other malformed business rules which may occur if the code for such rules were to be written free form, without being restricted to such metadata definitions or to the permissible criteria on the condition builder GUIs.

According to yet another embodiment, once the metadata rules code is output from the GUI or accepted by the API, it is then processed and traversed through a metadata governance model, prior to the metadata rules code being submitted to the blockchain.

Processing the code through the governance model then presents to metadata rules user or the blockchain administrator creating the metadata rules information on how the created code will affect blockchain transactions and assets, thus permitting the user to see on the fly within a simulated or sandbox environment, how the rule will perform when executed for a blockchain transaction. For example, the governance model and rule simulation may mimic or simulate certain values to show what the rule will create when executed on the blockchain and how data, assets, and transaction execution will be affected on the blockchain.

According to another embodiment, once the code is created and processed through the governance model, the user may then submit the code to partners on the blockchain platform (e.g., submitting the code to other blockchain participating nodes) for evaluation and consensus prior metadata rules and code defining such rules being accepted onto the blockchain.

According to such an embodiment, the partners and any participating node on the blockchain may apply the same governance model and also simulate execution of the created metadata rule to observe how the rule will affect data, assets, and transactions for the blockchain, without actually executing anything on the blockchain itself.

Based on the simulated execution, the partners and participating nodes may then vote for consensus, such as voting to accept or voting to reject the rule, etc., so as to determine whether or not the defined metadata rule will be accepted onto the blockchain.

According to a particular embodiment, the code and syntax for the rule is created in a JSON compatible format, but then later, when written onto the blockchain after consensus, is translated into Web Assembly Language, and thus takes on a safer binary format with cryptographic properties of a contract that cannot be changed by anyone once deployed onto the blockchain. Stated differently, all of the participating nodes can see the deployed and accepted code in its Web Assembly Language format, but they cannot change it, without again proceeding throughout the entire creation/editing of the rule, validation against metadata definitions, subjection to governance, and submitted again for consensus and then acceptance onto the blockchain.

WebAssembly (often shortened to Wasm or WASM) is a standard that defines a binary format and a corresponding assembly-like text format for executables used by web pages. The purpose of Wasm is to enable the JavaScript engine of a web browser to execute page scripts nearly as fast as native machine code. While not a full replacement for JavaScript, Wasm provides improved execution for performance-critical portions of page scripts and runs in the same sandbox as regular script code.

Representation of WebAssembly code or Wasm code is intended to be run on a portable abstract structured stack machine designed to be faster than parsing JavaScript, as well as faster to execute and amenable to extremely compact code representation.

Once accepted to the blockchain, the smart contract is then triggered and executed based on transaction type or based on all transactions or based on whatever defined criteria and conditions were defined and accepted.

According to such embodiments, execution of the smart contract is performed by multiple nodes on the blockchain or by all nodes on the blockchain, and output is then compared by multiple blockchain nodes to ensure that the output from concurrent executions is identical, so as to prevent tampering or any spoofing attempt or submission of malicious or fraudulent smart contract execution output as authentic.

Assuming the output is identical for multiple participating nodes having executed the smart contract, consensus will be met and the results or output of the smart contract execution will be accepted onto the blockchain, for instance, permitting a block on the blockchain with the results to be accepted as the “primary” chain of the blockchain or the “consensus” chain of the blockchain.

As was summarized above, consensus is a very important aspect of nearly all blockchain protocols, be they protocols for a public or private blockchain operating outside of the control of the host organization or a public or private blockchain defined, established, and operated by the host organization itself on behalf of the customer organizations of the host organization.

Most blockchains therefore have certain things in common and aspects of all blockchains utilizing DLT technology exhibit certain overlapping functionality (e.g., such as transacting onto the blockchain, reading from the blockchain, etc.). However, one of the ways in which blockchains are unique is the way consensus is reached for any given blockchain in accordance with the defined protocol for that particular blockchain. Consensus is utilized to determine precisely which transactions are legitimate and which transactions may therefore be permissibly added to the blockchain. Utilizing various consensus mechanisms, participating nodes on the blockchain may participate in and thus contribute to consensus for any given transaction attempting to be added to the blockchain.

Consensus mechanisms define the protocols that make sure all participating nodes (e.g., devices on the blockchain that maintain the blockchain and possibly processes transactions for the blockchain) are not only synchronized with one another but additionally agree on which transactions are legitimate and may therefore be appropriately added to the blockchain.

Consensus mechanisms are crucial for a blockchain in order to function correctly as they ensure that all participating nodes with access to the blockchain uses the same chain of the blockchain, often referred to as the “primary” chain or the “main” chain or the “consensus” chain of the blockchain. Because any participating node can submit transactions to be added to the blockchain, it is necessary to constantly check all transactions added to the blockchain, effectively causing the blockchain to be perpetually and constantly audited by all participating nodes of the blockchain as failure to define and enforce a proper consensus mechanisms will leave the blockchain susceptible to risk, fraud, and malicious activity through cyber-attacks.

As was described above, there are many different ways to reach consensus. For example, Proof Of Work (POW) is known as mining with the nodes being known as miners. Miners solve complex mathematical puzzles which require significant computational power to resolve. The first participating node acting as a miner on the blockchain to solve the complex mathematical puzzle gets to create a block and receives a reward for creating a block. The complex mathematical puzzles are designed in such a way that it takes a significant amount of time and computational resource to find the answer, yet they are very fast and computationally efficient to verify if an answer is correct, thus providing computational asymmetry.

The computational intensity of the problems is configurable such that they may be made easier or more difficult based on the particular implementation.

Proof Of Stake (POS) is a more environmentally friendly variant of the Proof Of Work protocol, in which Proof Of Stake makes use of the premise that those who own most assets, tokens, coins, etc., in any given blockchain network will correspondingly have the greatest vested interest in keeping the blockchain network well maintained so as to guarantee the value and integrity of the assets, tokens, or coins transacted onto the blockchain.

In a system that uses Proof Of Stake consensus protocols, a randomized process is used to determine which of the many participating nodes is allowed to produce the next block on the blockchain. Users of the blockchain can stake their tokens to become a validator (e.g., a participating node allowed to produce blocks on the blockchain in accordance with the governing blockchain protocol), thus requiring such users to lock their tokens up for a period of time. After doing so, such users are eligible to produce blocks as one of the participating nodes on the blockchain having assumed the role of validator. Generally speaking, the participating node having the largest stake of assets, tokens, coins, etc., therefore will statistically exhibit the highest chance to produce a block on the blockchain. Other criteria may include, for example, the amount of time that assets, tokens, coins, etc., have been staked by any given participating node on the blockchain.

As with Proof Of Work (POW), Proof Of Stake (POS) Validators are also rewarded for their work. The reward that the participating node operating as a validator receives for creating the next block depends on the design of the blockchain. This may be all or part of transaction fees, subscription fees, fixed fees, or simply the benefit of enhanced control, depending on the implementation details and purpose of the particular blockchain.

Distinguished from Proof Of Work (POW) miners who may own literally none of the assets, tokens, coins, etc., on the blockchain, the Proof Of Stake (POS) Validators will correspond to those participating nodes having a significant stake in the assets, tokens, coins, etc., on the blockchain network, and therefore correspondingly have a much larger incentive to properly maintain the blockchain network to their own benefit as such participating nodes own or control the very assets, tokens, coins, etc., on the blockchain for which they are performing the validating.

Delegated Proof Of Stake (DPOS) provides a very fast consensus mechanism, often referred to as a digital democracy, due to its use of a stake-weighted voting system. In such a Delegated Proof Of Stake protocol, participating nodes on the blockchain stake their assets, tokens, coins, etc., to vote for a certain amount of delegates. The weight of their vote depends on their stake. The delegates are users, persons, or organizations which seek to produce blocks on the blockchain network. Therefore, the delegates that receive the highest amount of votes will in turn be permitted to produce greater quantities of blocks and are rewarded for creating the blocks.

Proof Of Capacity (POC) provides a consensus mechanism that uses a process called plotting, where solutions are pre-stored in digital storages or hard disk drive space, etc. After a storage has been plotted and thus fully filled with solutions by a participating node, that participating node is then permitted to take part in the block creation process for the blockchain network.

Therefore, whichever participating node has the fastest solution to the puzzle of a (new) block, gets to create the new block and the more storage capacity that participating node has correlates to the more solutions that participating node can store, and therefore higher odds of creating a block for that participating node.

Proof Of Elapsed Time (POET) provides a consensus mechanism that aims to randomly and fairly determine which participating nodes get produce a block based on the time that they each of the many participating nodes have waited. Such a process assigns a random wait time to each node and the participating node whose wait time finishes first is then permitted to produce the next block.

Such a consensus mechanism may further utilize a system to verify that no single participating node is running multiple instances of participating nodes on the same blockchain network and further requires a mechanism to ensure that the assigned waiting time is sufficiently random.

As noted above, there are permitted both pre and post transaction execution constructs, in which pre execution is typically preferred for validation of data prior to even attempting to execute a transaction received at the blockchain and in which post execution is utilized to evaluate whether or not an event or transaction occurs in a particular way, then to take some action via the smart contract after execution of the transaction.

The metadata rules are considered to be metadata driven and declarative on the fly because the rules may be created utilizing a condition builder and simulated to test how the transaction or rule execution will look in a sandbox environment. In such a way, partners and other participating nodes on a blockchain are put at ease because they too can review the rule via the GUI rather than having to pay a programmer or developer to review 1000s of lines of code in a costly, time consuming, and burdensome process, which thus in turn drastically improves security by limiting the conditions and values that can be coded into a smart contact from the GUI and the API to that which is compatible with the defined metadata for a declared application or its associated entities or entities and field definitions for a particular transaction, etc.

Moreover, because the code is converted into a WebAssembly (WASM) format and represented as a binary, it is safe from tampering and malicious actors.

According to yet additional embodiments, conditions specified via a metadata rule may further be limited according to whether a transaction on the blockchain is by an "owner" of a declared application or a "party" of a declared application (DApp). For example, an owner of the application may have enhanced rights to, for example, modify a record transacted onto the blockchain whereas an authorized network participant for the declared application (DApp) may be merely a "party" for the application and may thus have permissions to create new records and submit additional information for records as well as read records, but perhaps they lack authority to modify or alter certain records, thus permitting a permissions enforcement mechanism for data on the blockchain in which the metadata rules will define a rule requiring that, for example, a transaction seeking to change an existing record must first "validate" in a pre-transaction execution smart contract that the transaction submitter is an "owner" for the application rather than merely a "party" for the application. Many other variations of permission enforcement are possible. Further still, such a rule could be utilized to trigger a notification when a "party" but not "owner" submits a record change transaction, with the defined metadata a rule then defining whether or not that transaction is processed or rejected.

Figure 20:
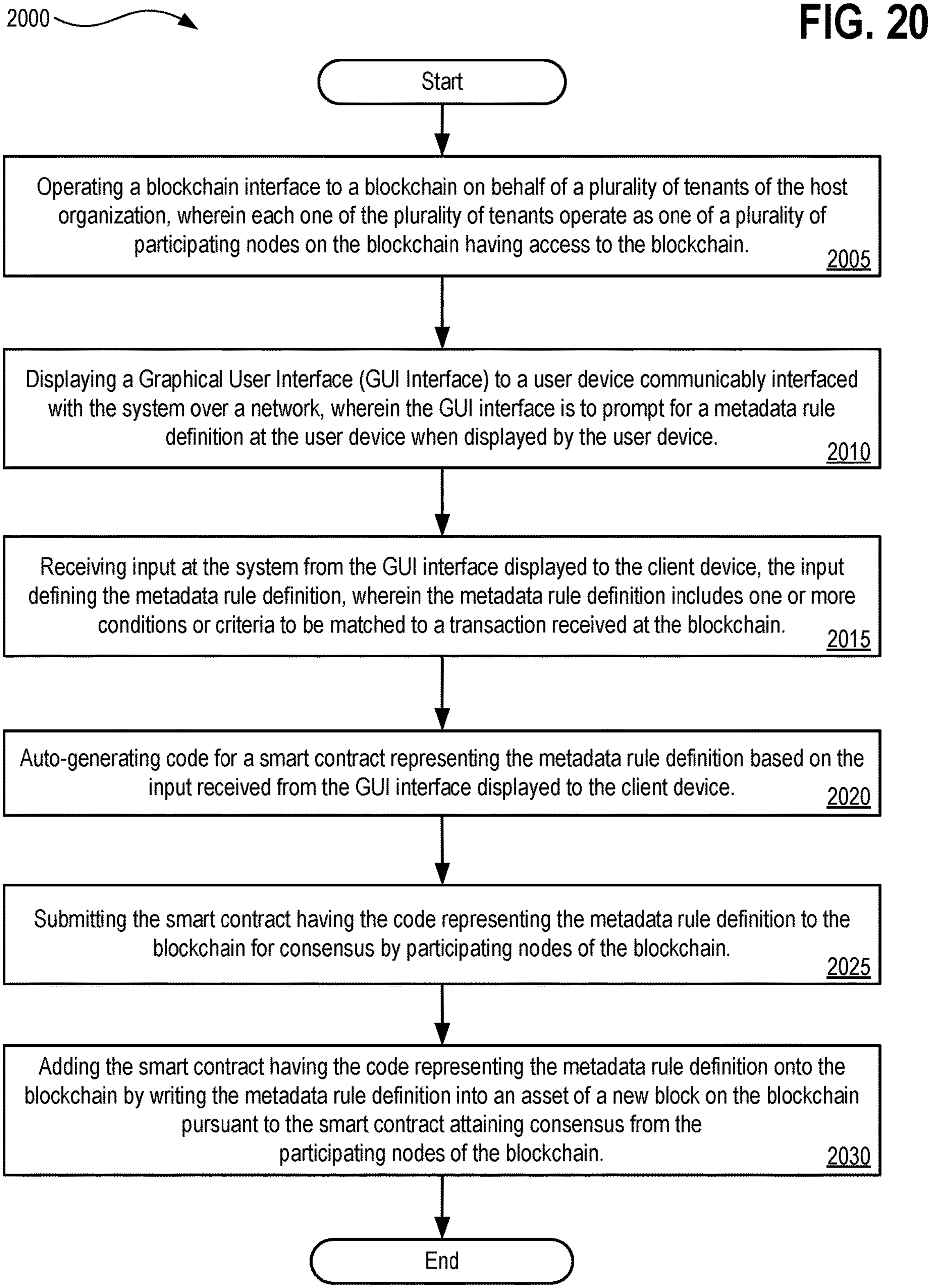
FIG. 20 depicts a flow diagram illustrating a method for implementing a metadata driven rules engine on blockchain in accordance with described embodiments.

FIG. 20 depicts a flow diagram illustrating a method 2000 for implementing a metadata driven rules engine on blockchain using Distributed Ledger Technology (DLT) in conjunction with a cloud based computing environment such as a database system implementation supported by a processor and a memory to execute such functionality to provide cloud based on-demand functionality to users, customers, and subscribers.

Method 2000 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 2050, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 2000 depicted at FIG. 20, at block 2005, processing logic operates a blockchain interface to a blockchain on behalf of a plurality of tenants of the host organization, wherein each one of the plurality of tenants operate as one of a plurality of participating nodes on the blockchain having access to the blockchain.

At block 2010, processing logic displays a Graphical User Interface (GUI Interface) to a user device communicably interfaced with the system over a network, wherein the GUI interface is to prompt for a metadata rule definition at the user device when displayed by the user device.

At block 2015, processing logic receives input at the system from the GUI interface displayed to the client device, the input defining the metadata rule definition, wherein the metadata rule definition includes one or more conditions or criteria to be matched to a transaction received at the blockchain.

At block 2020, processing logic auto-generates code for a smart contract representing the metadata rule definition based on the input received from the GUI interface displayed to the client device.

At block 2025, processing logic submits the smart contract having the code representing the metadata rule definition to the blockchain for consensus by participating nodes of the blockchain.

At block 2030, processing logic adds the smart contract having the code representing the metadata rule definition onto the blockchain by writing the metadata rule definition into an asset of a new block on the blockchain pursuant to the smart contract attaining consensus from the participating nodes of the blockchain.

According to another embodiment of method 2000, displaying the GUI interface to the user device comprises executing instructions stored in the memory of the system via the processor, wherein the instructions cause the system to transmit the GUI interface from a receive interface of the system to a user device communicably interfaced with the system over the network; and wherein receiving the input at the system from the GUI interface comprises receiving the input at the receive interface of the system.

According to another embodiment of method 2000, receiving the input defining the metadata rule definition further comprises converting the metadata rule definition into a WebAssembly language format and storing the converted metadata rule definition in a binary format in compliance with the WebAssembly language format.

According to another embodiment of method 2000, transacting the access control object onto the blockchain includes: storing metadata in the access control object defining a read on consensus access control mechanism; writing the access control object having the metadata stored therein onto the blockchain; and committing the access control object to the blockchain responsive to attaining consensus for the access control object.

According to another embodiment of method 2000, the metadata stored within the access control object defining the read on consensus access control mechanism implements read and write permissions as specified via the GUI displayed to the user device.

According to another embodiment of method 2000, the read and write permissions specify one or more blockchain entity names and one or more blockchain field names to which a specified blockchain participant is granted read access, write access, update authority, create authority, or some combination thereof.

According to another embodiment of method 2000, approving or denying access, includes: executing the smart contract; retrieving stored metadata from the access control object previously transacted onto the blockchain pursuant to instructions instantiated by the execution of the smart contract; determining if an initiator of the transaction received at the blockchain requesting access to the blockchain entity object corresponds to a specified blockchain participant having been granted read access, write access, update authority, create authority, or some combination thereof as represented by the stored metadata retrieved from the access control object; and approving or denying the access to the blockchain entity object on the basis of (i) first whether the initiator of the transaction corresponds to any specified blockchain participant within the stored metadata and (ii) whether sufficient blockchain access permissions have been granted to the initiator of the transaction as defined by the stored metadata.

According to another embodiment of method 2000, approving or denying access, includes: implementing a read on consensus process to be performed responsive to the executing of the smart contract, wherein the read on consensus process enables an entity to designate access controls to data stored upon the blockchain granularizing at least read and write permissions for the blockchain.

According to another embodiment of method 2000, the system of the host organization implements a cloud computing platform providing on-demand cloud computing services on accessible to subscribers of the cloud computing platform; and wherein an initiator of the transaction received at the blockchain requesting access to the blockchain entity object is associated with one of a plurality of customer organizations having subscriber access to the on-demand cloud computing services provided by the cloud computing platform.

According to another embodiment, method 2000 further includes: simulating execution of a smart contract for the transaction at the blockchain using the metadata rule definition without issuing any transaction to the blockchain; and transmitting simulated execution results of the smart contract execution to the GUI interface for display at the client device.

According to another embodiment, method 2000 further includes: receiving a second input from the GUI interface indicating acceptance of the simulated execution results prior to submitting the smart contract to the blockchain for consensus; and deploying the smart contract to the blockchain responsive to receiving the second input indicating acceptance, in which deploying the smart contract to the blockchain includes submitting the smart contract to the blockchain for consensus by participating nodes of the blockchain and adding the smart contract onto the blockchain pursuant to the smart contract attaining consensus.

According to another embodiment, method 2000 further includes: submitting the smart contract having the code representing the metadata rule definition to the blockchain for consensus by participating nodes of the blockchain further includes the participating nodes performing validation of the smart contract simulating execution of the smart contract for the transaction at the blockchain using the metadata rule definition without issuing any transaction to the blockchain; and in which the participating nodes simulate execution of the smart contract and submit an indication of acceptance of the simulated execution of the smart contract prior to granting consensus permitting the smart contract to be transacted onto the blockchain.

According to another embodiment of method 2000, adding the smart contract having the code representing the metadata rule definition onto the blockchain includes: transacting the smart contract onto the blockchain; in which the smart contract is written into a new asset of the new block on the blockchain; in which the new block of the blockchain is automatically subjected to a consensus protocol defined by a blockchain protocol for the blockchain; and in which the new block of the blockchain having the smart contract embedded within the new asset of the new block is accepted as part of a primary chain of the blockchain after the new block is validated and attains consensus.

According to another embodiment of method 2000, displaying the GUI interface to the user device includes executing instructions stored in the memory of the system via the processor, in which the instructions cause the system to transmit the GUI interface from a receive interface of the system to a user device communicably interfaced with the system over the network; and in which receiving the input at the system from the GUI interface includes receiving the input at the receive interface of the system.

According to another embodiment, method 2000 further includes: receiving a transaction matching the one or more conditions or criteria included with the metadata rule definition; and triggering the smart contract for execution based on the transaction matching the one or more conditions or criteria and performing one or more actions defined by the metadata rule definition.

According to another embodiment, method 2000 further includes: receiving a transaction matching the one or more conditions or criteria included with the metadata rule definition; and reading the metadata rule definition from the asset on the blockchain and performing one or more actions defined by the metadata rule definition.

According to another embodiment of method 2000, the metadata rule definition defines one or more actions to be taken on a pre-transaction execution basis when the transaction received at the blockchain matches the criteria included with the metadata rule definition; and in which the pre-transaction execution basis requires the smart contract to be executed prior to the transaction matching the one or more conditions or criteria being added to the blockchain or evaluated for consensus by the participating nodes.

According to another embodiment of method 2000, the metadata rule definition defines one or more actions to be taken on a post-transaction execution basis when the transaction received at the blockchain matches the criteria included with the metadata rule definition; and in which the post-transaction execution basis requires the smart contract to be executed after the transaction matching the one or more conditions or criteria is added to the blockchain pursuant to successfully attaining consensus from the participating nodes.

According to another embodiment of method 2000, receiving input at the GUI interface defining the metadata rule definition, further includes subjecting the received input to a governance model; in which the governance model requires at least: validating the received input from the GUI interface is in compliance with previously defined metadata for a declared application (DApp); and validating any defined entities, all defined field definitions, and all defined field types for the declared application received via the input from the GUI interface are in compliance with the previously defined metadata for the declared application (DApp).

According to another embodiment, method 2000 further includes: submitting the metadata rule definition to a metadata governance model for processing; receiving simulation results from the metadata governance model indicating how the metadata rule definition will affect the transaction on the blockchain via simulated execution of the smart contract having the metadata rule definition against the transaction within a sandbox environment; and transmitting the simulation results to the user device for display via the GUI interface.

According to another embodiment, method 2000 further includes: submitting the metadata rule definition to the participating nodes on the blockchain for consensus and validation; in which the participating nodes each submit the metadata rule definition to the metadata governance model for processing; in which each of the participating nodes each receive simulation results from the metadata governance model indicating how the metadata rule definition will affect the transaction on the blockchain; and in which the participating nodes submit votes for consensus subsequent to receiving the simulation results from the metadata governance model.

According to another embodiment, method 2000 further includes: receiving a request from the GUI interface requesting retrieval of a pre-existing metadata rules definition; retrieving the pre-existing metadata rules definition from the blockchain; loading the pre-existing metadata rules definition into the GUI interface; transmitting the GUI interface having the pre-existing metadata rules definition loaded therein to the user device for display; and receiving a request from the GUI interface to simulate execution of the pre-existing metadata rules against a blockchain transaction without issuing any transaction to the blockchain.

According to another embodiment of method 2000, receiving the input at the system defining the metadata rule definition includes receiving the metadata rule definition in a blockchain platform agnostic syntax; in which adding the smart contract having the code representing the metadata rule definition onto the blockchain comprises transacting the blockchain platform agnostic syntax having the metadata rule definition defined therein onto the blockchain; and further in which a pre-defined smart contract and rules parser on the blockchain infers rules for execution via the pre-defined smart contract from the blockchain platform agnostic syntax having the metadata rule definition defined therein.

According to another embodiment of method 2000, the host organization operates a participating node on the blockchain; and in which the blockchain operates external from the host organization and operates outside of the host organization's exclusive control.

According to another embodiment of method 2000, the blockchain further includes a pre-defined smart contract and rules parser; and in which the pre-defined smart contract operates in conjunction with the rules parser to infer rules from the metadata rule definition of the smart contract written onto the blockchain and provides default values for any non-defined rules required to execute the smart contract against the matched transaction received at the blockchain.

According to another embodiment of method 2000, the matched transaction received at the blockchain includes a user signed blockchain transaction; in which the pre-defined smart contract and rules parser further infers access rights and visibility permissions for the user having submitted the matched transaction received at the blockchain based on a signature encoded with the user signed blockchain transaction; in which the method further includes transacting the user signed blockchain transaction onto the blockchain in compliance with the inferred access rights and visibility permissions for the user.

According to a particular embodiment, there is a non-transitory computer-readable storage media having instructions stored thereupon that, when executed by a processor of a system having at least a processor and a memory therein, the instructions cause the system to perform operations including: operating a blockchain interface to a blockchain on behalf of a plurality of tenants of a host organization, in which each one of the plurality of tenants operate as one of a plurality of participating nodes on the blockchain having access to the blockchain; displaying a Graphical User Interface (GUI Interface) to a user device communicably interfaced with the system over a network, in which the GUI interface is to prompt for a metadata rule definition at the user device when displayed by the user device; receiving input at the system from the GUI interface displayed to the client device, the input defining the metadata rule definition, in which the metadata rule definition includes one or more conditions or criteria to be matched to a transaction received at the blockchain; auto-generating code for a smart contract representing the metadata rule definition based on the input received from the GUI interface displayed to the client device; submitting the smart contract having the code representing the metadata rule definition to the blockchain for consensus by participating nodes of the blockchain; and adding the smart contract having the code representing the metadata rule definition onto the blockchain by writing the metadata rule definition into an asset of a new block on the blockchain pursuant to the smart contract attaining consensus from the participating nodes of the blockchain.

Figure 21:
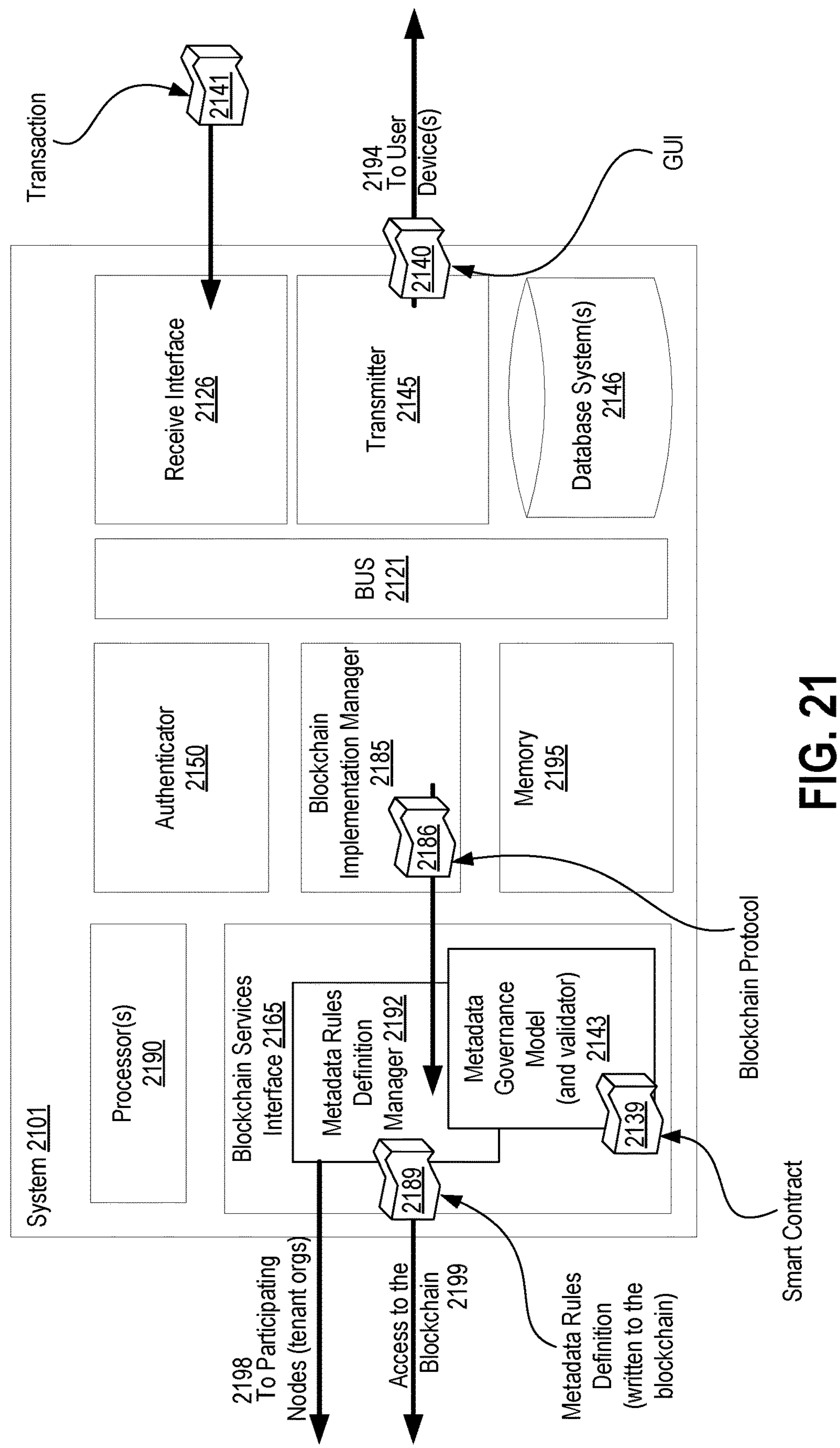
FIG. 21 shows a diagrammatic representation of a system within which embodiments may operate, be installed, integrated, or configured.

FIG. 21 shows a diagrammatic representation of a system 2101 within which embodiments may operate, be installed, integrated, or configured. In accordance with one embodiment, there is a system 2101 having at least a processor 2140 and a memory 2145 therein to execute implementing application code for the methodologies as described herein. Such a system 2101 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 2101, which may operate within a host organization, includes the processor 2140 and the memory 2145 to execute instructions at the system 2101. According to such an embodiment, the processor 2140 is to execute a blockchain services interface 2165 on behalf of on behalf of a plurality of tenants 2148 of the host organization, in which each one of the plurality of tenants 2148 operate as a participating node with access to the blockchain 2149. Internal to the blockchain services interface 2165, there is depicted the blockchain metadata definition manager 2142, depicted here as writing metadata onto the blockchain via its access to the blockchain 2149 as provided by the blockchain services interface 2165.

As shown here, the metadata rules definition manager 2142 is capable of receiving and transacting metadata rules 2189 definitions onto the blockchain via its access to the blockchain 2149.

A receive interface 2126 of the system 2101 is to receive a transaction 2141 for the blockchain which will be matched against the metadata rules definition triggering smart contract 2139 execution when one or more conditions or criteria match the metadata rules definition 2189 previously written onto the blockchain.

Such a system further includes the smart contract 2139 which when triggered is executable via the processor 2140 and the metadata governance model and validator 2143 via which to validate any metadata rules definition 2189 presented and requested to be transacted onto the blockchain before permitting the metadata rules definition 2189 to be added to the blockchain. A blockchain services interface 2165 is further provided via which to the system 2101 is to write the updated values for the data record to the blockchain by adding the transaction 2141 to a new block on the blockchain pursuant to successful validation of the metadata rules definition 2189 via the metadata governance model 2143.

A blockchain protocol 2186 for the blockchain defines a group of functions for the blockchain (e.g., as provided by the blockchain implementation manager 2185), in which the group of base functions are accessible to any participating node (e.g., tenant orgs) 2148 of the blockchain. According to such a system 2101, the blockchain services interface 2165 is further to add the metadata rules definition 2189 to a new block on the blockchain pursuant to successful validation by the metadata governance model 2143.

Bus 2121 interfaces the various components of the system 2101 amongst each other, with any other peripheral(s) of the system 2101, and with external components such as external network elements, other machines, client devices, cloud computing services, etc. Communications may further include communicating with external devices via a network interface over a LAN, WAN, or the public Internet. Authenticator 2150 provides authentication services for users seeking access to the database systems 2146, clouds, and other services of the host organization.

According to a particular embodiment of the system 2101, the system is to execute at a host organization. As shown here, such a system includes: a memory 2145 to store instructions; a processor 2140 to execute instructions; in which the processor 2140 is to execute a blockchain interface 2165 to a blockchain 2149 on behalf of a plurality of tenants of the host organization, in which each one of the plurality of tenants operate as one of a plurality of participating nodes 2148 on the blockchain having access to the blockchain; a transmitter 2145 to transmit a Graphical User Interface (GUI Interface) 2140 from the system to a user device 2144 communicably interfaced with the system over a network for display, in which the GUI interface 2140 is to prompt for a metadata rule definition 2189 at the user device when displayed by the user device; a receive interface 2126 of the system to receive receiving input from the GUI interface 2140 displayed to the client device, the input defining the metadata rule definition, in which the metadata rule definition includes one or more conditions or criteria to be matched to a transaction 2141 received at the blockchain; in which the processor is to auto-generate code for a smart contract representing the metadata rule definition based on the input received from the GUI interface displayed to the client device; in which the processor is to submit the smart contract having the code representing the metadata rule definition to the blockchain for consensus by participating nodes of the blockchain; and in which the processor is to add the smart contract having the code representing the metadata rule definition onto the blockchain by writing the metadata rule definition into an asset of a new block on the blockchain pursuant to the smart contract attaining consensus from the participating nodes of the blockchain.

According to another embodiment, the processor of the system is further configured to execute instructions to cause the system to perform operations including: simulating execution of a smart contract for the transaction at the blockchain using the metadata rule definition without issuing any transaction to the blockchain; and transmitting simulated execution results of the smart contract execution to the GUI interface for display at the client device.

According to another embodiment, the processor to submit the smart contract having the code representing the metadata rule definition to the blockchain for consensus by participating nodes of the blockchain triggers the participating nodes to perform validation of the smart contract by simulating execution of the smart contract for the transaction at the blockchain using the metadata rule definition without issuing any transaction to the blockchain; and in which the participating nodes simulate execution of the smart contract and submit an indication of acceptance of the simulated execution of the smart contract prior to granting consensus permitting the smart contract to be transacted onto the blockchain.

Figure 22A:
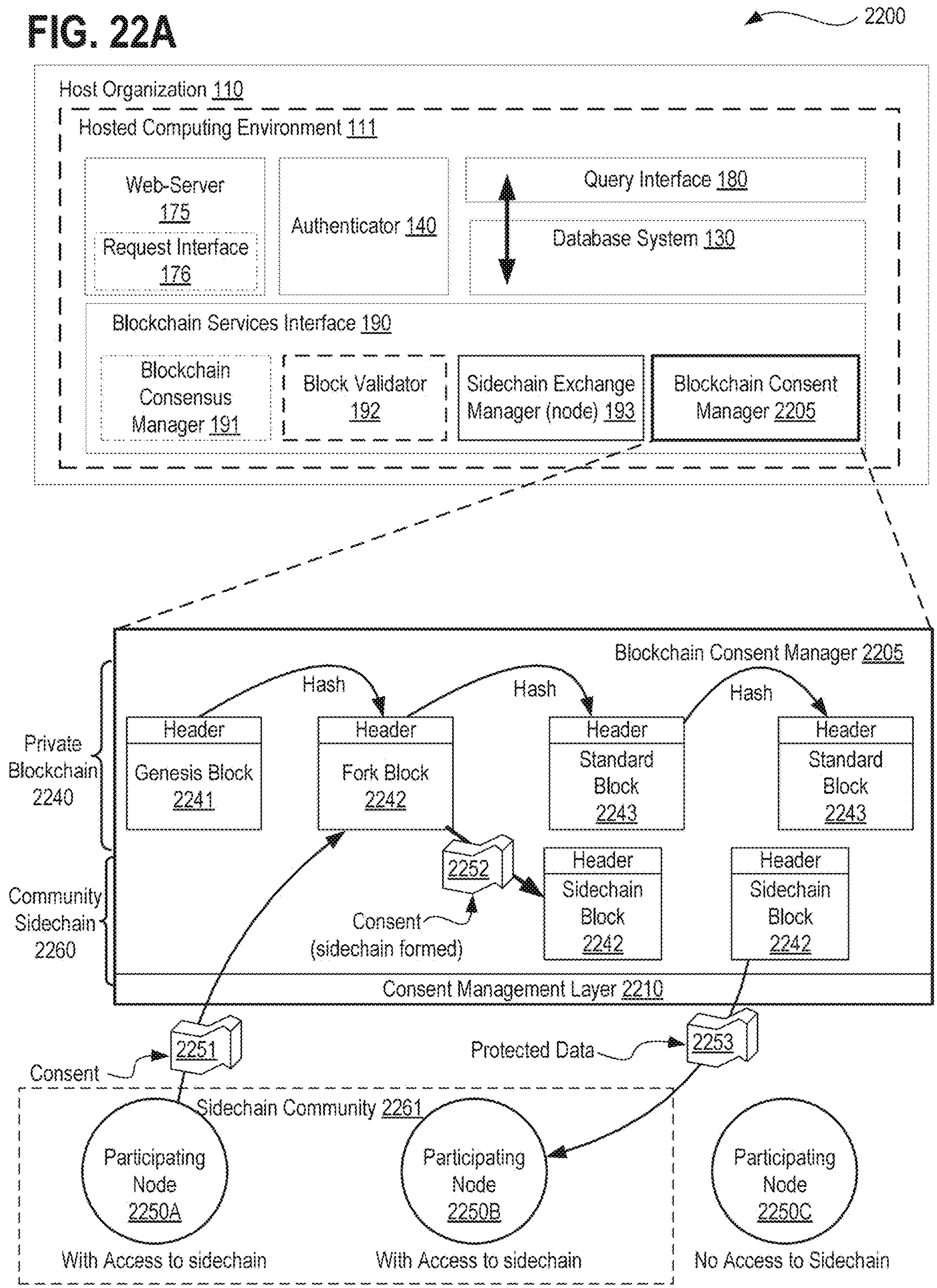
FIG. 22A depicts another exemplary architecture, with additional detail of a blockchain which implements community sidechains with consent management, in accordance with described embodiments.

FIG. 22A depicts another exemplary architecture 2200, with additional detail of a blockchain which implements community sidechains with consent management, in accordance with described embodiments.

As depicted here, there is again a host organization 110 having a hosted computing environment 111 operating therein with a web-server 175, request interface 176, authenticator 140, query interface 180, and database system 130. As before, there is also a blockchain services interface 240 via which the host organization 110 provides a variety of blockchain related services to customers, subscribers, and other organizations and tenants which utilize the cloud computing services provided by the host organization 110.

More particularly, there is now depicted within the blockchain services interface 240 a blockchain consent manager 2205 which implements community sidechain functionality with consent management to control access rights, readability, exchange permissions and disclosure capabilities of the payload data stored within the blockchain.

Conventionally, blockchain blocks are fully open and readable to any participating node for the blockchain protocol implementation. Such openness is by design as it permits any node to authenticate and validate that transactions are valid independently, without requiring permission from any authority. However, such openness is not always desirable. Therefore, the blockchain consent manager 2205 and the blockchain services interface 240 expose additional functionality for certain blockchain protocol implementations supported by the host organization which permit certain data to be subjected to additional access restrictions, while nevertheless utilizing and benefiting from the distributed ledger technologies embodied within the blockchain functionality.

According to a particular embodiment, the blockchain consent manager 2205 provides a community sidechain with consent management on a private blockchain. As depicted here, the blockchain consent manager 2205 provides a private blockchain 2240 (e.g., a community sidechain) which is comprised of an initial genesis block 2241 beginning the sidechain as a private blockchain 2240 followed by a sequence of standard blocks 2243 as the private blockchain continues to grow. The private blockchain 2240 is accessible to each of the participating nodes 2250A and 2250B and 2250C. In practice, there are likely to be many more participating nodes for the private blockchain 2240.

Community sidechains are useful where it is desirable to share data between two nodes of a blockchain, for instance, such as the ability to share medical information for a patient between a hospital and an insurance provider.

With conventional mechanisms, every participating node 2250A-C has full access to all data once that data is written into the blockchain. While useful in many situations, it is readily apparent that medical information should not be freely accessible to view due to privacy concerns as well as HIPAA (Health Insurance Portability and Accountability Act of 2496) requirements. Notwithstanding the shortcomings, or design feature, of prior blockchain protocol implementations, which permit full visibility, the blockchain consent manager 2205 of the host organization 110 provides specific customers, organizations, users (e.g., hospitals, doctor offices, insurance providers, etc., within the context of the patient medical records example) to benefit from the use of blockchain functionality such as immutability and non-centralized record keeping, while also respect patient privacy and comply with Federal HIPAA requirements. Financial organization have similar legal requirements to protect private information, yet may also benefit from the blockchain functionality as set forth herein to provide community sidechains with consent management capabilities via the blockchain consent manager 2205.

According to one embodiment, the blockchain consent manager 2205 implements a consent management layer 2210 through which participating nodes 2250A-C must traverse if they wish to view, read, or access certain information stored within the private blockchain 2240. According to such an embodiment, some of the data within the private blockchain 2240 is viewable to all participating nodes 2250A-C whereas other data is restricted.

Unlike the distinction between a private blockchain and a public blockchain, in which anyone can access the public blockchain and view any information within it, and anyone having access to the private blockchain can access any information within it, the private blockchain 2240 with consent management is different because even if a participating node has authority to access the private blockchain 2240, such access does not necessarily confer the "consent" by which to access protected or restricted information stored within the private blockchain 2240.

As depicted here, participating node 2250A has provided consent 2251 which is written into the private blockchain 2240. Consequently, a new sidechain community 2261 is formed by the blockchain consent manager 2205. Specifically, the blockchain consent manager 2205 creates a new community sidechain 2260 formed from sidechain blocks 2242. The community sidechain 2260 is formed from the point of the fork block 2242 which is viewed by the private blockchain 2240 as a standard block, but includes a reference linking the newly formed community sidechain 2260 with the private blockchain 2240. The main private blockchain 2240 then continues on after the creation of the community sidechain 2260 via additional standard blocks 2243 which follow the fork block 2242.

Upon the consent 2251 being received from participating node 2250A and being written into the private blockchain 2240, the blockchain consent manager 2205 seeds the new community sidechain 2252 with the consent, thus forming the new community sidechain 2260. According to certain embodiments, no payload data whatsoever is written into the sidechain blocks 2242 of the community sidechain. For example, the protected data 2253 is not written into the community sidechain 2260, but rather, remains within the private blockchain 2240 in protected form, but is accessible to the participating nodes of the sidechain community 2261 via a reference between the sidechain blocks 2242 accessible only to the participating nodes 2250A and 2250B of the sidechain community which permits retrieval of the protected data 2253 through the consent management layer. In other embodiments, protected data 2253 may be written into the payload of the sidechain blocks 2242, and through virtue of the participating nodes 2250A and 2250B residing within the sidechain community 2261, those participating nodes 2250A and 2250B will have access to the protected data 2253 without having to access the main chain (e.g., the primary blockchain 2240). As depicted here, the community sidechain 2260 is linked to the private blockchain 2240, and may therefore be considered a forked blockchain, whereas in other implementations, the community sidechain may be formed and permitted to operate independently from the private blockchain, so long as the blockchain consent manager 2205 remains in control to manage which participating nodes are permitted to form any newly created sidechain community 2261, and therefore, which participating nodes have access to the protected data 2253 and which participating nodes do not have access to the protected data 2253.

As is depicted here, participating nodes 2250A and 2250B have access to the sidechain as they form the entirety of the sidechain community 2261, and thus, data is sharable between the nodes of the sidechain community, whereas the participating node 2250C is not a member node of the sidechain community 2261, and therefore cannot access the protected data and cannot share data with the participating nodes 2250A and 2250B.

Figure 22B:
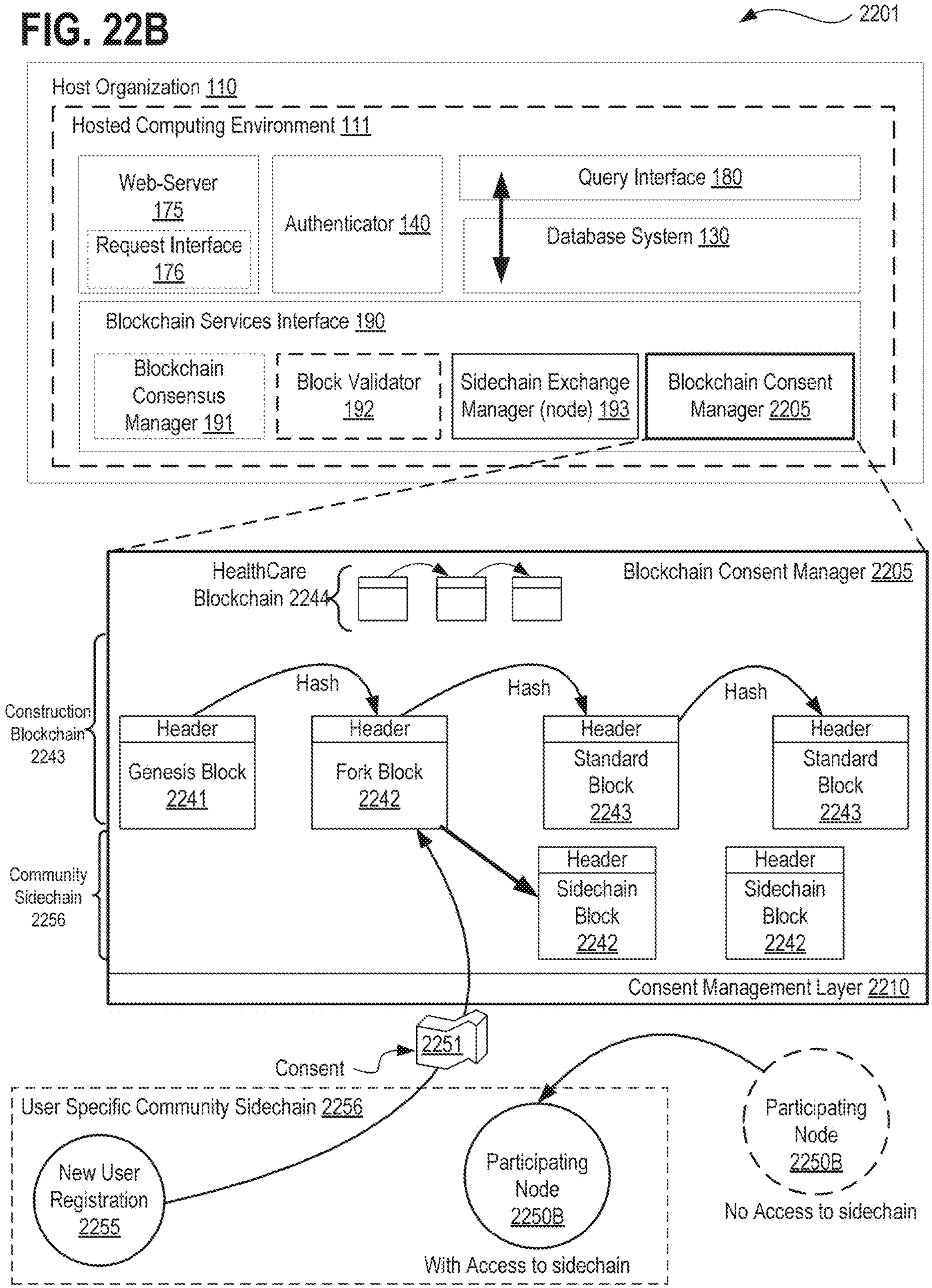
FIG. 22B depicts another exemplary architecture, with additional detail of a community sidechain with consent management, in accordance with described embodiments.

FIG. 22B depicts another exemplary architecture 2201, with additional detail of a community sidechain with consent management, in accordance with described embodiments.

Depicted here are further details regarding the introduction of new participating nodes into the private blockchains. As shown here, there now exists two distinct private blockchains which are managed by the blockchain services interface 240, specifically, the healthcare blockchain 2244 and the construction blockchain 2243. According to described embodiments, there can be many different private blockchains, and they may be organized in a variety of ways. For instance, it is conceivable that different parties in the healthcare industry may wish to share data amongst one another, and therefore, they may participate within the same private healthcare blockchain 2244, and where data sharing is needed, consent may be granted, a sidechain formed with the participating nodes needing access to the data to be shared, thus forming a sidechain community, and then the data shared amongst those participants of the newly created sidechain community, just as was described above.

However, there may be other participants which have no need for access to medical data, and therefore, those participating nodes are formed into a distinct private blockchain. For instance, depicted here is the construction blockchain 2243 having participants such as hardware stores, construction materials manufacturers, building contractors, etc. While such actors likely have no need to access medical information, they likely would benefit from the ability to securely share data related to their construction industry, such as purchase orders, building plans, construction contracts, etc. These actors may wish to protect certain types of information, yet may nevertheless benefit from the use of blockchain functionality.

According to a particular embodiment, a new user registration (e.g., for instance the creation of a user profile with a website, etc.) within the main construction blockchain 2243 resulting in the creation of a new user specific community sidechain 2256. Initially, the new user registration is the only participating node for the user specific community sidechain 2256 as only that particular user by default will have access to private and protected data. However, the new user registration node 2255 may consent 2251 to another node, with the consent being written into the construction blockchain 2243 (e.g., being written into the fork block 2242 by way of example), thus resulting in the community sidechain 2256 having how having both the new user registration 2255 and also another participating node to whom consent was granted. As shown here, participating node 2250B previously was part of the construction blockchain 2243 with no access to the sidechain, however, upon the grant of consent for the new user registration node, the participating node 2250B is then joined into the user specific community sidechain 2256, through which access to private or protected data associated with the new user registration node 2255 may be shared. All nodes having consent to enter the user specific community sidechain 2256 will be given access to the private and protected information of the new user registration node 2255. If the same user requires different access to be given to different participating nodes, then the user would require a separate new user registration node to be created. For example, if a user creates a profile with a website such as Home Depot or Lowe's within the construction blockchain 2243 and elects to share information, for instance with a carpet installer, then consent may be granted to the carpet installer to join the user specific community sidechain 2256 and access the relevant information. If the user wishes then to share the same information with, for example, a window installer, then the window installer may also be given consent 2251 to join the user specific community sidechain 2256 as a new participating node, however, if the user wishes to share different information with each provider, then two profiles would be required. Pragmatically, however, the same information for the user would be pertinent to each installer, and therefore, it is unlikely that the user encounters such problem.

It is therefore in accordance with a particular embodiment that users may create user specific community sidechains within the primary blockchain (e.g., such as the construction blockchain 2243 or the healthcare blockchain 2244, etc.) by creating a user profile with a participating website and such users may then grant consent to other nodes (e.g., via the same website) to permit sharing of their private or protected information with specified target nodes participating within the primary blockchain but without access to the user specific sidechain before being granted consent.

Although not specific to the concepts which are discussed in detail herein, a website, such as Home Depot, may operate as a node within the construction blockchain 2243 and also as a customer of the host organization. Through the website of the customer Home Depot, new users may create user profiles and the blockchain services interface 240 of the host organization will then generate a new node within the construction blockchain 2243 or other relevant primary blockchain corresponding to the new user registration 2255. The blockchain services interface 240 will additionally generate the user specific community sidechain 2256 via which the user may grant consent to share information with other participating nodes for the particular blockchain, such as the construction blockchain in this example. For instance, according to one embodiment, when users login or create a profile with the website, such as with Home Depot, they are authenticating with the host organization 110 upon which the website operates and resides. Because the user is then authenticated with the host organization 110, the same host organization 110 can then create the new node for the new user registration on any blockchain accessible to the host organization 110 through the blockchain services interface 240.

To be clear, information is not shared between two different private blockchains. Therefore, while technically feasible, it is not contemplated that information would be shared between the healthcare blockchain 2244 and the construction blockchain 2243. Rather, each operates as a separate private blockchain, each with its own participating nodes, users, and sidechains. The same human user could, however, create profiles with different websites resulting in that human user having a node within the healthcare private blockchain and also a node within the construction private blockchain. The fact that both private blockchains are managed by the same host organization is irrelevant and would likely be unknowable to the particular user in question.

It should also be noted that a sidechain of the private blockchain is not a node, but rather, a permissible branch, or fork, from the main private blockchain. The sidechains depicted here remain immutably attached to, and associated with the primary blockchain and do not operate independently. However, if information is to be shared with another independently operated blockchain, such as another healthcare private blockchain separate from the healthcare blockchain 2244 managed by the host organization 110, then the user could grant consent to exchange protected data with other independently operated blockchain in the manner described previously (e.g., at FIG. 1D), assuming a defined exchange agreement exists between the two primary blockchains, in which case the healthcare blockchain 2244 managed by the host organization would be considered the parent blockchain (e.g., element 188 at FIG. 1D) and the separate independently operated blockchain would be treated as the independently operated sidechain (e.g., element 189 at FIG. 1D).

According to a particular embodiment, when user consent is captured for a particular node within the user specific sidechain, the consent is captured at the sidechain and then written into the primary blockchain where it is permanently kept. In such an embodiment, the fact that consent has been granted is not protected information, however, the restricted data is protected and the consent is only applicable to a specified participating node of the primary blockchain until such time that consent is rescinded. According to certain embodiments, the consent granted may be time limited, and will therefore expire after a specified period of time. In such a case, access to the protected information is checked against the time expiration via the blockchain consent manager 2205 as part of the blockchain protocol provided by the blockchain services interface 240.

Figure 22C:
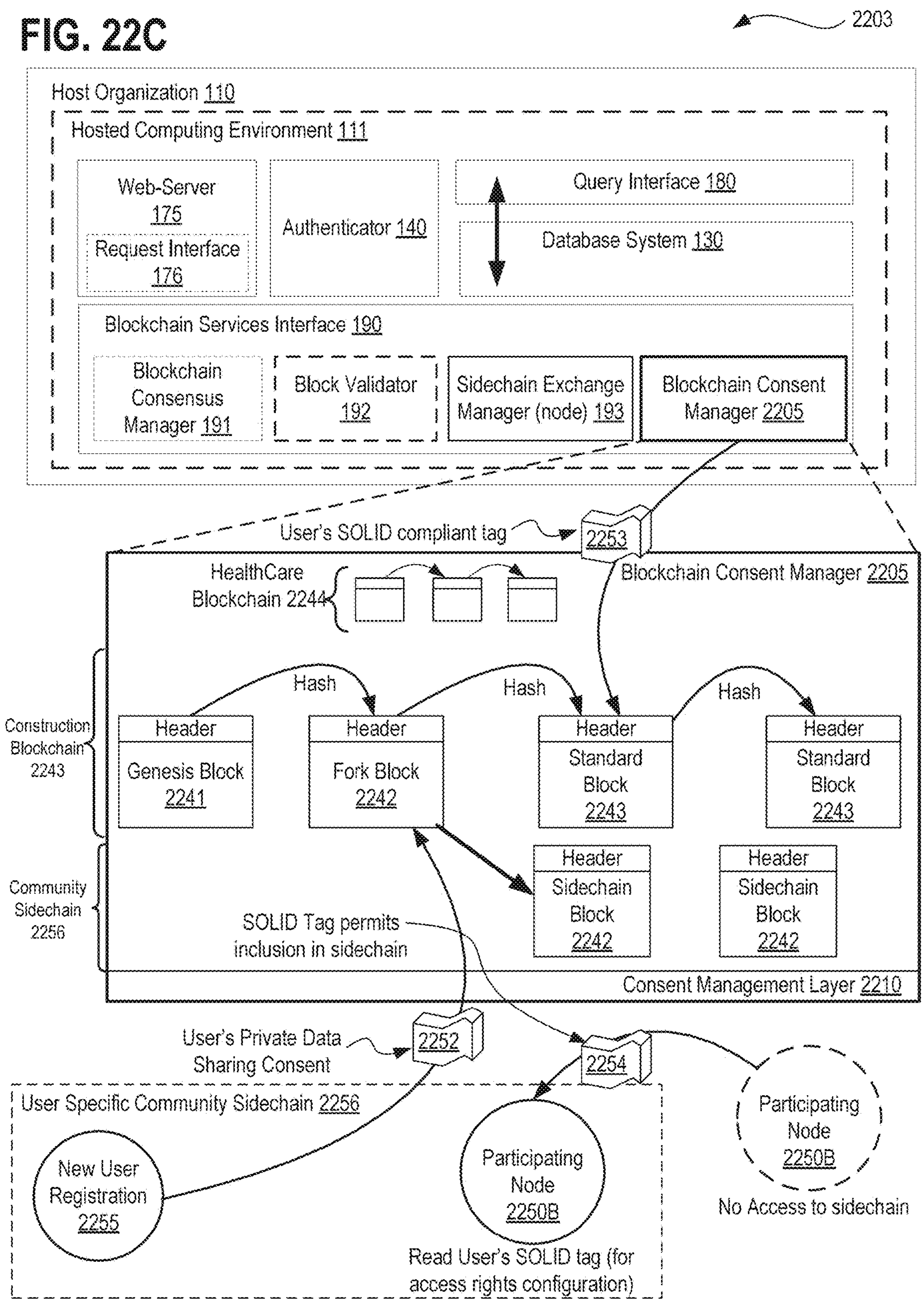
FIG. 22C depicts another exemplary architecture, with additional detail showing means for protecting consumer data privacy using SOLID, blockchain and IPFS, in accordance with described embodiments.

FIG. 22C depicts another exemplary architecture 2203, with additional detail showing means for protecting consumer data privacy using SOLID, blockchain and IPFS integrated with a marketing cloud platform in conjunction with a cloud based computing environment.

As depicted here, the user's SOLID compliant tag is transacted by the blockchain consent manager 2205 onto the blockchain 2243 depicted here. The SOLID tag permits inclusion 2254 in the sidechain 2256, thus causing participating node 2250B not previously part of the user specific community sidechain 2256 to now become a participating node 2250 of the user specific community sidechain 2256. As shown, the user's SOLID compliant tag may be read for access rights configuration information, with the user's private data sharing consent being retrievable from the respective participating nodes of the user specific community sidechain 2256.

According to a particular embodiment, the SOLID protocol is utilized in conjunction with IPFS and blockchain. The InterPlanetary File System (IPFS) protocol allows users to not only receive but to also host content, in a similar manner to BitTorrent. As opposed to a centrally located server, IPFS is built around a decentralized system of user-operators who hold a portion of the overall data, creating a resilient system of file storage and sharing. Any user in the network can serve a file by its content address, and other peers in the network can find and request that content from any node who has it using a distributed hash table (DHT).

The SOLID protocol, which stands for "SOcial LInked Data" is a web decentralization project which aims to radically change the way Web applications work today, resulting in true data ownership by the end users and consumers as well as providing improved privacy for such individuals. Stated differently, Solid is an attempt to re-decentralize the web.

The SOLID project proposes developing a platform for linked-data applications that are completely decentralized and fully under users' control rather than controlled by other entities. The ultimate goal of SOLID is to allow users to have full control of their own data, including access control and storage location.

A number of technical challenges must be resolved before the aim of decentralizing the web may be accomplished. Rather than using a centralized spoke-hub distribution paradigm, decentralized peer-to-peer networking is implemented in a manner that adds more control and performance features than traditional peer-to-peer networks such as BitTorrent and blockchain. Other goals are for the system to be easy to use, fast, and allow for simple creation of applications by developers.

A central focus of SOLID is to enable the discovery and sharing of information in a way that preserves privacy on behalf of a user. For instance, a user may store personal data in "PODS" (Personal Online Data Stores) hosted wherever the user desires. Applications that are authenticated by Solid are allowed to request data if the user has given the application permission. A user may distribute personal information among several pods; for example, different pods might contain personal profile data, contact information, financial information, health, travel plans, or other information. The user could then join an authenticated social-networking application by giving it permission to access the appropriate information in a specific pod. The user retains complete ownership and control of data in the user's pods: what data each pod contains, where each pod is stored, and which applications have permission to use the data.

An organized collection of standards and data formats/vocabularies providing the same capabilities that centralized social media services offer, such as identity, authentication, login, permission lists, contact management, messaging, feed subscriptions, comments, discussions, and others. Specifications and design notes describing a REST API extend existing standards and also guide developers building servers or applications. Additional proposed features include a test suite for testing and validating SOLID implementations and an ecosystem of social applications, identity providers, and helper libraries that run on the SOLID platform.

Additionally leveraged by described embodiments, in addition to blockchain and SOLID technologies, is the InterPlanetary File System (IPFS) protocol and network which is designed to create a content-addressable, peer-to-peer method of storing and sharing hypermedia in a distributed file system.

The IPFS is a peer-to-peer distributed file system that seeks to connect all computing devices with the same system of files. IPFS may be viewed as a single BitTorrent swarm, exchanging objects within one repository. In such a way, IPFS provides a high-throughput, content-addressed block storage model, with content-addressed hyperlinks with a file system that can be accessed in a variety of ways, including via FUSE and over HTTP.

While Solid presents an entirety new paradigm for web applications, it is nevertheless backward compatible with existing web protocols and interfaces. As the Internet has evolved over-time, data storage paradigms have morphed from one in which a user's data was stored on their own personal computer to a regime in which a user's personal data is now stored within massive data centers around the world, managed by third parties, platform providers, and app providers.

Very often, social media platforms and apps measure their ability to make money on the basis of the amount and diversity of "user" data they have at their disposal. Platform providers and app providers leverage user's data to generate revenue. However, as users become increasingly savvy with the modern internet, many seek to exercise greater control over their data, but have previously found there is no effective means by which to do so.

Some countries have enacted data protection laws, sometimes requiring that, for example, companies must make your data available, and permit users to download or delete it.

While such laws provide a legal solution, they do not provide a technical solution and the reality is that it remains frustratingly difficult for users to manage, control, or delete their data once it has been captured by platform and app providers.

Pods enable users to bring their own data. When utilized with SOLID, applications may be built in a way where the SOLID compliant applications and social media platforms read and write users' data from pods, where each respective user has affirmatively decided for themselves to store such data, and where such users have permitted the app and platform providers to access such data.

Users may have multiple pods, each of which may be stored directly on the user's computer, stored in a distributed manner across the user's own multiple devices, stored in a distributed manner via a public or private blockchain network, or hosted in the cloud. For example, a user's pod may be stored in the cloud by the host organization's database systems.

The pods themselves store linked data. For instance, pods may link to data in another pod, to data in a database, or to data accessible via the Internet. Thus, with SOLID, it is possible for a user to store the data they produce wherever they want and to further control access to their data.

According to described embodiments, a "You-Niverse" or "YouNiverse" user data privacy platform expands the capabilities even further and operates to shift both ownership and control of user data from large data aggregators and back to the users themselves who may then make informed decisions regarding precisely who they share data with, when they share data, and whether or not to continue sharing such data. Certain data consumers may be granted access to the user's data, but at the user's sole discretion. For instance, social media platforms may continue to utilize the data of such users, but at the approval and authorization of the user. Such platforms must seek authorization from the user to access their data and must maintain that approval to continue to access the data, with such approval being revocable at any time by the user having ownership and control of such data.

As will be unsurprising to most, one of the biggest concerns for a consumer today is that consumer's privacy. Moreover, it is becoming more and more apparent that most of the top enterprises have inexcusably relaxed privacy rules which in turn invite abuse by various entities from malicious hackers to foreign and domestic governments, which thus results in great damage to such consumers when their user data is breached, leaked online, sold, abused, or otherwise utilized in some manner that does not meet with their approval.

While certain uses may be somewhat innocuous, such as suggesting a targeted advertisement campaign, other data abuses cause literal social, economic, political, and professional harm to users when such data is abused. The examples are so numerous and commonplace that they don't even warrant inclusion here.

Therefore, it is in accordance with certain embodiments that a cloud computing platform is exposed via APIs and GUIs from the host organization which permits user and consumer data to be directly owned by individuals and selectively shared based on a unique approach to privacy which leverages existing capabilities such as SOLID, IPFS, and Distributed Ledger Technology (DLT) such as blockchain, and provides new and enhanced features which enable the users to manage and control their data and sharing authorizations through a simple centralized interface.

According to a particular embodiment, a unique SOLID compliant tag is allocated to a user which operates as a privacy preserving tag, allowing the user to initially have data pulled from various sources to create their initial profile.

A user's profile is typically made up from a collection of primary info describing the individuals name, contact information, age, location, etc., which is then supplemented with, for example, employment history (including current employment), education, social information, private information such as the individual's accessible accounts, health information, university transcripts, etc.

Such information may be retrieved through a series of APIs implemented by the host organization and for which the host organization maintains and manages the access and authentication schemes utilizing the user's unique SOLID tag.

Despite the information residing within many disparate systems, the host organization's privacy platform interface permits the user to retrieve the information into the host organization.

Utilizing the SOLID protocol, the host organization retrieves the user's information and then permits the user to configure through the use of a GUI, settings within the user's SOLID tag indicating what data is public and what data is private within the user's profile according to specifications and preferences submitted by such users via the GUI. For example, a user may specify that certain information, such as school transcripts, be shared with a specific entity but not shared with any other entity. Or the user may specify that all of their information in their profile be shared with one or more entities. For example, if healthcare data for the user is stored in the profile, the user may permit all of the healthcare information to be shared with a hospital and their doctor, but then permit only a very limited subset of the same data to be shared with a specified university. For instance, the user may share their immunization records with the university from their profile, but no other data, despite their doctor and hospital having full access to all data within the profile for a particular user.

Utilizing SOLID, the information may also be tagged so as to alleviate privacy concerns as the user is in control of what information is deemed private or public.

When a firm, company, business, or some entity seeks access to the user's information, they must first obtain consent from the user, with the user's consent being transacted onto a public blockchain within an asset specifying the user, the user's SOLID compliant tag, and to whom the user has granted consent to access the information in their profile, thus resulting in the user's data being decentralized from the organizations seeking to access such data. Stated differently, third parties and specified entities may still access the user's data, but must do so with the user's consent and must retrieve such data from the pod within which the user's data is stored. The user's profile data may also be stored on a blockchain, in an encrypted manner, or may be stored elsewhere, so long as it is accessible via a provided link or reference.

For example, the user's specific identity may be written onto the public blockchain correlated to the user's SOLID complaint tag, and then when a firm or organization seeks to access the user's data, the systems of the firm/organization seeking access to the user's profile data will reference the blockchain, looking up the user by their identity or their SOLID complaint tag, and then derive whether or not consent has been granted for that firm to access the user's private data, and to what portions of such data.

If the user has granted access permissions to the firm, then the firm can proceed to retrieve the user's private data, which was agreed to be shared by the user, with the retrieval coming from the blockchain in this particular example.

For instance, according to a specific embodiment, the firm seeking access to the data may be added to a user-specific community side chain, forked from the public blockchain, and once the firm is a participating node within the user-specific community side chain 2256, access restrictions and access rights for the user-specific community side chain 2256 will permit the firm/organization seeking access to the user's data to permissibly retrieve the protected data from the blockchain.

According to another embodiment, users may additionally generate an IPFS profile, based their previously allocated SOLID compliant tag, for any sub-portion of their profile, with the IPFS profile being then encoded with an asymmetric key.

Consequently, only entities that have been granted shared access may then permissibly view the data within the IPFS profile.

In such a way, users/consumers may themselves monetize their own data, rather than seeing other organizations monetize, package, sell, re-sell, and repackage their private user data to the user's detriment.

Moreover, users may additionally share their data with the host organization's Marketing cloud, which allows incentives to the users, such as rewards points for validating their identity. Stated differently, users can choose what services can contact them for marketing services based on the preferences and settings configured by the user and written onto the public Blockchain.

According to a particular embodiment, any time that an app, social media platform, company, firm, or some other entity seeks to access the information of the user, the user's consent stored on the blockchain must be retrieved and checked to determine if that particular entity has valid and current consent from the user to access the information sought.

According to a particular embodiment, the user's unique SOLID tag may be shared with various entities, which uniquely identifies that user as well as specifies that current consent may be found by accessing a specified public blockchain and retrieving the user's current consent based on the user's unique SOLID tag previously shared. Thus, if an entity wishes to access the user's information, they must first retrieve the current consent from the blockchain based on the user's SOLID tag so as determine whether or not that particular entity has current permission to access that user's data, and more specifically, what data belonging to that user may be accessed by the entity seeking access.

Because the user's consent is stored within the blockchain, it may be updated and changed at any time and from that point forward, any entity seeking access to the user's data will be affected for all future access requests. Thus, even if, for example, an app had access to that user's profile data previously, on the next attempt to access the user's profile data, that same app must again check the public blockchain using the user's unique SOLID tag to determine if the app has current permission (e.g., that is to say of the user's consent remains in effect) to access the user's data. If the user had previously granted access but since revoked access, then the app will not be able to access the user's information stored in the pod linked via the user's SOLID tag.

The user's consent may also be configured to expire after a specified amount of time or expire after a certain number of access attempts.

The user may additionally generate an IPFS profile based on that user's unique SOLID tag, for each of the parts of that user's profile. For example, an IPFS profile may be generated based on the SOLID tag for healthcare information, and another IPFS profile may be generated for university and school transcripts and yet another IPFS profile may be generated for customer information at a particular retailer.

The generated IPFS profile will then be encoded with asymmetric key cryptography. Thus, only entities having the asymmetric keys and thus having shared access can view the data of the user.

Because the user maintains access control over their own data, such users may then electively choose to monetize their data, or permit their data to be used for monetization purposes, and may further reserve the right to change their mind and revoke access at any time.

In other words, users can choose what services may contact them for marketing services based on the preferences and settings established by the user via the consent written onto the Blockchain (which is identified and referenced by the user's SOLID tag).

For example, according to certain embodiments, organizations may allocate or grant monetization rewards, rewards points, or other incentives to the user for granting access to their information. According to one embodiment, a business entity allocates commerce rewards points to the user and associates the allocated commerce rewards points with the user's unique SOLID tag, once the user grants their consent for the business entity to access at least a portion of the user's profile information. According to related embodiments, the business entity grants additional commerce rewards points to the user based on the user's first purchase transaction, with such points being associated with the user via the user's unique SOLID tag.

According to a particular embodiment, the business entity utilizes the marketing cloud and the commerce cloud platforms provided by Salesforce. In such embodiments, when such a user provides access to their information to the business entity, the commerce cloud platform will provide commerce rewards points to the customer for purchases from merchants also utilizing the commerce cloud platform and will further provide incentives to the customer for providing additional validation information (e.g., to verify the user's identity) by applying a points multiplier to the customer's commerce rewards points based on the customer's increased validation score (e.g., a points multiplier may be applied to base points to increase total points allocated to the customer based on an improved validation score). Such a system may then further provide recommendations to the customer which are tailored to that particular customer's interests and usage patterns based on that customer's shared information pursuant to the business entity's ability to access the customer's information via the consent written to the blockchain and linked via the user's unique SOLID tag.

Moreover, once the customer has opted in to provide such information to the business entity, additional identifying information and additional verification by the customer improves the verification score for that customer and thus translates into additional redeem offers for goods and services at the merchants (e.g., such as the business entity) utilizing the commerce cloud platform and increased earning rates of commerce rewards for everyday spending by that customer.

Consider a particular example, of a user having data stored within a social media platform. All privacy has been lost for any data associated with that user which is stored by the social media platform due to the inability for that user to control access to their information. Essentially, the social media platform may do whatever it wishes with the user's data.

Figure 23:
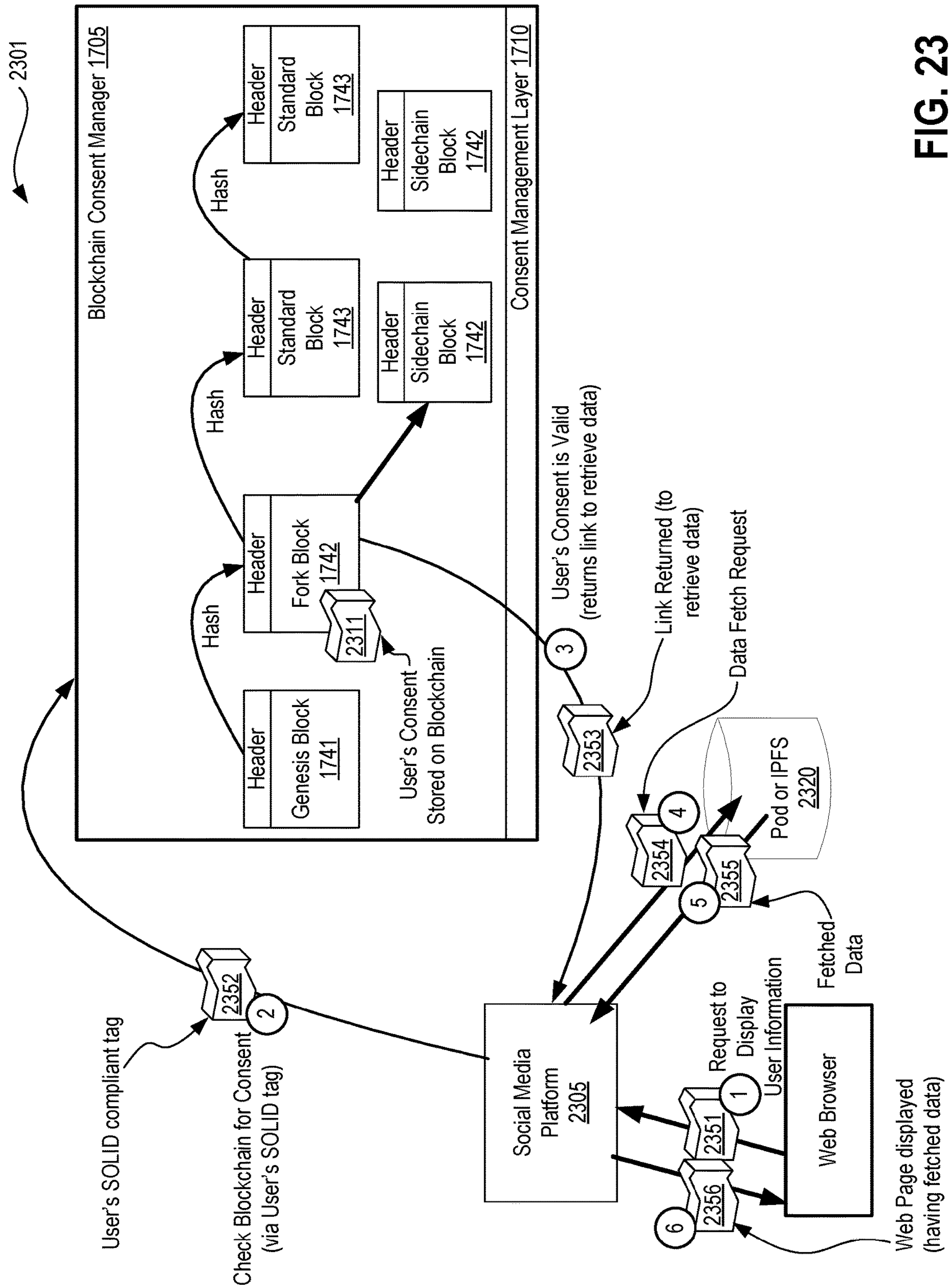
FIG. 23 depicts another exemplary architecture, with additional detail showing the interactions which occur when a user's data is attempted to be accessed, in accordance with described embodiments.

FIG. 23 depicts another exemplary architecture 2301, with additional detail showing the interactions which occur when a user's data is attempted to be accessed, in accordance with described embodiments.

As shown here, there is now a web browser requesting to display user information from a social media platform 2305. For example, the social media platform may be displaying information about the user associated with the SOLID tag as part of a collection of marketing information or may be sharing such data as part of a social media networking platform such as LinkedIn. Or rather than a social media platform 2305, a healthcare app may be attempting to share information about the user associated with the SOLID tag to a PC at a hospital or doctor's office, via the web browsers. Regardless of the use of the information, when a request to display the information is made from the web browser (operation 1), a request 2351 is transmitted to the social media platform 2305 or whatever app is providing the website. Next at operation 2, the social media platform 2305 or app checks the blockchain for consent utilizing the user's SOLID compliant tag 2352, with this request being transmitted to the blockchain consent manager 1705 in this particular example. However, the website or app could check the blockchain itself, rather than using the blockchain consent manager 1705 provided by the host organization.

The user's consent 2311 is stored on the blockchain as described previously, and therefore, assuming current consent to share the requested data remains, at operation 3, a link 2353 is returned to retrieve the requested data, pursuant to the user's consent being valid. This link is returned to the social media platform 2305 or whatever app originated the request, which then responsively at operation 4 makes a data fetch request 2354 to the pod or IPFS referenced via the link 2353 returned. The user controls and specifies where their data is stored, and thus, the link 2353 will reference whatever pod or storage repository or IPFS profile has been configured by the owner of the user data associated with the SOLID tag. The pod, storage repository, or IPFS profile 2320 will return the requested data at operation 5 as fetched data 2355, pursuant to which the social media platform 2305 or app may then at operation 6 proceed to display the web page 2356 having embodied therein the fetched data owned and controlled by the user associated with the SOLID tag.

Use of the user's unique SOLID tag shifts the power dynamic into the user's favor, such that the user is in control of how their data is to be utilized by others. Because the user is in control, the user has vastly increased privacy over their data, through the user's ability to specify what may be shared, what marketing aspects may be shared, with whom it may be shared, and so forth.

Say for example, a user permits their email to be shared on the LinkedIn social media platform. However, when the user subsequently elects to revoke consent and no longer permit their email to be shared, the LinkedIn platform will then be missing that user's email from any profile on that website. Stated differently, even if the user's LinkedIn profile previously displayed the user's email, once the user revokes consent to share with LinkedIn, the LinkedIn website will no longer show that user's email. This assumes, of course, that the LinkedIn website is SOLID compliant. If so, then the email itself is pulled from a source or pod linked via the user's SOLID tag. When consent is valid, a reference link will be followed from the user's SOLID tag stored on the blockchain and the email field will be displayed, however, after consent is revoked, that same email field cannot be displayed by the LinkedIn website. This is because the website, be it LinkedIn or some other website, displays the information from the user's pod, rather than from a data source controlled by the website.

In such a way, revocation of consent written onto the blockchain for this user will immediately affect all entities attempting to display that user's information because any attempt to display the user's information will require an access attempt from the pod where the user's information is stored, and an access request without valid consent will fail, thus preventing the field or user data in question from being displayed.

Any website, app, or social media platform that attempts to display or share information belonging to the user need not know who the authority is that controls or owns the information. Rather, the information is simply referenced in compliance with the SOLID protocol, such as by displaying the field SOLID ID: email for a specified user identified by that user's unique SOLID tag. Data retrieval may be performed via the REST API or other permissible syntax. Notably, however, the data is retrieved not from a database controlled by, for example, the app requesting or displaying the data, but rather, by a data repository as specified by the user via the user's SOLID tag. The data retrieval must traverse the consent mechanism by checking the blockchain, searching by the user's SOLID tag, to verify that current consent to access the data remains in effect, from which the information requested may then be retrieved via a link or reference provided upon validation of current consent, which when followed, retrieves the requested information. In the example above, only the user's email was requested to be retrieved, however, it is also permissible to retrieve, for example, the user's entire profile, subject to consent, or all data stored within a particular pod established by the user, or all data stored within a particular IPFS profile created by the user based on the user's SOLID tag and identified (e.g., the IPFS profile may be specified as the repository of data) based on the user's SOLID tag.

By way of clarification, it is possible for an entity to capture or "scrape" a user's data if that entity has consent. For example, if a user grants consent to a malicious app, the malicious app can then make appropriate SOLID data retrieval requests which will be subjected to the consent authorization by checking the blockchain for the user's current consent, however, because consent was granted, the malicious app will then have the ability to retrieve the requested data and store that data locally. Storing the data locally within a repository controlled by the malicious app is not an appropriate use of the information, however, this is outside of the control of the SOLID protocol. While the malicious app will not be able to update or retrieve information for that user again, after consent is revoked, the malicious app would retain the information stored locally and could continue to access that local copy of the data. However, reputable apps, websites, and social media platforms which market themselves as being SOLID compliant are more likely to adhere to the principles of the SOLID protocol, including refraining from scraping the user's data and storing a local copy in a storage repository outside of the user's control.

According to certain embodiments, the unique SOLID tag generated and assigned to the user need not be a SOLID compliant tag, but rather, may simply be a unique identifier created for the user, which is then utilized in place of the SOLID compliant tag. In such an event, entities seeking to access the users data would first reference the user's unique ID either at the blockchain or at a blockchain interface provided by the host organization to determine if current consent has been granted by the user, and if so, then the host organization will return either the requested data or a link to the requested data, pursuant to consent being valid and current as stored by the blockchain for the particular request being made.

Figure 24:
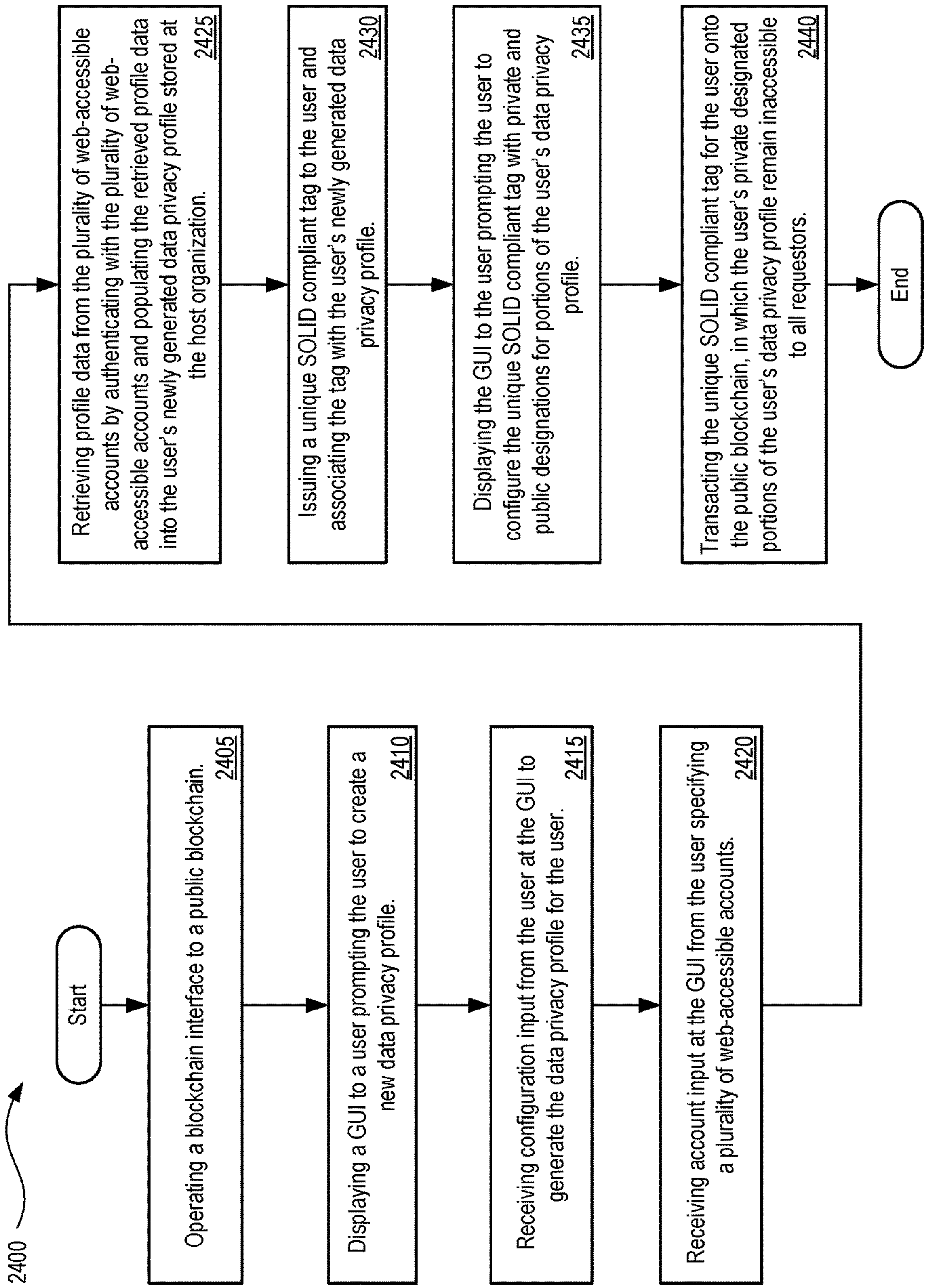
FIG. 24 depicts a flow diagram illustrating a method for protecting consumer data privacy using SOLID, blockchain and IPFS integration in conjunction with a cloud based computing environment in accordance with described embodiments.

FIG. 24 depicts a flow diagram illustrating a method 2400 for protecting consumer data privacy using SOLID, blockchain and IPFS integration in conjunction with a cloud based computing environment such as a database system implementation supported by a processor and a memory to execute such functionality to provide cloud based on-demand functionality to users, customers, and subscribers.

Method 2400 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 240, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 2400 depicted at FIG. 24, beginning with block 2405, processing logic operates an interface to a shared ledger on behalf of a plurality of authorized network participants for the shared ledger, in which the shared ledger persists data via a plurality of distributed shared ledger nodes.

At block 2405, processing logic operates a blockchain interface to a public blockchain.

At block 2410, processing logic displays a GUI to a user prompting the user to create a new data privacy profile.

At block 2415, processing logic receives configuration input from the user at the GUI to generate the data privacy profile for the user.

At block 2420, processing logic receives account input at the GUI from the user specifying a plurality of web-accessible accounts.

At block 2425, processing logic retrieves profile data from the plurality of web-accessible accounts by authenticating with the plurality of web-accessible accounts and populating the retrieved profile data into the user's newly generated data privacy profile stored at the host organization.

At block 2430, processing logic issues a unique SOLID compliant tag to the user and associating the tag with the user's newly generated data privacy profile.

At block 2435, processing logic receives displays the GUI to the user prompting the user to configure the unique SOLID compliant tag with private and public designations for portions of the user's data privacy profile.

At block 2440, processing logic receives transacts the unique SOLID compliant tag for the user onto the public blockchain, in which the user's private designated portions of the user's data privacy profile remain inaccessible to all requestors.

According to another embodiment, method 2400 further includes: generating an IPFS profile for the user using the unique SOLID compliant tag for the user; storing the user's data privacy profile into the IPFS profile; and writing a link onto the public blockchain within the user's unique SOLID compliant tag referencing the IPFS profile within which the user's data privacy profile is stored.

According to another embodiment, method 2400 further includes: receiving a request from the organization to access the user's private data from the blockchain; validating the organization has been granted consent by the user by reading the consent from the user's unique SOLID compliant tag; and sharing the user's private data from the blockchain with the organization.

According to another embodiment, method 2400 further includes: encrypting the user's data privacy profile to generate an encrypted data privacy profile for the user; writing the encrypted data privacy profile for the user onto the public blockchain; writing a link onto the public blockchain within the user's unique SOLID compliant tag referencing the encrypted data privacy profile for the user on the public blockchain; and in which the method further includes the host organization returning an encryption key to a requestor to decrypt the encrypted data privacy profile for the user responsive to the requestor having been granted consent by the user to access information from the user's data privacy profile.

According to another embodiment, method 2400 further includes: storing the user's data privacy profile within a database system of the host organization; writing a link onto the public blockchain within the user's unique SOLID compliant tag referencing the user's data privacy profile as stored within the database of the host organization; and in which the method further includes the host organization (i) receiving a request by an organization to access a portion of the user's data privacy profile, (ii) checking the user's unique SOLID compliant tag on the blockchain to validate the request by the organization, (iii) retrieving the requested portion of the user's data privacy profile as stored within the database of the host organization pursuant to successfully verifying the user has granted consent to share to the organization, and (iv) returning the requested portion of the user's data privacy profile to the organization.

None of the claims in the above description are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements.

It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system to execute at a host organization, wherein the system comprises:

a memory to store instructions;

a set of one or more processors;

a non-transitory machine-readable storage medium that provides instructions that, when executed by the set of one or more processors, the instructions stored in the memory are configurable to cause the system to perform operations comprising:

operating a blockchain interface to a blockchain on behalf of a plurality of tenants of the host organization;

operating a database interface to a distributed database, separate from the blockchain, on behalf of the plurality of tenants of the host organization;

displaying a Graphical User Interface (GUI Interface) to a user device communicably interfaced with the system over a network, wherein the GUI interface is to prompt for a metadata entity definition at the user device when displayed by the user device, wherein the metadata entity definition defines access control permissions for a blockchain entity including specifying at least (i) a data classification attribute indicating sensitive user information and (ii) a consent required attribute indicating consent is required to access the sensitive user information and (iii) a consent requirements attribute indicating a party from whom the consent must be acquired;

transacting the metadata entity definition onto the blockchain; and creating a new entity object defined by the metadata entity definition within the distributed database to store the sensitive user information and writing the sensitive user information to the distributed database to be persistently stored.

2. The system of claim 1, wherein writing the sensitive user information to the distributed database to be persistently stored comprises:

generating an SQL query to create a new record or to update an existing record within the new entity object at the distributed database;

executing the SQL query against the distributed database to persistently store the sensitive user information within the distributed database; and wherein the access control permissions remain stored at the blockchain as the metadata entity definition and further wherein the sensitive user information remains stored within the new entity object at the distributed database without the sensitive user information ever being written to the blockchain.

3. The system of claim 1, wherein the instructions are configurable to cause the system to perform operations further including:

receiving a transaction at the blockchain requesting access to the sensitive user information;

retrieving the metadata entity definition from the blockchain;

determining the metadata entity definition mandates the consent required attribute indicating consent is required to access the sensitive user information; and determining the party from whom the consent must be acquired based on the consent requirements attribute as specified by the metadata entity definition retrieved from the blockchain.

4. The system of claim 3, wherein the instructions are configurable to cause the system to perform operations further including:

determining the party from whom the consent must be acquired has granted consent for the requestor to access the sensitive user information; and responsively querying the distributed database requesting retrieval of the sensitive user information.

5. The system of claim 3, wherein the instructions are configurable to cause the system to perform operations further including:

executing a smart contract at the blockchain responsive to the transaction received at the blockchain requesting access to the sensitive user information;

determining, via execution of the smart contract, that the party from whom the consent must be acquired has granted consent based on availability of a decryption key written onto the blockchain via which to decrypt the sensitive user information;

responsively querying the distributed database requesting retrieval of the sensitive user information and passing the decryption key to the distributed database at the time of querying;

wherein the distributed database is to retrieve the sensitive user information as stored in an encrypted form and applies the decryption key to decrypt the sensitive user information and returns the sensitive user information in a non-encrypted format; and receiving the sensitive user information from the distributed database in the non-encrypted format.

6. The system of claim 3, wherein the instructions are configurable to cause the system to perform operations further including:

executing a smart contract at the blockchain responsive to the transaction received at the blockchain requesting access to the sensitive user information;

determining, via execution of the smart contract, that the party from whom the consent must be acquired has granted consent;

retrieving a decryption key written onto the blockchain via which to decrypt the sensitive user information;

responsively querying the distributed database requesting retrieval of the sensitive user information;

receiving the sensitive user information from the distributed database in an encrypted format; and decrypting the sensitive user information via the decryption key.

7. The system of claim 1, wherein the instructions are configurable to cause the system to perform operations further including:

executing a smart contract responsive to receiving the transaction at the blockchain, wherein the smart contract retrieves the metadata entity definition previously transacted onto the blockchain specifying the access control permissions; and approving or denying access to the sensitive user information based on the execution of the smart contract.

8. The system of claim 7, wherein approving or denying access, comprises:

executing the smart contract;

retrieving the metadata entity definition from the access control object previously transacted onto the blockchain pursuant to instructions instantiated by the execution of the smart contract;

determining if an initiator of the transaction received at the blockchain requesting access to the blockchain entity object corresponds to a specified blockchain participant having been granted read access, write access, update authority, create authority, or some combination thereof as represented by the stored metadata retrieved from the access control object; and approving or denying the access to the blockchain entity object on the basis of (i) first whether the initiator of the transaction corresponds to any specified blockchain participant within the metadata entity definition identified as a permissible requestor by party from whom the consent must be acquired and (ii) whether sufficient blockchain access permissions have been granted to the permissible requestor and initiator of the transaction as defined by the metadata entity definition.

9. The system of claim 1, wherein the instructions are configurable to cause the system to perform operations further including:

auto-generating an access control object specifying the access control permissions using the metadata entity definition received via the input from the GUI interface displayed to the client device; and wherein transacting the metadata entity definition onto the blockchain comprises transacting the access control object onto the blockchain to store the metadata entity definition onto the blockchain.

10. The system of claim 1:

wherein the sensitive user information comprises Personally Identifiable Information (PII) for an individual protected by jurisdictional requirements for the handling of PII by companies; or alternatively wherein the sensitive user information comprises Personally Identifiable Information (PII) for an individual protected by General Data Protection Regulation (GDPR) compliance requirements for companies operating within the European Union.

11. The system of claim 1:

wherein each one of the plurality of tenants operate as one of a plurality of participating nodes on the blockchain having access to the blockchain; or alternatively wherein the host is to operate as one of a plurality of participating nodes on the blockchain having access to the blockchain on behalf of the plurality of tenants and further in which each of the plurality of tenants gain access to the blockchain indirectly through the participating node of the host organization.

12. The system of claim 1:

wherein each one of the plurality of tenants operate as one of a plurality of participating nodes on the distributed database having access to the distributed database; or alternatively wherein the host is to operate as one of a plurality of participating nodes on the distributed database having access to the distributed database on behalf of the plurality of tenants and further in which each of the plurality of tenants gain access to the distributed database indirectly through the participating node of the host organization.

13. The system of claim 1:

wherein the distributed database comprises an InterPlanetary File System (IPFS) compatible type distributed database system; or wherein the distributed database comprises a CouchDB compatible type distributed database system.

14. The system of claim 1, wherein receiving the transaction at the blockchain requesting access to the sensitive user information comprises:

receiving a transaction at the blockchain requesting access to the blockchain entity subject to the metadata entity definition transacted onto the blockchain; and retrieving the access control permissions specified for the blockchain entity from the blockchain to determine the access control permissions for the sensitive user information.

15. The system of claim 1:

wherein displaying the GUI interface to the user device comprises executing instructions stored in the memory of the system via the processor, wherein the instructions cause the system to transmit the GUI interface from a receive interface of the system to a user device communicably interfaced with the system over the network; and wherein receiving the input at the system from the GUI interface comprises receiving the input at the receive interface of the system.

16. The system of claim 1, wherein transacting the metadata entity definition onto the blockchain comprises:

writing the metadata entity definition into an access control object defining a read on consensus access control mechanism;

writing the access control object having the metadata entity definition stored therein onto the blockchain; and committing the access control object to the blockchain responsive to attaining consensus for the access control object.

17. The system of claim 16:

wherein the metadata entity definition stored within the access control object defining the read on consensus access control mechanism implements read and write permissions as specified via the GUI displayed to the user device;

wherein the read and write permissions specify one or more blockchain entity names and one or more blockchain field names to which a specified blockchain participant is granted read access, write access, update authority, create authority, or some combination thereof; and wherein any specified blockchain participant granted read access for the sensitive user information must query the distributed database requesting retrieval of the sensitive user information from the distributed database as the sensitive user information is never written onto the blockchain to which the metadata entity definition is stored.

18. The system of claim 1:

wherein the system of the host organization implements a cloud computing platform providing on-demand cloud computing services on accessible to subscribers of the cloud computing platform; and wherein an initiator of the transaction received at the blockchain requesting access to the blockchain entity object is associated with one of a plurality of customer organizations having subscriber access to the on-demand cloud computing services provided by the cloud computing platform.

19. A method performed by a system of a host organization, the system having a processor and a memory therein, wherein the method comprises:

operating a blockchain interface to a blockchain on behalf of a plurality of tenants of the host organization;

operating a database interface to a distributed database, separate from the blockchain, on behalf of the plurality of tenants of the host organization;

displaying a Graphical User Interface (GUI Interface) to a user device communicably interfaced with the system over a network, wherein the GUI interface is to prompt for a metadata entity definition at the user device when displayed by the user device, wherein the metadata entity definition defines access control permissions for a blockchain entity including specifying at least (i) a data classification attribute indicating sensitive user information and (ii) a consent required attribute indicating consent is required to access the sensitive user information and (iii) a consent requirements attribute indicating a party from whom the consent must be acquired;

transacting the metadata entity definition onto the blockchain; and creating a new entity object defined by the metadata entity definition within the distributed database to store the sensitive user information and writing the sensitive user information to the distributed database to be persistently stored.

20. The method of claim 19, further comprising:

receiving a transaction at the blockchain requesting access to the sensitive user information;

retrieving the metadata entity definition from the blockchain;

determining the metadata entity definition mandates the consent required attribute indicating consent is required to access the sensitive user information;

determining the party from whom the consent must be acquired based on the consent requirements attribute as specified by the metadata entity definition retrieved from the blockchain;

determining the party from whom the consent must be acquired has granted consent for the requestor to access the sensitive user information; and responsively querying the distributed database requesting retrieval of the sensitive user information.

21. Non-transitory computer-readable storage media having instructions stored thereupon that, when executed by a processor of a system having at least a processor and a memory therein, the instructions cause the system to perform operations comprising:

operating a blockchain interface to a blockchain on behalf of a plurality of tenants of the host organization;

operating a database interface to a distributed database, separate from the blockchain, on behalf of the plurality of tenants of the host organization;

displaying a Graphical User Interface (GUI Interface) to a user device communicably interfaced with the system over a network, wherein the GUI interface is to prompt for a metadata entity definition at the user device when displayed by the user device, wherein the metadata entity definition defines access control permissions for a blockchain entity including specifying at least (i) a data classification attribute indicating sensitive user information and (ii) a consent required attribute indicating consent is required to access the sensitive user information and (iii) a consent requirements attribute indicating a party from whom the consent must be acquired;

transacting the metadata entity definition onto the blockchain; and creating a new entity object defined by the metadata entity definition within the distributed database to store the sensitive user information and writing the sensitive user information to the distributed database to be persistently stored.

22. The non-transitory computer readable storage media of claim 21, wherein the instructions cause the system to perform operations further comprising:

receiving a transaction at the blockchain requesting access to the sensitive user information;

retrieving the metadata entity definition from the blockchain;

determining the metadata entity definition mandates the consent required attribute indicating consent is required to access the sensitive user information;

determining the party from whom the consent must be acquired based on the consent requirements attribute as specified by the metadata entity definition retrieved from the blockchain;

determining the party from whom the consent must be acquired has granted consent for the requestor to access the sensitive user information; and responsively querying the distributed database requesting retrieval of the sensitive user information.

* * * * *